US011780499B2

(12) United States Patent
Kobayashi et al.

(10) Patent No.: US 11,780,499 B2
(45) Date of Patent: Oct. 10, 2023

(54) WORKING VEHICLE AND TRACTOR

(71) Applicant: Kubota Corporation, Osaka (JP)

(72) Inventors: Kumiko Kobayashi, Sakai (JP); Kunihiko Nishino, Sakai (JP); Yasuaki Morioka, Sakai (JP); Shunsuke Miyashita, Sakai (JP); Yuki Kubota, Sakai (JP); Misako Kawai, Sakai (JP)

(73) Assignee: KUBOTA CORPORATION, Osaka (JP)

(*) Notice: Subject to any disclaimer, the term of this patent is extended or adjusted under 35 U.S.C. 154(b) by 506 days.

(21) Appl. No.: 16/903,656

(22) Filed: Jun. 17, 2020

(65) Prior Publication Data

US 2020/0307693 A1 Oct. 1, 2020

Related U.S. Application Data

(63) Continuation of application No. PCT/JP2018/046310, filed on Dec. 17, 2018.

(30) Foreign Application Priority Data

| | | |
|---|---|---|
| Dec. 18, 2017 | (JP) | 2017-242205 |
| Dec. 18, 2017 | (JP) | 2017-242214 |
| Jan. 23, 2018 | (JP) | 2018-009220 |

(51) Int. Cl.
*B62D 15/00* (2006.01)
*B62D 15/02* (2006.01)
(Continued)

(52) U.S. Cl.
CPC .......... *B62D 15/025* (2013.01); *A01B 69/008* (2013.01); *B60K 17/165* (2013.01);
(Continued)

(58) Field of Classification Search
CPC ........ B62D 15/025; B62D 1/04; B62D 25/16; B62D 49/02; B62D 49/08; A01B 69/008; B60K 17/165; B60K 23/04
See application file for complete search history.

(56) References Cited

U.S. PATENT DOCUMENTS 6,314,348 B1 * 11/2001 Winslow .............. A01B 69/008 701/41
8,494,726 B2 * 7/2013 Peake .................. G05D 1/0274 701/50
(Continued)

FOREIGN PATENT DOCUMENTS

JP 2005-504251 A 2/2005
JP 2005-278464 A 10/2005
(Continued)

OTHER PUBLICATIONS

Official Communication issued in International Patent Application No. PCT/JP2018/046310, dated Mar. 12, 2019.

*Primary Examiner* — Peter D Nolan
*Assistant Examiner* — Wae L Louie
(74) *Attorney, Agent, or Firm* — KEATING AND BENNETT, LLP

(57) ABSTRACT

A working vehicle includes an inertia detector to measure inertia information of a vehicle body, a rear axle supporting a rear wheel, and a transmission case rotatably supporting the rear wheel. The inertia detector overlaps with at least a portion of the transmission case in a plan view and is capable of accurately measuring inertia information when a vehicle body changes attitude.

4 Claims, 113 Drawing Sheets

(51) Int. Cl.

| | |
|---|---|
| ***A01B 69/04*** | (2006.01) |
| ***B60K 17/16*** | (2006.01) |
| ***B60K 23/04*** | (2006.01) |
| ***B62D 1/04*** | (2006.01) |
| ***B62D 25/16*** | (2006.01) |
| ***B62D 49/02*** | (2006.01) |
| ***B62D 49/08*** | (2006.01) |
| ***G01C 21/16*** | (2006.01) |

(52) U.S. Cl.
CPC ................ *B60K 23/04* (2013.01); *B62D 1/04* (2013.01); *B62D 25/16* (2013.01); *B62D 49/02* (2013.01); *B62D 49/08* (2013.01); *G01C 21/166* (2020.08); *B60K 2023/043* (2013.01)

(56) References Cited

U.S. PATENT DOCUMENTS

| | | | | |
|---|---|---|---|---|
| 11,399,454 | B2 * | 8/2022 | Miyashita | G05D 1/027 |
| 11,407,308 | B1 * | 8/2022 | Weston | B60K 17/20 |
| 2002/0158390 | A1 | 10/2002 | Braman et al. | |
| 2014/0168009 | A1 | 6/2014 | Peake | |
| 2015/0305239 | A1 * | 10/2015 | Jung | A01D 41/141<br>701/50 |
| 2016/0046298 | A1 * | 2/2016 | DeRuyck | G06V 20/597<br>340/576 |
| 2016/0053779 | A1 * | 2/2016 | Komatsu | F15B 13/06<br>60/431 |
| 2016/0169679 | A1 * | 6/2016 | Kajino | G01S 19/42<br>701/491 |
| 2016/0325782 | A1 * | 11/2016 | Muemken | A01B 69/008 |
| 2017/0089043 | A1 * | 3/2017 | Chang | G05B 19/042 |
| 2017/0168501 | A1 * | 6/2017 | Ogura | G05D 1/0278 |
| 2017/0322550 | A1 * | 11/2017 | Yokoyama | A01B 63/111 |
| 2018/0011495 | A1 * | 1/2018 | Sakaguchi | G05D 1/0276 |
| 2018/0210440 | A1 * | 7/2018 | Matsuzaki | G05D 1/0011 |
| 2019/0133023 | A1 * | 5/2019 | Iwami | G05D 1/0212 |
| 2020/0383261 | A1 * | 12/2020 | Miyashita | G05D 1/027 |
| 2020/0398780 | A1 * | 12/2020 | Kobayashi | H01Q 1/325 |
| 2021/0307232 | A1 * | 10/2021 | Shinkai | A01B 59/066 |
| 2022/0022361 | A1 * | 1/2022 | Ogura | G05D 1/0219 |
| 2022/0022375 | A1 * | 1/2022 | Murray | A01D 41/127 |
| 2022/0185384 | A1 * | 6/2022 | Kim | B62D 25/16 |
| 2022/0204098 | A1 * | 6/2022 | Kobayashi | B62D 21/14 |

FOREIGN PATENT DOCUMENTS

| | | | |
|---|---|---|---|
| JP | 2007-159424 | A | 6/2007 |
| JP | 2016-016562 | A | 2/2016 |
| JP | 2016-094093 | A | 5/2016 |
| JP | 2017-112962 | A | 6/2017 |
| WO | 2013/119140 | A1 | 8/2013 |

* cited by examiner

FIG.84A

| Number of operations | Correction amount (cm) | |
|---|---|---|
| | L-Correction amount | R-Correction amount |
| 1 | 2 | 2 |
| 2 | 4 | 4 |
| 3 | 6 | 6 |
| 4 | 8 | 8 |
| 5 | 10 | 10 |
| ⋮ | ⋮ | ⋮ |

FIG.84B

| Operation extent (Displacement) | Correction amount (cm) | |
|---|---|---|
| | L-Correction amount | R-Correction amount |
| 5mm | 2 | 2 |
| 10mm | 4 | 4 |
| 15mm | 6 | 6 |
| 20mm | 8 | 8 |
| 25mm | 10 | 10 |
| ⋮ | ⋮ | ⋮ |

WORKING VEHICLE AND TRACTOR

CROSS REFERENCE TO RELATED APPLICATIONS

The present application is a continuation application of International Application No. PCT/JP2018/046310, filed Dec. 17, 2018, which claims the benefit of priority to Japanese Patent Application No. 2017-242205 filed on Dec. 18, 2017, Japanese Patent Application No. 2017-242214 filed on Dec. 18, 2017, and Japanese Patent Application No. 2018-009220 filed on Jan. 23, 2018. The entire contents of each of these applications are hereby incorporated herein by reference.

BACKGROUND OF THE INVENTION

1. Field of the Invention

The present invention relates to a working vehicle such as a tractor and a rice transplanter, the working vehicle including an inertia measurement device (IMU: Inertia Measurement Unit) configured to measure inertia information upon attitude changing of a vehicle body. In addition, the present invention relates to a tractor capable of performing auto traveling by receiving satellite position information, and capable of measuring the vehicle body movement with the inertia measurement device, and thus improving accuracy of the auto traveling.

2. Description of the Related Art

In the tractor shown as an example of the working vehicle mentioned above, the tractor conventionally includes, as an inertia measurement unit, a three-axis gyro and an accelerometer in three directions, for example, to obtain a three-dimensional angular velocity and acceleration, and determines a posture of the traveling vehicle body, that is, an inclining state and a turning state in a front-rear direction and a right-left direction. In some cases, the inertia measurement unit is integrated in the same case with a GPS antenna configured to receive the satellite position information that is transmitted from the GPS satellites (for example, refer to Japanese Unexamined Patent Publication No. 2016-94093). In addition, among the tractors of this type, a tractor that does not include a driving cabin has a GPS antenna housed inside a control panel of a vehicle body (for example, refer to Japanese Unexamined Patent Publication No. 2016-16562).

Thus, in a tractor of a type that does not have a driving cabin, the inertia measurement unit is housed inside the control panel portion.

In addition, as a technique related to the tractor having a configuration to perform the auto traveling, there is a technique of an antenna unit having a chassis integrally housing a GPS antenna, a circuit board, and an inertia measurement unit to automatically perform the autonomous traveling along a traveling route set by using a satellite positioning system (for example, refer to Japanese Unexamined Patent Publication No. 2016-94093).

In addition, the working vehicle disclosed in Japanese Unexamined Patent Publication No. 2017-112962 is previously known.

The working vehicle disclosed in Japanese Unexamined Patent Publication No. 2017-112962 includes a traveling machine body having a traveling device, a working device configured to perform the working on an agricultural field, a steering device configured to steer the traveling device, a receiver device configured to acquires position information by a satellite positioning system, an inertia measurement unit configured to measure inertia information, a generator portion configured to generate a target line on which the traveling body travels, and a controller portion to control the steering unit so that the traveling body travels along the target line based on the position information and the inertia information.

SUMMARY OF THE INVENTION

A working vehicle includes an inertia detector to measure inertia information of a vehicle body, a rear axle supporting a rear wheel, and a transmission case rotatably supporting the rear wheel. The inertia detector overlaps with at least a portion of the transmission case in a plan view.

A tractor includes an inertia detector to measure inertia information of a vehicle body, a right rear wheel, and a left rear wheel. The inertia detector is adjacent to a transmission case of the vehicle body to transmit a driving force to the right and left rear wheels or to a rigid portion including a vehicle frame.

A working vehicle includes a traveling vehicle body configured to travel in accordance with either manual steering with a steering handle or auto steering applied to the steering handle based on a scheduled traveling line, a receiver provided to the traveling vehicle body to receive a signal of a satellite, an inertia detector to measure inertia of the traveling vehicle body, an auto steering mechanism to automatically steer the steering handle based on the signal received by the receiver and the inertia measured by the inertia detector, an anti-vibration structure to suppress vibration of the inertia detector, and a support to support the inertia detector on the traveling vehicle body with the anti-vibration structure.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings as follows.

FIG. 84A is an explanation view explaining a correction extent in a push switch according to a preferred embodiment of the present invention.

FIG. 84B is an explanation view explaining a correction extent in a slide switch according to a preferred embodiment of the present invention.

DETAILED DESCRIPTION OF THE PREFERRED EMBODIMENTS

Figure 1:
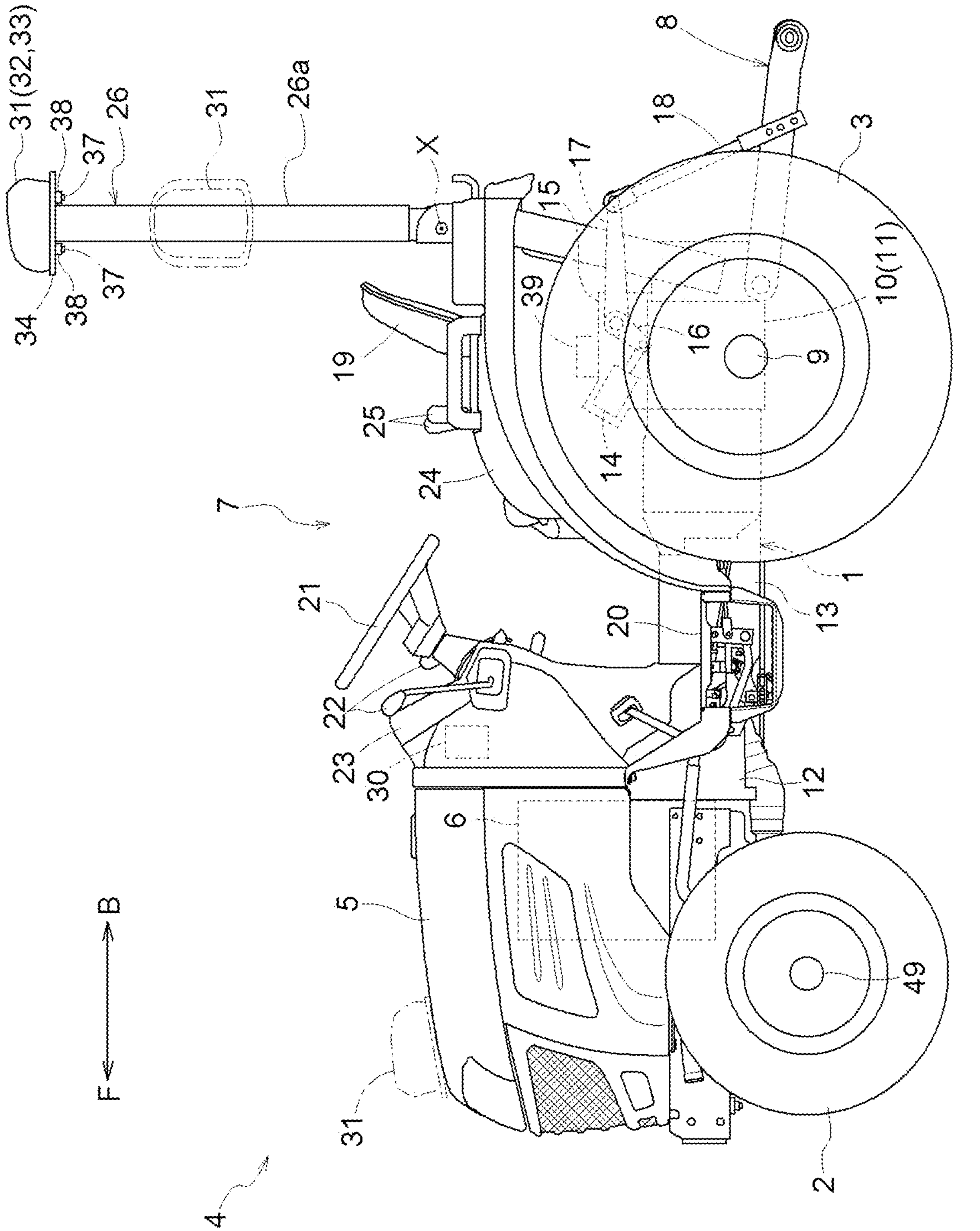
FIG. 1 is a side view of a tractor according to a preferred embodiment of the present invention.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

1. First Preferred Embodiment

First, a first preferred embodiment of the present invention will be described with reference to the drawings.

Hereinafter, a preferred embodiment of a tractor, which is an example of a working vehicle according to the first preferred embodiment of the present invention, will be described with reference to the drawings.

FIG. 1, FIG. 2, FIG. 3, and FIG. 4 show the tractor according to the present preferred embodiment of the present invention. In this preferred embodiment, the direction indicated by the reference symbol F in FIG. 1 corresponds to the front of the tractor, and the direction indicated by the reference symbol B corresponds to the rear of the tractor. In addition, the direction indicated by the reference symbol R in FIG. 2 corresponds to the right of the tractor, and the direction indicated by reference symbol L corresponds to the left of the tractor.

As shown in FIG. 1, the tractor includes a traveling vehicle body 4 wholly supported by a vehicle body frame 1 that defines a framework of the vehicle body, and the traveling vehicle body 4 includes left and right front wheels 2 configured to be driven and to be changed in direction and includes left and right rear wheels 3 configured to be driven in a fixed direction. An engine 6 is mounted in a bonnet 5 at the front portion of the vehicle body, and a driving portion 7 is provided at the rear portion of the vehicle body.

Figure 2:
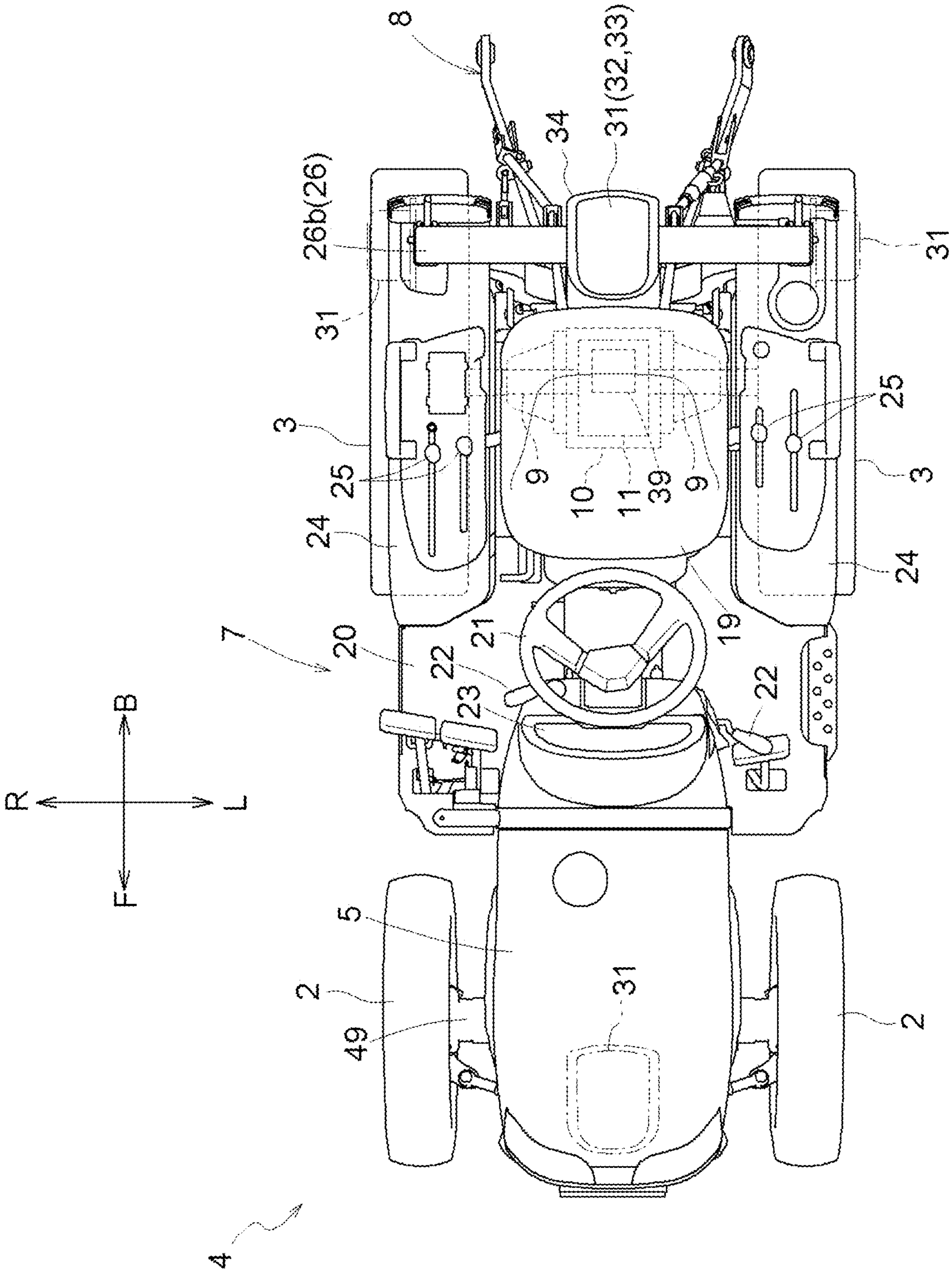
FIG. 2 is a plan view of a tractor according to a preferred embodiment of the present invention.
Figure 3:
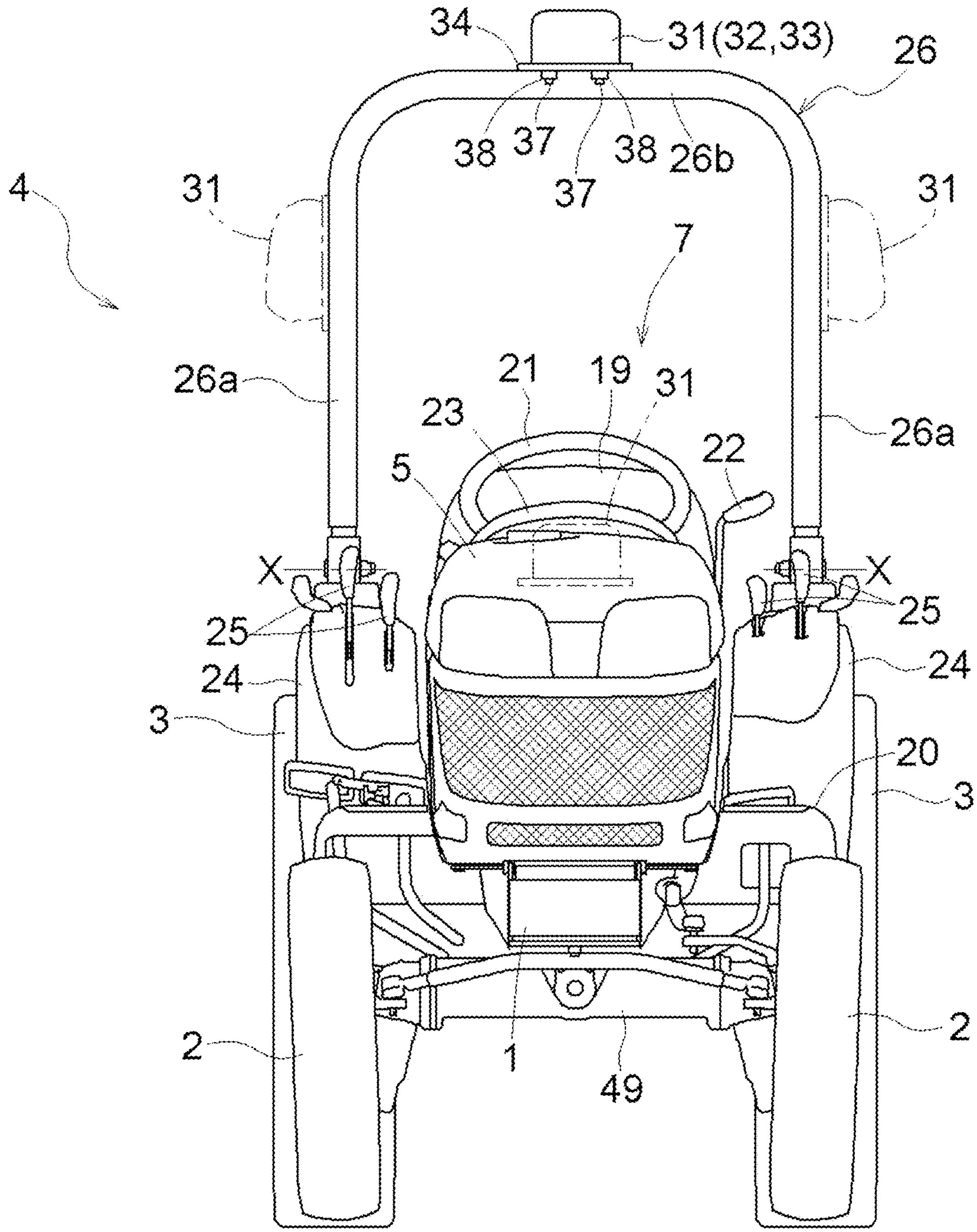
FIG. 3 is a front view of a tractor according to a preferred embodiment of the present invention.

As shown in FIG. 1 and FIG. 2, the traveling vehicle body 4 includes a link mechanism 8 to which a working device (not shown in the drawings) such as a tilling device can be attached to the rear portion of the traveling vehicle body and which is capable of being lifted and lowered while being connected to the working device. A transmission case 10 configured to transmit the power of the engine 6 to the left and right rear wheels 3 through the rear axle 9 is provided at a lower portion of the driving portion 7. The transmission case 10 is provided with a differential device configured to cause a speed difference between the driving speeds of the left and right rear axles 9, and the power from the engine 6 is transmitted through the differential device 11 and distributed to the left and right rear wheels 3. The transmission case 10 rotatably supports the rear axle 9.

In this preferred embodiment, the engine 6 arranged in the front portion of the vehicle body, the clutch housing 12 connected to the rear portion of the engine 6, the middle frame 13, the transmission case 10 arranged in the rear portion of the vehicle body, and the like are integrally connected to each other to define the vehicle body frame 1 with high-rigid.

The upper portion of the transmission case 10 is provided with a hydraulic lifting cylinder 14 configured to drive the working device up and down with a link mechanism 8. The lift cylinder 14 is housed in a cylinder case 15. In the cylinder case 15, a swing arm 16 that is swingably operated through stretching and shortening of the lifting cylinder 14 is provided, and the lift arm 17 that swings integrally with the swing arm 16 and the link mechanism 8 are pivotally connected by a lift rod 18.

The driving portion 7 includes a driver seat 19 on which an operator can sit, a boarding step 20 that is arranged in front of the driver seat 19 and defines a floor surface of the driving portion 7, and a control panel portion 23 arranged in front of the driver seat 19 and including a steering wheel 21 and other operating tools 22. On the left and right sides of the driver seat 19, rear wheel fenders 24 that cover above the left and right rear wheels 3, and the rear wheel fenders 24 are also provided with a plurality of operation tools 25 to perform various work procedures.

On the rear side of the driver portion 7, both left and right sides are connected to the rear end of the vehicle body frame 1, that is, to the rear end of the transmission case 10, and a ROPS (Rollover Protection Structure) 26 for roll protection extending upward so as to surround the upper rear side of the driver seat 19 is provided. That is, the ROPS 26 includes a pair of left and right vertical frame portions **26*a* extending in the vertical direction and includes a lateral frame portion 26*b* connecting the upper ends of the left and right vertical frame portions 26*a* and extending in the horizontal direction, and has a substantially gate shape in view from the front. The ROPS 26** is formed of a hollow square pipe material, and has a shape obtained by bending the square pipe material in a substantially gate shape in a front view.

The ROPS 26 is configured to be bent around a lateral swing fulcrum X provided at the lower portion. With this configuration, the ROPS 26 are swung around the swing fulcrum X to the front side of the machine body in transporting of the vehicle body, and thus the amount of upward projection is reduced and the transportation is prevented from being hindered.

The traveling vehicle body 4 includes a controller 30 to perform traveling control, a steering motor (not shown in the drawings) capable of steering the front wheels 2, a positioning unit 31 configured to measure the position and azimuth of the traveling vehicle body 4 with use of the well-known GPS (Global Positioning System) which is an example of the GNSS (Global Navigation Satellite System), and the like.

The positioning unit 31 includes an antenna unit 32 configured to receive a radio wave transmitted from a GPS satellite (not shown in the drawings) and data transmitted from a reference station (not shown in the drawings) installed at a known position, and includes a satellite navigation device 33 configured to measure the position and azimuth of the traveling vehicle body 4 based on the positioning data of the positioning unit 31. In the present preferred embodiment, a positioning method using the GPS uses the D-GPS (Differential GPS) capable of measuring the position of the vehicle body with use of the positioning data of the GPS and the error correction information transmitted from a reference station whose position is known on the ground side in advance. The reference station transmits, preferably wirelessly, the error correction information that is obtained by receiving the radio waves from GPS satellites. The satellite navigation device 33 obtains the position and azimuth of the traveling vehicle body 4 based on the positioning data obtained by receiving the radio wave from the GPS satellite and the information from the reference station.

The positioning unit 31 including the antenna unit 32 is arranged at a high position facing the outside of the machine body so that the receiving sensitivity of the radio waves transmitted from the GPS satellites becomes high. In particular, as shown in FIG. 1, the positioning unit 31 is provided in the lateral frame portion 26*b* arranged at the top portion (the highest position) of the ROPS 26. The positioning unit 31 is attached by an attachment bracket 34 in the vicinity of the lateral center portion of the lateral frame portion 26*b*. That is, the antenna unit 32 is provided at a position higher than the upper end of the driver seat 19 and above the swing fulcrum X of the ROPS 26.

Figure 4:
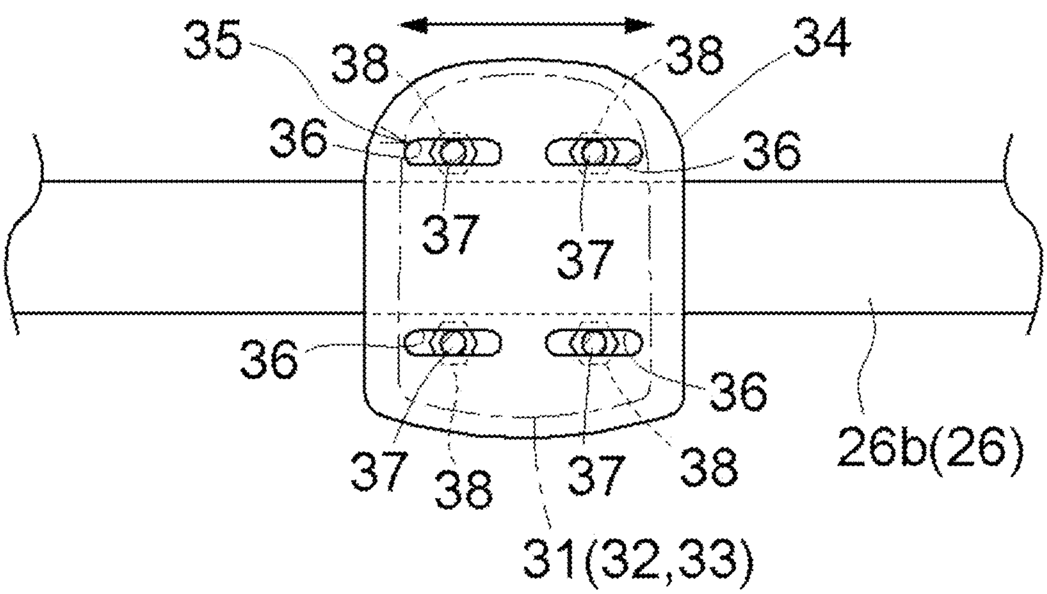
FIG. 4 is a bottom view illustrating an adjustment mechanism according to a preferred embodiment of the present invention.
Figure 5:
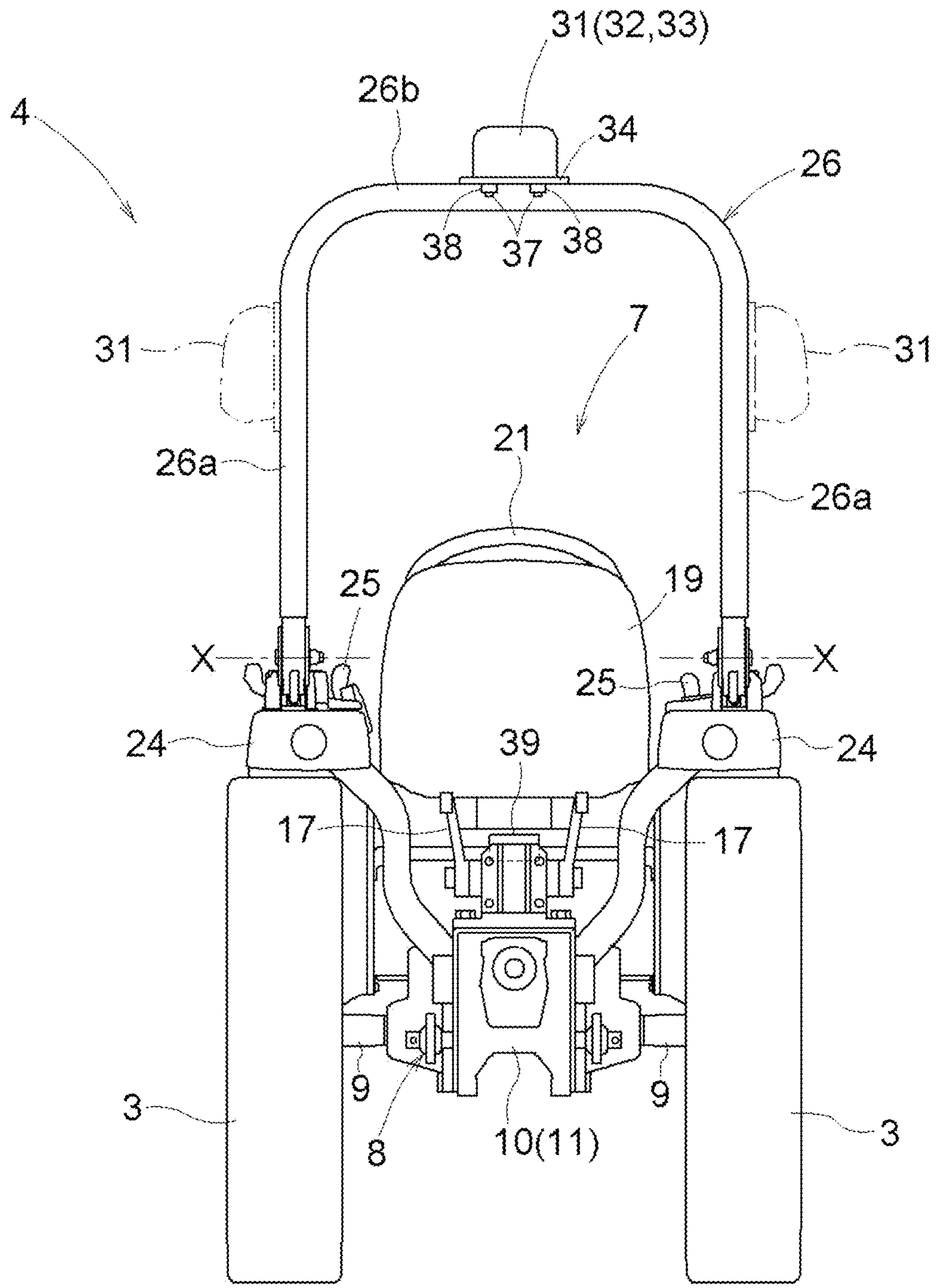
FIG. 5 is a back view of a tractor according to a preferred embodiment of the present invention.

An adjusting mechanism 35 configured to adjust the attachment position of the positioning unit 31 with respect to the ROPS 26 in the left-right direction is provided. In addition, as shown in FIG. 4, the positioning unit 31 is attached to the ROPS 26 with an attachment bracket 34. The positioning unit 31 is fixedly attached to the attachment bracket 34 by fastening four bolts 37 protruding downward and inserting through the insertion holes 36 formed in the attachment bracket 34 and nuts 38 attached to the bolts 37 from the lower side of the attachment bracket 34. Each of the insertion holes 36 into which the bolts 37 are inserted is a long hole that is elongated in the lateral direction. The positioning unit 31 can be laterally moved to an arbitrary position within the range of the elongated hole and can be fixed by fastening the bolts 37 and the nuts 38.

As described above, the antenna unit 32 is provided at a position separating upward from the traveling vehicle body 4, and thus the position and azimuth of the traveling vehicle body 4 measured using the GPS include the positioning error caused by the positional deviation of the antenna unit 32 due to the yawing, pitching, or pitching of the traveling machine body 4. That is, it is an error caused by the positional deviation between the position measured by the positioning unit 31 and the work position of the working device.

Thus, the traveling vehicle body 4 is provided with an inertia measurement device (IMU: Inertia Measurement Unit) 39 configured to measure the yaw angle, pitch angle, roll angle, and the like of the traveling vehicle body 4 with a triaxial gyroscope (not shown in the drawings) and a three-direction acceleration sensor (not shown in the drawings) in order to enable the correction to remove the positioning error as described above. The information on the position and azimuth of the traveling vehicle body 4 measured by the positioning unit 31 is corrected based on the information on the positional deviation of the antenna unit 32 due to the yawing, pitching, or rolling of the traveling vehicle body 4 measured by the inertia measurement unit 39.

As shown in FIG. 2, the inertia measurement unit 39 is arranged at a position overlapping with the transmission case 10 in a plan view. In addition, the inertia measurement unit 39 is provided below the driver seat 19 at a position above the drive shaft of the rear axle 9 and above the cylinder case 15 arranged above the transmission case 10. More particularly, the inertia measurement unit 39 is arranged at a position overlapping with the rear wheel 3 in a side view. This portion is a portion having high rigidity and is unlikely to be deformed by bending and is separated from the engine 6, and thus it is hardly affected by the vibration of the engine 6. Thus, the measurement is carried out with a small error.

As shown in FIG. 1, the controller 30 is provided under the state of being housed inside the control panel portion 23. Then, the controller 30 is configured to execute the auto steering control to control the steering motor and the like such that the traveling vehicle body 4 travels along the working traveling route based on the preset traveling route information in the field and on the positioning result of the positioning unit 31.

The wiring 40 that connects the positioning unit 31 including the antenna unit 32 to the controller 30 is provided. In addition, the wiring 40 is arranged along the vertical frame portion 26*a*. In particular, the wiring 40 is arranged so as to pass through the inside of a movable portion that is arranged above the swing fulcrum X of the vertical frame portion 26*a* of the ROPS 26 made of a hollow square pipe material.

Figure 6:
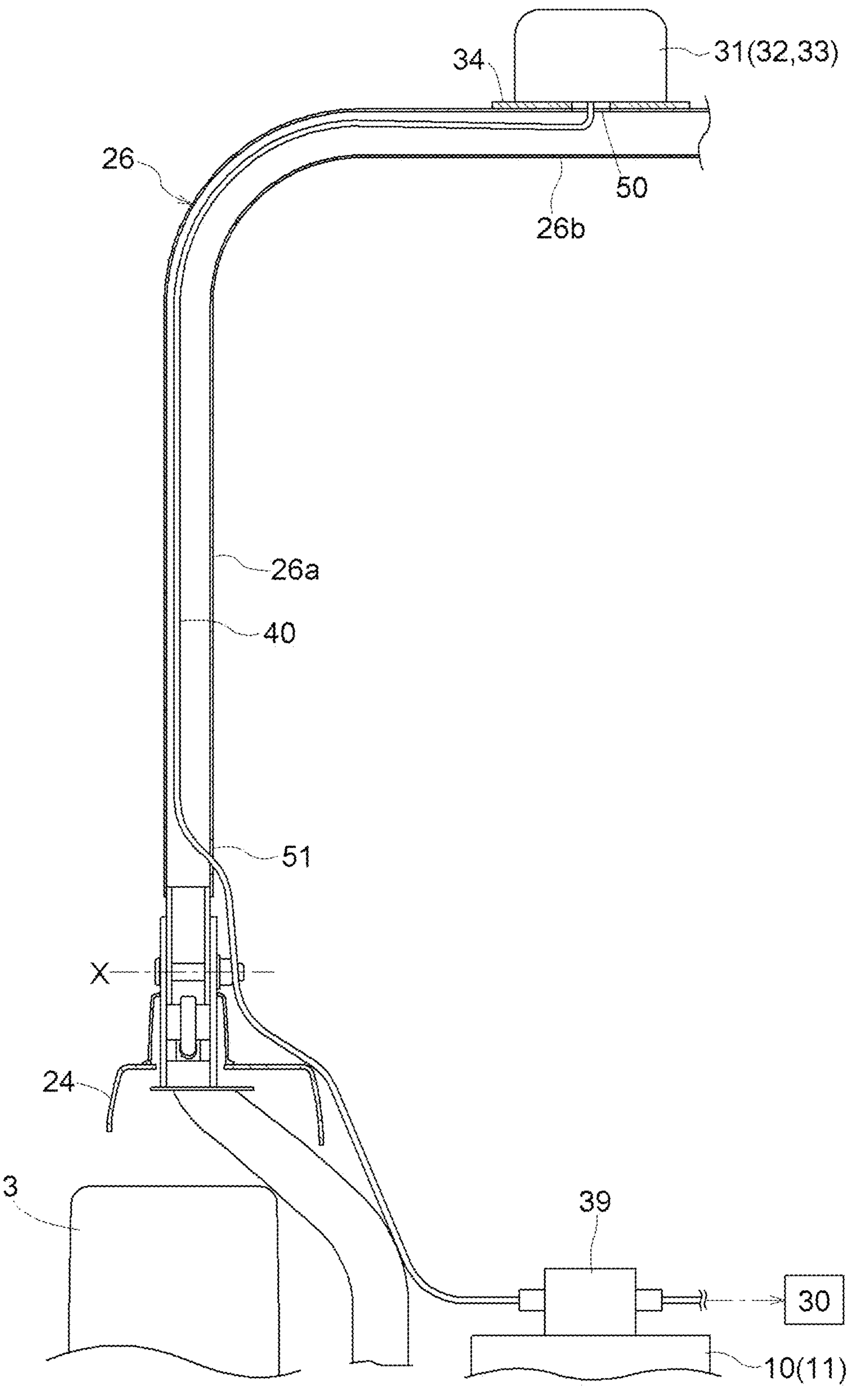
FIG. 6 is a longitudinal front view illustrating a support structure for wirings according to a preferred embodiment of the present invention.

That is, as shown in FIG. 6, the wiring 40 from the positioning unit 31 is guided to the inside of the lateral frame portion 26*b* through the insertion hole 50 formed in the lateral frame portion 26*b*, passes through the inside of the lateral frame portion 26*b* and the vertical frame portion 26*a*, passes through the insertion hole 51 formed above the swing fulcrum X of the vertical frame portion 26*a*, and extends to the inertia measurement unit 39 arranged above the transmission case 10. Then, the wiring 40 extends to the controller 30 provided in the control panel portion 23 through the inertia measurement unit 39 and a lower side of the rear wheel fender 24.

Another Preferred Embodiment (1) In the above preferred embodiment, the antenna unit (the positioning unit 31) is attached to the lateral frame portion 26*b* of the ROPS 26. However, instead of this configuration, the antenna unit 32 (the positioning unit 31) may have the configuration where the antenna unit 32 is attached to the vertical frame portion 26*a* of the ROPS 26 as shown by the imaginary lines in FIG. 1, FIG. 3, FIG. 5, FIG. 9, FIG. 10, and FIG. 12.

Figure 7:
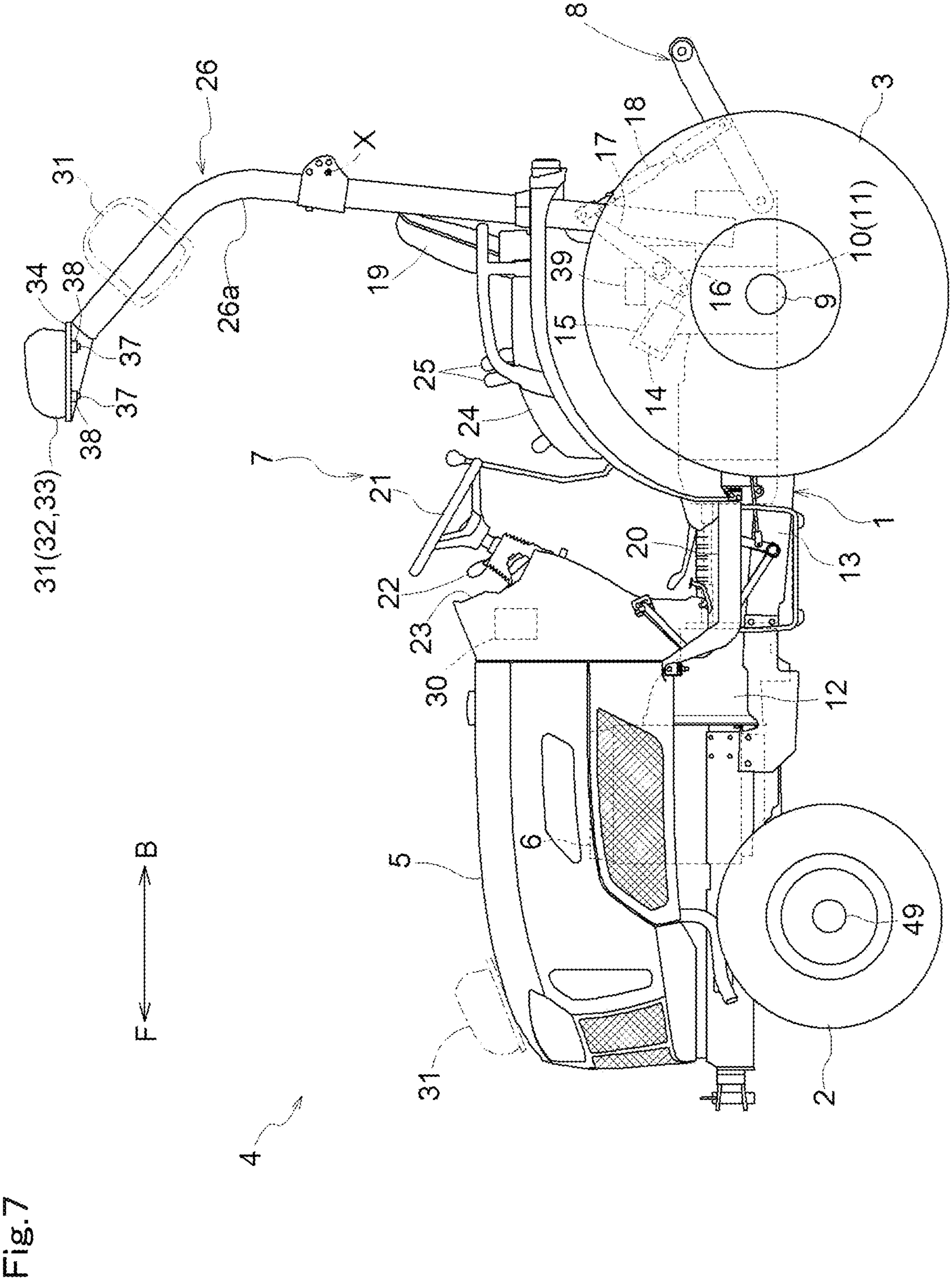
FIG. 7 is a side view of a tractor according to another preferred embodiment of the present invention.
Figure 8:
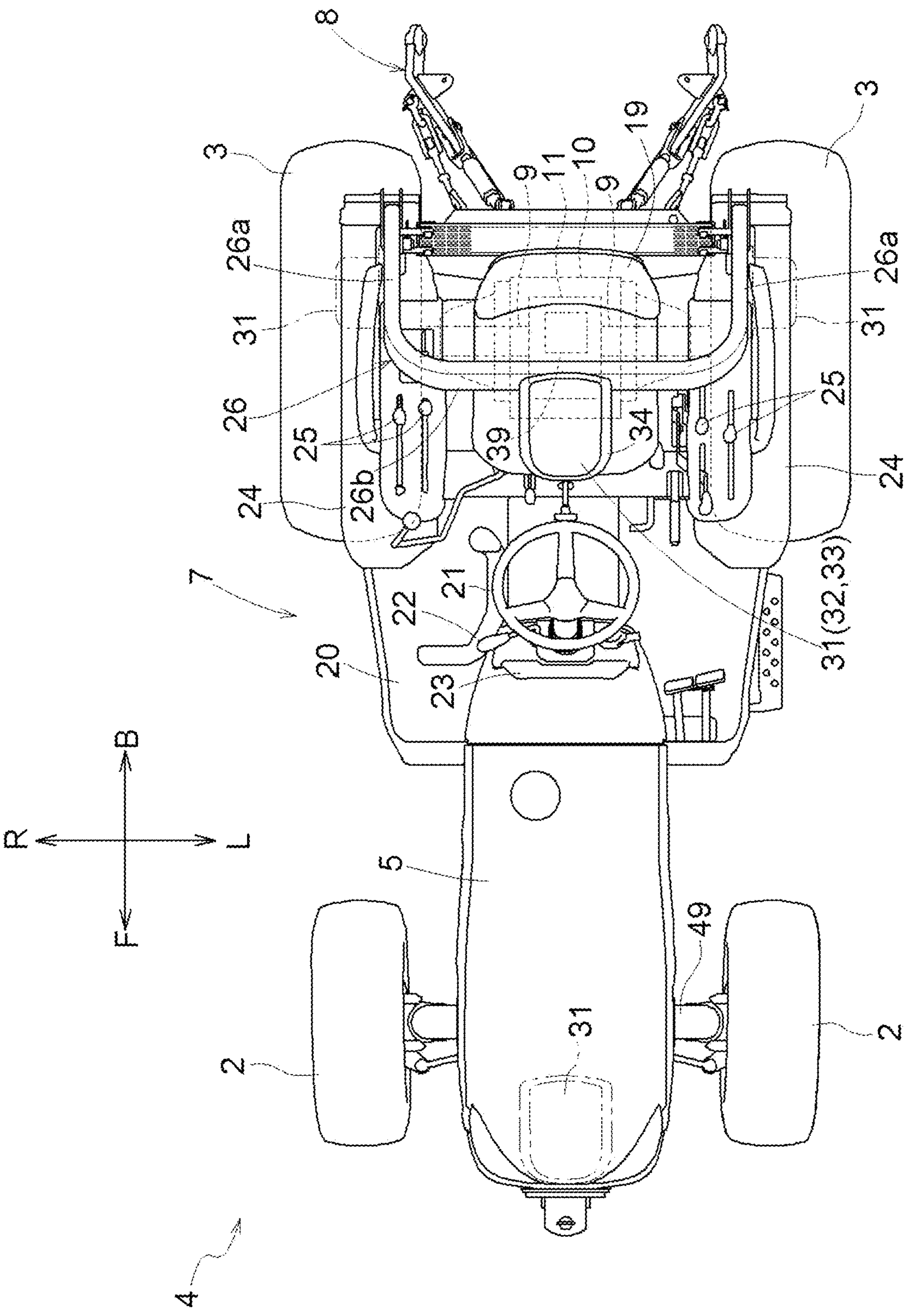
FIG. 8 is a plan view of a tractor according to a preferred embodiment of the present invention.
Figure 9:
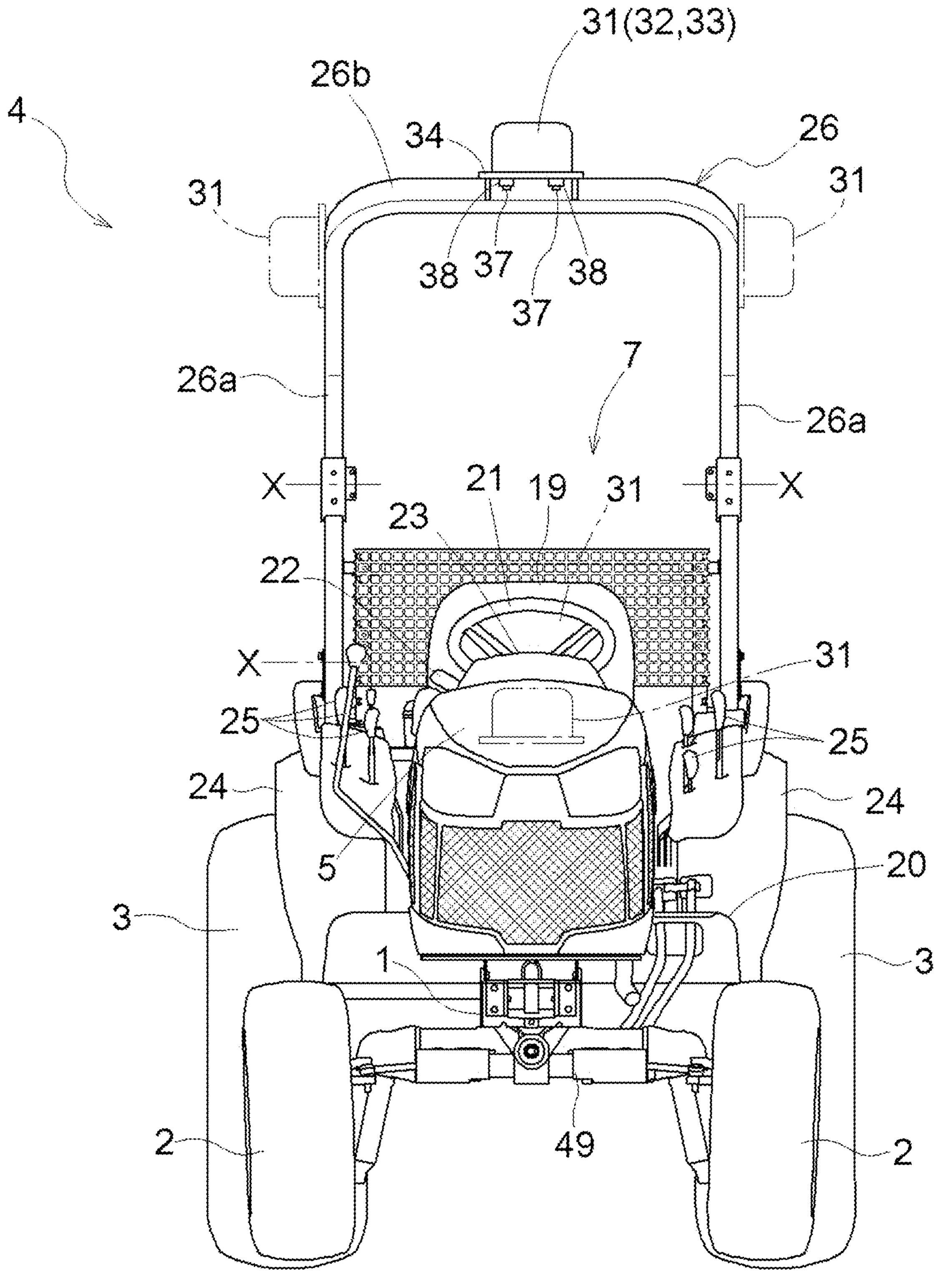
FIG. 9 is a front view of a tractor according to a preferred embodiment of the present invention.

(2) In the above preferred embodiment, the vertical frame portion 26*a* of the ROPS 26 has a shape that extends straight in the vertical direction. However, instead of this configuration, the upper portion of 26*a* may be provided so as to be bent toward the front side of the machine body as shown in FIG. 7, FIG. 8, and FIG. 9.

Figure 10:
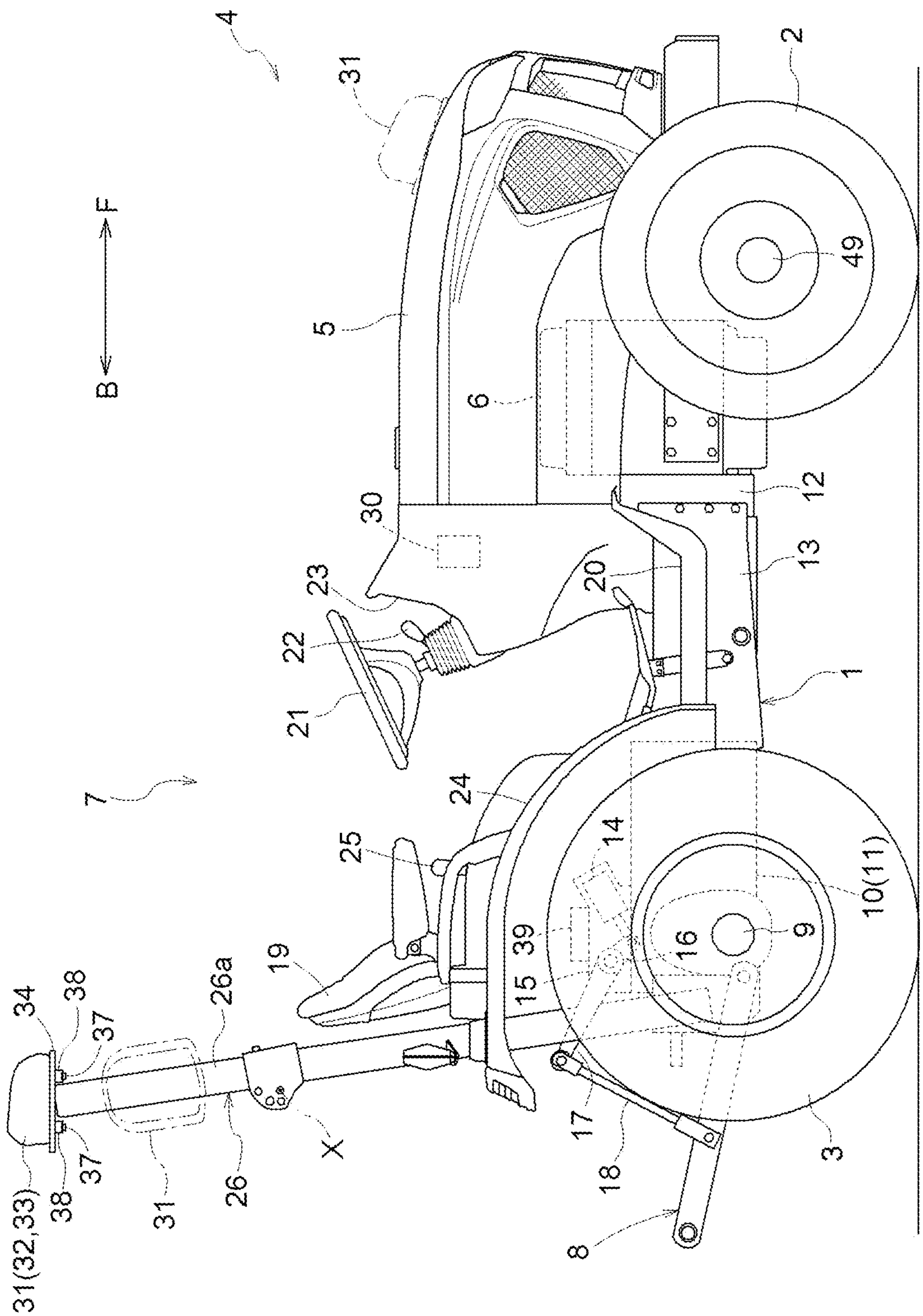
FIG. 10 is a side view of a tractor according to a preferred embodiment of the present invention.
Figure 11:
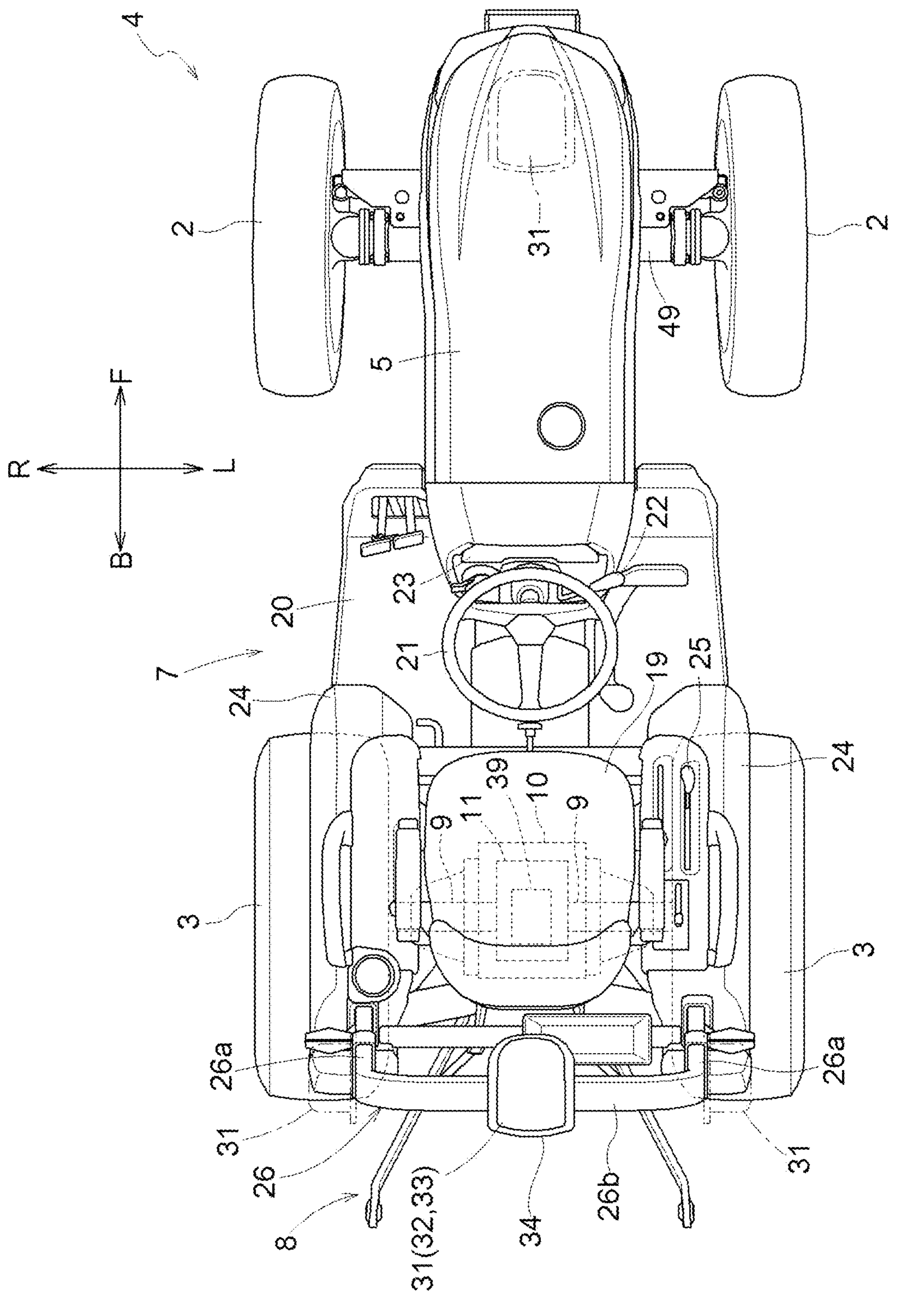
FIG. 11 is a plan view of a tractor according to a preferred embodiment of the present invention.
Figure 12:
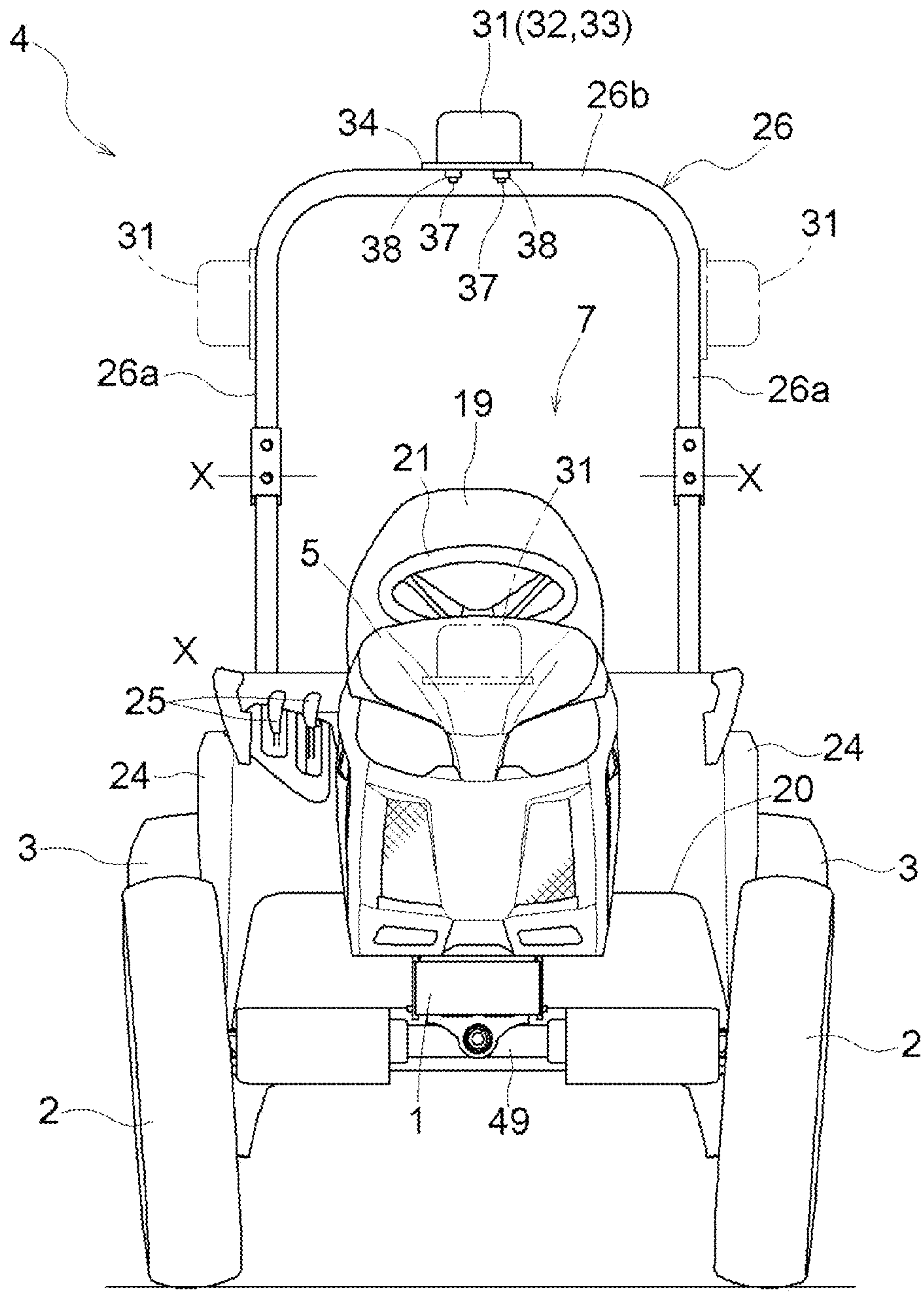
FIG. 12 is a front view of a tractor according to a preferred embodiment of the present invention.
Figure 13:
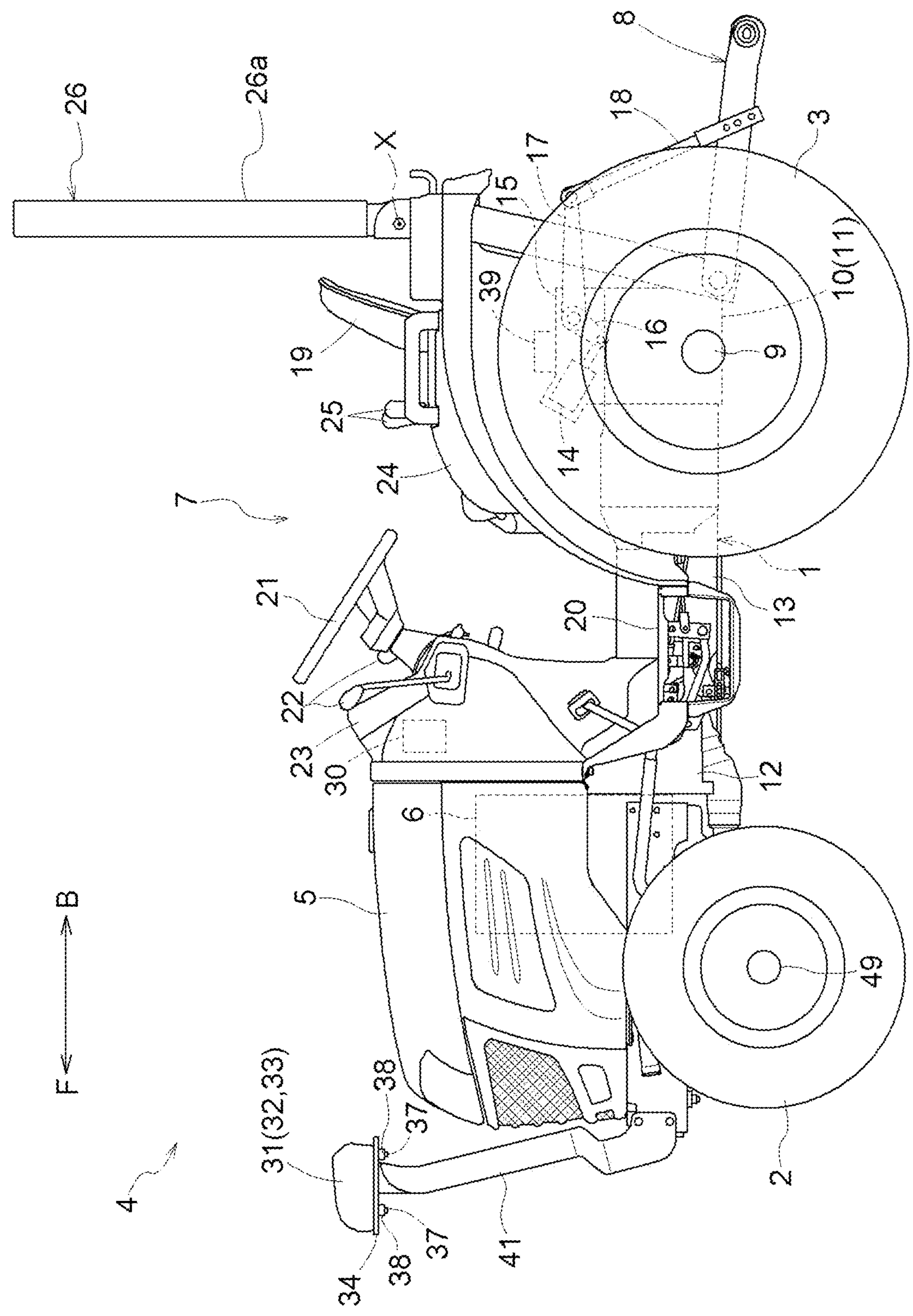
FIG. 13 is a side view of a tractor according to a preferred embodiment of the present invention.
Figure 14:
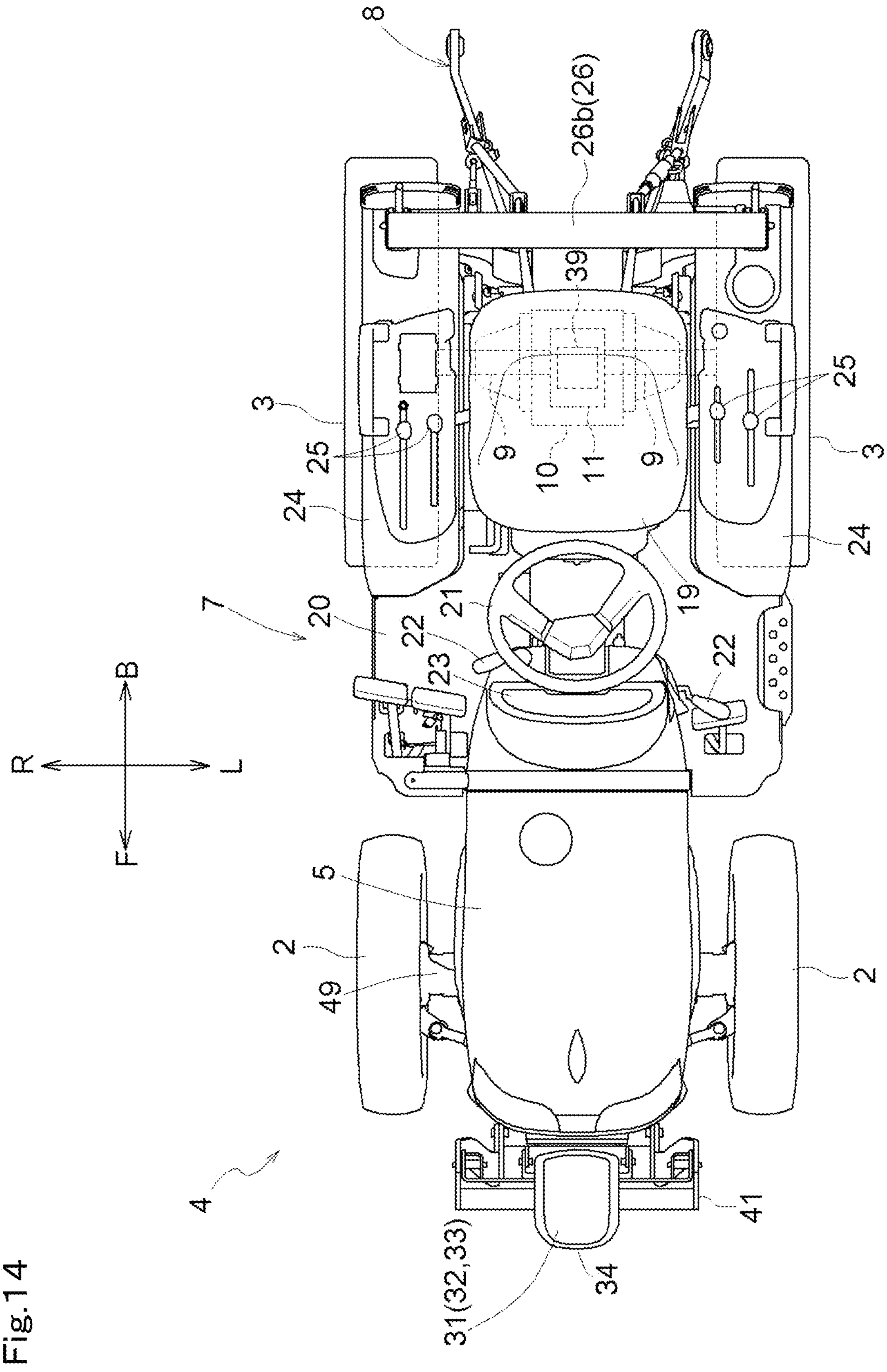
FIG. 14 is a plan view of a tractor according to a preferred embodiment of the present invention.

(3) In the above preferred embodiment, the ROPS 26 are provided with the swing fulcrum X at the lower end. However, instead of this configuration, it may be also possible to have a swing fulcrum X for bending and to provide the antenna unit 32 on the lateral frame portion 26*b* of the ROPS 26 as shown in FIG. 10, FIG. 11, and FIG. 12.

(4) In the above preferred embodiment, the antenna unit 32 is attached to the ROPS 26 provided at the rear portion of the traveling vehicle body 4. However, instead of this configuration, the following configurations (4-1) to (4-6) may be used.

(4-1)

Figure 15:
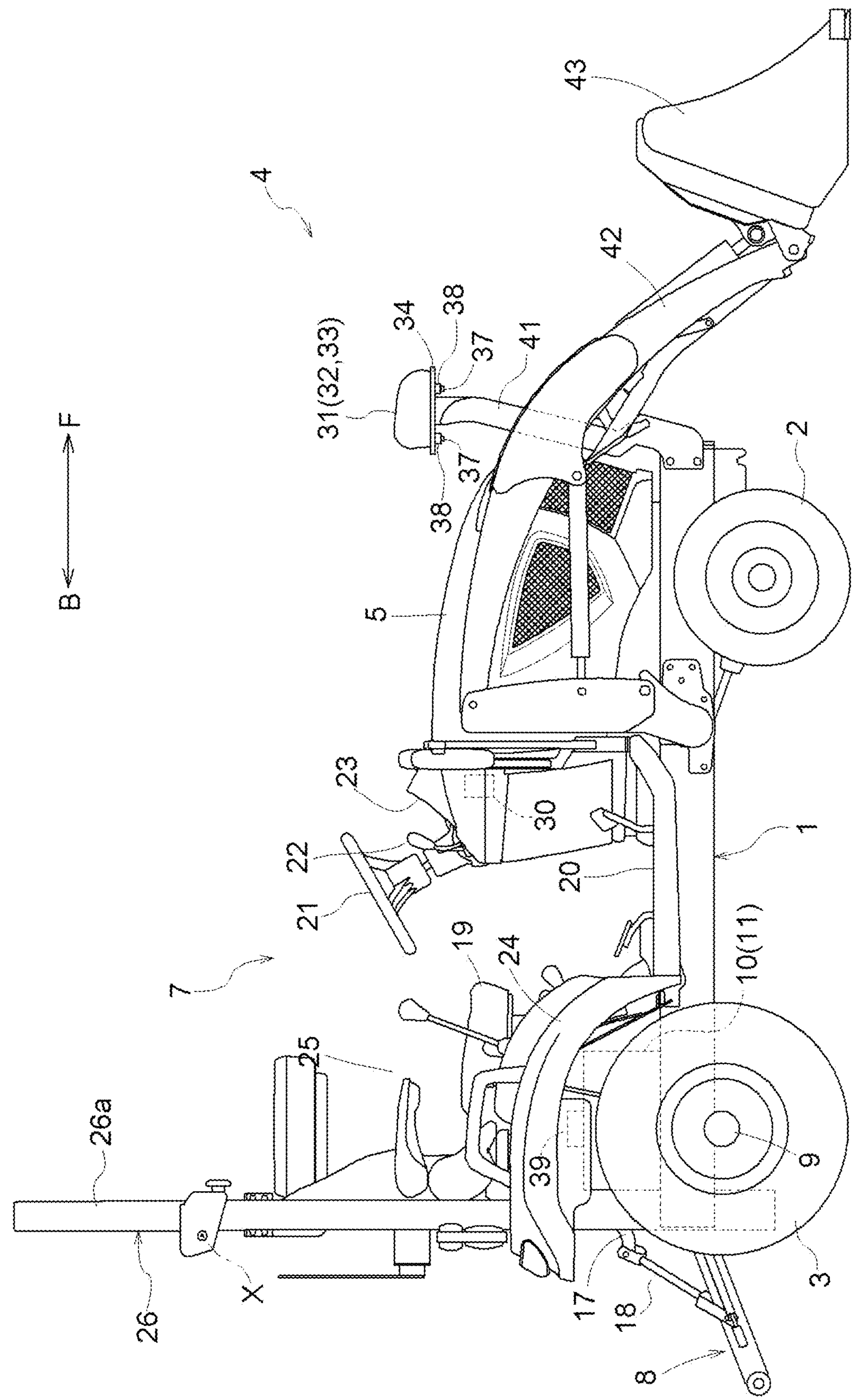
FIG. 15 is a side view of a tractor according to a preferred embodiment of the present invention.
Figure 16:
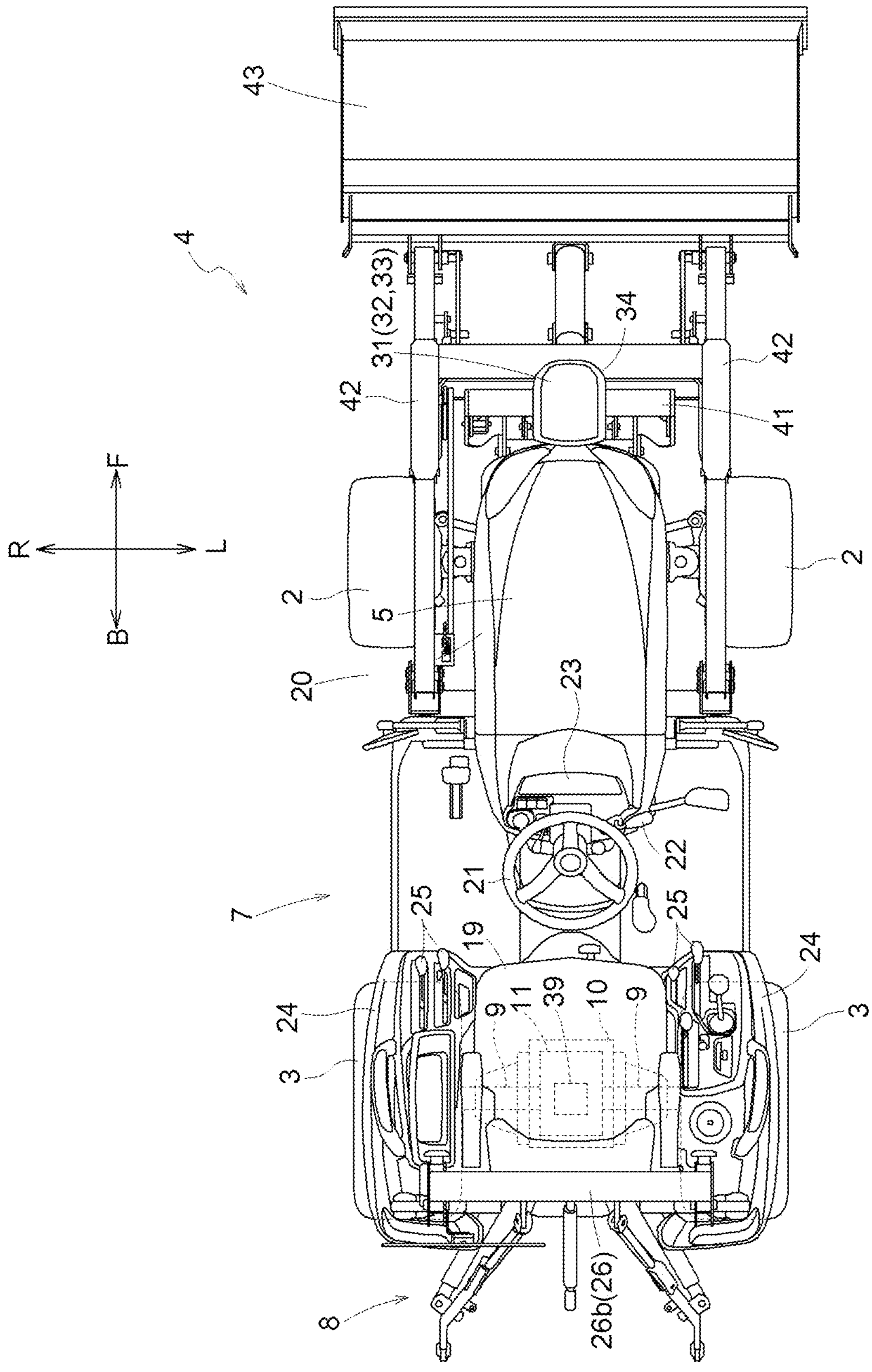
FIG. 16 is a plan view of a tractor according to a preferred embodiment of the present invention.

As shown in FIG. 13, FIG. 14, FIG. 15, and FIG. 16, the antenna unit 32 may be attached to the front guard 41 provided on the traveling vehicle body 4 to protect the front end portion. FIG. 15 and FIG. 16 show a configuration in which the front loader 43 is connected by the support arms 42 that extend through the left and right sides of the front guard 41.

(4-2)

Figure 17:
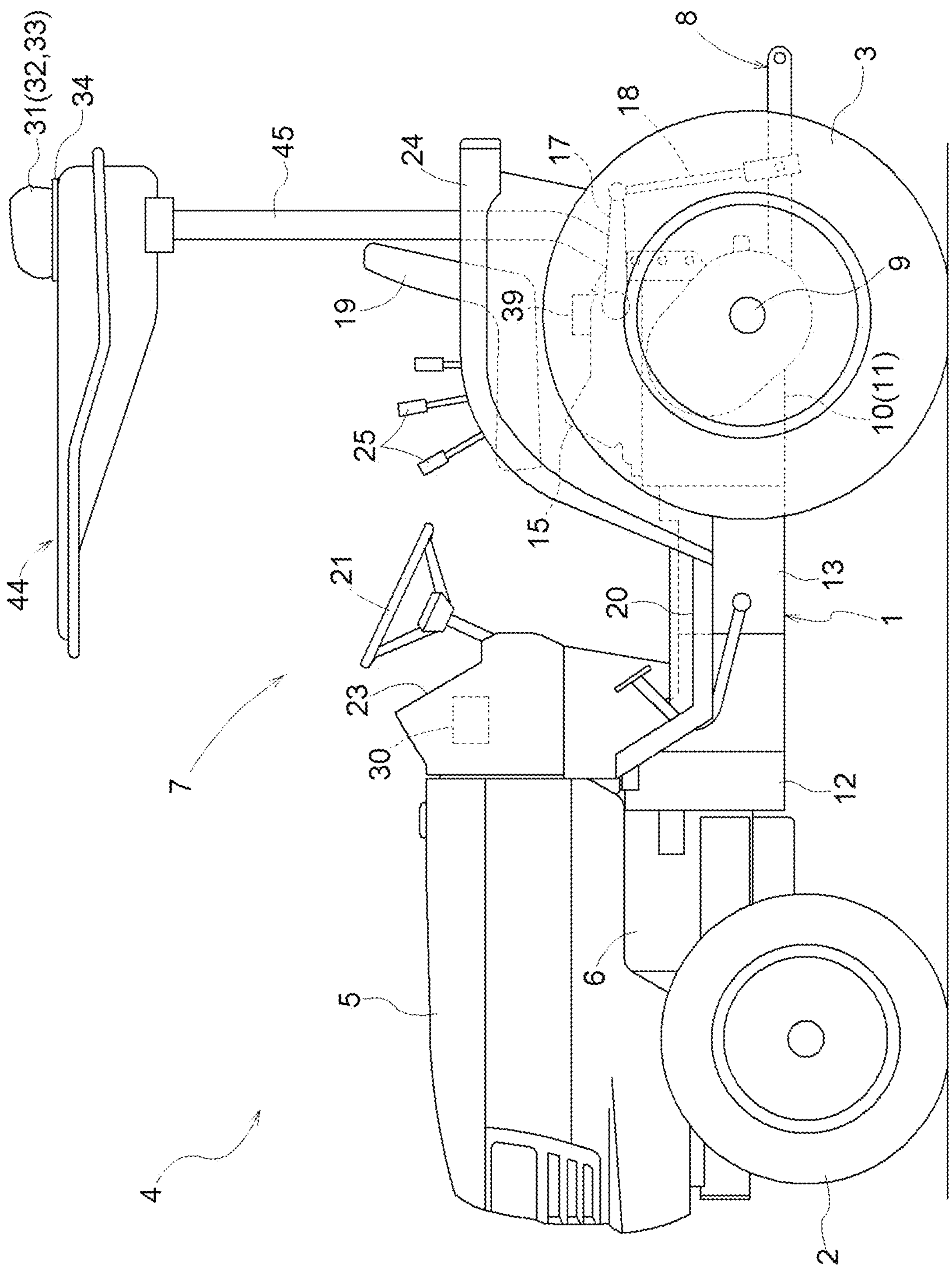
FIG. 17 is a side view of a tractor according to a preferred embodiment of the present invention.
Figure 18:
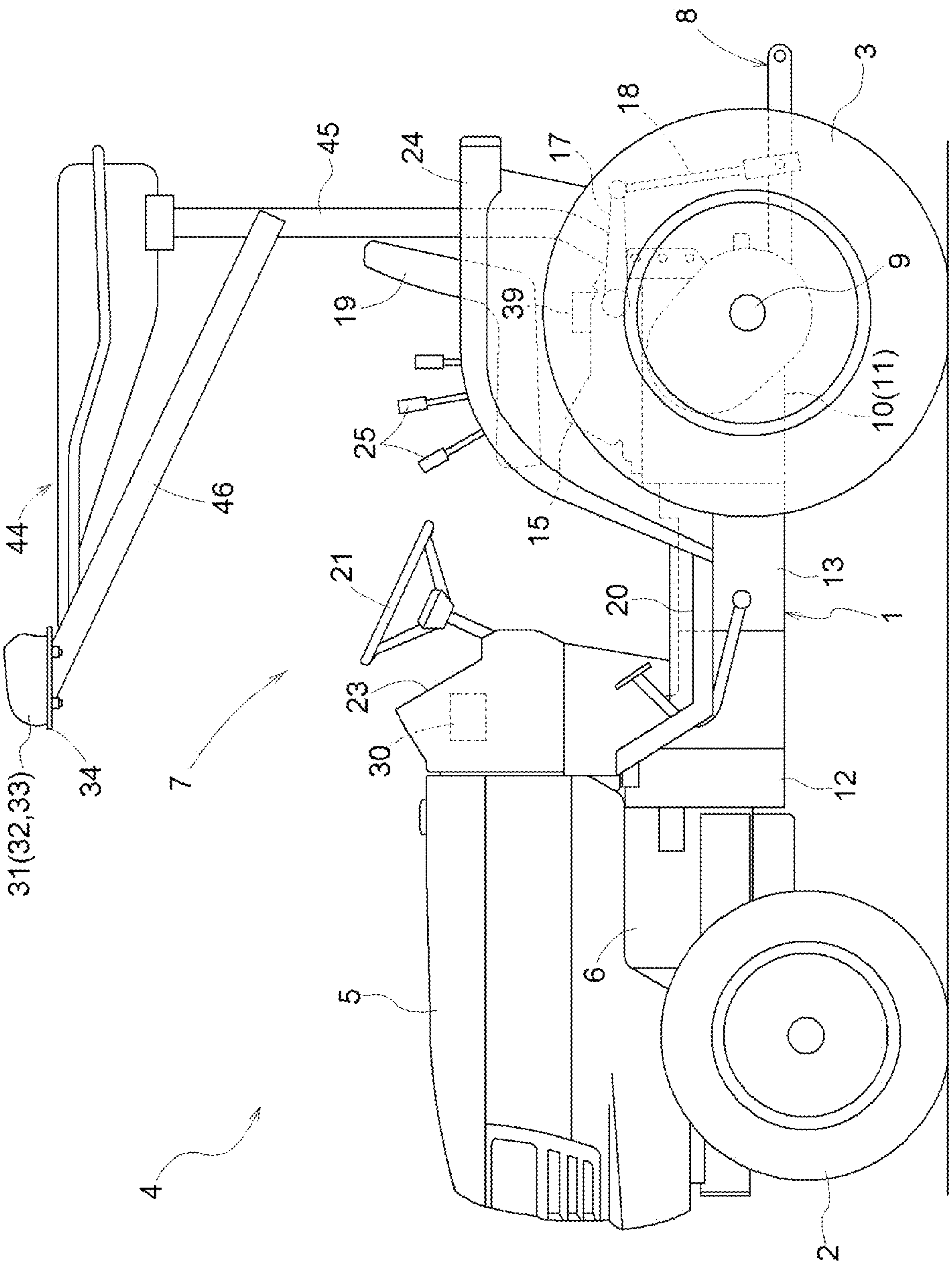
FIG. 18 is a side view of a tractor according to a preferred embodiment of the present invention.

As shown in FIG. 17 and FIG. 18, the antenna unit 32 may be attached to the canopy 44 that covers the upper portion of the driving portion 7. As shown in FIG. 18, when the antenna unit 32 is attached to the front end portion of the canopy 44 that extends to have a cantilever shape toward the front portion of the machine body, the auxiliary stay 46 may be extended from the column 45 of the canopy 44 to improve the support strength.

(4-3)

Figure 19:
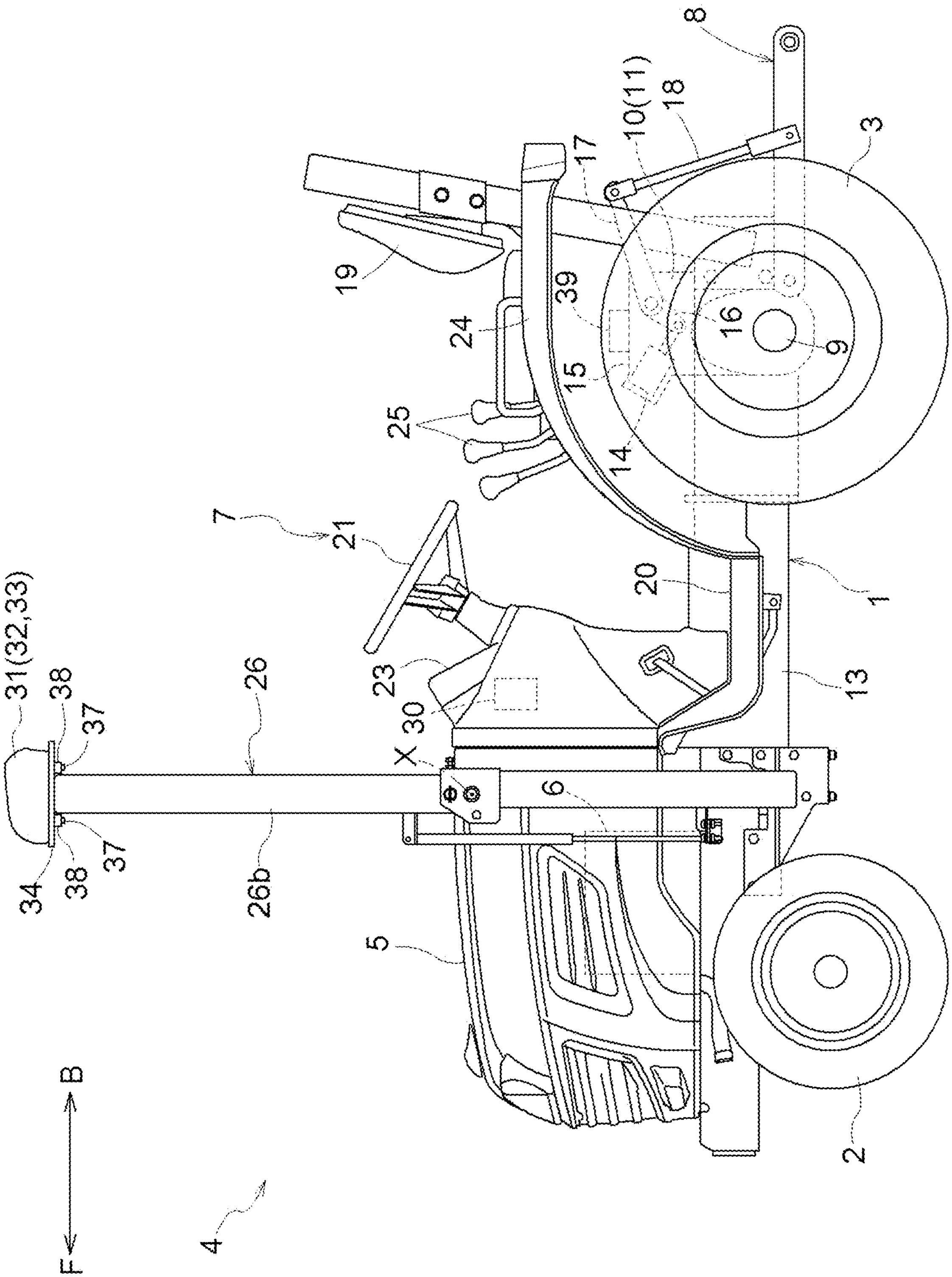
FIG. 19 is a side view of a tractor according to a preferred embodiment of the present invention.
Figure 20:
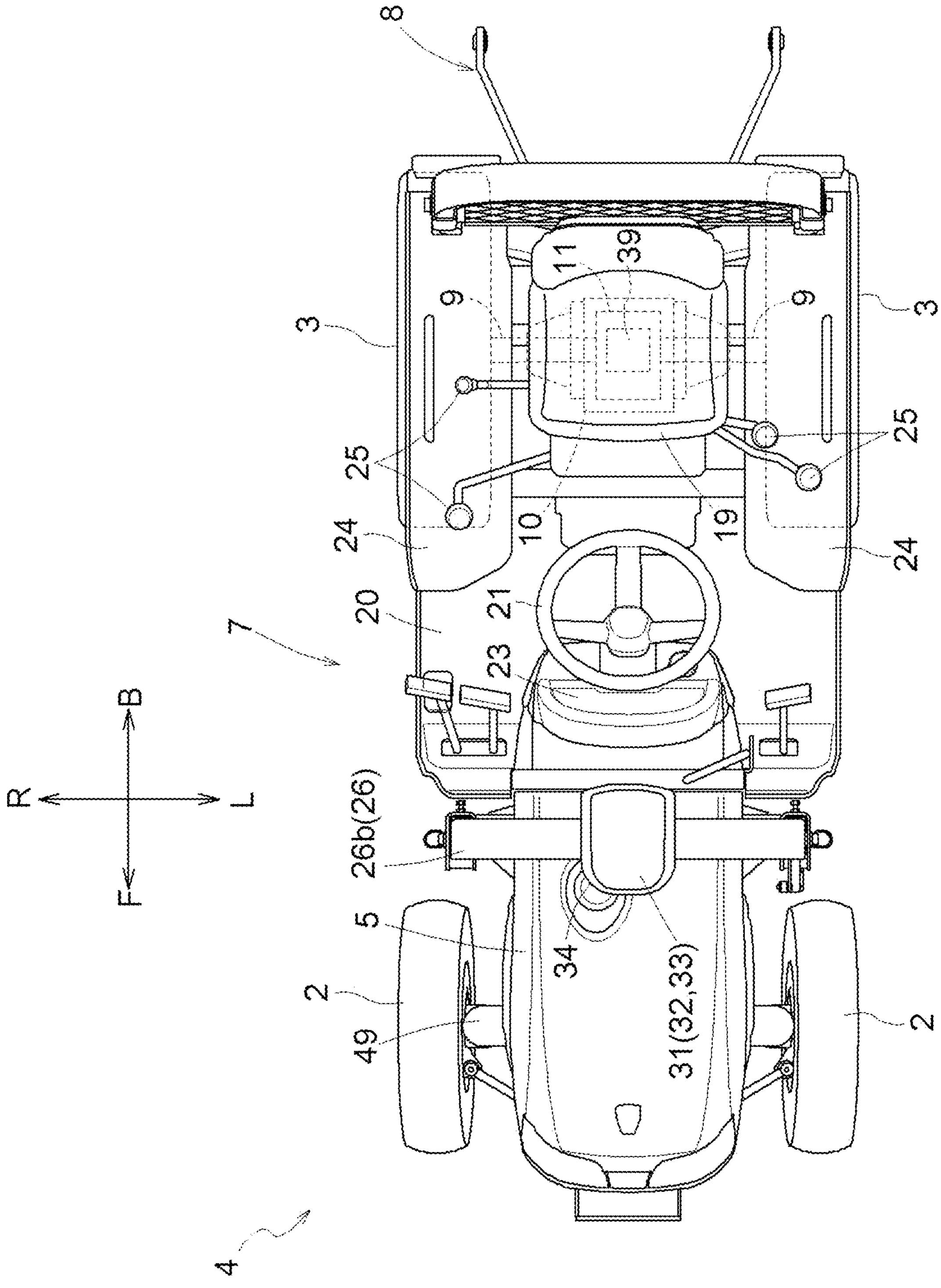
FIG. 20 is a plan view of a tractor according to a preferred embodiment of the present invention.

As shown in FIG. 19 and FIG. 20, the antenna unit 32 may be attached to the ROPS 26 that is provided at a position arranged in front of the driving portion 7 and on the rear side of the bonnet 5.

(4-4)

Figure 21:
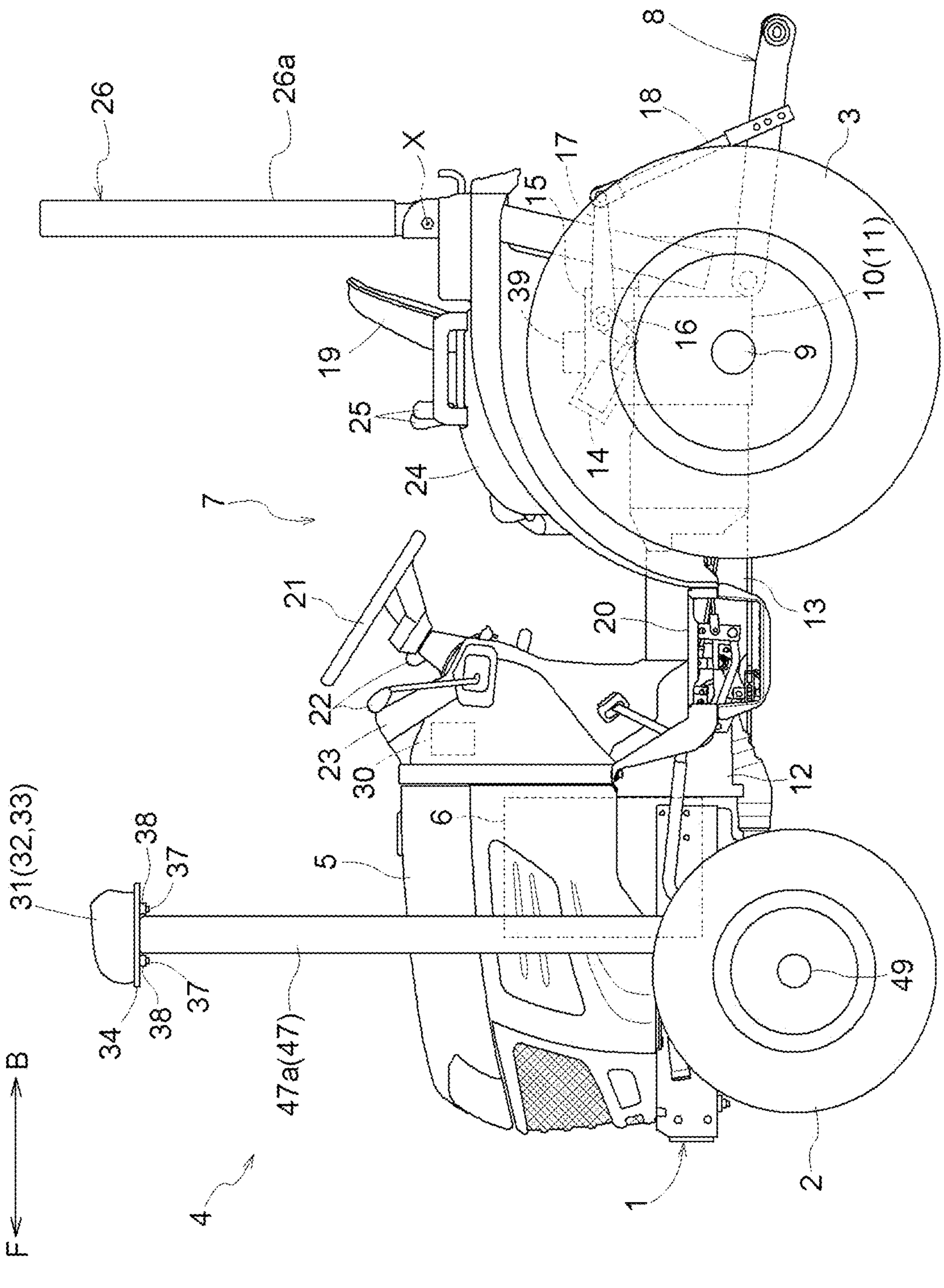
FIG. 21 is a side view of a tractor according to a preferred embodiment of the present invention.
Figure 22:
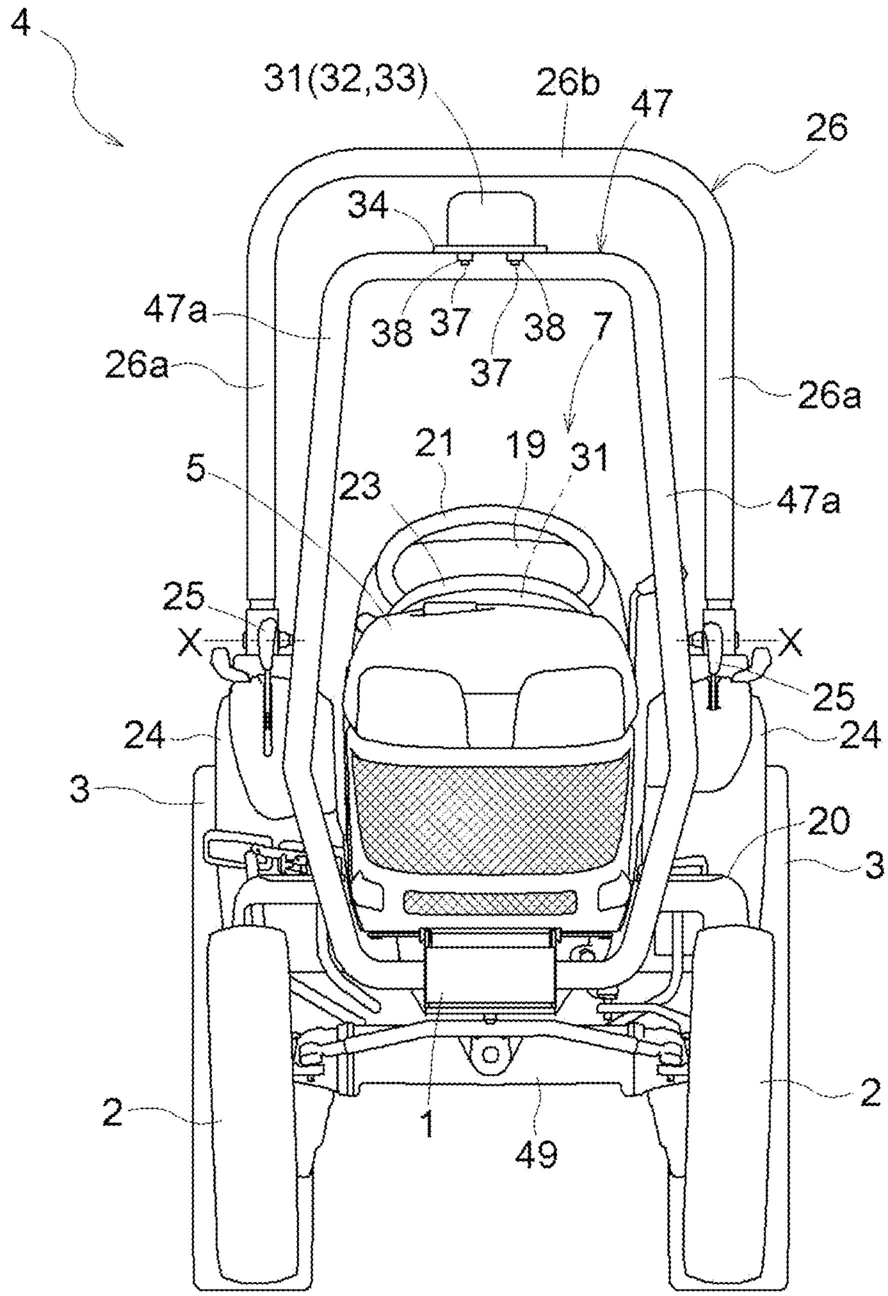
FIG. 22 is a front view of a tractor according to a preferred embodiment of the present invention.
Figure 23:
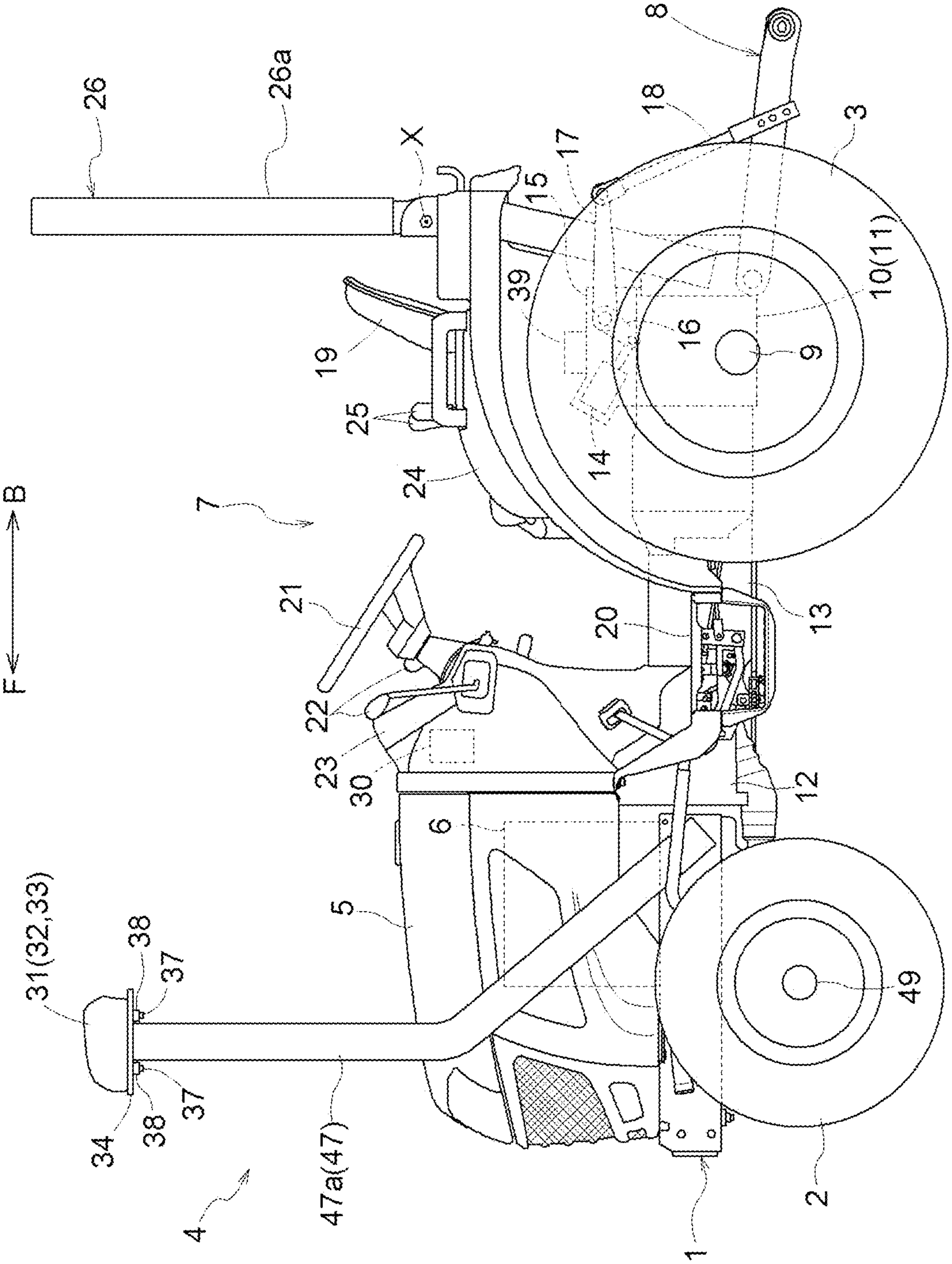
FIG. 23 is a side view of a tractor according to a preferred embodiment of the present invention.

As shown in FIG. 21, FIG. 22, and FIG. 23, a dedicated support member 47 may be provided in the driving portion 7 under the state of straddling over the bonnet 5, in addition to the ROPS for fall-prevention provided at the rear portion, and the support member 47 may be provided with the antenna unit 32. The vertically extending portion 47*a* of the support member 47 may have a linearly extending shape or may have an L-shaped bending shape.

(4-5)

Figure 24:
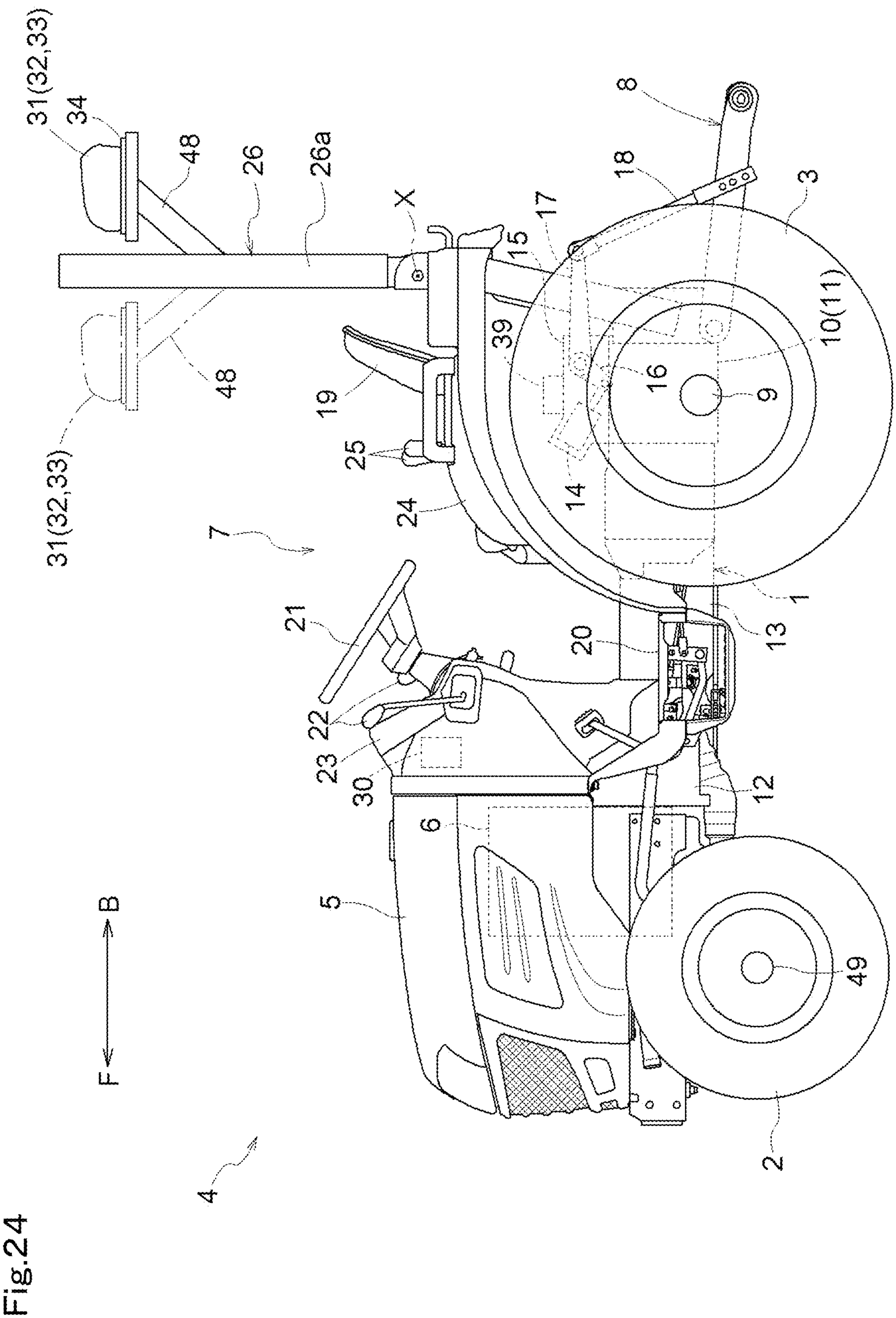
FIG. 24 is a side view of a tractor according to a preferred embodiment of the present invention.
Figure 25:
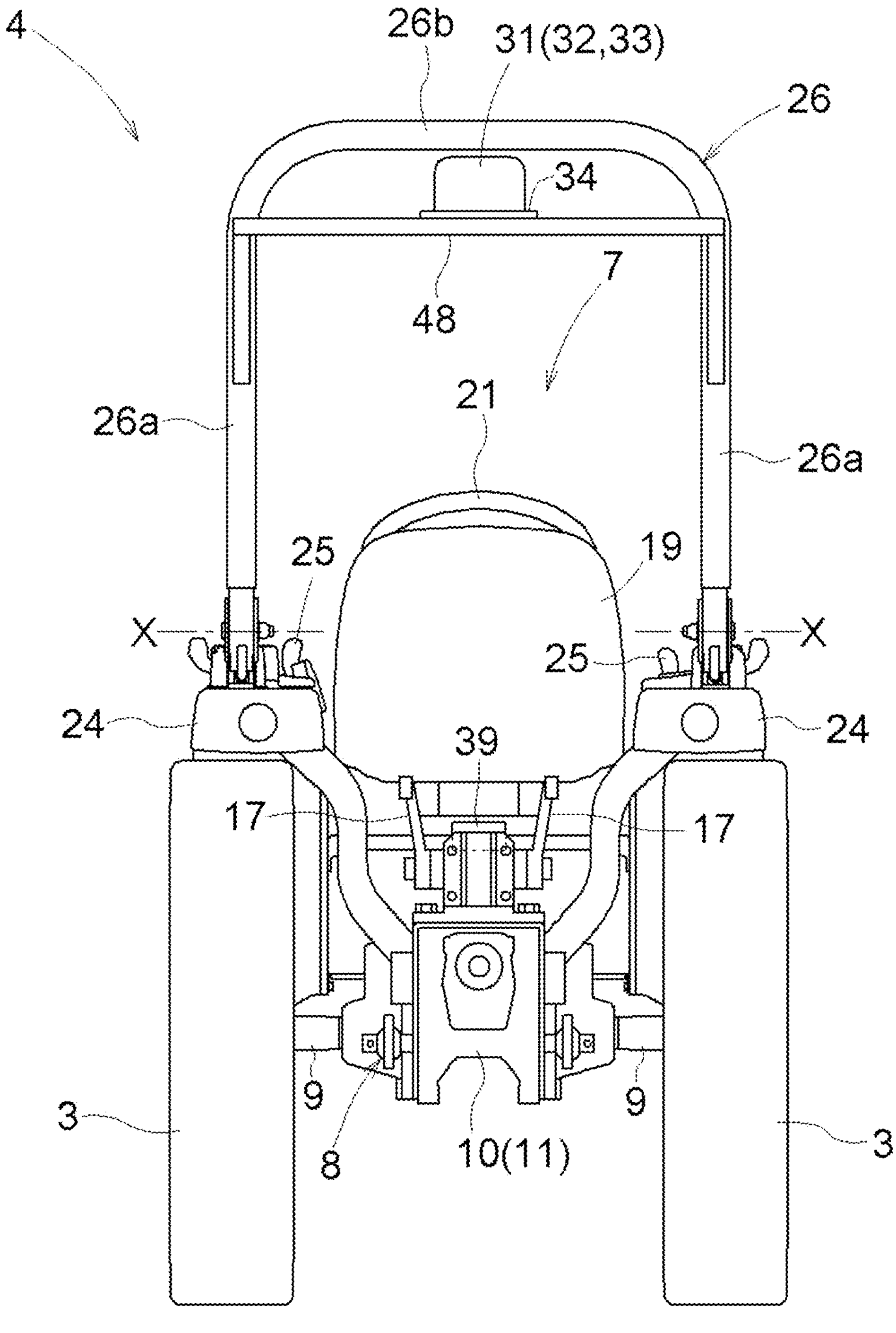
FIG. 25 is a back view of a tractor according to a preferred embodiment of the present invention.
Figure 26:
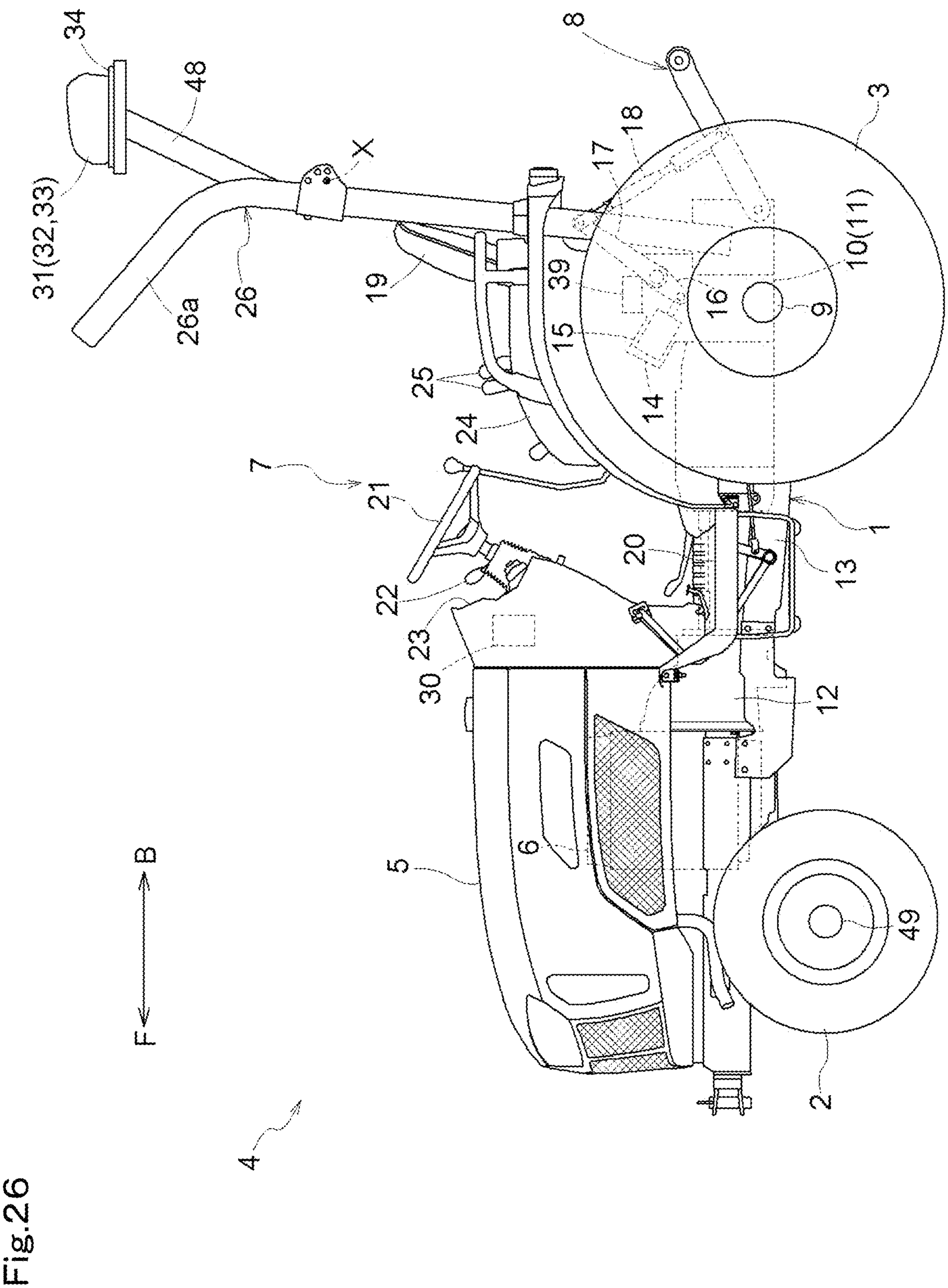
FIG. 26 is a side view of a tractor according to a preferred embodiment of the present invention.
Figure 27:
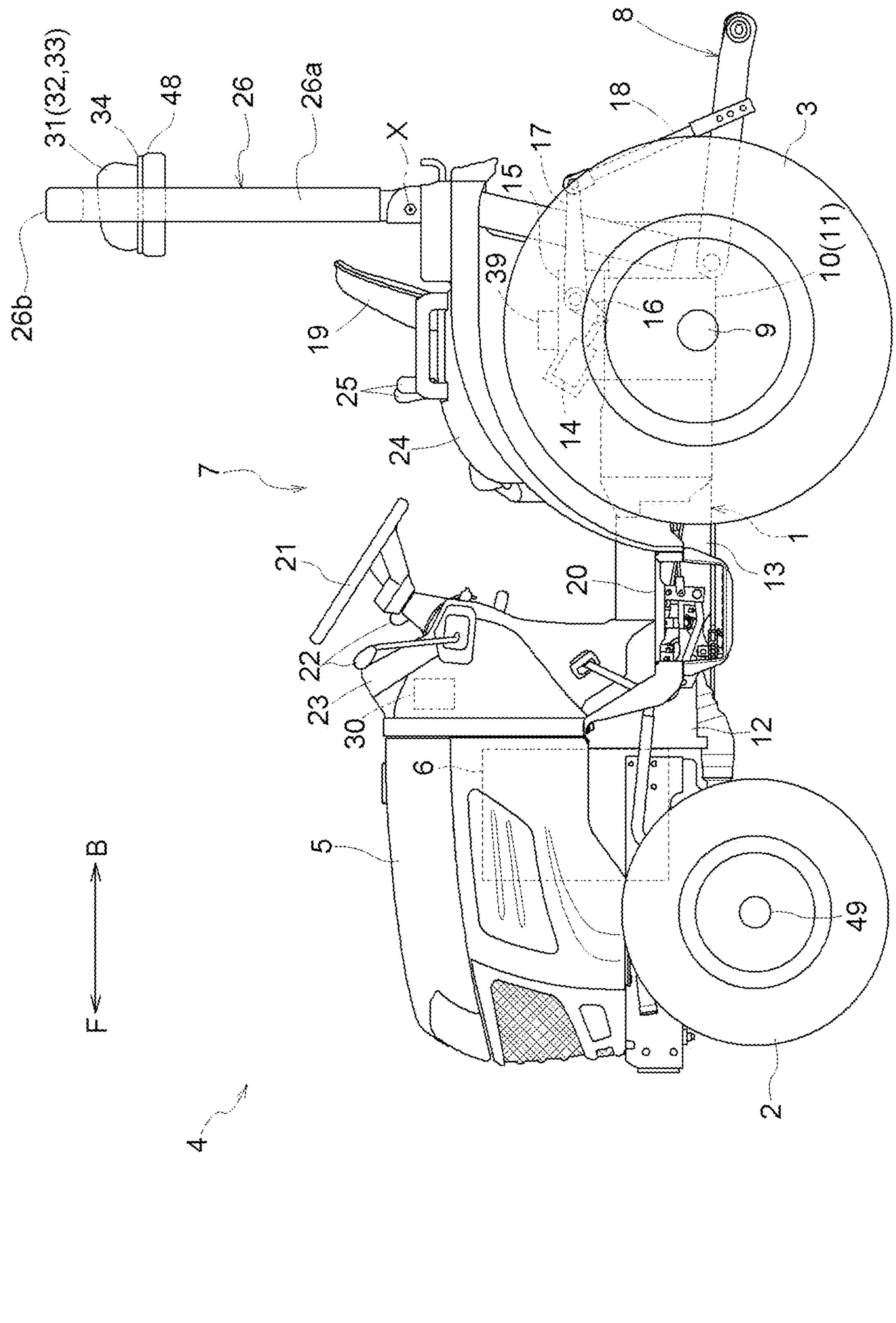
FIG. 27 is a side view of a tractor according to a preferred embodiment of the present invention.
Figure 28:
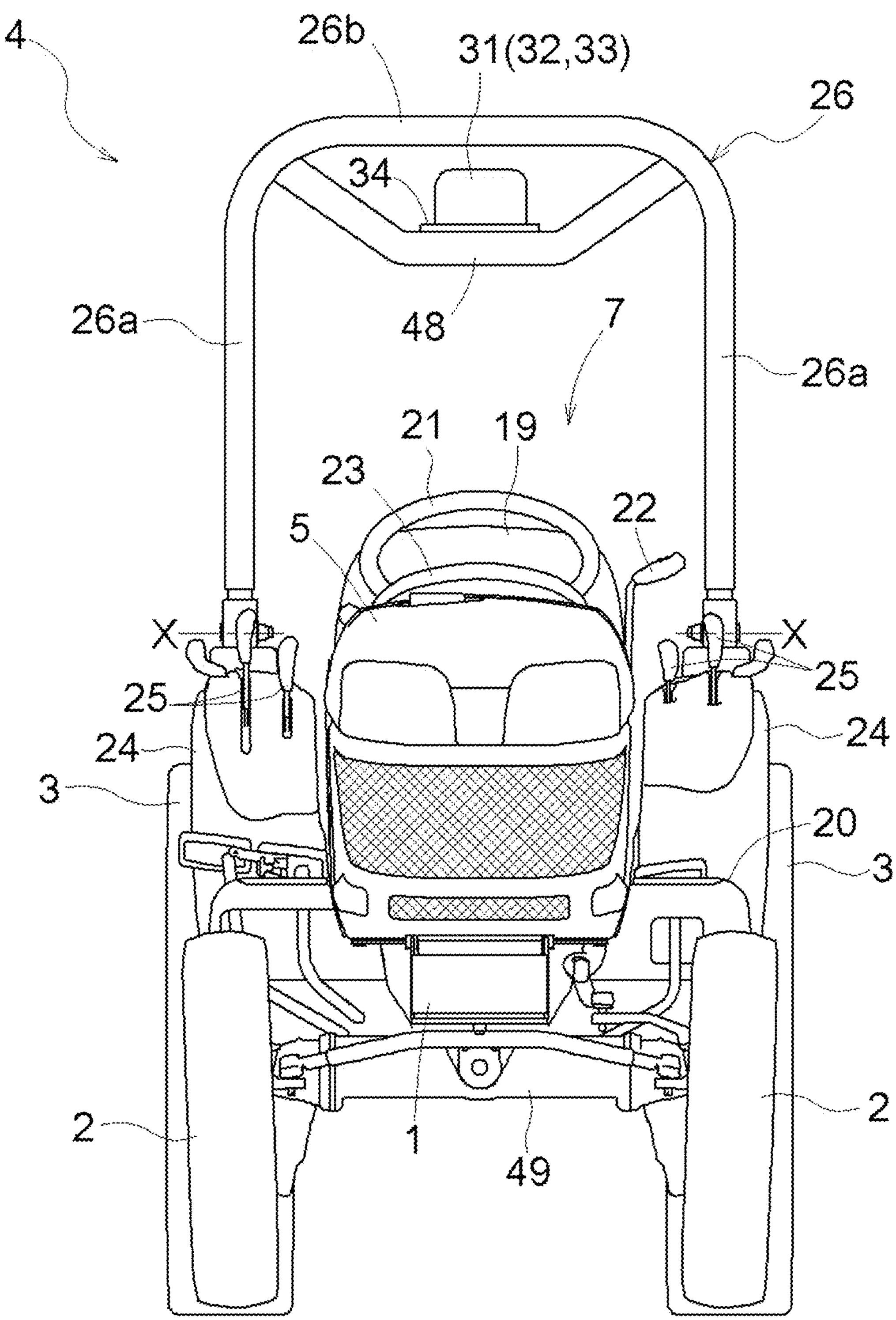
FIG. 28 is a front view of a tractor according to a preferred embodiment of the present invention.
Figure 29:
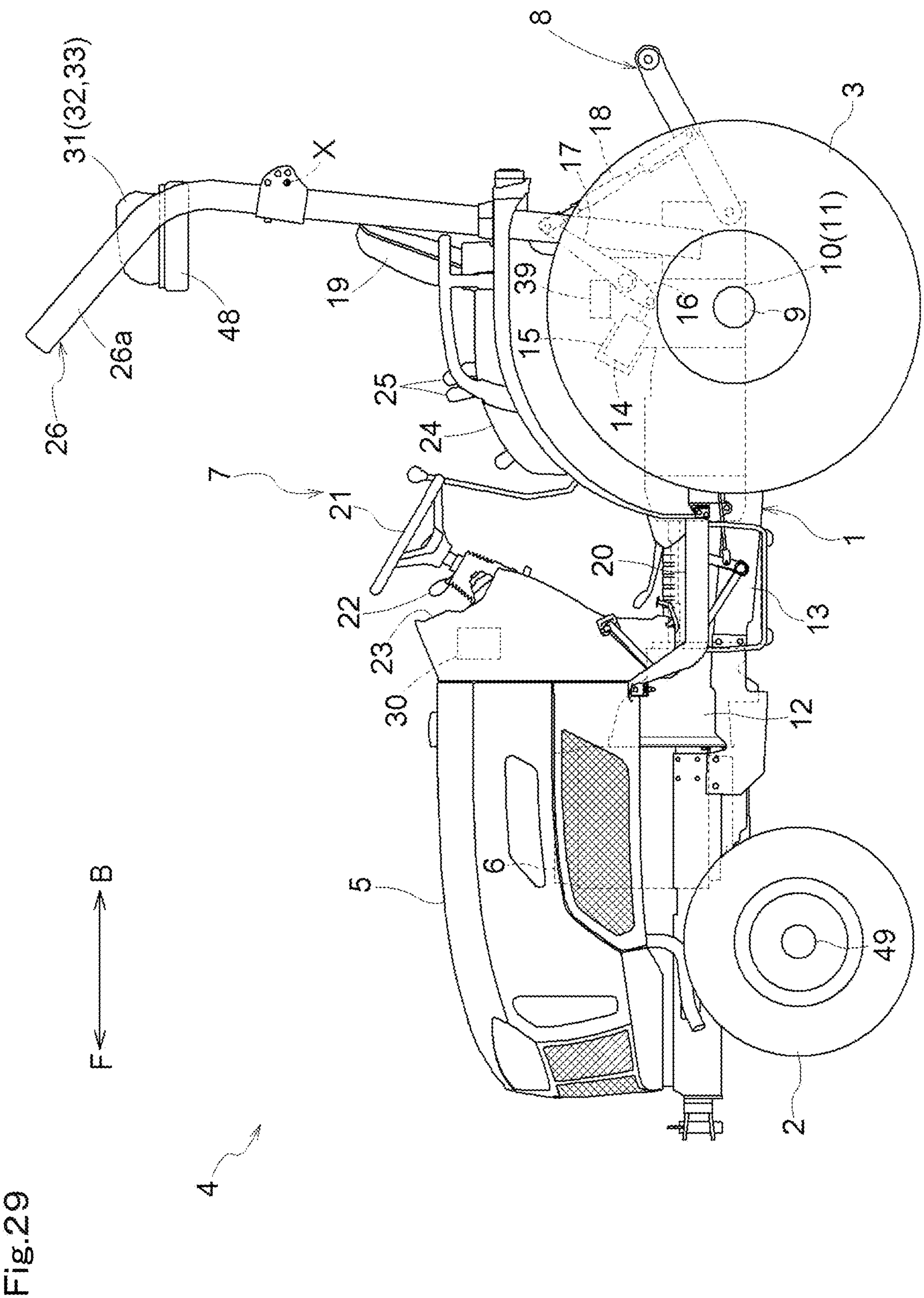
FIG. 29 is a side view of a tractor according to a preferred embodiment of the present invention.

As shown in FIG. 24 to FIG. 29, a stay 48 extending from the ROPS 26 for fall-prevention provided at the rear of the driving portion 7 may be provided, and the antenna unit 32 may be attached to the stay 48. For example, as shown in FIG. 24 and FIG. 25, a stay 48 extending toward the rear side of the machine body or a front side of the machine body may be provided to the ropes 26 extending straight in the vertical direction, and the antenna unit 32 may be provided on the stay 48. In addition, as shown in FIG. 26, an upper side portion of the ROPS 26 may be provided to have a shape bent to the front side of the machine body, and a stay 48 extending from the bent portion of the ROPS 26 to the upper rear portion may be provided, and the antenna unit 32 may be attached to the stay 48. In addition, as shown in FIG. 27, FIG. 28, and FIG. 29, the stay 48 may be provided to the ROPS 26 extending straight in the vertical direction or to the ROPS 26 having a shape bending toward the front portion of the machine body under the state of extending across the left and right vertical frame portions 26*a* and under the state of overlapping with the vertical frame portion 26*a* in a side view. In addition, the stay 48 may be provided with the antenna unit 32.

(4-6)

As shown by the imaginary line in FIG. 1, the antenna unit 32 may be attached to the upper portion of the bonnet 5.

(5) In the above-described preferred embodiment, the wiring 40 is configured to pass through the inside of the vertical frame portion 26*a* of the ROPS 26, to extend outward from the middle portion of the vertical frame portion 26*a*, and to extend toward the controller 30. Instead of the configuration, the following configurations (5-1) to (5-5) may be used.

(5-1)

The wiring 40 may extend inside the vertical frame portion 26*a* so as to pass through the opening portion that is formed at the lower end portion of the vertical frame portion 26*a*, and then to pass through the inside of the rear wheel fender 24 and extend toward the controller 30.

(5-2)

The wiring 40 may be arranged so as to pass through the inner side surface of the outer circumferential surface of the vertical frame portion 26*a* on the inner side in the machine width direction.

(5-3)

The wiring 40 may be arranged so as to pass through the outer surface of the outer circumferential surface of the vertical frame portion 26*a* in the machine width direction.

(5-4)

The wiring 40 may be arranged so as to pass through the rear surface of the outer circumferential surface of the vertical frame portion 26*a* in the front-rear direction of the machine body.

(5-5)

When the wiring 40 is arranged on the outer circumferential surface of the vertical frame portion 26*a*, the periphery of the wiring 40 may be covered with a decorative cover (not shown in the drawings) so that the wiring 40 is not exposed to the outside. The decorative cover may have a configuration to be attached to a movable portion of the ROPS 26 above the swing fulcrum X.

(6) In the above preferred embodiment, the positioning unit 31 (the antenna unit 32) and the traveling control controller are connected with the wiring 40. However, instead of the configuration, the positioning unit 31 (the antenna unit 32) and the controller 30 for the traveling control may be configured to transmit information to each other by a wireless communication method through a communication device that is not shown in the drawings.

(7) In the above preferred embodiment, the inertia measurement unit 39 is arranged at a position overlapping with the transmission case 10 in a plan view. However, instead of the configuration, the following configurations (7-1) to (7-6) may be used.

(7-1)

The inertia measurement unit 39 may be arranged on the lateral side portion of the vehicle body frame 1. In this case, the vehicle body frame 1 may directly support the inertia measurement unit 39, and the vehicle body frame 1 may support the inertia measurement unit 39 with a bracket that is not shown in the drawings.

(7-2)

The inertia measurement unit 39 may be arranged on the lower surface of the vehicle body frame 1. In that case, the inertia measurement unit 39 may be arranged in a region surrounded by the left and right rear wheel fenders 24 in a front view. In addition, the vehicle body frame 1 may directly support the inertia measurement unit 39, and the vehicle body frame 1 may support inertia measurement unit 39 with a bracket that is not shown in the drawings.

(7-3)

As the vehicle body frame 1, a pair of main frames (not shown in the drawings) extending in the vehicle front-rear direction is provided on both left and right sides of the vehicle body, and a frame structure to support the engine 6 and the transmission case 10 by the left and right main frames is provided. The configuration may be such that the inertia measurement unit 39 is provided in a region surrounded by the left and right main frames in a front view. In that case, the main frame may directly support the inertia measurement unit 39, and the main frame may support the inertia measurement unit 39 with a bracket.

(7-4)

The inertia measurement unit 39 may be arranged under the state of being arranged above the front axle 49 in a side view. In that case, the inertia measurement unit 39 may be arranged so as to overlap with the front wheel 2 in a side view, or may be arranged so as not to overlap with the front wheel 2.

(7-5)

The inertia measurement unit 39 may be arranged under the bonnet 5 under the state of overlapping with the bonnet 5 in a plan view. In this configuration, the front axle 49, the vehicle body frame 1 and the like may be provided at overlapping positions in a plan view.

(7-6)

The inertia measurement unit 39 may be provided on the ROPS 26. In this configuration, the inertia measurement unit 39 may be provided in a position close to the antenna unit 32, may be provided under the state of being housed in the positioning unit 31, or may be provided in a position separated from the antenna unit 32.

(8) In the above preferred embodiment, the adjustment mechanism 35 for adjusting the position of the positioning unit 31 with respect to the ROPS 26 is configured such that the bracket 34 has the insertion hole 36 (an elongated hole) through which the bolt 37 is inserted. Instead of the configuration, a plurality of round insertion holes through which the bolts 37 are inserted may be formed at intervals, and any one of the insertion holes is selected and the bolt may be inserted and fastened to the selected insertion hole to adjust the position.

(9) In the above preferred embodiment, the controller 30 is configured or programmed to execute the auto steering control with the steering motor. However, in addition to the control of the steering motor, the transmission motor to operate the transmission may be controlled to automatically control the vehicle speed.

(10) The above-described preferred embodiment exemplifies the case where an example embodiment of the present invention is applied to a tractor including the ROPS. However, preferred embodiments of the present invention may be applied to a tractor having no ROPS, a tractor with a cabin, or the like, and to other working vehicles such as a rice transplanter other than the tractor.

2. Second Preferred Embodiment

Next, a second preferred embodiment of the present invention will be described with reference to the drawings.

FIG. 30 to FIG. 33 show a tractor according to the second preferred embodiment of the present invention. In this preferred embodiment, the direction indicated by the reference symbol F shown in FIG. 30 and FIG. 31 corresponds to the front side of the tractor, and the direction indicated by the reference symbol B corresponds to the rear side of the tractor. In addition, the direction indicated by the reference symbol R shown in FIG. 31 corresponds to the right side of the tractor, and the direction indicated by the reference symbol L corresponds to the left side of the tractor.

Figure 30:
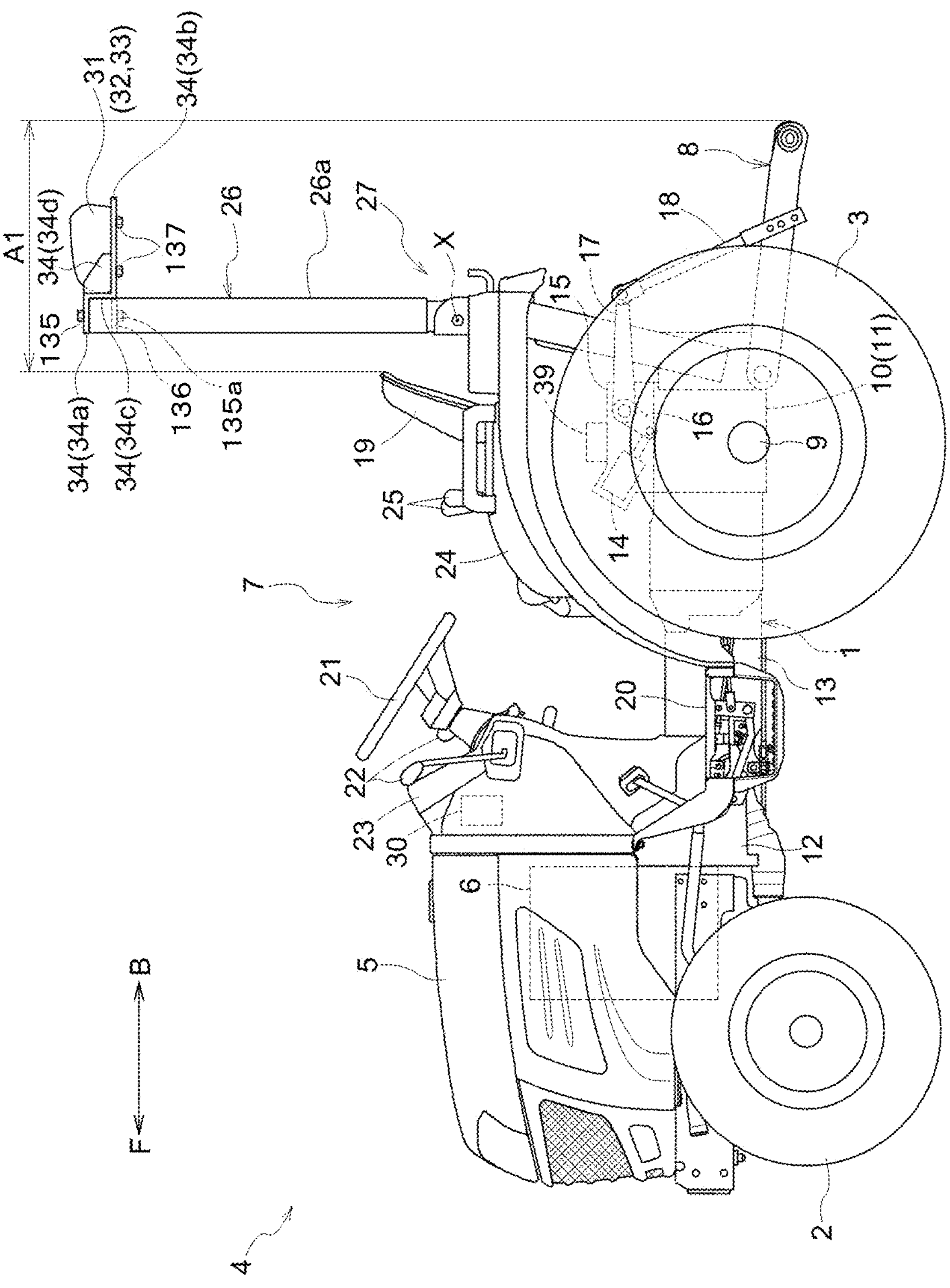
FIG. 30 is a side view of a tractor according to a preferred embodiment of the present invention.

As shown in FIG. 30, the tractor is provided with the entire vehicle body supported by the vehicle body frame 1, and is provided with the traveling vehicle body 4 including the left and right front wheels 2 that is configured to change the steering direction and to be driven and having the left and right rear wheels 3 that is configured to be driven in a fixed direction. An engine 6 is mounted inside a bonnet 5 provided at the front portion of the vehicle body, and a driving portion 7 is provided at the rear portion side of the vehicle body.

Figure 31:
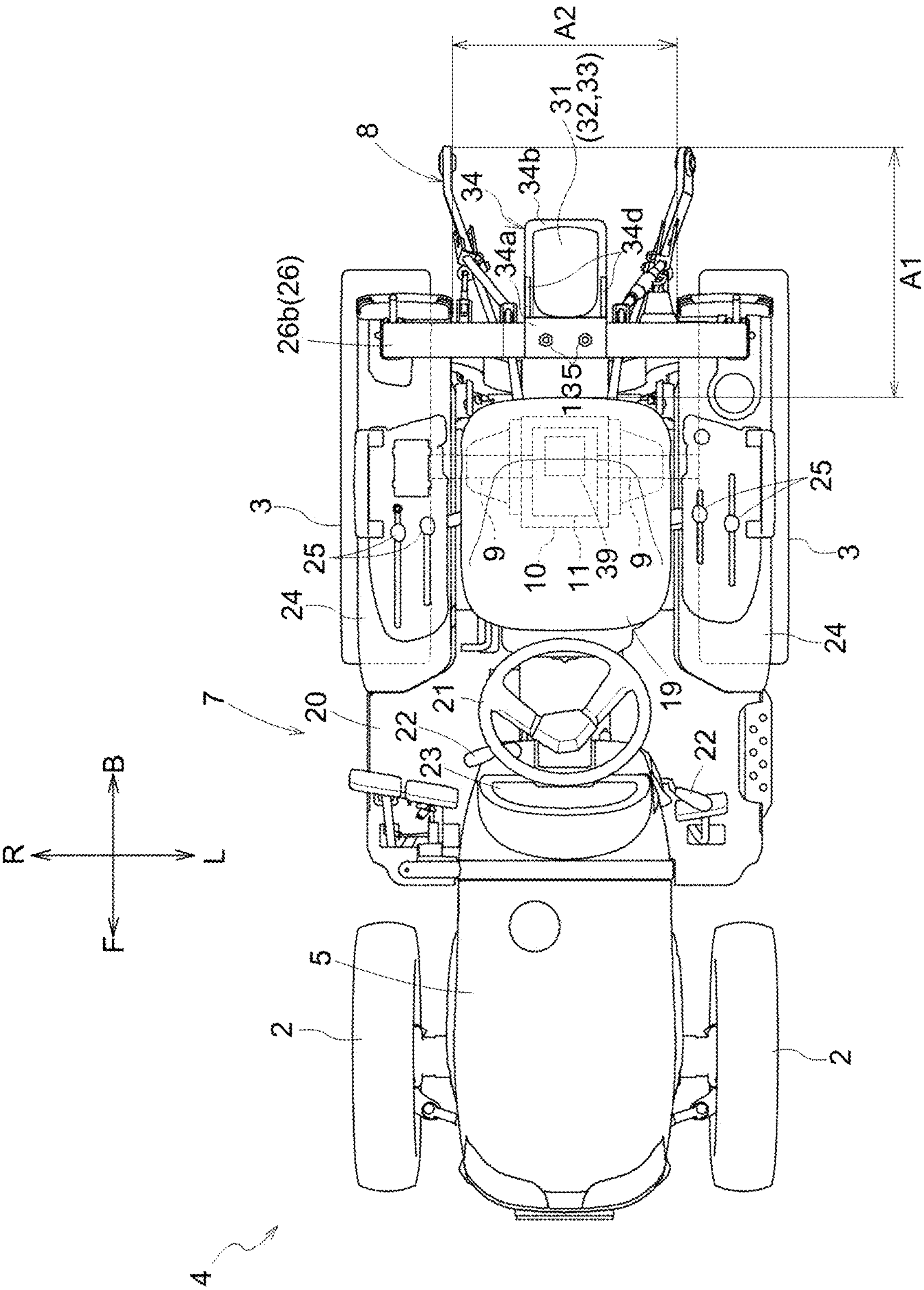
FIG. 31 is a plan view of a tractor according to a preferred embodiment of the present invention.
Figure 32:
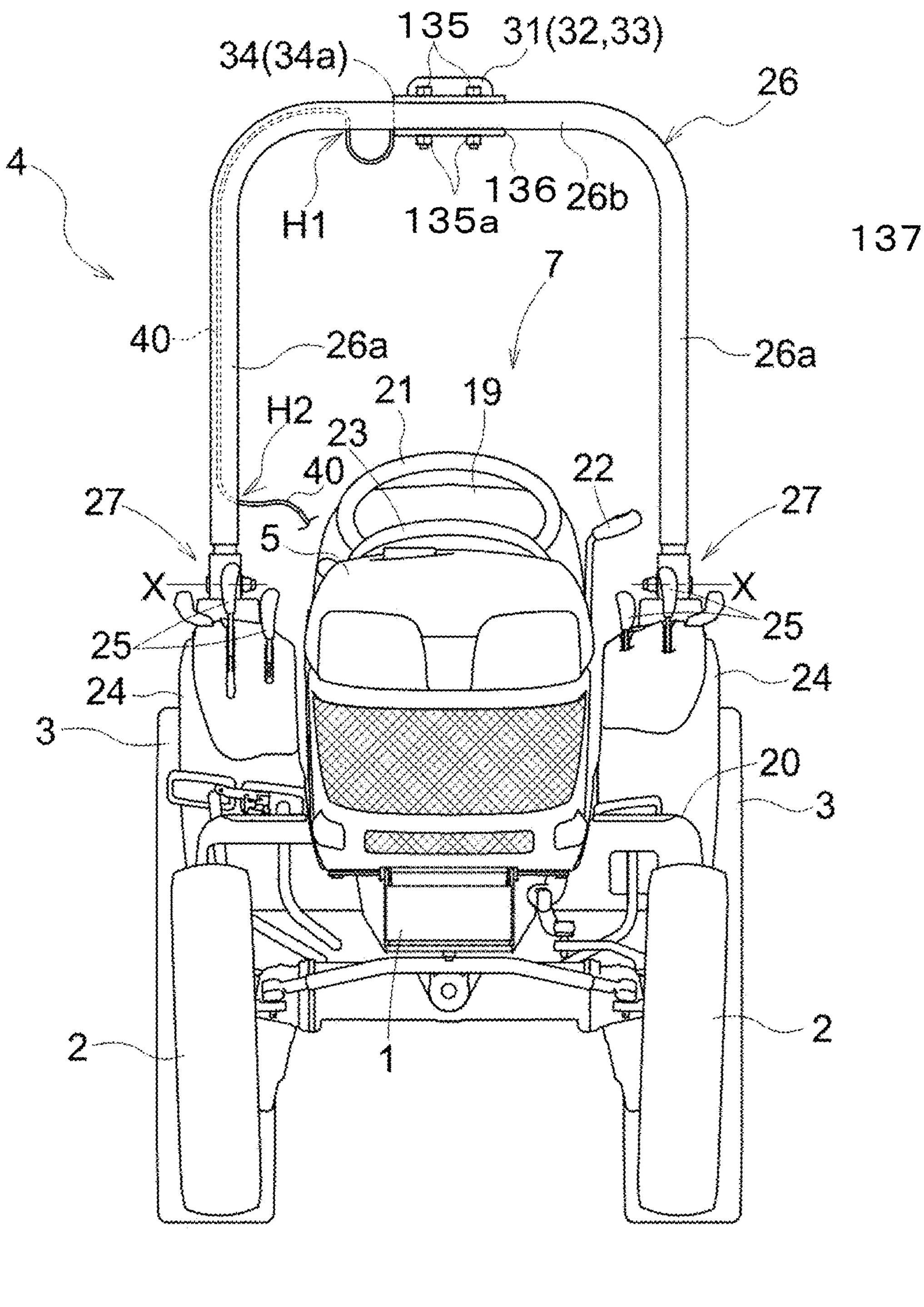
FIG. 32 is a front view of a tractor according to a preferred embodiment of the present invention.
Figure 33:
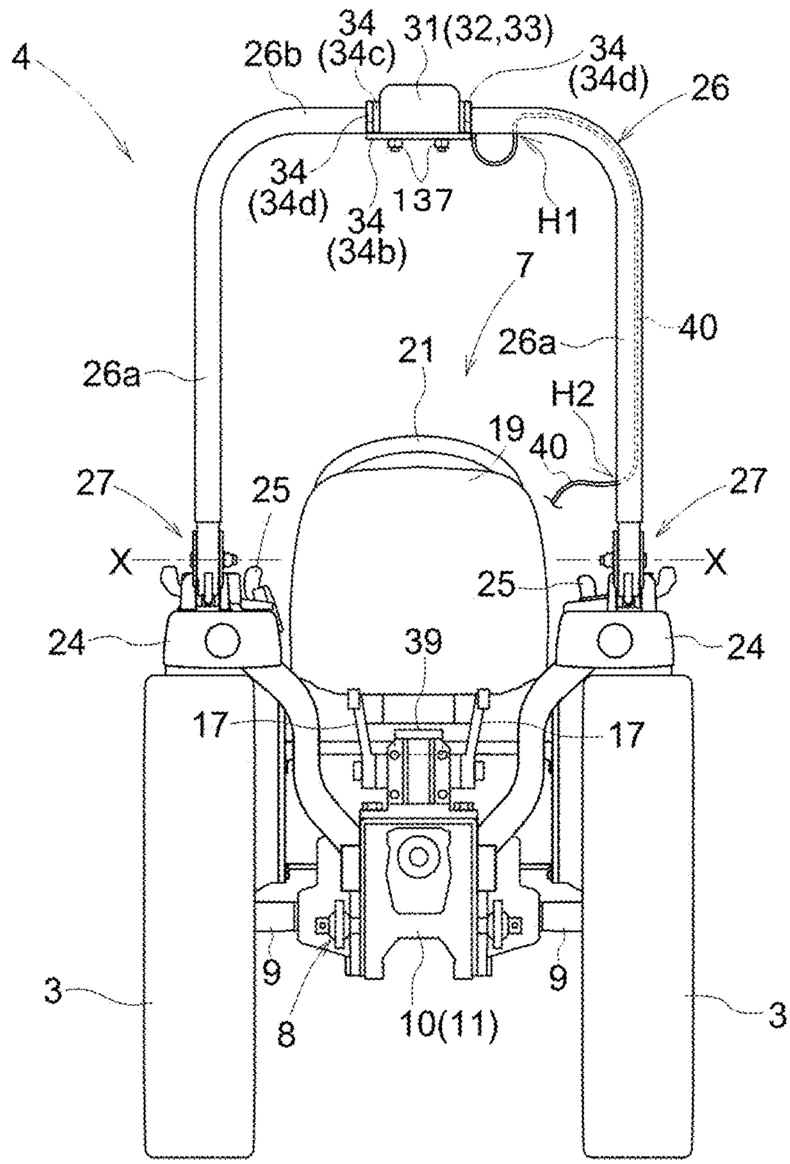
FIG. 33 is a back view of a tractor according to a preferred embodiment of the present invention.

As shown in FIG. 30 and FIG. 31, the traveling vehicle body 4 has the rear portion that is provided with an lift link mechanism (a link mechanism) 8 to which a working device (not shown in the drawings) such as a tilling device can be attached and detached, and the lift link mechanism is configured to be lifted and lowered while the working device is connected. A transmission case 10 that transmits the power of the engine 6 from the rear axle 9 to the left and right rear wheels 3 is provided below the driving portion 7. The transmission case 10 is provided with a differential device 11 configured to provide a speed difference to the driving speeds of the left and right rear axles 9, and the power from the engine 6 is transmitted and distributed to the left and right rear wheels 3 through the differential device 11. The transmission case 10 rotatably supports the rear axle 9.

In this preferred embodiment, the engine 6 arranged in the front portion of the vehicle body, the clutch housing 12 connected to the rear of the engine 6, the middle frame 13, the transmission case 10 arranged in the rear portion of the vehicle body, and the like are integrally connected to each other to define a highly rigid vehicle body frame 1.

At the upper portion of the transmission case 10, a hydraulic lifting cylinder 14 that moves the working device upward and downward through the lift link mechanism 8 is provided. The lift cylinder 14 is housed in a cylinder case 15. Inside the cylinder case 15, a swing arm 16 that is swingably operated through the lengthening and shortening of the lift cylinder 14 is provided, and a lift arm 17 that swings integrally with the swing arm 16 and a lift link mechanism 8 are pivotally connected by a lift rod 18.

The driving portion 7 includes a driver seat 19 on which a driver can sit, a boarding step 20 that is arranged in front of the driver seat 19 and defines a floor surface of the driving portion 7, and a control panel portion 23 including a steering wheel 21 for front wheel steering that is arranged in front of the driver seat 19 and other control levers (operation tools) 22. The rear wheel fenders 24 that cover the left and right rear wheels 3 are provided on the left and right sides of the driver seat 19, and the rear wheel fenders 24 are also provided with a plurality of operation tools 25 to perform various work processes. The driver seat 19 may be configured to be swung forward by lifting the rear portion around the fulcrum of the front portion of the seat. With this configuration, the driver seat 19 can be swung to expose the transmission case 10.

The rear portion of the driving portion 7 is provided with a ROPS 26 for roll protection having the left and right sides connected and fixed to the rear end portion of the vehicle body frame 1, that is, to the rear end portion of the transmission case 10 and extending upward so as to surround the rear upper side of the driver seat 19. That is, the ROPS 26 includes a pair of left and right vertical frame portions **26*a* extending in the vertical direction, and a lateral frame portion 26*b* connecting the upper ends of the left and right vertical frame portions 26*a* and extending in the horizontal direction, and has a substantially gate shape in view from the front of the vehicle body. The ROPS 26 has a structure in which the left and right vertical frame portions 26*a* and the lateral frame portions 26*b* are integrally formed by bending a hollow square pipe material so that the internal spaces are continuous, and is a substantially gate shape in a front view. That is, the lower end of the vertical frame portion 26*a* of the ROPS 26 may be fixed to a member having high rigidity such as the transmission case 10, the vehicle body frame 1, the axle case of the rear axle 9, or the like. When the lower end of the vertical frame portion 26*a* of the ROPS 26 is fixed to the transmission case 10, the vertical frame portion 26*a* may be fixed to a plurality of positions in the lateral direction of the vehicle body and the longitudinal direction of the vehicle body, and thereby the ROPS 26** can be firmly fixed.

The ROPS 26 is configured to be foldable about a lateral swing fulcrum X in a folding portion 27 that is provided to the lower portion of the left and right vertical frame portions 26*a*. With this configuration, the movable portion of the ROPS 26 (the upper side portions of the left and right vertical frame portions 26*a* above the swing fulcrum and the lateral frame portion 26*b*) is folded by being swung to the vehicle backward side around the swing fulcrum X in transportation of the vehicle body and the like, and thereby it is possible to reduce the amount of upward protrusion and avoid obstructing the transportation. In addition, under the folded state, the lateral frame portion 26*b* is lowered so that the operator can easily perform the maintenance of the positioning unit 31.

The traveling vehicle body 4 is provided with a controller 30 for the traveling control, a steering motor (not shown in the drawings) capable of steering the front wheels 2, a positioning unit 31 configured to measure the position and azimuth of the traveling vehicle body 4 with a well-known GPS (Global Positioning System) which is an example of the GNSS (Global Navigation Satellite System), and the like.

The positioning unit 31 is provided with an antenna unit 32 for satellite navigation to receive a radio wave transmitted from the GPS satellite (not shown in the drawings) and receive data transmitted from a reference station (not shown in the drawings) installed at a known position, and provided with a satellite navigation device 33 to measure the position and azimuth of the traveling vehicle body 4 on the basis of the positioning data of the positioning unit 31. As a positioning method using the GPS, the present preferred embodiment uses the D-GPS (Differential GPS) configured to measure a position of the vehicle body with use of the GPS positioning data and the error correction information transmitted from a reference station whose position is preliminarily known on the ground side. The reference station transmits, by wireless communication, the error correction information obtained by receiving radio waves that is transmitted from the GPS satellites. The satellite navigation device 33 obtains the position and azimuth of the traveling vehicle body 4 on the basis of the positioning data obtained by receiving the radio wave of the GPS satellite and of the information transmitted from the reference station. In addition, as a positioning method using the GPS, another positioning method such as the RTK (Real Time Kinematic) method may be used.

The positioning unit 31 including the antenna unit 32 is provided in the lateral frame portion 26*b* provided at the top portion (at the highest position) of the ROPS 26 so that the receiving sensitivity of radio waves from GPS satellites can be high. The positioning unit 31 is attached in the vicinity of the center portion of the lateral frame portion 26*b* in the lateral direction with the attachment bracket 34 defining and functioning as a support member. That is, the antenna unit 32 is provided at a position higher than the upper end of the driver seat 19 and above the swing fulcrum X of the ROPS 26.

As described above, since the antenna unit 32 is provided at a position separating from the traveling vehicle body 4 to the upper side, the positioning error caused by the positional deviation of the antenna unit 32 due to the yawing, pitching, or rolling of the traveling vehicle body 4 is included in the position and azimuth of the traveling vehicle body 4 measured using the GPS.

The traveling vehicle body 4 is provided with the Inertia Measurement Unit (IMU) 39 to measure the yaw angle, pitch angle, roll angle, and the like of the traveling vehicle body 4, the inertia measurement unit 39 includes a triaxial gyroscope (not shown in the drawings) and a three-direction acceleration sensor (not shown in the drawings) in order to enable the correction for removing the positioning error as described above. By having the inertia measurement unit 39, the information on the position and azimuth of the traveling vehicle body 4 measured by the positioning unit 31 is corrected based on the information on the positional deviation of the antenna unit 32, which are caused by the yawing, pitching, or rolling of the traveling vehicle body 4 measured by the inertia measurement unit 39.

As shown in FIG. 31, the inertia measurement unit 39 is arranged at a position overlapping with the transmission case 10 in a plan view. In addition, the inertia measurement unit 39 is arranged below the driver seat 19 and above the drive axis of the rear axle 9, and is arranged above the cylinder case 15 provided on an upper side of the transmission case 10. More particularly, the inertia measurement unit 39 is arranged at a position overlapping with the rear wheel 3 in a side view. This position has high rigidity and is unlikely to be deformed by bending. In addition, since the inertia measurement unit 39 is separated from the engine 6, it is hardly affected by the vibration of the engine 6 and can perform the measurement with a small error. In addition, in this tractor, since the transmission case 10 can be exposed by swinging the driver seat 19 forward, the swing of the driver seat 19 facilitates the access to the inertia measurement unit 39, and thereby facilitates the maintenance under a good state.

In this tractor, as a specific example of the position adjacent to the vehicle body frame 1 configured as a rigid member defined by connecting the engine 6, the clutch housing 12, and the transmission case 10, the inertia measurement unit 39 is provided above a cylinder case 15 provided above the transmission case 10. In addition, the inertia measurement unit 39 is arranged at a middle position between the left and right rear wheel fenders 24 in the front view.

As shown in FIG. 30, the controller 30 is provided under the state of being housed inside the control panel portion 23. And, the controller 30 is configured to perform the auto steering control to control the steering motor and the like such that the traveling vehicle body 4 travels along the working traveling route based on the information on the preset traveling route in the field and on the positioning result of the positioning unit 31.

Figure 34:
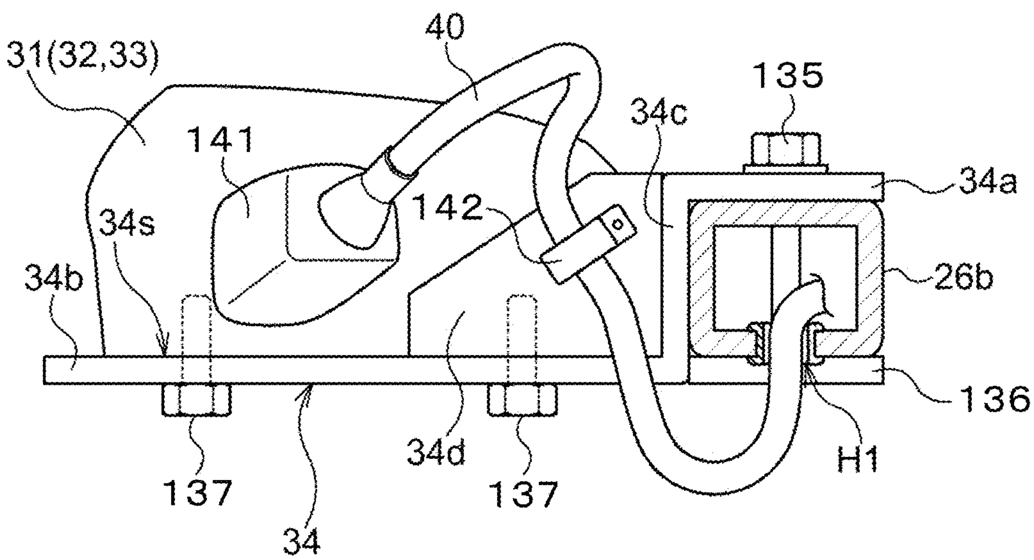
FIG. 34 is a side view illustrating wirings between a positioning unit and a lateral frame portion according to a preferred embodiment of the present invention.
Figure 35:
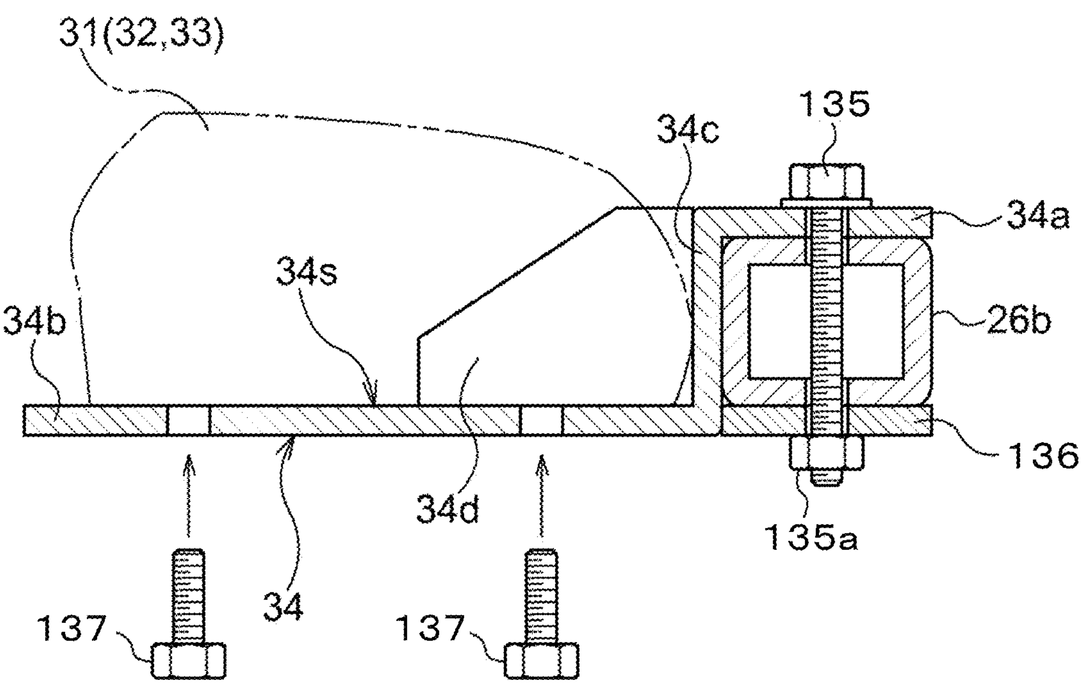
FIG. 35 is a cross-portion view illustrating an attachment bracket and a lateral frame according to a preferred embodiment of the present invention.

As shown in FIG. 34 and FIG. 35, in the attachment bracket 34 defining and functioning as a supporting member that supports the positioning unit 31, the position of the front attachment portion 34*a* is high and the position of the rear attachment portion 34*b* is low in a side view, and the attachment bracket 34 is a step-like molded product in which the vertical wall portion 34*c* is formed integrally between the front attachment portion 34*a* and the rear attachment portion 34*b*. An attachment surface 34*s* is provided on the upper surface of the attachment portion 34*b*, and the reinforcing frames 34*d* (see FIG. 31 and FIG. 33) are provided upright at the left and right ends of the attachment surface 34*s*.

A plurality of bolt insertion holes are formed in the attachment portion 34*a* of the attachment bracket 34, and similarly, bolt insertion holes are formed in the attachment portion 34*b*. The bolt insertion holes to which the fixing bolts 135 are inserted are vertically formed in the lateral frame portion 26*b*, corresponding to the insertion holes of the attachment portion 34*a*, and the fixed plate 136 having the nut portion 135*a* to which the fixing bolts 135 are screwed is arranged to the lower surface of the lateral frame portion 26*b*.

With this configuration, the attachment portion 34*a* of the attachment bracket 34 is brought into contact with the upper surface of the lateral frame portion 26*b*, the vertical wall portion 34*c* of the attachment bracket 34 is brought into contact with the rear surface of the lateral frame portion 26*b*, the fixing bolts 135 to be inserted to the plurality of bolt insertion holes of the attachment portions 34*a* are inserted to the insertion holes of the lateral frame portion 26*b*, and further the attachment bracket 34 is fixed to the lateral frame portion 26*b* by being screwed to the nut portion 135*a* of the fixing plate 136.

In addition, the positioning unit 31 is arranged so that the positioning unit 31 is mounted on the attachment portion 34*b* of the attachment bracket 34, and is supported by inserting the connection bolt 137 from below to the insertion hole of the attachment portion 34*b*. Under the state of being supported in this manner, the positioning unit 31 is arranged at a position sandwiched by the left and right reinforcing frames 34*d* under the state where the positioning unit 31 is mounted on the placing surface 34*s*.

In this manner, the attachment bracket 34 (an example of a support member) is arranged at the center of the lateral frame portion 26*b* in the left-right direction in view from the front, and arranged at the position where the rear end projects rearward from the rear end of the lateral frame portion 26*b* in the plan view.

With this configuration, the positioning unit 31 is arranged at a position partially overlapping with the lateral frame portion 26*b* in the front view, and the upper end of the positioning unit 31 has a positional relation in which the upper end projects upward from the upper surface of the lateral frame portion 26*b*. With this configuration, the attachment bracket 34 or the ROPS 26 solves the problem that a branch of tree or the like comes into contact with the positioning unit 31 in the working under an environment in which a branch of tree or the like comes into contact with the positioning unit 31.

A wiring 40 that connects the controller 30 to the positioning unit 31 including the antenna unit 32 is arranged along the vertical frame portion 26*a*. In particular, as shown in FIG. 34, a position for taking out the wiring 40 is set on the side surface of the positioning unit 31 (hereinafter, the position is referred to as a wiring taking-out position), and a waterproof position is provided outside the wiring taking-out position. The waterproof cover 141 is arranged on an outer position of the wiring taking-out position, and the pulling-out posture of the wiring 40 is set to an oblique posture so that the wiring 40 pulled out from the waterproof cover 141 reaches a position higher than the wiring taking-out position.

Figure 36:
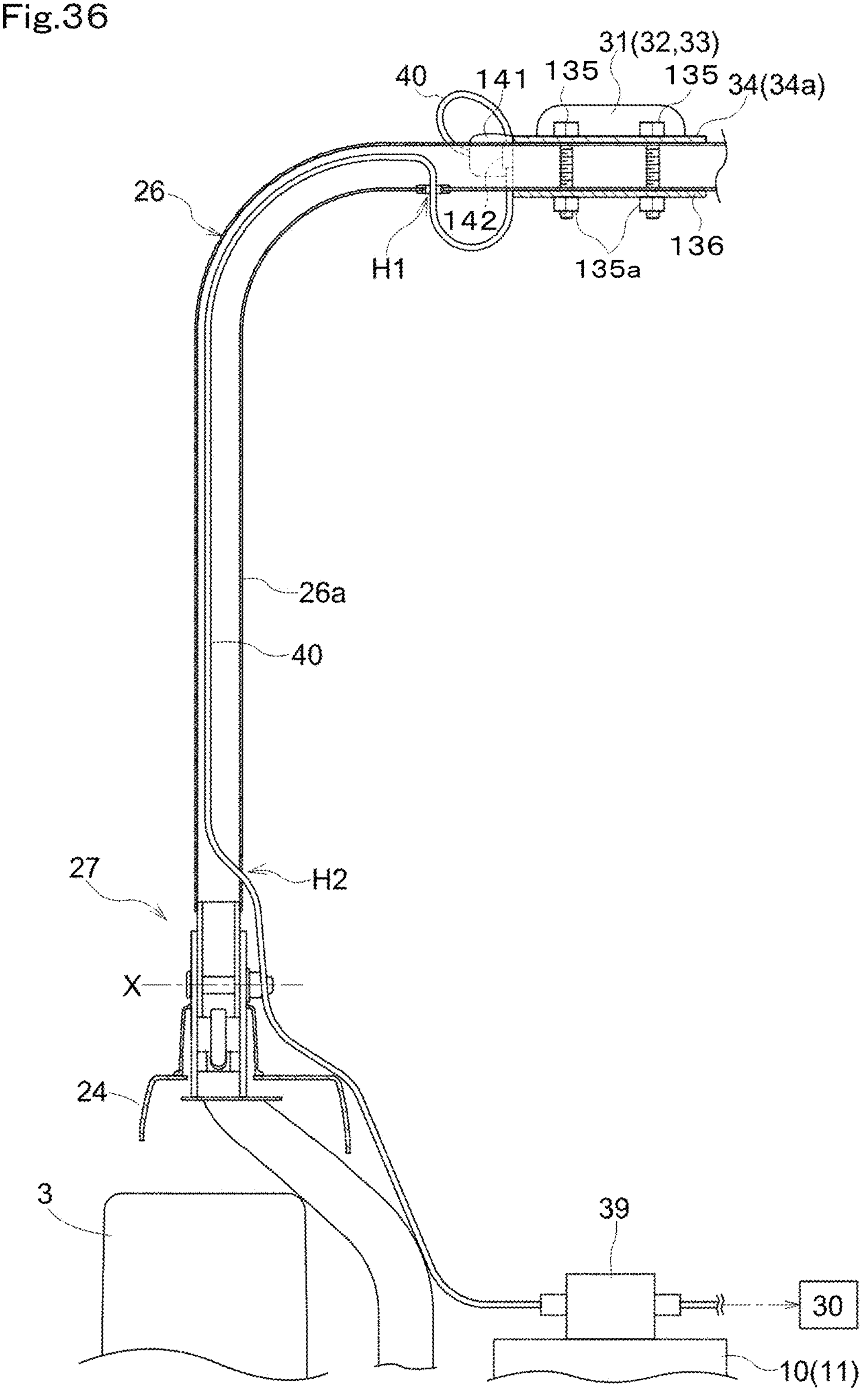
FIG. 36 is a cross-portion view illustrating wirings inside a ROPS according to a preferred embodiment of the present invention.

In addition, of the wirings 40 taken out, the middle position between the waterproof cover 141 and the lateral frame portion 26*b* is supported by the clamp 142 provided on the outer surface of the reinforcing frame 34*d*. And, as shown in FIG. 36, the wiring 40 is inserted, into the internal space of the lateral frame portion 26*b*, from the first through hole H1 formed on the lower surface of the lateral frame portion 26*b*, and is arranged so as to be pulled out from the second through hole H2 formed on the inner surface side (opposing surfaces of the left and right vertical frame portions 26*a*) of the vertical frame portion 26*a* above the folded portion 27 (above the swing fulcrum X) and below one of the vertical frame portions 26*a*.

In this manner, the wiring 40 from the waterproof cover 141 is pulled out obliquely upward, and thus even when raindrop wets the wiring 40, the raindrop is caused to flow from the highest position of the wiring 40 in a predetermined direction, and can be quickly removed from the wiring 40. The clamp 142 may be provided in the lateral frame portion 26*b*.

The wiring 40 extends to the inertia measurement unit 39 arranged above the transmission case 10 and joins with the wiring from the inertia measurement unit 39. In addition, the joining wiring 40 extends between the rear wheel fender 24 and the driver seat 19, and further extends between the boarding step 20 and the floor mat to the controller 30 provided in the control panel portion 23.

As shown in FIG. 30 and FIG. 31, in the side view, the positioning unit 31 is provided in the first area A1 between the rear end of the driver seat 19 and the rear ends of the left and right lift link mechanisms 8, and is provided in the second area A2 between the left and right lift link mechanisms 8 in the plan view.

Another Preferred Embodiment a

The present invention may be configured as the following preferred embodiment other than the preferred embodiments mentioned above. In each of the preferred embodiments described below, the components having the same functions as those according to the preferred embodiments are given the same reference numbers and reference symbols as those in the preferred embodiments.

Figure 37:
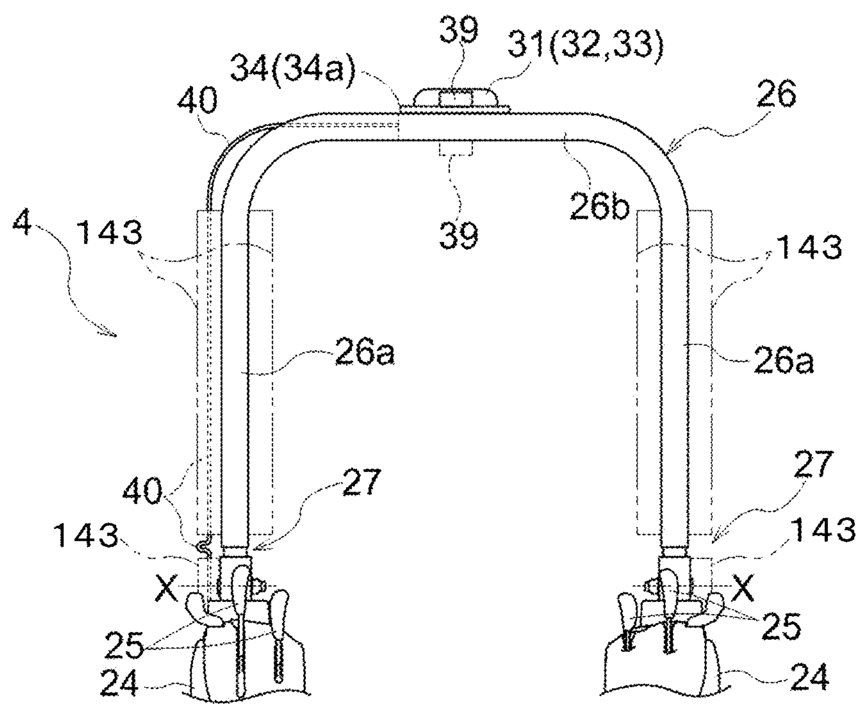
FIG. 37 is a front view of a ROPS according to another preferred embodiment a of the present invention.

(a-1) As shown in FIG. 37, the positioning unit 31 including at least one of the antenna unit 32 and the satellite navigation device 33 is provided on the lateral frame portion 26*b* with the attachment bracket 34, and the inertia measurement unit 39 is provided to the lateral frame portion 26*b* of the ROPS 26. FIG. 37 illustrates a configuration where the inertia measurement unit 39 is provided on the upper surface of the lateral frame portion 26*b*.

In the preferred embodiment (a-1), the inertia measurement unit 39 and the positioning unit 31 may be arranged in a vertical positional relation. As a specific example, the inertia measurement unit 39 may be provided on the lower surface of the lateral frame portion 26*b* as shown by the chain double-dashed line in FIG. 37. By providing the inertia measurement unit 39 to the lower surface of the lateral frame portion 26*b* in this manner, it is possible to suppress the influence on the inertia measurement unit 39, the influence being caused by the swaying of the traveling vehicle body 4.

(a-2) As shown in FIG. 37, the wiring 40 that connects the controller 30 and the positioning unit 31 including the antenna unit 32 is arranged along the outer surface of the vertical frame portion 26*a*, and a decorative cover 143 is provided with the vertical frame portion 26*a* so as to cover the wirings arranged in the above-mentioned manner.

Figure 38:
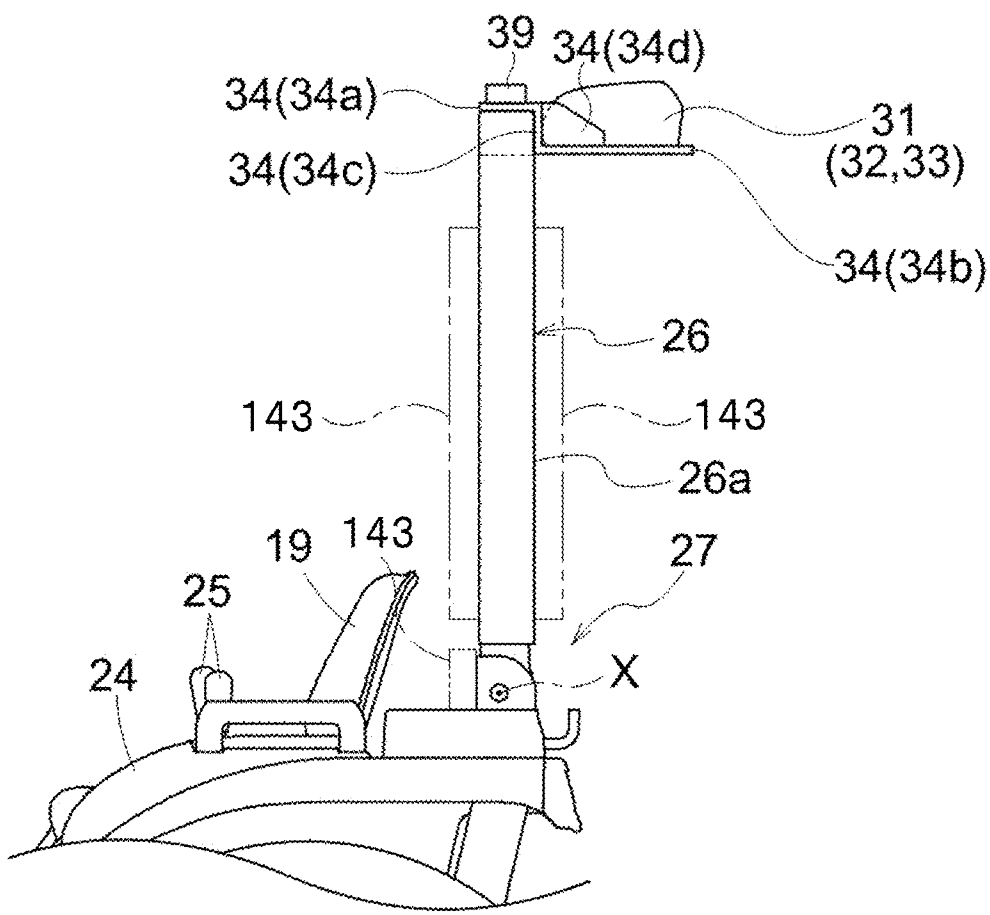
FIG. 38 is a side view of the ROPS according to the other preferred embodiment a of the present invention.

FIG. 37 and FIG. 38 show a configuration in which the decorative cover 143 is provided on the outer surface of the vertical frame portion 26*a* above the folding portion 27 and below the folding portion 27. In addition, under the folding part 27, the wiring 40 may be held in a form of being clamped to a portion of the folding part 27 supported by the traveling vehicle body 4. In this manner, it is not necessary to form a through-hole unlike the configuration in which wiring is provided in the internal space of the vertical frame portion 26*a*, and it is possible to prevent a decrease in strength of the ROPS 26. Furthermore, not only the wiring cover 40 arranged on the outer side of the vertical frame portion 26*a* on the vehicle body side can be substantially-entirely covered with the decorative cover 143 for protection, but also the wiring 40 can be prevented from hanging and from disordering.

In the preferred embodiment (a-2), as shown by the two-dash line in FIG. 37 and FIG. 38, the arrangement target may be either the left or right vertical frame portion 26*a*, and any one of an outer side surface provided with respect to the traveling vehicle body 4, an inner side surface provided with respect to the traveling vehicle body 4, and a front surface and a rear surface of the vertical frame portion 26*a* may be the arrangement target. It is possible to provide the decorative cover 143 corresponding to that configuration.

Figure 39:
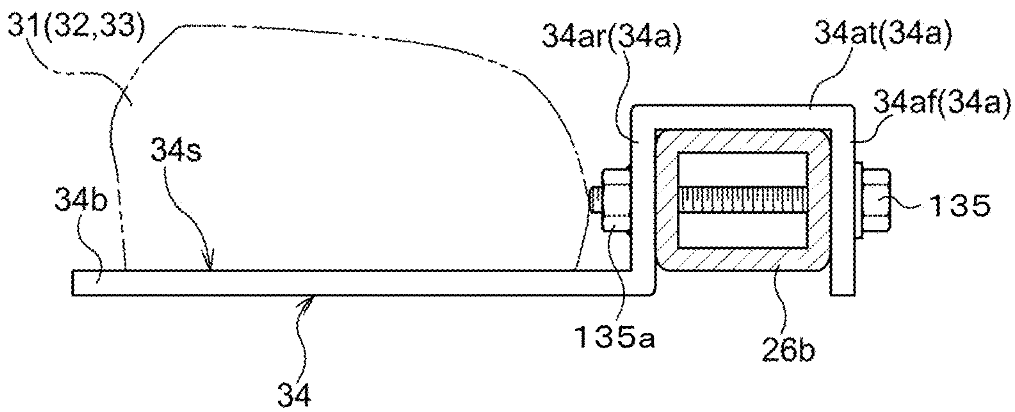
FIG. 39 is a side view of a structure of an attachment bracket according to the other preferred embodiment a of the present invention.
Figure 40:
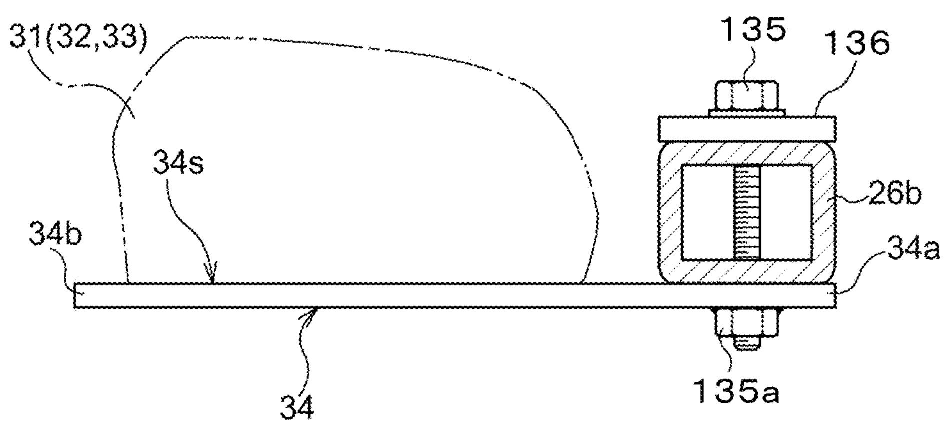
FIG. 40 is a side view of the structure of the attachment bracket according to the other preferred embodiment a of the present invention.
Figure 41:
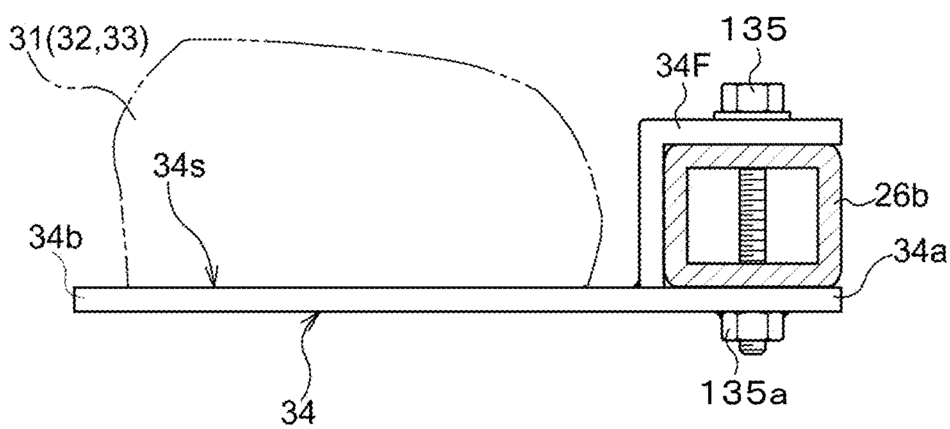
FIG. 41 is a side view of the structure of the attachment bracket according to the other preferred embodiment a of the present invention.

(a-3) The attachment bracket 34 defining and functioning as a support member can be configured as shown in any of FIG. 39, FIG. 40, and FIG. 41. That is, in the configuration shown in FIG. 39, the attachment portion 34*a* of the attachment bracket 34 includes the front wall 34*af*, the upper wall 34*at*, and the rear wall 34*ar* so as to be held from above the lateral frame portion 26*b*. Under the configuration, the fastening bracket 135 penetrates the front wall 34*af*, the lateral frame portion 26*b*, and the rear wall 34*ar* in the front-rear direction, and is screwed into the nut portion 135*a* of the rear wall 34*ar*, whereby the attachment bracket 34 is fixed to the lateral frame portion 26*b*.

In addition, in the configuration shown in FIG. 40, as the attachment portion 34*a* of the attachment bracket 34, the front end upper surface of the attachment bracket 34 is brought into contact with the lower surface of the lateral frame portion 26*b*, and the fixing plate 136 is arranged on the upper surface of the lateral frame portion 26*b*. The fastening bracket 135 vertically penetrates through the fixing plate 136, the lateral frame portion 26*b*, and the attachment portion 34*a*, and is screwed into the nut portion 135*a* on the lower surface of the attachment portion 34*a*, whereby the attachment bracket 34 fixed to the lateral frame portion 26*b*.

In addition, in the configuration shown in FIG. 41, an engaging member 34F having a shape capable of contacting to the rear surface and the upper surface of the lateral frame portion 26*b* is provided as the attachment portion 34*a* of the attachment bracket 34, and the engaging member 34F contacts to the upper surface and the rear surface of the lateral frame portion 26*b*, the attachment portion 34*a* contacts to the lower surface of the lateral frame portion 26*b*, the fixing bolt 135 penetrates the upper wall portion of the engaging member 34F, the lateral frame portion 26*b*, and the attachment portion 34*a*, and is screwed into the nut portion 135*a* on the lower surface of the attachment portion 34*a*, whereby the attachment bracket 34 is fixed to the lateral frame portion 26*b*.

(a-4) In the preferred embodiment, since the attachment bracket 34 is arranged in a posture that extends rearward from the lateral frame portion 26*b*, the positioning unit 31 is arranged rearward of the lateral frame portion 26*b*. Instead of this configuration, the attachment bracket 34 may be arranged so as to extend forward from the lateral frame portion 26*b*, and the positioning unit 31 may be supported by the attachment bracket 34. Under the arrangement as described above, the positioning unit 31 is arranged on the front side of the lateral frame portion 26*b*.

(a-5) The information may be transmitted by wireless without arranging the wiring between the positioning unit 31 or the antenna unit 32 and the controller 30.

Figure 42:
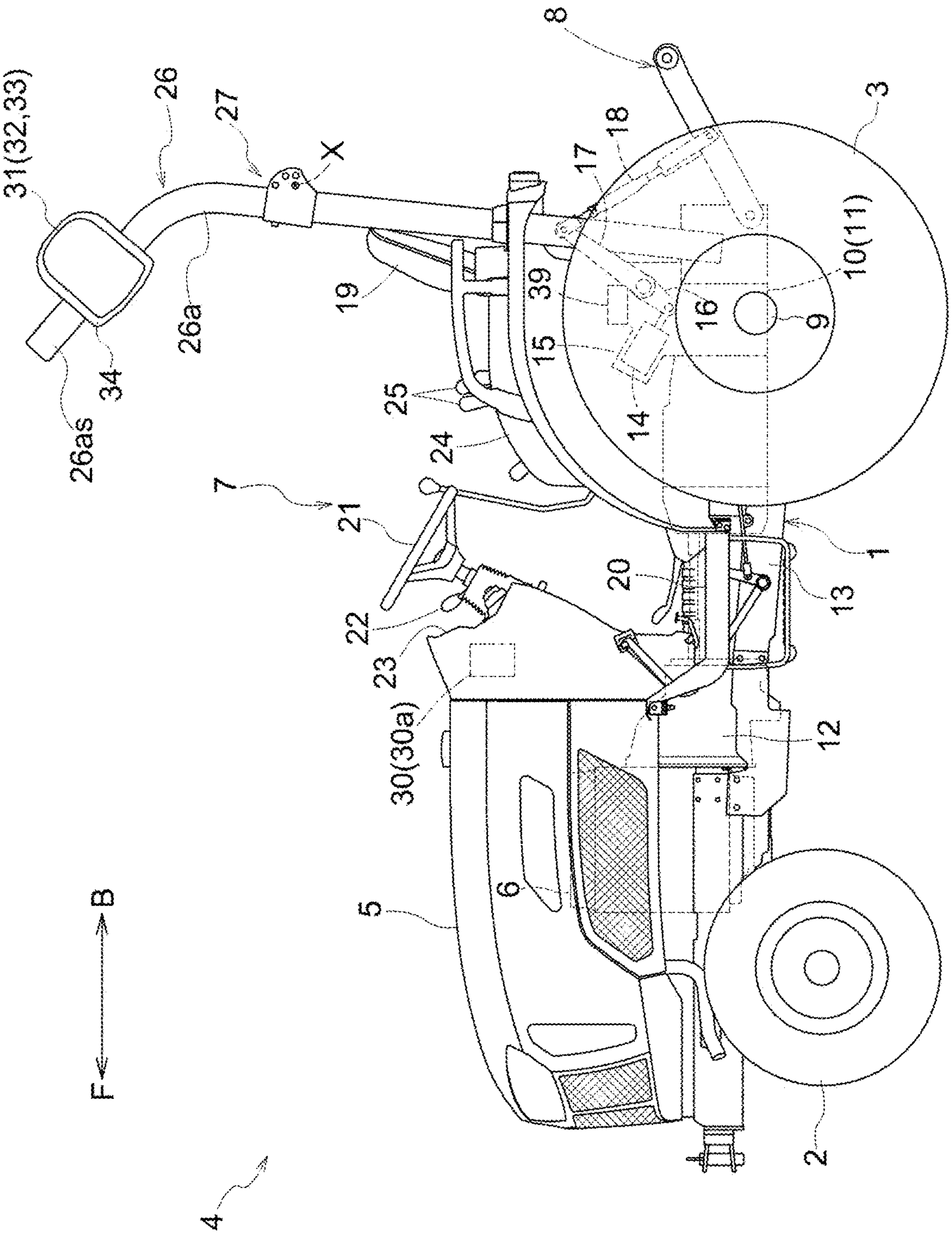
FIG. 42 is a side view of a tractor according to another preferred embodiment b of the present invention.
Figure 43:
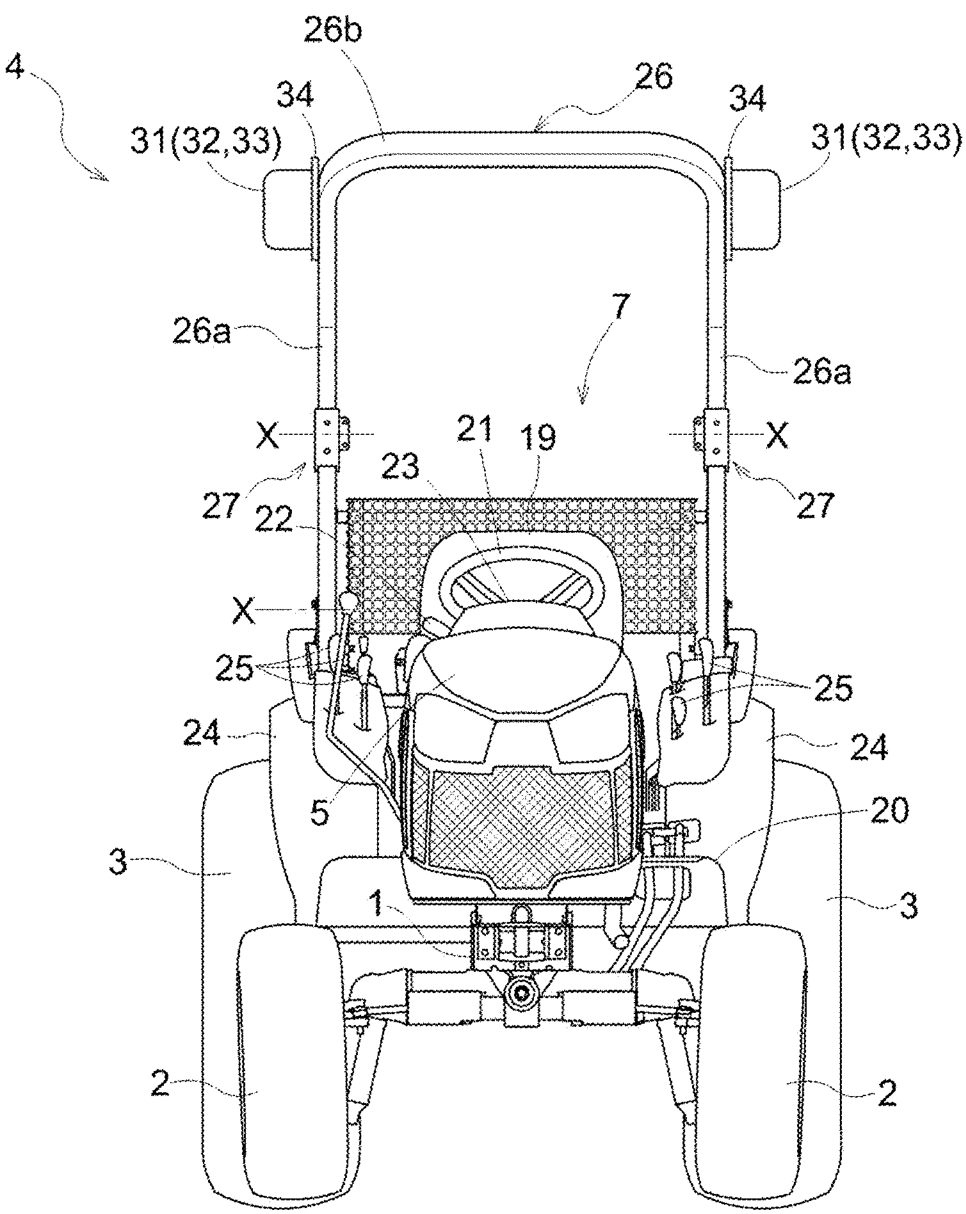
FIG. 43 is a front view of the tractor according to the other preferred embodiment b of the present invention.

Another Preferred Embodiment b (b-1) As shown in FIG. 42 and FIG. 43, a folding portion 27 is provided at a middle portion of the vertical frame portion 26*a* in the vertical direction. In this manner, the ROPS 26 are configured such that the upper side of the folding portion 27 can be folded around the horizontally swing fulcrum X, and the inclined portion 26*as* has the upper side of the vertical frame portion 26*a* above the folding portion 27 being inclined forward toward the upper end side. The positioning unit 31 is provided on each of the outer surfaces of the left and right inclined portions 26*as*. This alternative preferred embodiment b may include three or more positioning units 31.

In the preferred embodiment (b-1), the positioning unit 31 is provided at a position higher than the top of the backrest portion of the driver seat 19 on both the left and right vertical frame portions 26*a* of the ROPS 26. In particular, the attachment bracket 34 defining and functioning as a support member is attached to the outer surface of the inclined portion 26*as* arranged above the folding portion 27, and the positioning unit 31 is provided to the attachment bracket 34.

The positioning unit 31 includes an antenna unit 32 for satellite navigation that receives a radio wave transmitted from a GPS satellite (not shown in the drawings) and receives data transmitted from a reference station (not shown in the drawings) installed at a known position, and includes a satellite navigation device 33 that measures the position and azimuth of the traveling vehicle body 4 based on the positioning data of the positioning unit 31.

Figure 44:
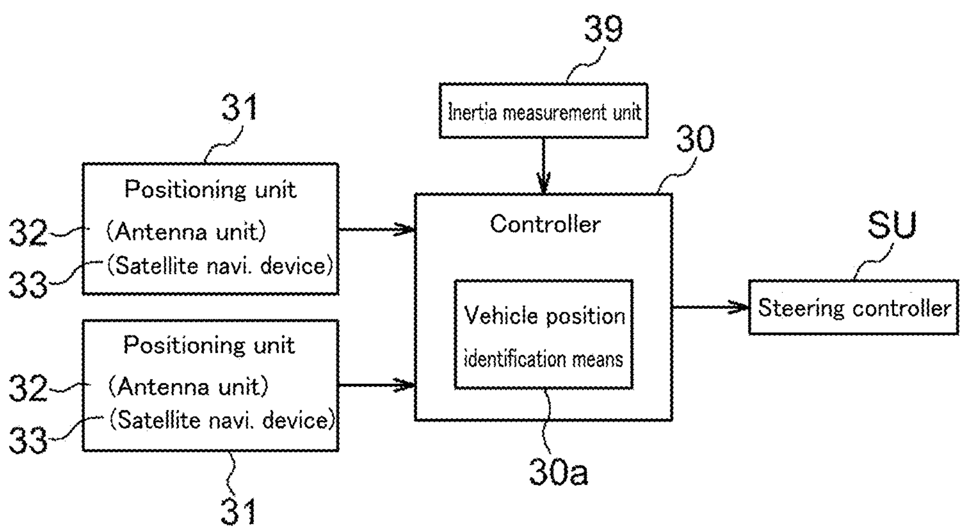
FIG. 44 is a block circuit diagram of a control configuration according to the other preferred embodiment b of the present invention.

As shown in FIG. 44, the controller 30 is configured or programmed to include a vehicle position specifying unit 30*a* that specifies the vehicle position by receiving the positioning information from the two positioning units 31, and the vehicle position specifying unit 30*a* corrects the vehicle position based on the information from the inertia measurement unit 39. Then, the controller 30 outputs a control signal to the steering control unit SU so as to travel along the traveling route based on the position of the vehicle and on the preset traveling route information.

With that configuration, the satellite position information transmitted from the GPS satellite or the like can be preferably received without being obstructed by a portion of the bonnet 5 or the traveling vehicle body 4 or without being affected by obstacles. Based on the positioning information from the positioning unit 31, a process of reducing an error or a process of obtaining an average value is performed to enable highly accurate autonomous traveling.

Figure 45:
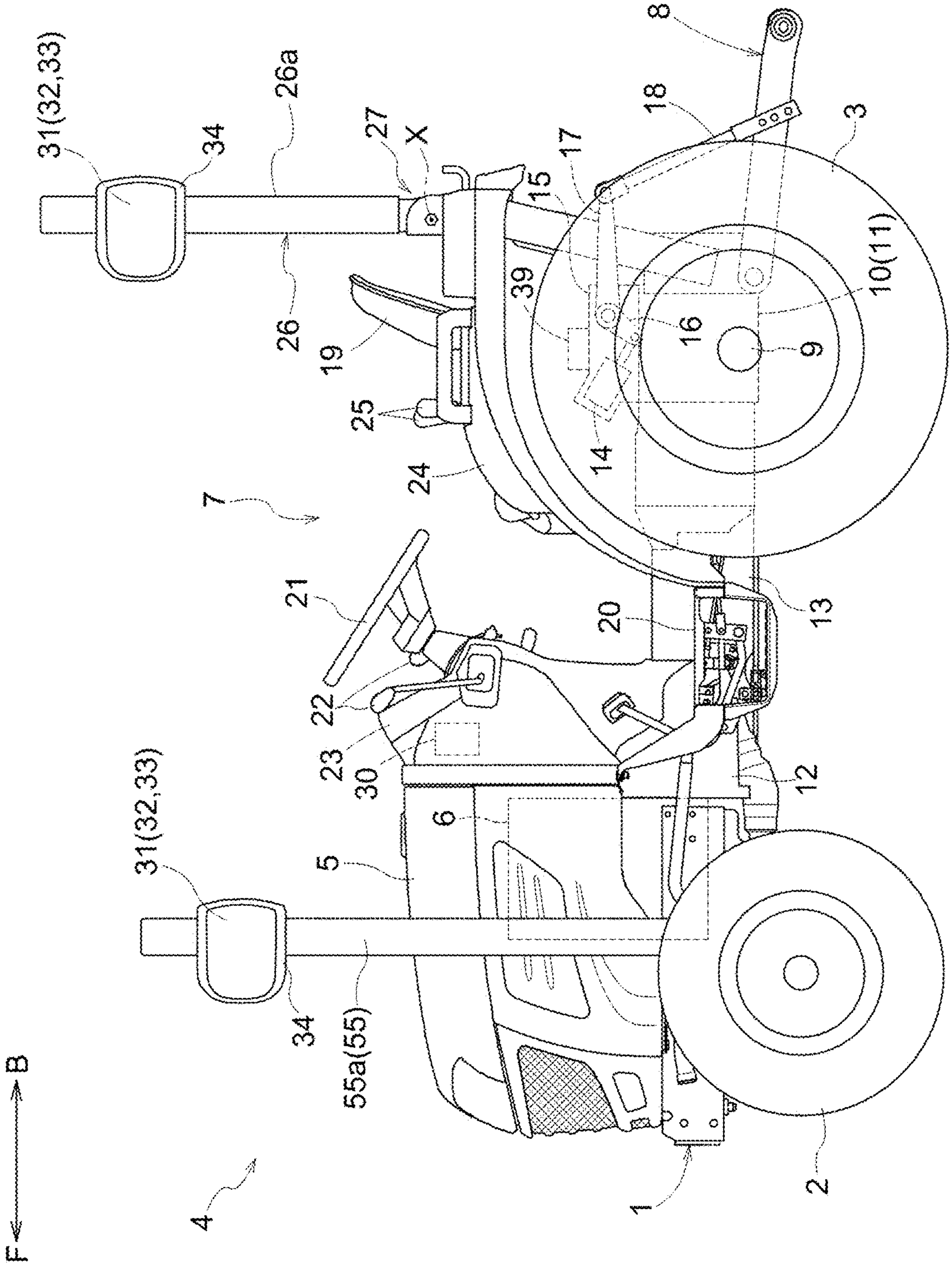
FIG. 45 is a side view of the tractor according to the other preferred embodiment b of the present invention.
Figure 46:
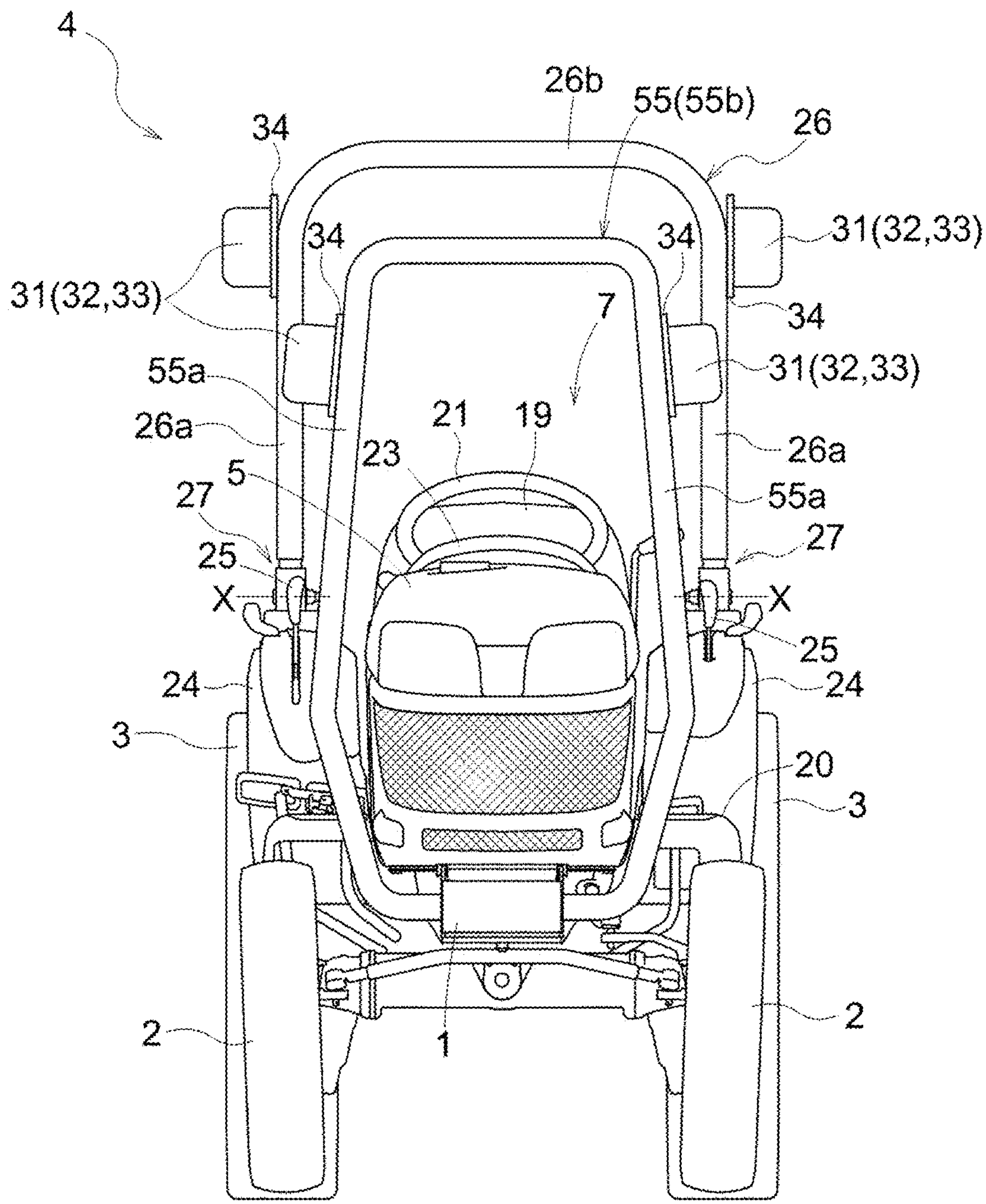
FIG. 46 is a front view of the tractor according to the other preferred embodiment b of the present invention.

(b-2) As shown in FIG. 45 and FIG. 46, a ROPS 26 for fall protection (referred to as rear ROPS 26 in the preferred embodiment) is provided behind the driver seat 19, and, the front ROPS 55 is provided in front of the driver seat 19. The positioning units 31 are respectively provided at the left and right positions of the rear ROPS 26 and the front ROPS 55.

The front ROPS 55 are formed by bending a hollow square pipe material to have a pair of left and right front vertical frame portions 55*a* extending in the vertical direction and to have a front horizontal frame portion 55*b* connecting these upper ends and extending in the horizontal direction. The front ROPS 55 has a substantially gate shape in front view of the vehicle body. In such a configuration, the positioning units 31 are provided on the left and right front vertical frame portions 55*a* with the attachment brackets 34.

The positioning unit 31 includes an antenna unit 32 for satellite navigation and includes a satellite navigation device 33 that measures the position and azimuth of the traveling vehicle body 4.

Also in the preferred embodiment (b-2), similarly to the preferred embodiment (b-1), the process of reducing the error by acquiring the positioning information from the plurality of positioning units 31 and the process of acquiring the average value are performed, thereby enabling the autonomous driving with high precision.

(b-3) Even when the positioning information can be acquired from a plurality of positioning units 31, it is not necessary to use a plurality of positioning information at the same time. The process which determines the vehicle position based on information may be performed. In addition, the received information of a plurality of positioning units 31 is compared with each other, and when the received information of a predetermined positioning unit 31 is different from the received information of another positioning unit 31, the positioning information of the positioning unit 31 is not used in the control.

In the preferred embodiment b, the vehicle may be configured to include three or more positioning units 31, or may be configured to specify the vehicle position based on three or more pieces of positioning information.

Figure 47:
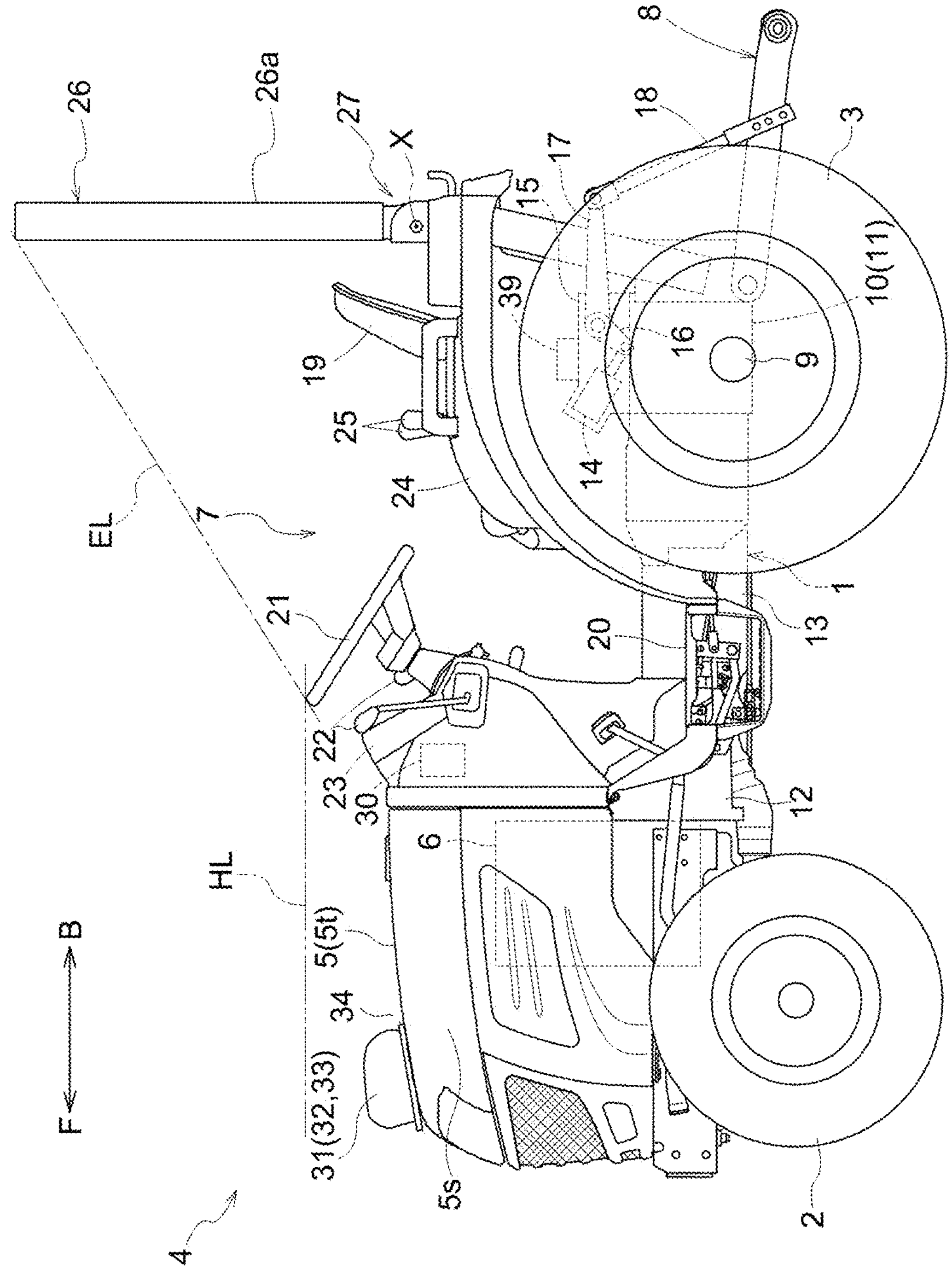
FIG. 47 is a side view of a tractor according to another preferred embodiment c of the present invention of the present invention.
Figure 48:
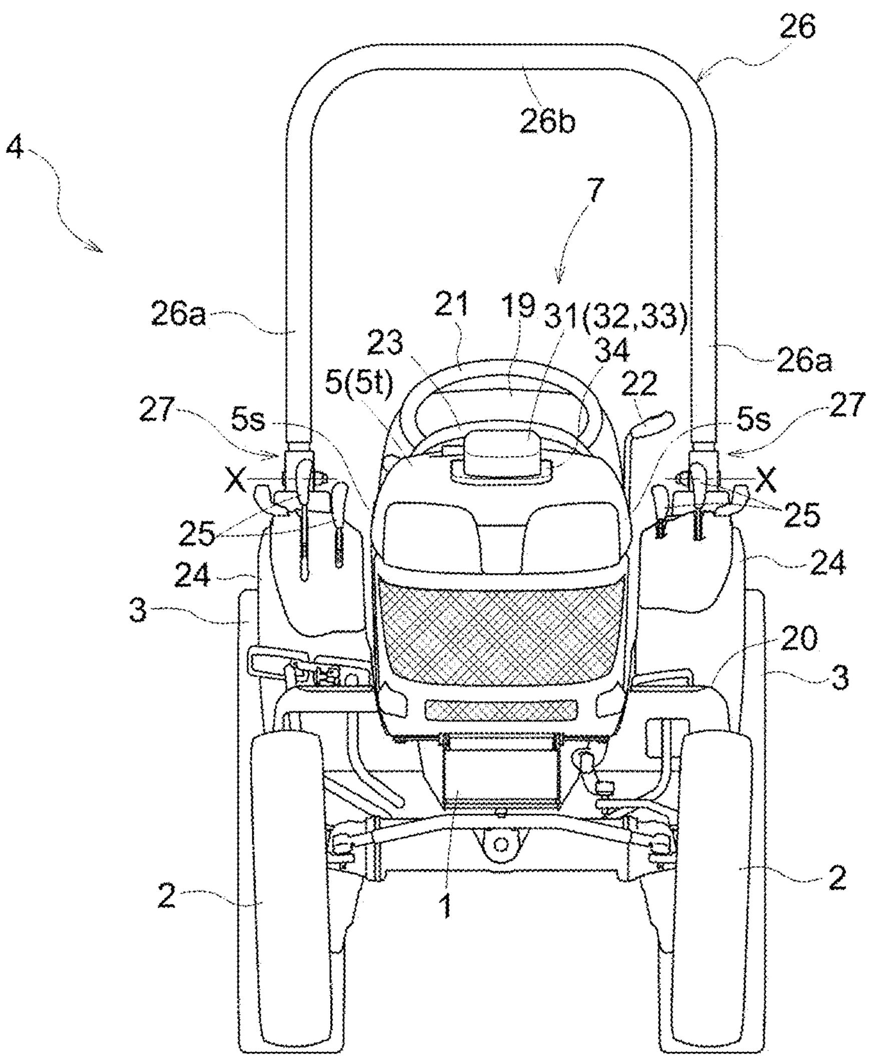
FIG. 48 is a front view of the tractor according to the other preferred embodiment c of the present invention.

Another Preferred Embodiment c (c-1) As shown in FIG. 47 and FIG. 48, the bonnet 5 includes an upper surface portion 5*t* and left and right side surface portions 5*s*, and the upper surface portion 5*t* of the bonnet has a center in the vehicle longitudinal direction. A positioning unit 31 including an antenna unit 32 in front of the portion is attached to a central position in the left-right direction with an attachment bracket 34 defining and functioning as a support member.

In addition, as shown in FIG. 47, in a side view, the antenna unit 32 is arranged above the area line EL connecting the upper end of the lateral frame portion 26*b* of the ROPS 26 and the upper end of the steering wheel 21, and moreover is arranged below the horizontal line HL in a horizontal posture that passes through the upper end of the steering wheel 21. In the case where the positioning unit 31 is provided, a portion or an entirety of the positioning unit 31 may be arranged at a position projecting from the front end of the bonnet 5 to the front side.

By arranging the positioning unit 31 including the antenna unit 32 in this manner, the satellite position information transmitted from the GPS satellite or the like can be preferably received without being affected by an obstacle such as a vehicle body structure such as the ROPS 26. In addition, since the positioning unit 31 is arranged below the horizontal line HL, the visibility of the operator sitting on the driver seat 19 is not obstructed.

Figure 49:
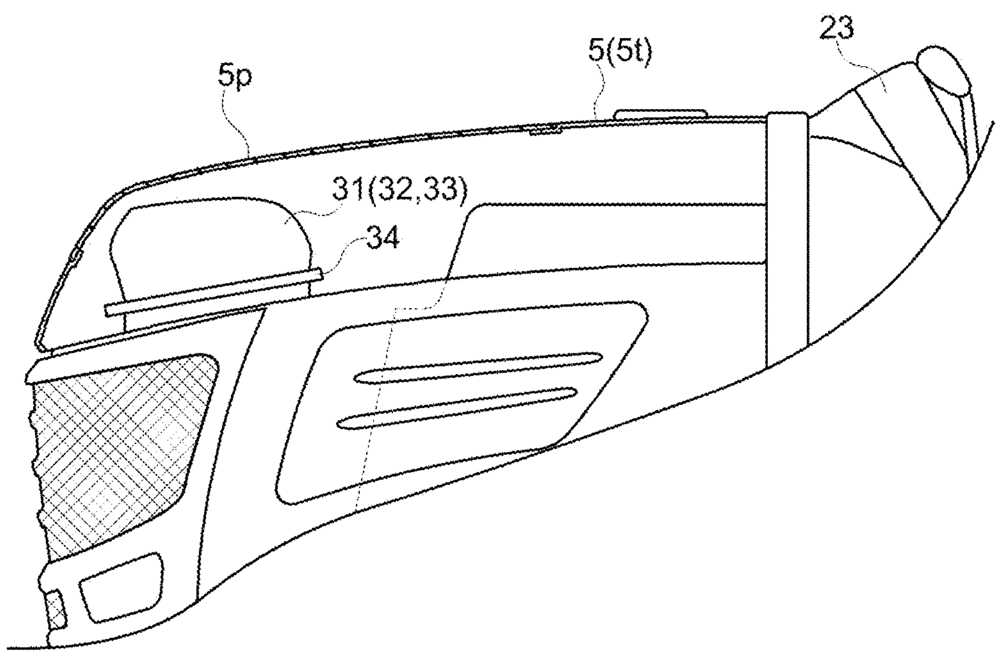
FIG. 49 is a partially-cutting side view of a bonnet according to the other preferred embodiment c of the present invention.

(c-2) As shown in FIG. 49, the positioning unit 31 including the antenna unit 32 is provided inside the bonnet 5 at the center position in the left-right direction with the attachment bracket 34, and the resin wall 5*p* is provided in a portion of the portion facing the upper side of the positioning unit 31 of the bonnet 5.

Since the positioning unit 31 is provided in this manner, the positioning unit 31 is not damaged by wind and rain, and good receiving of satellite position information transmitted by the GPS satellites or the like can be performed without any damage by the body components such as the ROPS 26. In addition, since the resin wall 5*p* is provided above the positioning unit 31, the satellite position information transmitted from GPS satellites or the like can be received without being disturbed.

Figure 50:
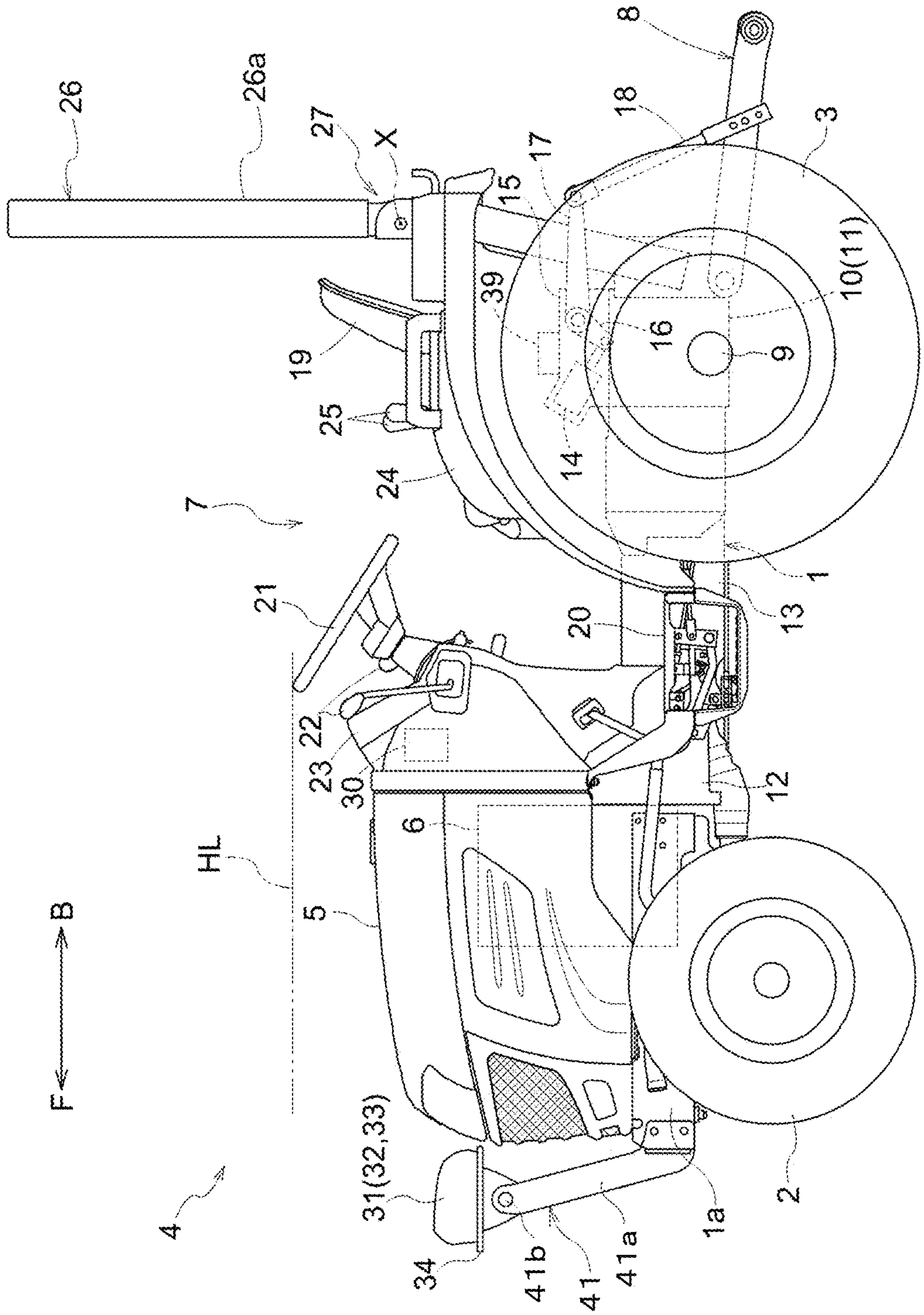
FIG. 50 is a side view of a tractor according to another preferred embodiment d of the present invention of the present invention.
Figure 51:
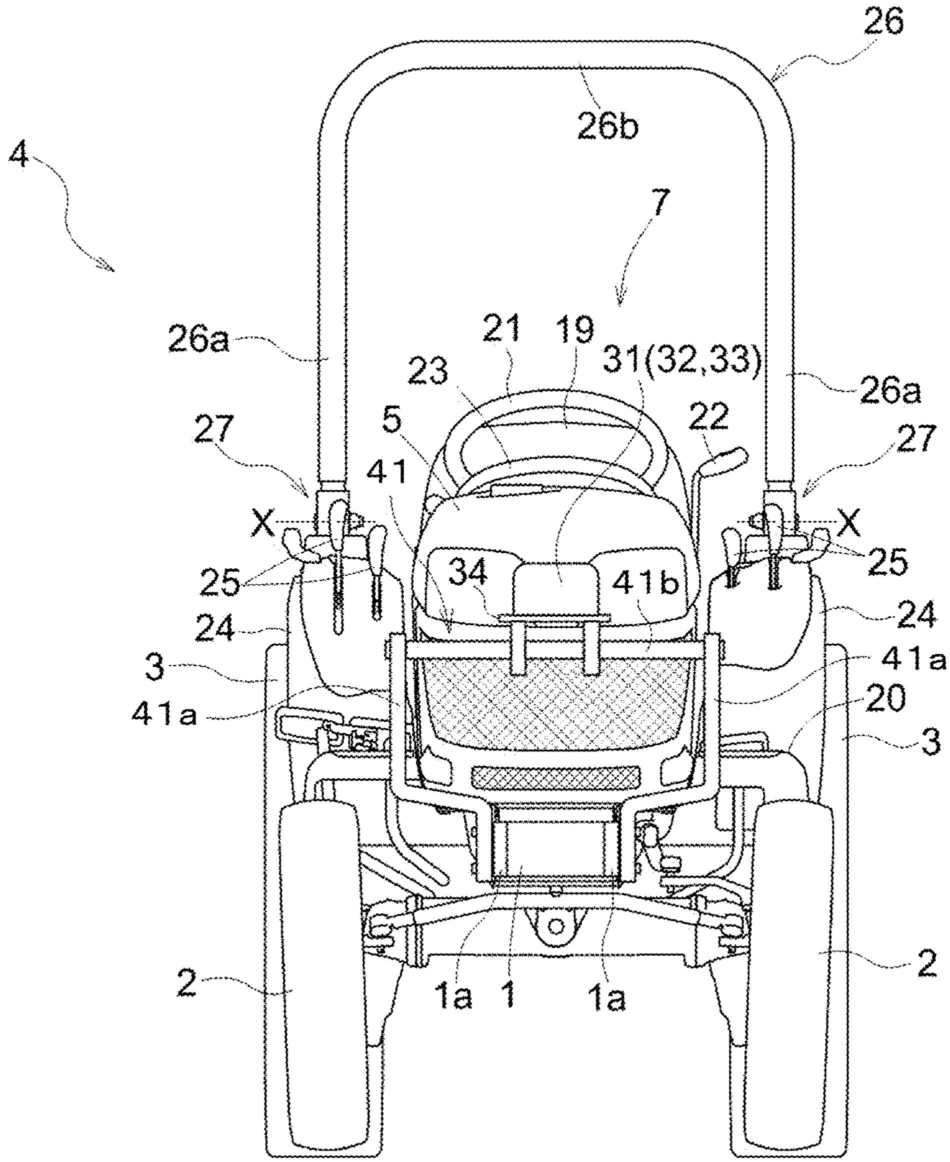
FIG. 51 is a front view of the tractor according to the other preferred embodiment d of the present invention.

Another Preferred Embodiment d (d-1) As shown in FIG. 50 and FIG. 51, a front guard 41 (an example of a front support member) is fixed to the left and right frame members 1*a* that define the vehicle body frame 1 of the traveling vehicle body 4. The front guard 41 is provided with an attachment bracket 34, and the attachment bracket 34 is provided with a positioning unit 31 including an antenna unit 32. The front guard 41 is arranged on the front side of the front end of the bonnet 5 to prevent the inconvenience that the bonnet 5 comes into contact with and breaks the outer wall of a building or a tree during the traveling.

The front guard 41 includes a pair of vertically oriented left and right vertical members 41*a* each including a base end connected to the left and right frame members 1*a* and of a horizontal member 41*b* connected to the upper ends thereof. A attachment bracket 34 is provided at the center of the lateral member 41*b* in the left-right direction, and the positioning unit 31 is provided so as to be mounted on the upper surface of the attachment bracket 34. As a result, the upper end of the positioning unit 31 is provided at the center position in the left-right direction of the front guard 41 above the upper end of the vertical member 41*a*.

In the preferred embodiment (d-1), as shown in FIG. 50, the positioning unit 31 is positioned below a horizontal line HL in a horizontal posture that passes through the upper end of the steering wheel 21 in a side view.

In this manner, the positioning unit 31 is arranged in the open space in front of the bonnet 5, and the satellite position information transmitted from the GPS satellites and the like can be well received without being affected by obstacles. In addition, since the positioning unit 31 is arranged below the horizontal line HL, the visibility of the operator sitting on the driver seat 19 is not obstructed.

Figure 52:
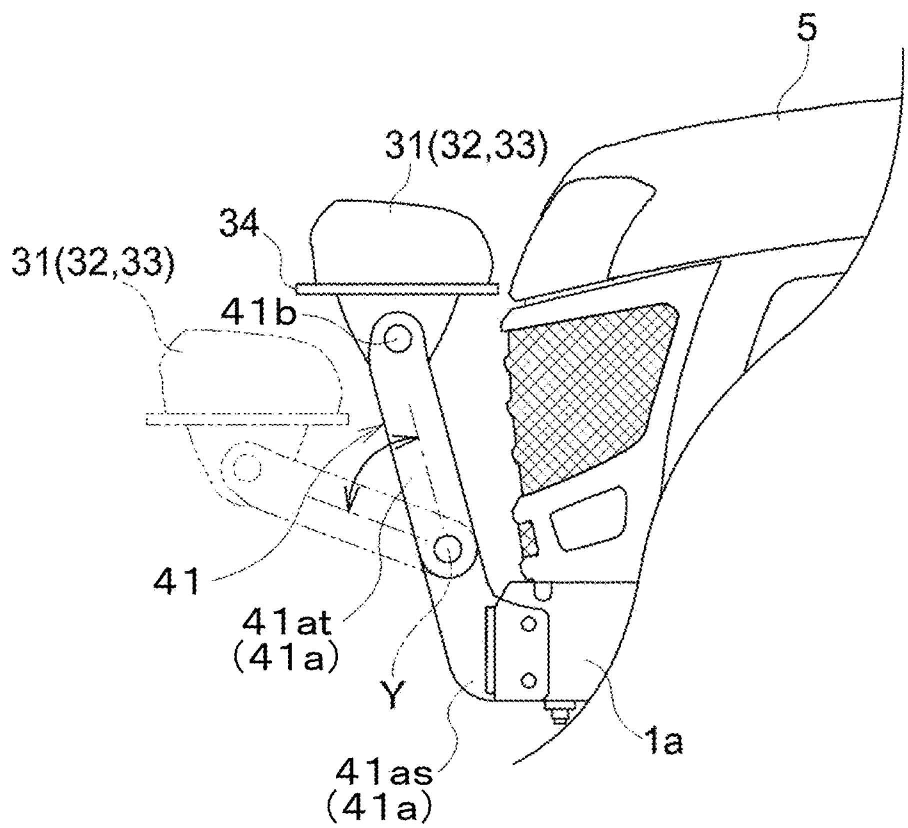
FIG. 52 is a side view of a front guard according to the other preferred embodiment d of the present invention.

(d-2) As shown in FIG. 52, a portion of the front guard 41 defining and functioning as a front support member is swingably supported in the front-rear direction about the switching axis Y in the lateral posture, and is supported by the front guard 41. On the other hand, the positioning unit 31 including the antenna unit 32 is provided with the same configuration as that of the preferred embodiment (d-1).

In the preferred embodiment (d-2), the vertical member 41*a* of the front guard 41 includes a lower base member 41*as* and a vertical swinging member 41*at* that is swingably supported in the front-rear direction about the switching axis Y. In addition, the horizontal member 41*b* is connected to the upper ends of the left and right vertical swing members 41*at*, and the positioning unit 31 is provided at the center of the horizontal member 41*b* in the left-right direction with the attachment bracket 34.

With that configuration, the vertical swinging member 41*at* is swung forward around the switching axis Y to displace the positioning unit 31 farther forward from the front end of the bonnet 5 and to receive the satellite position information transmitted from the GPS satellite or the like. Additionally in the preferred embodiment (d-2), it may be configured to horizontally maintain the position of the positioning unit 31 when the vertical swinging member 41*at* is swung forward as shown by the chain double-dashed line in FIG. 52.

Figure 53:
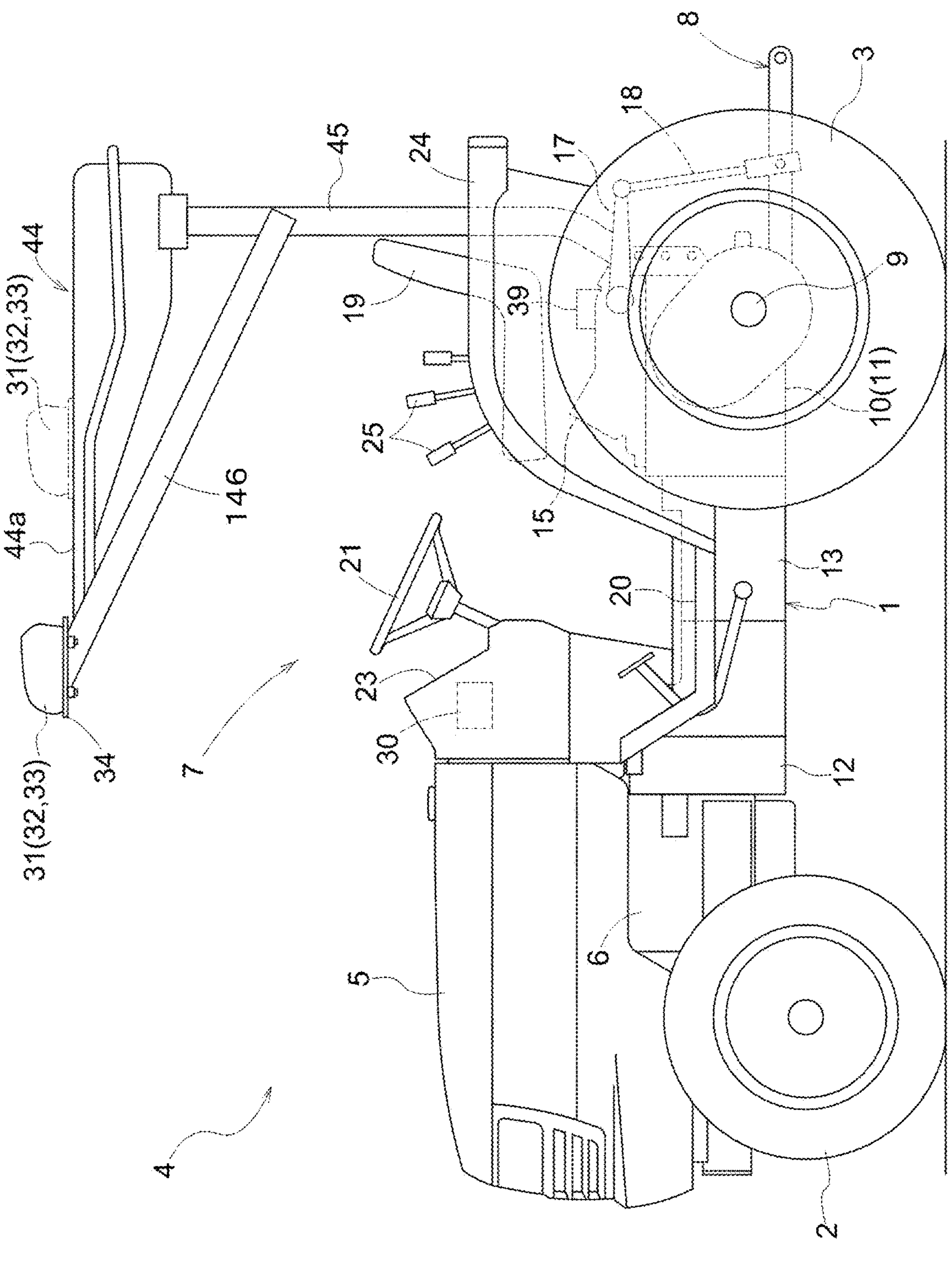
FIG. 53 is a side view of a tractor according to another preferred embodiment e of the present invention of the present invention.

Another preferred Embodiment e (e-1) As shown in FIG. 53, the antenna unit 32 may be provided in the canopy 44 that covers the upper portion of the driving portion 7. That is, the canopy 44 includes a resin roof member 44*a* that extends in a cantilever manner toward the front portion of the vehicle body with respect to the pillar members (pillars) 45 standing upright on the left and right of the rear position of the driver seat 19. On the upper surface of the roof member 44*a* of the canopy 44, the antenna unit 32 is provided in a space between the center and the front end in the front-rear direction with the attachment bracket 34.

In particular, when the antenna unit 32 is provided at the front end of the roof member 44*a* of the canopy 44, the beam member 146 is provided between the column member 45 and the front end of the roof member 44*a* as shown in FIG. 53. That is, in this configuration, the positioning unit 31 (the antenna unit 32) including the antenna unit 32 is arranged on the extension line of the beam member 146 in the longitudinal direction, thereby supporting the antenna unit 32 with high strength.

In the preferred embodiment (e-1), the antenna unit 32 is provided at the center position in the front-rear direction of the canopy 44 as shown by the chain double-dashed line in the drawing, and the antenna unit 32 is provided between the center position and the front end position, thereby preferably receiving the satellite position information transmitted from the GPS satellite or the like at a high position.

Incidentally, in the preferred embodiment (e-1), the canopy 44 may be provided at the upper end of the ROPS 26 without using the strut member 45. Although the beam member 146 is connected to the front end of the roof member 44*a* in FIG. 53, the beam member 146 is not necessarily connected to the front end, and the beam member 146 may be connected to a middle position in the front-rear direction of the canopy 44.

Figure 54:
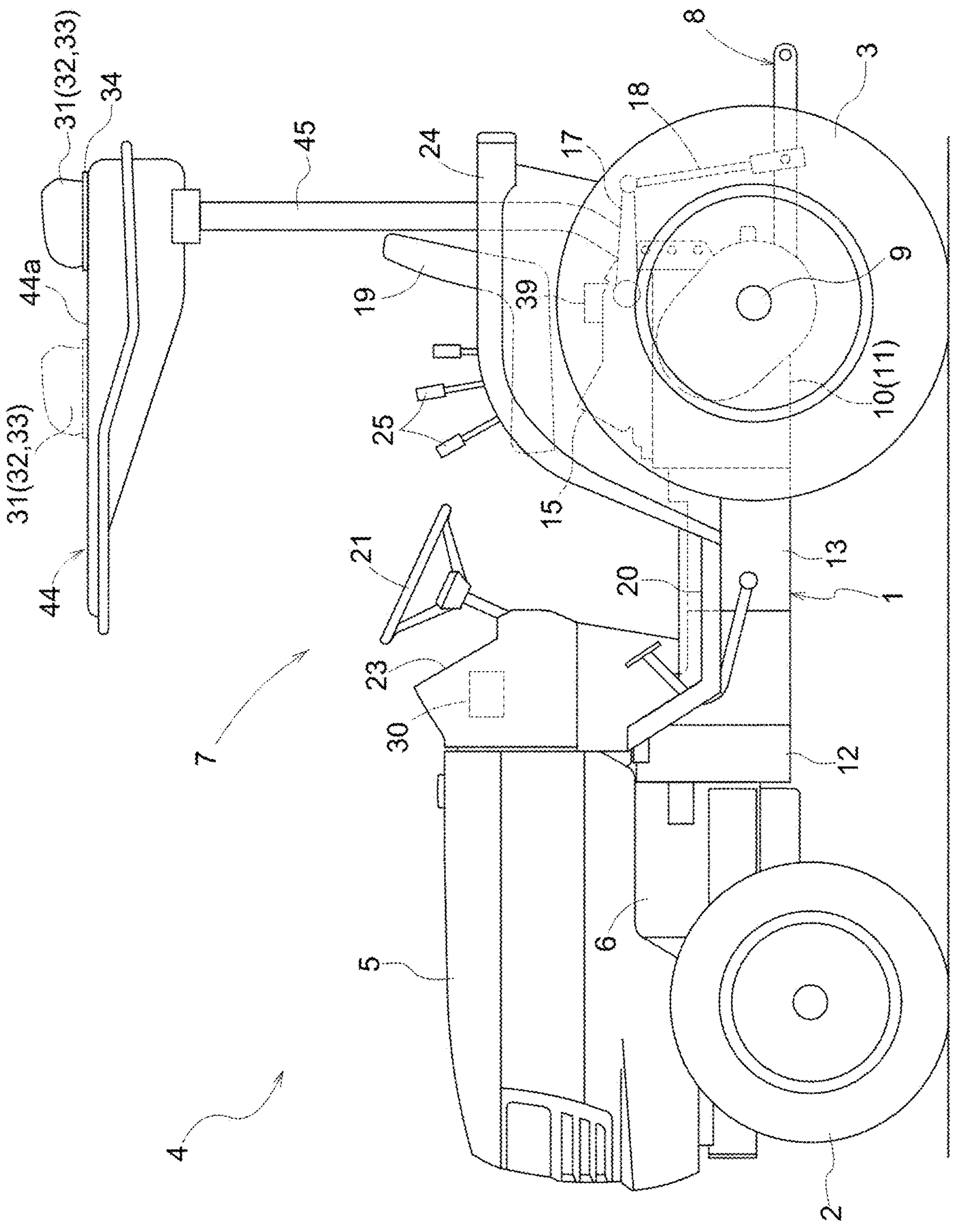
FIG. 54 is a front view of the tractor according to the other preferred embodiment e of the present invention.

(e-2) As shown in FIG. 54, the antenna unit 32 is provided between the center (the position indicated by the chain double-dashed line in the drawing) and the rear end of the roof member 44*a* of the canopy 44 in the front-rear direction. The drawing shows the configuration in which the antenna unit 32 is provided at the rear end of the canopy 44. By providing the antenna unit 32 at this position, the antenna unit 32 is arranged on an extension line of the column member 45 in the longitudinal direction, and the column member 45 receives the vibration in the vertical direction, and the support member 45 receives the vibration even when the traveling vehicle body 4 vibrates vertically, so that it is possible to perform the receiving above the satellite positioning under the state where the vibration is suppressed.

Figure 55:
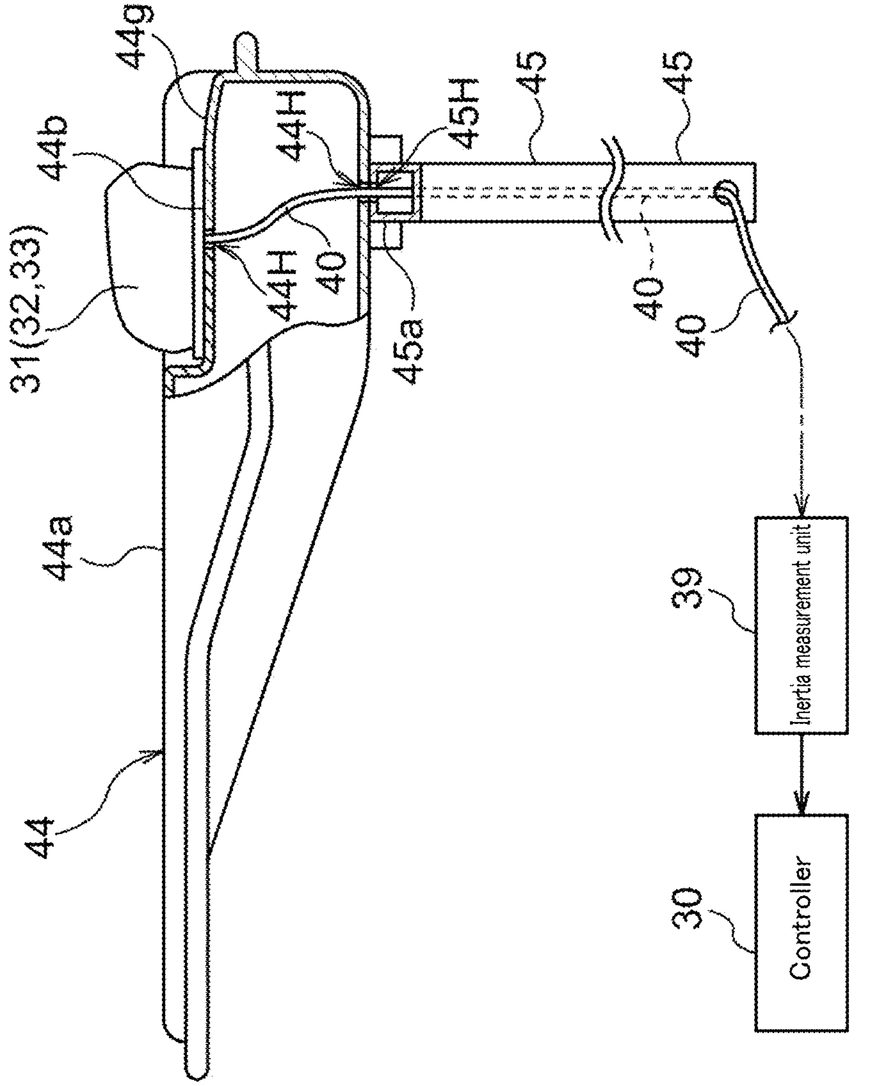
FIG. 55 is a partially-cutting side view of a canopy according to the other preferred embodiment e of the present invention.
Figure 56:
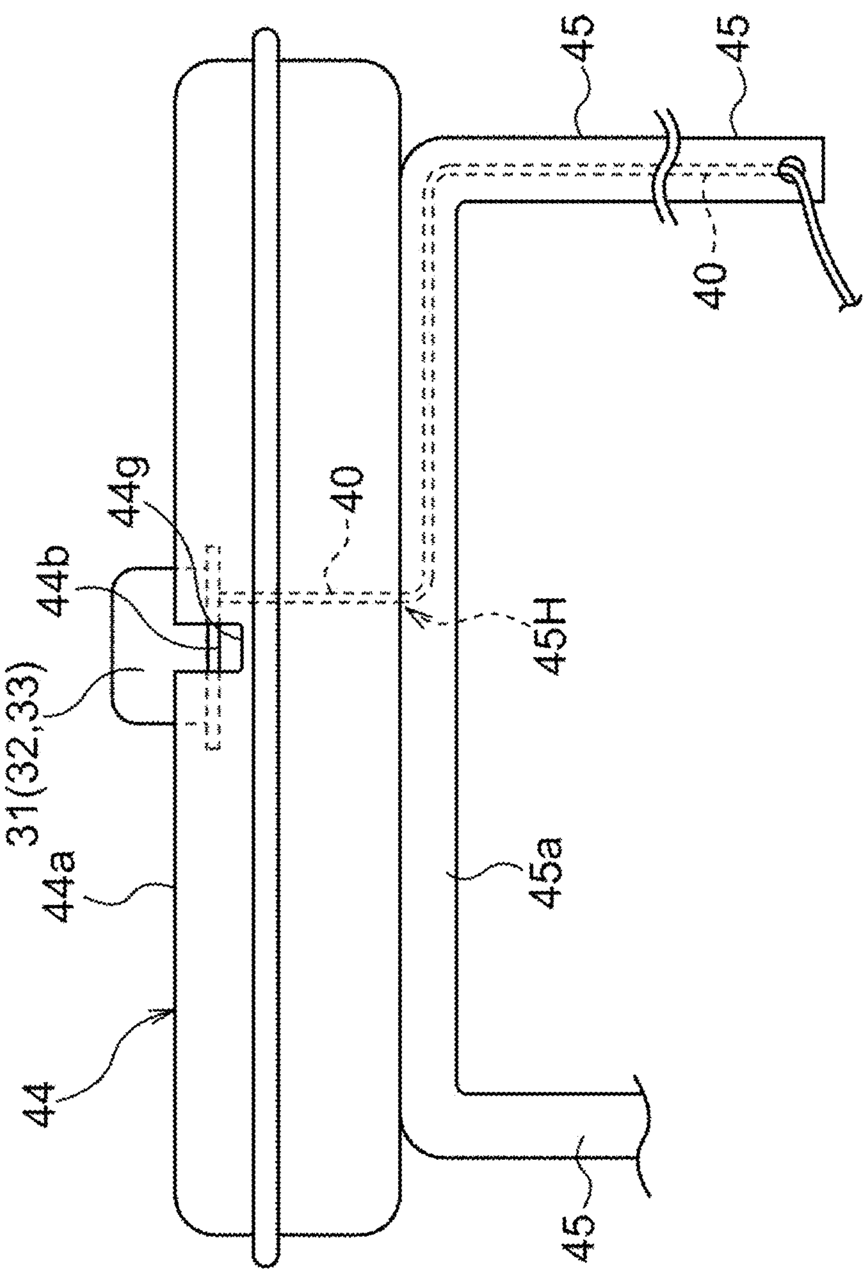
FIG. 56 is a back view of the canopy according to the other preferred embodiment e of the present invention.

(e-3) As shown in FIG. 55 and FIG. 56, the attachment recess 44*b* is formed on the upper surface of the roof member 44*a* of the canopy 44, and the antenna unit 32 is provided in such a form that the antenna unit 32 is fitted into the attachment recess 44*b*. In addition, a drainage groove 44*g* (an example of a drainage means) that is continuous with the attachment recess 44*b* is formed.

In the configuration, the left and right support members 45 are formed to have the shape of a hollow square pipe, and the upper ends of the left and right support members 45 are bent to connect the upper ends of the left and right support members 45 to each other. In addition, the bottom of the attachment recess 44*b* and the bottom wall of the roof member 44*a* are provided with an insertion hole 44H at the upper end, and the introduction hole 45H into which the wiring 40 inserted into the insertion hole 44H is introduced is formed on the upper surface of the connection column 45*a*.

With that configuration, the wiring 40 from the antenna unit 32 is inserted into the insertion hole 44H, inserted into the support member 45 from the introduction hole 45H on the upper surface of the connection support portion 45*a*, and pulled out from the lower portion of the support member 45 to the outside. The positioning information can be transmitted to the controller 30 with the inertia measurement unit 39.

In the preferred embodiment (e-3), since the antenna unit 32 is provided in the attachment recess 44*b* by being fitted thereto, the antenna unit 32 can be stably supported. However, since raindrop may be staying in the attachment recess 44*b*, the raindrop is sufficiently discharged by forming the drainage groove 44*g* communicating with the attachment recess 44*b*, and the disadvantage that the raindrop remains in the attachment recess 44*b* is eliminated.

In the preferred embodiment (e-3), the wiring 40 from the antenna unit 32 may be arranged along the drain groove 44*g*. By arranging the wiring 40 in this manner, there is no difficulty in arranging the wiring 40. Although the attachment bracket 34 is not shown in the drawing, the antenna unit 32 may be supported with the attachment bracket 34.

Another Preferred Embodiment f

Figure 57:
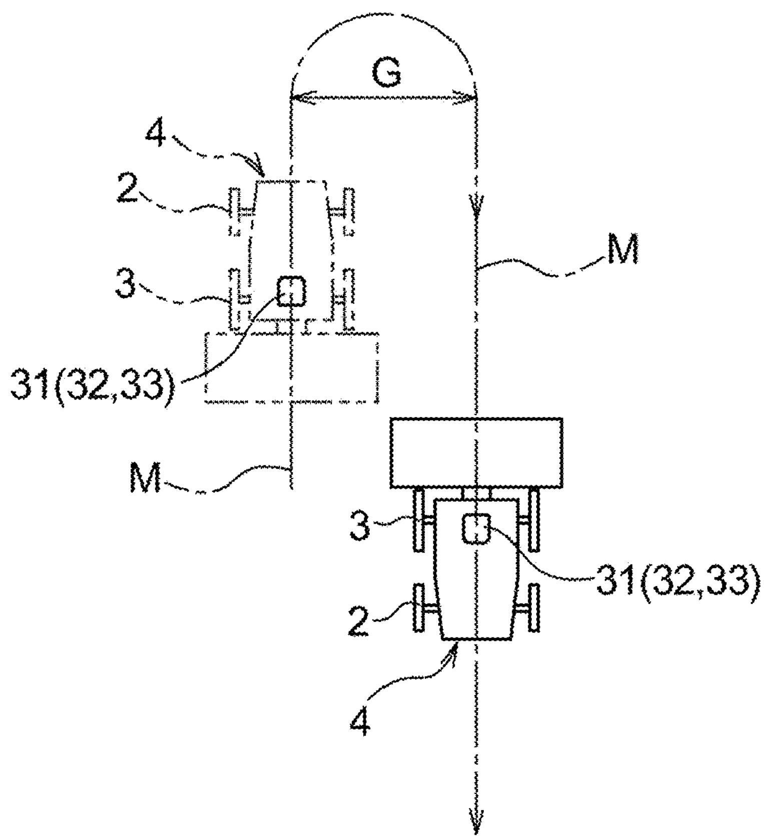
FIG. 57 is a plan view illustrating a traveling path according to another preferred embodiment f of the present invention.

FIG. 57 shows the traveling route M of the traveling vehicle body 4 in the case where the traveling vehicle body 4 is provided with the positioning unit 31 including the antenna unit 32 and the satellite navigation device 33, and the plowing work is performed based on the positioning of the positioning unit 31. When the traveling vehicle body 4 travels straight ahead based on the positioning of the positioning unit 31 and the traveling vehicle body 4 reaches a headland and then turns, an interval G of a predetermined distance is provided between the traveling path M before the turning and the traveling path M after the turning is created.

Ideally, the gap G has the same value whether the vehicle makes a right turn at the edge shown in the upper side of the drawing as shown in the figure or makes a left turn at the lower side of the drawing. When the plowing work is performed based on the positioning by the positioning unit 31, the interval G is set to a fixed value. However, when the positioning unit 31 deviates from the center of the traveling vehicle body 4 in the left-right direction in either of the left-right directions, the distance G does not become the same value, and thus the positioning unit 31 is desired to be provided at the center position of the traveling vehicle body 4 in the left-right direction with high accuracy. In order to cope with such a problem, the configuration described below is used in the preferred embodiment f.

Figure 58:
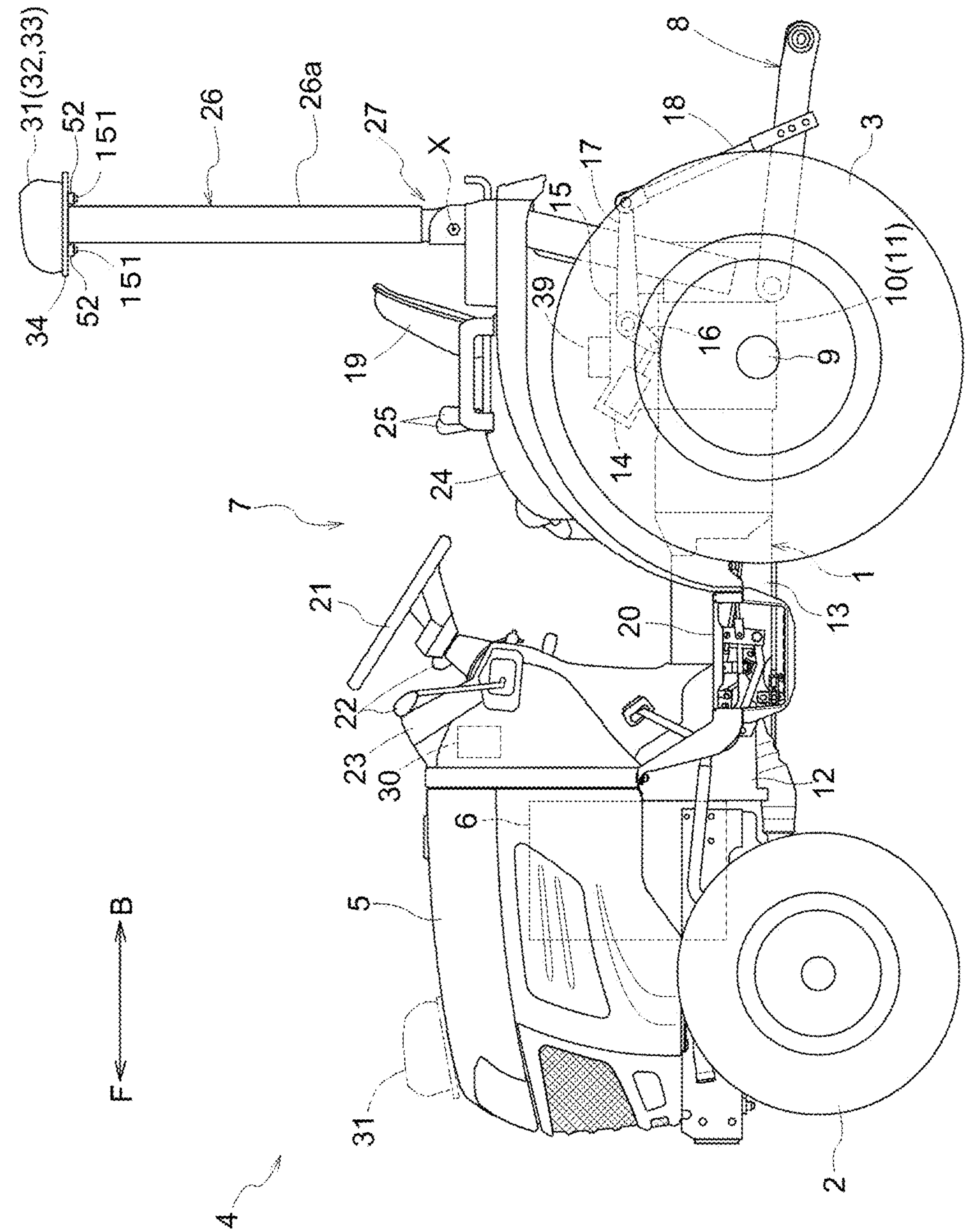
FIG. 58 is a side view of a tractor according to the other preferred embodiment f of the present invention.
Figure 59:
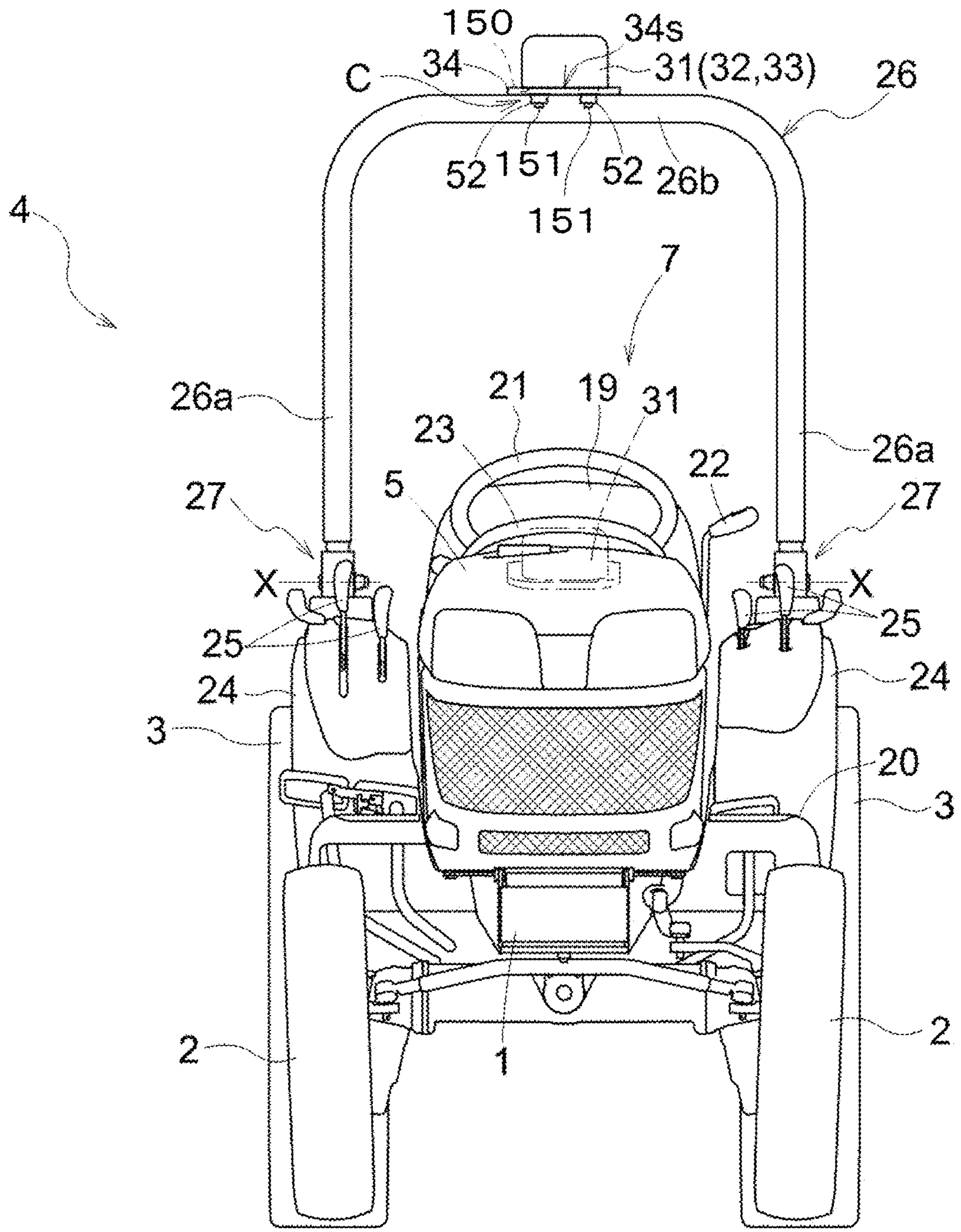
FIG. 59 is a front view of the tractor according to the other preferred embodiment f of the present invention.

(f-1) As shown in FIG. 58 and FIG. 59, the ROPS 26 are provided at the rear position of the traveling vehicle body 4, the ROPS 26 including a pair of left and right vertical frame portions 26*a* extending in the vertical direction, and a lateral frame portion 26*b* connecting the upper ends thereof and extending in the horizontal direction.

A attachment bracket 34 is horizontally fixed to the upper surface of the lateral frame portion 26*b* at the center in the left-right direction, and the positioning unit 31 including the antenna unit 32 is provided on the attachment surface 34*s* of the attachment bracket 34 with a position adjusting mechanism C is attached.

Figure 60:
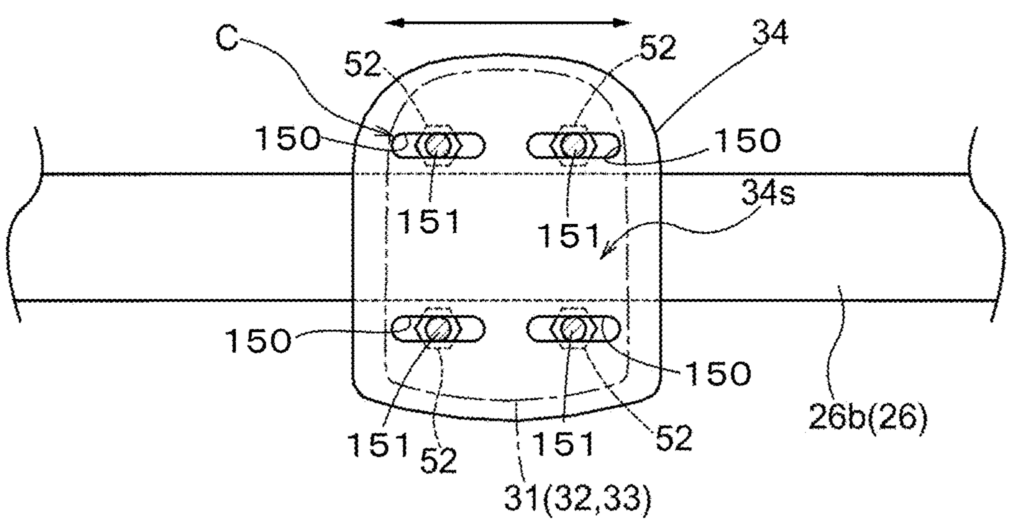
FIG. 60 is a plan view of a position adjustment mechanism according to the other preferred embodiment f of the present invention.

As shown in FIG. 60, the position adjusting mechanism C includes a plurality (four in the preferred embodiment (f-1)) of elongated holes 150 formed in the attachment bracket 34 and extending in the left-right direction, a plurality of (four in the preferred embodiment (f-1)) fastening bolts 151 protruding downward from the bottom surface of the positioning unit 31 so as to be inserted into these elongated holes 150, and fastening nuts 52 to be screwed to the fastening bolts 151.

With such a configuration, the fastening bolts 151 are inserted into the plurality of long holes 150, and the fastening nuts 52 are fastened to fix the position of the positioning unit to an arbitrary position in the lateral direction of the traveling vehicle body 4, thereby easily enabling the positional adjustment of the positioning unit 31 in the lateral direction.

As a modified example of the other preferred embodiment (f-1), a flange (not shown in the drawings) that abuts on the attachment surface 34*s* of the attachment bracket 34 is formed so as to project in the left-right direction with respect to the positioning unit 31 including the antenna unit 32. A long hole 150 extending laterally with respect to the flange may be formed, the attachment bracket 34 may be provided with a fastening bolt 151 that can be inserted into the long hole 150 in an upward posture, and a fastening nut 52 that is screwed into the fastening bolt 151 may be provided. In this modification, the long hole 150, the fastening bolt 151, and the fastening nut 52 define the position adjusting mechanism C.

Figure 61:
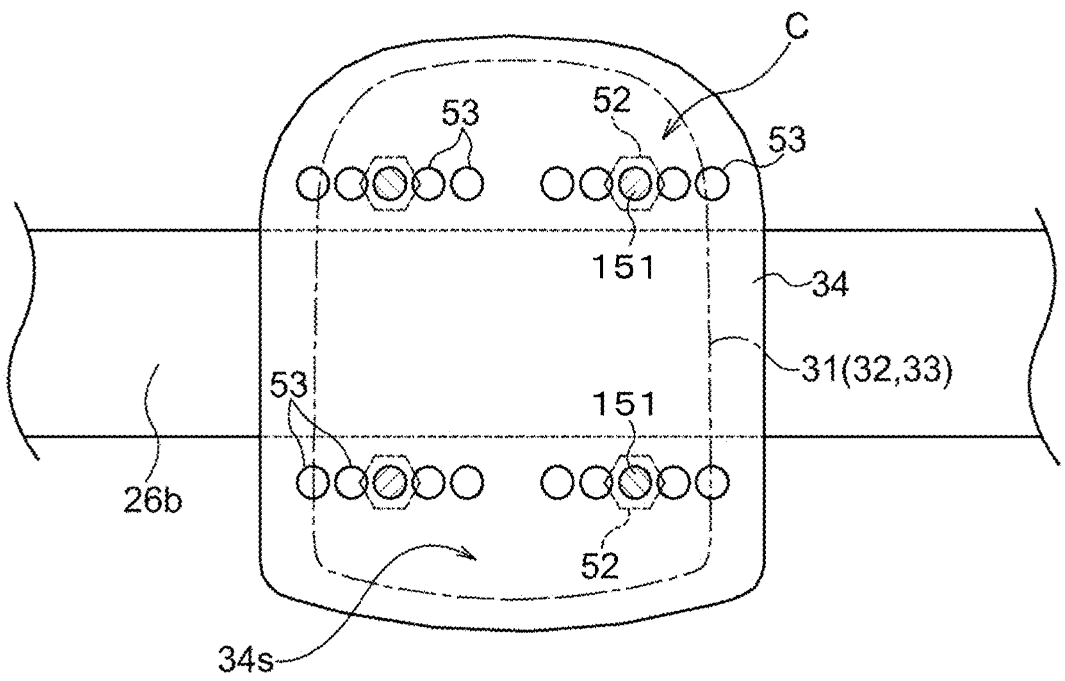
FIG. 61 is a plan view of the position adjustment mechanism according to the other preferred embodiment f of the present invention.

(f-2) As shown in FIG. 61, in the preferred embodiment (f-2), the position adjusting mechanisms C includes a plurality (four in the preferred embodiment (f-1)) of insertion holes 53 arranged in the attachment bracket 34 so as to be laterally offset from each other, a plurality of (four in the preferred embodiment (f-1)) of fastening bolts 151 facing downward on the bottom surface of the positioning unit 31 including the antenna unit 32 so as to be inserted into the four insertion holes 53, and the fastening nuts 52 to be screwed onto the fastening bolts 151.

With such a configuration, one of the plurality of insertion holes 53 is selected, the fastening bolt 151 is inserted, and the fastening nut 52 is fastened to fix the position of the positioning unit 31 at an arbitrary position in the lateral direction of the traveling vehicle body 4. Thereby, the position of the positioning unit 31 can be easily adjusted in the lateral direction.

As a modified example of the preferred embodiment (f-2), a flange (not shown in the drawings) that abuts the attachment surface 34*s* of the attachment bracket 34 is formed on the positioning unit 31, and the positioning unit 31 is aligned by being laterally offset with respect to the flange. A plurality (for example, four in the preferred embodiment (f-1)) of insertion holes 53 are formed, and the attachment bracket 34 is provided with the fastening bolts 151 that can be inserted into the insertion holes in a posture in which the fastening bolt 151 faces upward. The fastening nut 52 that is screwed together may be provided. In this modification, the plurality of insertion holes 53, the fastening bolts 151, and the fastening nuts 52 define the position adjusting mechanism C.

Another Preferred Embodiment g

The preferred embodiment g provides the configuration provided with the fall protection ROPS in front of the driver seat 19, but does not exclude the configuration provided with the fall protection ROPS behind the driver seat 19. Thus, the ROPS provided in front of the driver seat 19 are referred to as the front ROPS 55, and the ROPS provided in the rear of the driver seat 19 are referred to as the rear ROPS 26.

Figure 62:
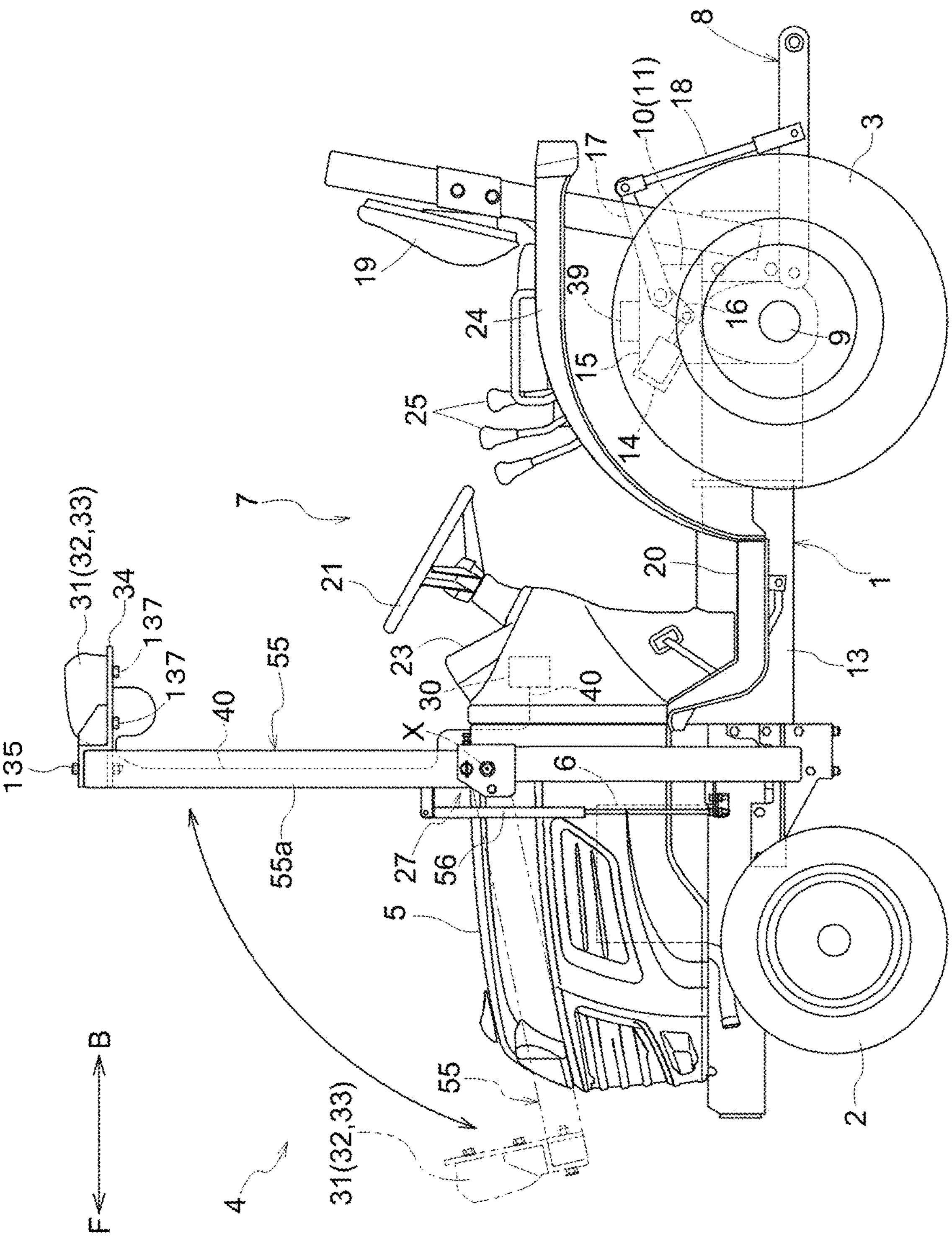
FIG. 62 is a side view of a tractor according to another preferred embodiment g of the present invention.
Figure 63:
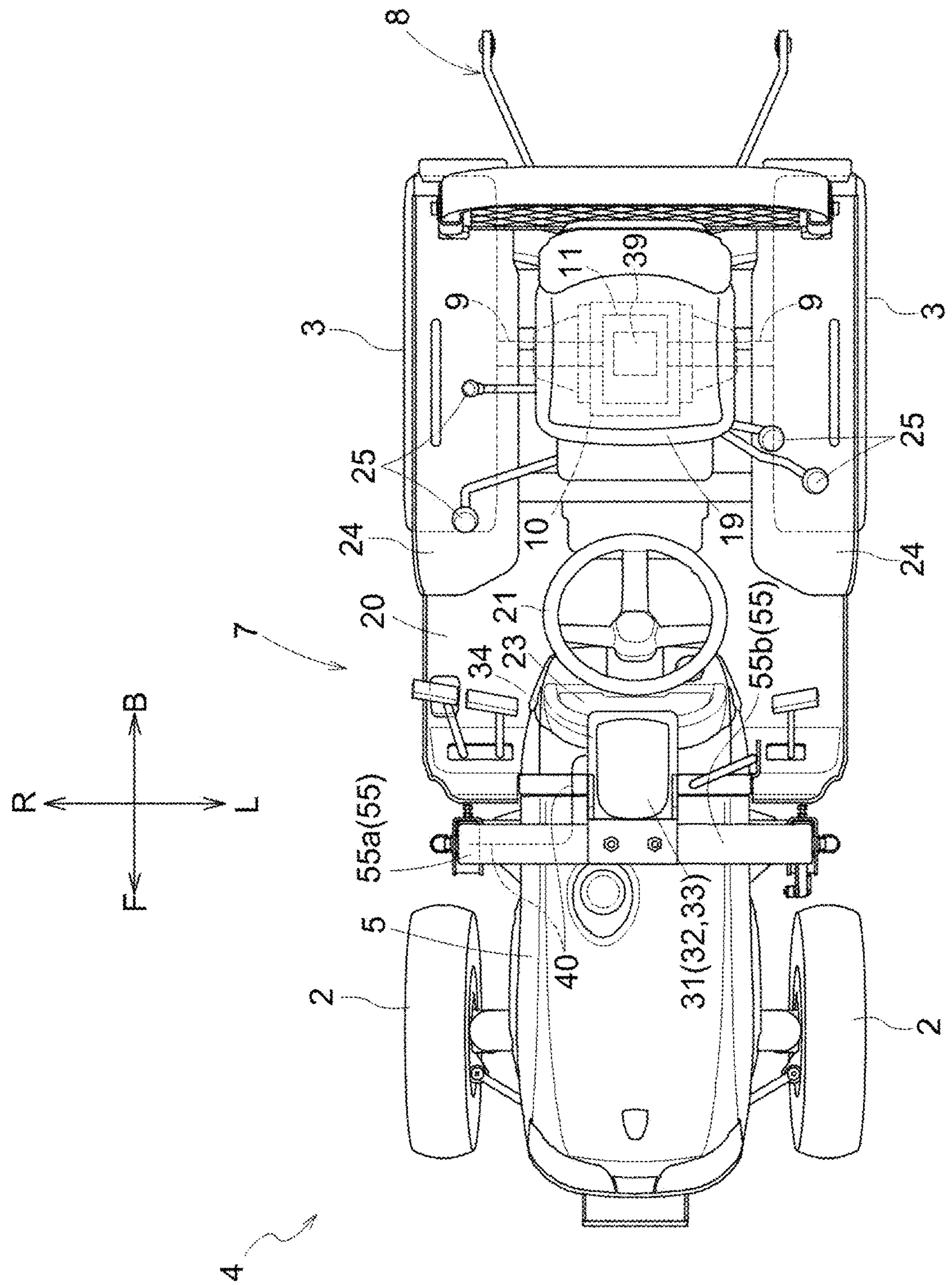
FIG. 63 is a plan view of the tractor according to the other preferred embodiment g of the present invention.

(g-1) As shown in FIG. 62 and FIG. 63, the front ROPS 55 for roll protection is provided in front of the driver seat 19, and the front ROPS 55 is provided with a positioning unit 31. The positioning unit 31 includes the antenna unit 32 for satellite navigation, and includes the satellite navigation device 33 that measures the position and azimuth of the traveling vehicle body 4.

The front ROPS 55 includes a pair of left and right front vertical frame portions 55*a* formed by bending a hollow square pipe material to extend in the vertical direction, and includes a front lateral frame portion 55*b* connecting the upper ends thereof and extending in the lateral direction, and has a substantially gate shape in front view of the vehicle body. In such a configuration, the positioning unit 31 is provided on the upper surface of the front lateral frame portion 55*b* with the attachment bracket 34. As a result, the positioning unit 31 including the antenna unit 32 is arranged at a position higher than the upper end of the backrest of the driver seat 19.

In the preferred embodiment (g-1), the front ROPS 55 are configured to be foldable around a lateral swing fulcrum X in a folding portion 27 provided under the left and right front vertical frame portions 55*a*. With this configuration, in transporting the vehicle body, the upper frame portion of the front ROPS 55 (the upper portions above the swing fulcrum X of the left and right front vertical frame portions 55*a* and the front lateral frame portion 55*b*) is configured to reduce the amount of upward protrusion by being swung and folded about the swing fulcrum X to the front side of the vehicle body. In the folding, the vertical frame portion 26*a* above the swing fulcrum X swings by 180°, and can be set to the non-use position. In the non-use position, the lateral frame portion 26*b* and the antenna unit 32 are arranged below the swing fulcrum X, which facilitates maintenance of the antenna unit 32 and the like.

In the folding configuration, the lower side below the swing fulcrum X is referred to as a lower frame portion, and the lower frame portion is fixed to the traveling vehicle body 4. In addition, in the front ROPS 55, an standing posture in which the upper frame portion stands up as shown by a solid line in FIG. 62 in a human operation and a retracting posture in which the upper frame portion falls down forward of the vehicle body as shown by a two-dot chain line in FIG. 61 can be switched. In particular, a gas spring 56 is provided as an assist mechanism to reduce the burden on the operator when operating the ROPS 55 from the retracting posture to the standing posture.

Figure 64:
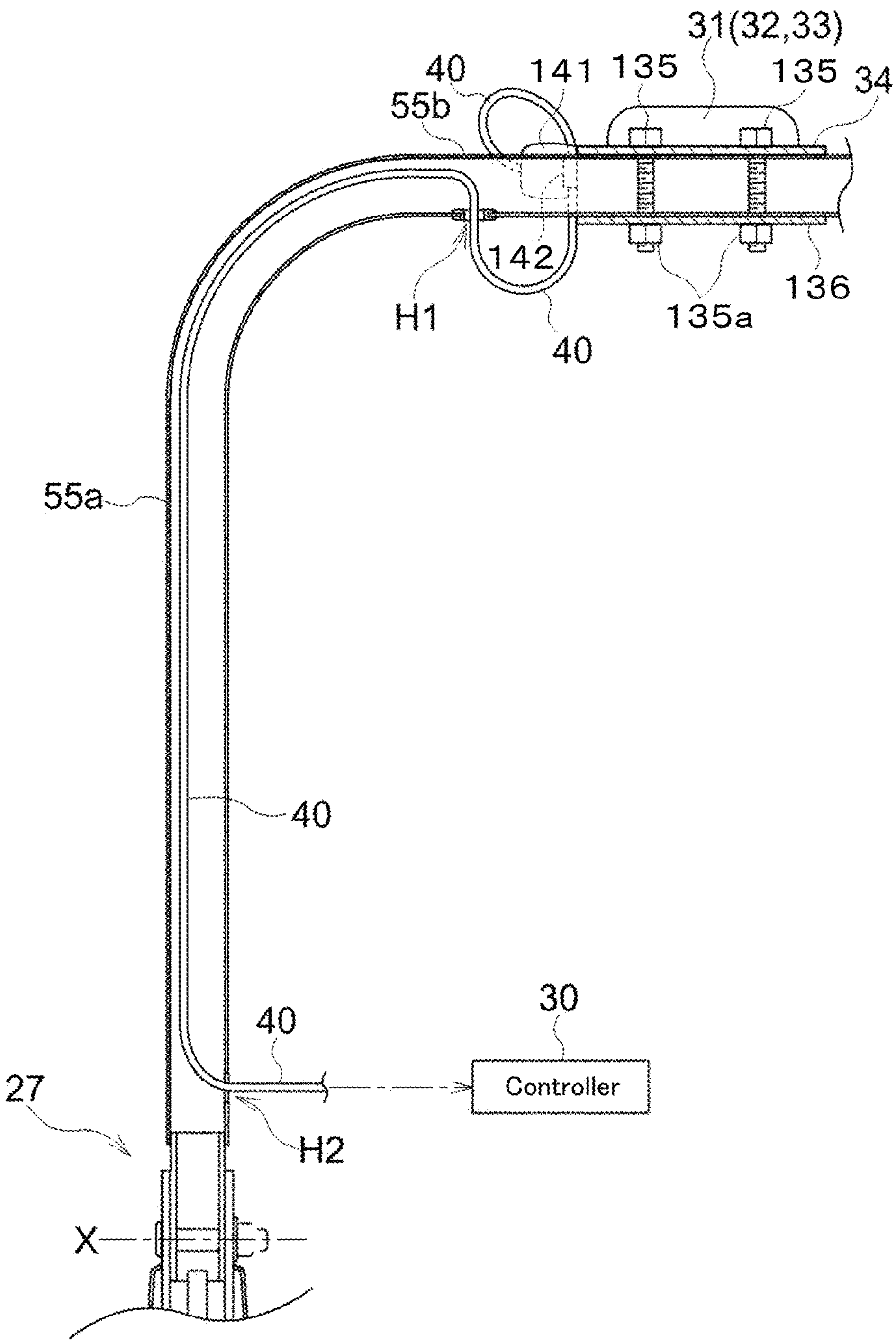
FIG. 64 is a cross-portion view illustrating wirings inside a front ROPS according to the other preferred embodiment g of the present invention.

Additionally in this configuration, as shown in FIG. 64, the wiring 40 that connects the positioning unit 31 including the antenna unit 32 and the controller 30 is arranged from the front lateral frame portion 55*b* to the front vertical frame portion 55*a*. That is, the wiring 40 is inserted from the first through hole H1 on the lower surface of the front lateral frame portion 55*b* into the internal space of the front lateral frame portion 55*b*, and is folded from the folding portion 27 at the lower portion of one front vertical frame portion 55*a*. At the upper portion (above the swing fulcrum X), the front vertical frame portion 55*a* is arranged so as to be pulled out from the second through hole H2 on the inner surface side (opposing surfaces side of the left and right front vertical frame portions 55*a*). The wiring 40 thus drawn is connected to the controller 30.

In the configuration of the preferred embodiment (g-1), even when the upper frame portion is heavy by providing the positioning unit 31 in the upper frame portion, the upper frame portion can be easily set to the standing posture with the biasing force of the gas spring 56. In addition, by inserting the wiring 40 from the inside of the lateral frame portion 26*b* into the inside of the front vertical frame portion 55*a*, the wiring 40 is not damaged and the hanging of the wiring 40 can be prevented.

In the preferred embodiment (g-1), the traveling vehicle body 4 is configured such that the front ROPS 55 for roll protection are provided in front of the driver seat 19 and the ROPS 26 for roll protection are provided behind the driver seat 19. In addition, as the assist mechanism, a torsion spring or a coil spring may be provided instead of the gas spring 56.

The ROPS 26 may be configured to reach the retracting posture by reclining backward.

Figure 65:
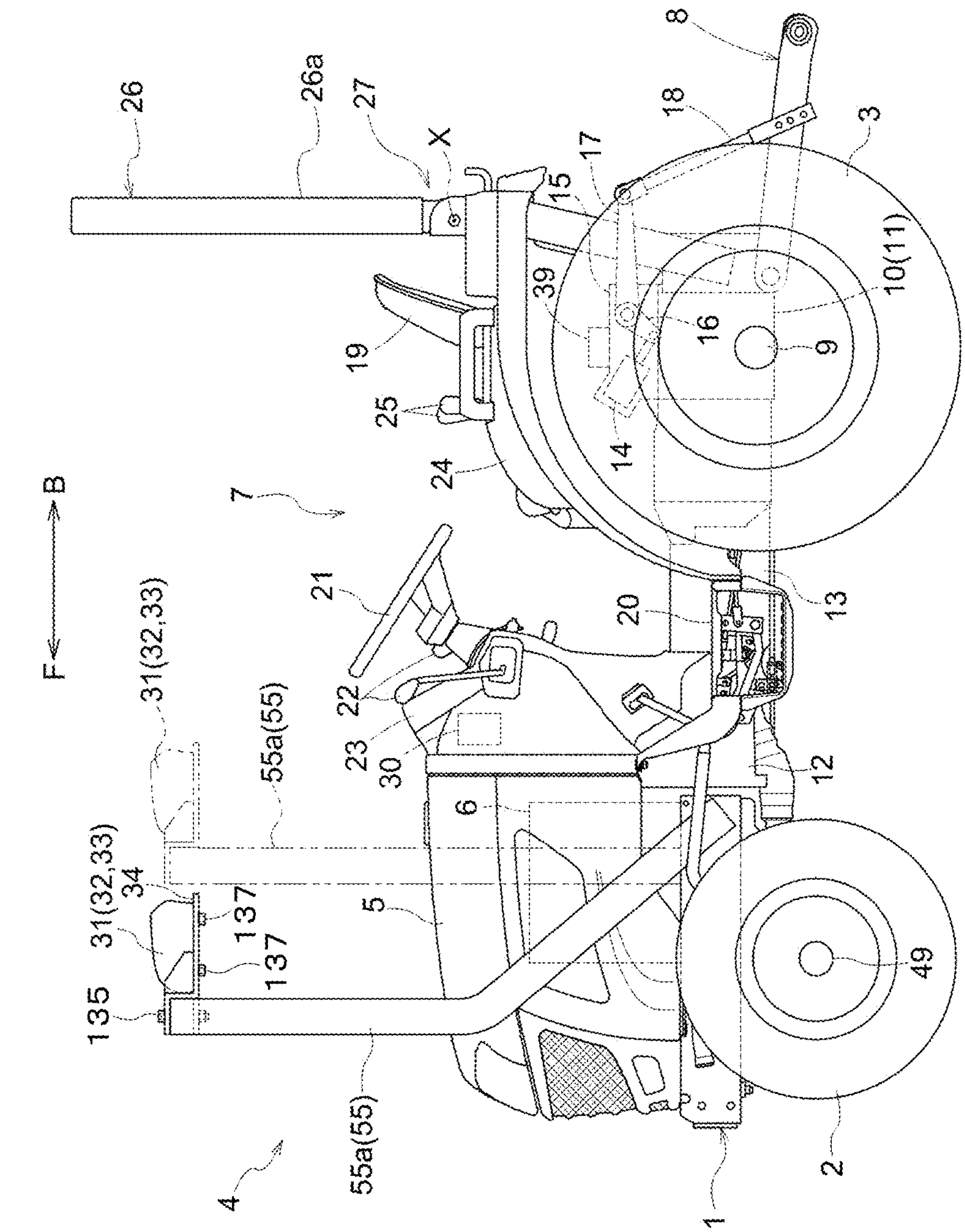
FIG. 65 is a side view of the tractor according to the other preferred embodiment g of the present invention.
Figure 66:
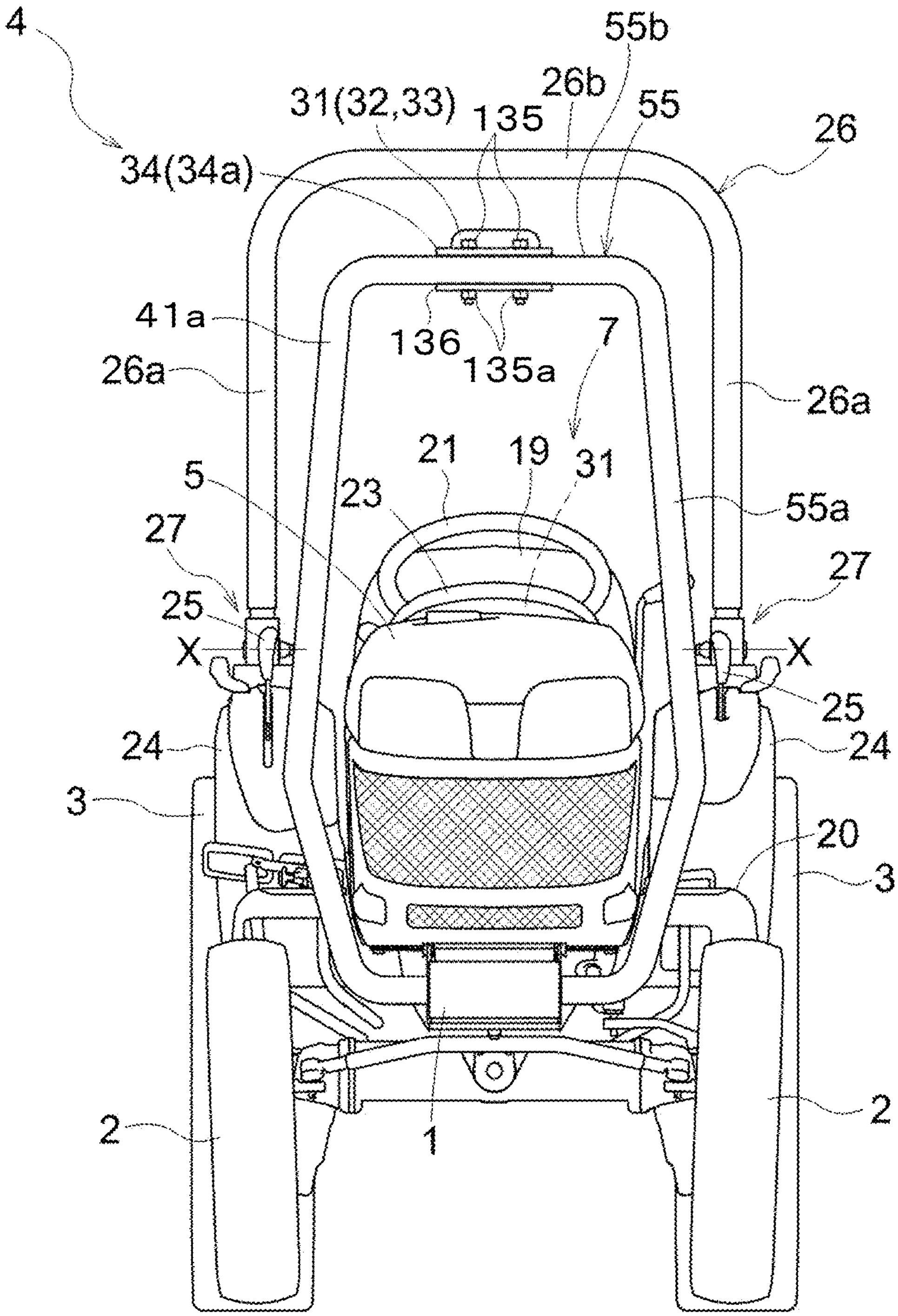
FIG. 66 is a front view of the tractor according to the other preferred embodiment g of the present invention.

(g-2) As shown in FIG. 65 and FIG. 66, in the traveling vehicle body 4 having the rear ROPS 26 at the rear position of the driver seat 19, the front ROPS 55 are provided at the front position of the driver seat 19. The positioning unit 31 is provided in the partial rope 55. The positioning unit 31 includes the antenna unit 32 for satellite navigation and a satellite navigation device 33 that measures the position and azimuth of the traveling vehicle body 4.

The front ROPS 55 includes a pair of left and right front vertical frame portions 55*a* extending in the vertical direction and a front lateral frame portion 55*b* connecting the upper ends of the left and right portions and extending in the horizontal direction. And, the front ROPS 55 has a substantially gate shape in the front view of the vehicle body. In such a configuration, the positioning unit 31 is provided on the upper surface of the front lateral frame portion 55*b* with the attachment bracket 34. As a result, the positioning unit 31 including the antenna unit 32 is arranged at a position higher than the upper end of the backrest of the driver seat 19.

In the preferred embodiment (g-2), the front ROPS 55 are formed to have a substantially gate shape by bending a hollow square pipe material, and the base end side takes an oblique posture extending forward as it extends upward. Thus, the positioning unit 31 is separated from the rear ROPS 26 to improve the receiving performance. The front ROPS 55 are standing vertically upward from the traveling vehicle body 4 as shown by the chain double-dashed line in FIG. 65.

Furthermore, as a configuration to support the positioning unit 31 including the antenna unit 32 on the front ROPS 55, for example, a configuration may be adopted in which the positioning unit 31 is directly fixed to the upper surface of the lateral frame portion 26*b* with bolts or the like.

Figure 67:
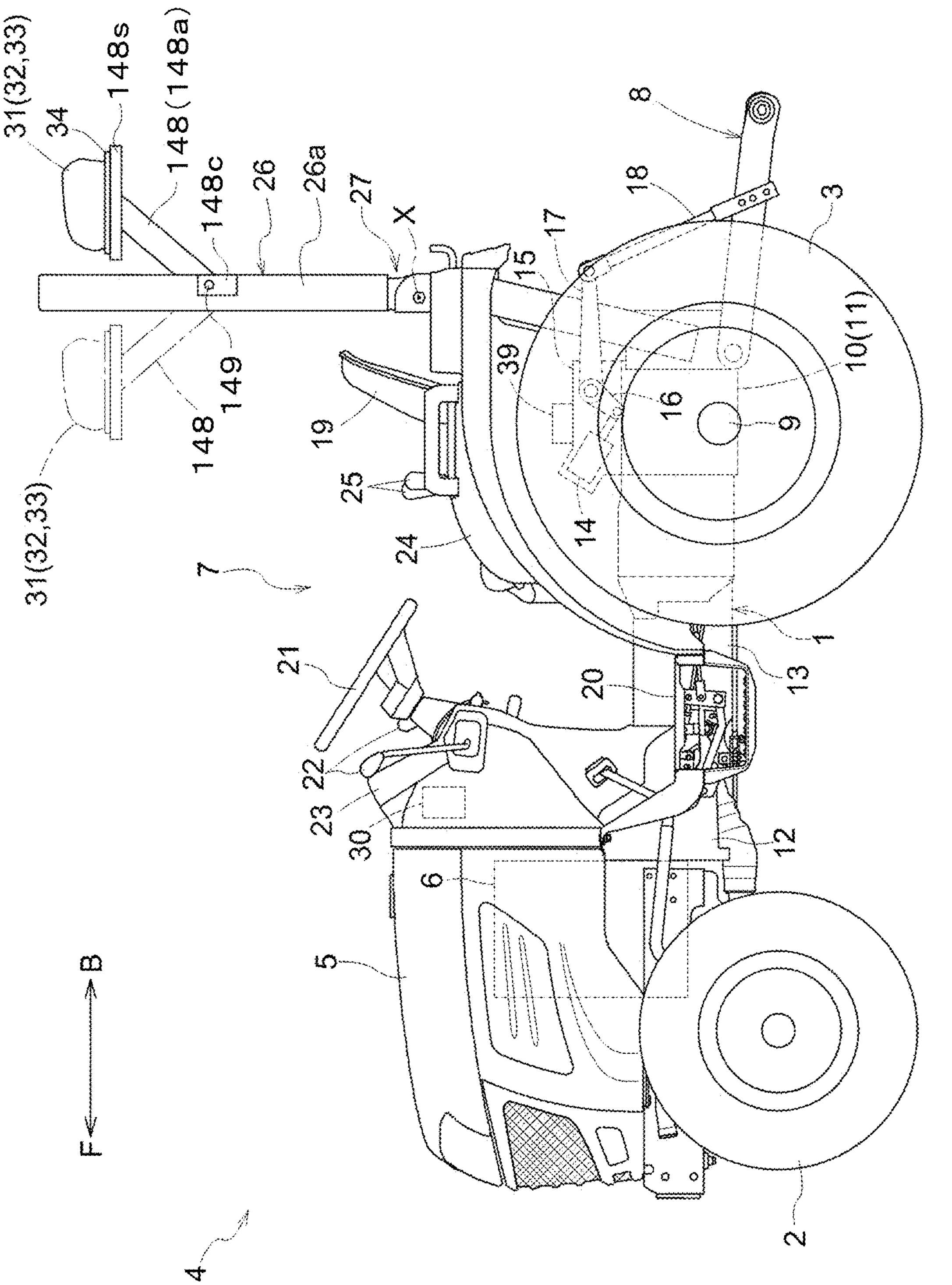
FIG. 67 is a side view of a tractor according to another preferred embodiment h of the present invention.
Figure 68:
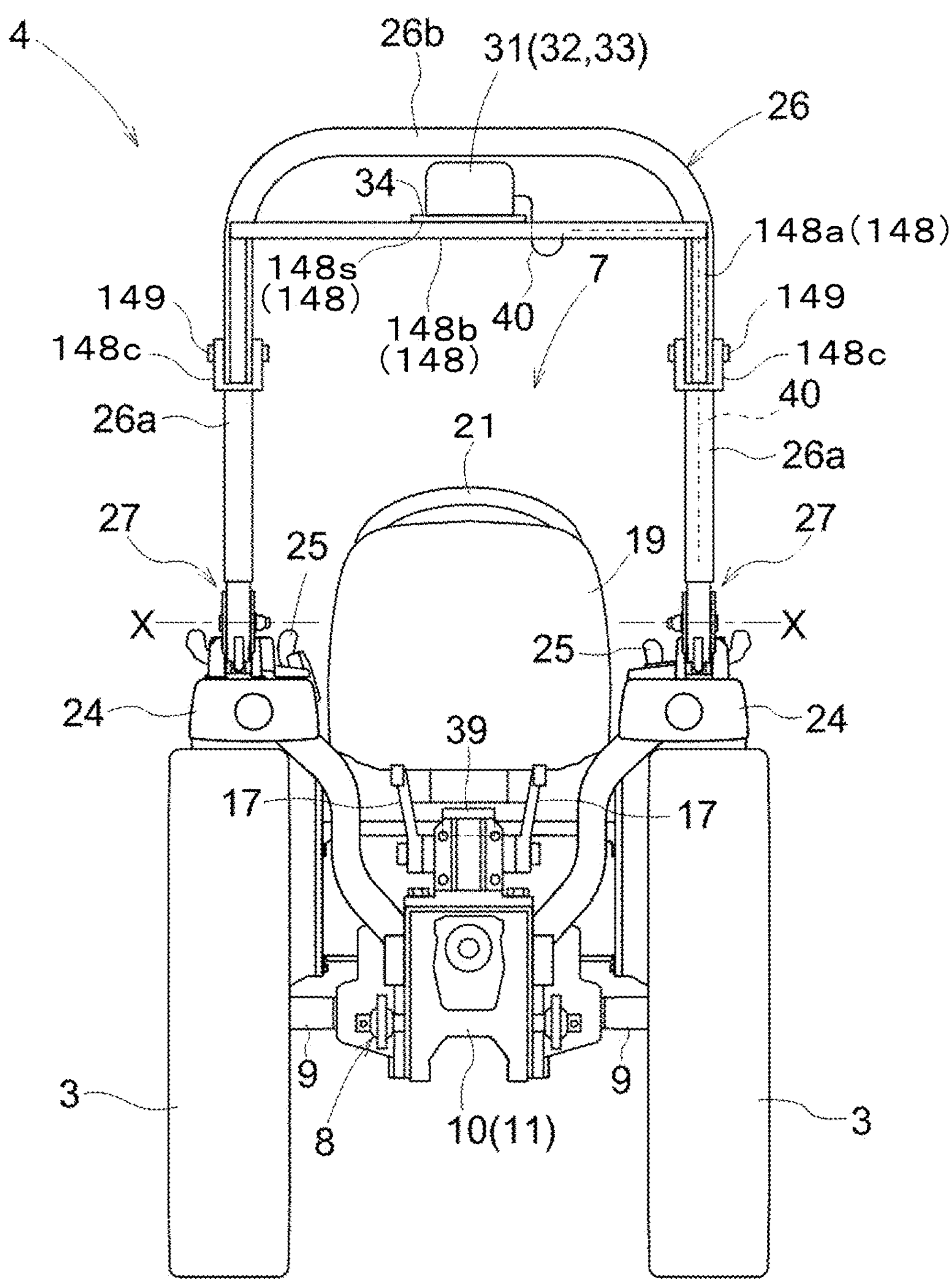
FIG. 68 is a back view of the tractor according to the other preferred embodiment h of the present invention.

Another Preferred Embodiment h (h-1) As shown in FIG. 67 and FIG. 68, the ROPS 26 for roll protection extending upward so as to surround the upper rear side of the driver seat 19 is provided, and the positioning unit 31 is supported on the stand 148*s* of a jig 148 provided on the ROPS 26 is attached with the attachment bracket 34. The ROPS 26 has left and right vertical frame portions 26*a* extending in the vertical direction by bending a hollow square pipe material, and has a lateral frame portion 26*b* connecting the upper ends of the lateral frame portions 26*a* and extending in the horizontal direction. The positioning unit 31 includes an antenna unit 32 for satellite navigation, and includes a satellite navigation device 33 that measures the position and azimuth of the traveling vehicle body 4.

As shown in FIG. 68, the jig 148 includes a left and right support member 148*a* made of a hollow square pipe material, a connecting member 148*b* made of a hollow square pipe material connecting the upper ends of these members, and a left and right support member 148*a*. And, an attachment bracket 148*s* is provided on the upper surface of the connecting member 148*b*.

The left and right fastening brackets 148*c* have a shape capable of contacting the rear surface and the left and right side surfaces of the vertical frame portion 26*a* of the ROPS 26, and the left and right fastening brackets 148*c* have attachment holes (not shown in the drawings) penetrating in the lateral direction. Correspondingly, fastening holes (not shown in the drawings) penetrating in the lateral direction are formed in the left and right vertical frame portions 26*a* of the ROPS 26.

With this configuration, in the preferred embodiment (h-1), the fastening bracket 148*c* is arranged at a position where the left and right vertical frame portions 26*a* of the ROPS 26 are held, and the holding bolt is provided across the attachment hole and the fastening hole. The jig 148 is fixed to the ROPS 26 by inserting the holding bolt 149 into a holding nut or the like.

The wiring 40 connected to the positioning unit 31 passes through the internal space of the connecting member 148*b*, the internal space of the support member 148*a*, and the internal space of the vertical frame portion 26*a* of the ROPS 26. The positioning information is transmitted to the controller 30 through the wiring 40.

In this fixing state, the left and right support members 148*a* take a posture obliquely extending upward and rearward in a side view, the connection member 148*b* connected to the upper ends of the left and right support members 148*a* takes a horizontal posture, and the attachment base 148*s* also takes the horizontal posture. As a result, the positioning unit 31 is supported in the horizontal posture at a position spaced apart rearward from the ROPS 26 and higher than any of the rear wheel fender 24 and the backrest of the driver seat 19.

In addition, since the ROPS 26 have high rigidity, the vibration of the positioning unit 31 can be suppressed to reduce the measurement error. In addition, since the positioning unit 31 is arranged at a position spaced from the ROPS 26, the positioning can be performed without being obstructed by the ROPS 26.

In the preferred embodiment (h-1), the jig 148 may be arranged so as to extend forward and upward from the ROPS 26 as shown by the chain double-dashed line in FIG. 67.

Figure 69:
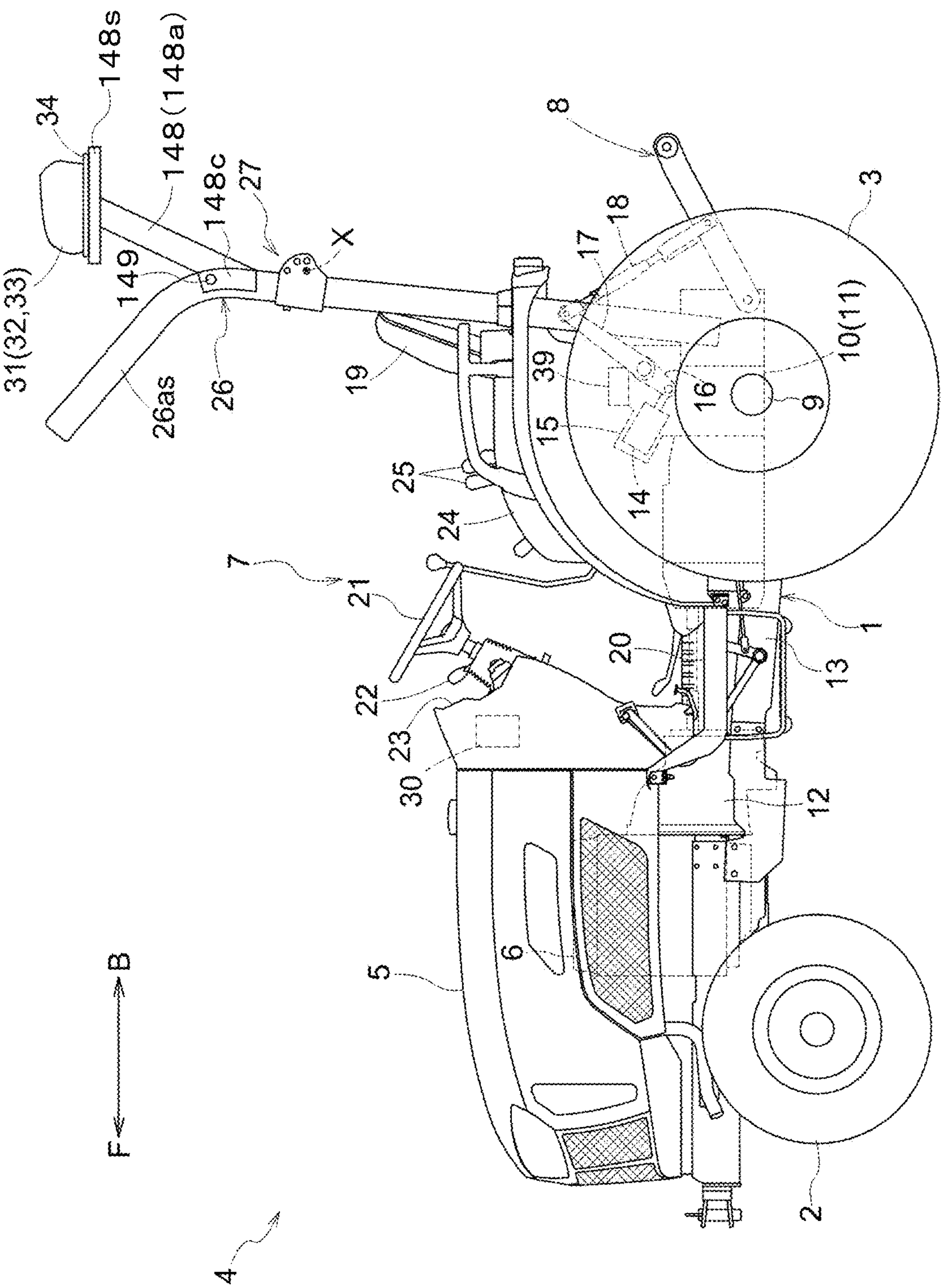
FIG. 69 is a side view of the tractor according to the other preferred embodiment h of the present invention.

(h-2) As shown in FIG. 69, the vertical frame portion 26*a* is provided with an inclined portion 26*as* that is inclined upward toward the upper end of the vertical frame portion 26*a* toward the upper end side. A jig 148 may be provided above the folding portion 27.

The preferred embodiment (h-2) is assumed to have the same configuration as that of the preferred embodiment (h-1) described above, and the supporting member 148*a* is set in an inclined posture in which the upper end is displaced rearward. In this manner, the positioning unit 31 mounted on the attachment base 148*s* is separated from the upper end of the inclined portion 26*as*, and as a result, it is possible to prevent the inconvenience that the receiving of the positioning information is interfered by the ROPS 26.

In any of the preferred embodiments (h-1) and (h-2), for example, the positioning unit 31 is supported at a predetermined position of the jig 148 with the attachment bracket 34 without using the attachment base 148*s*. In addition, the jig 148 may be fixed to the ROPS 26 with a holding bolt 149, and an arbitrary configuration may be used.

Figure 70:
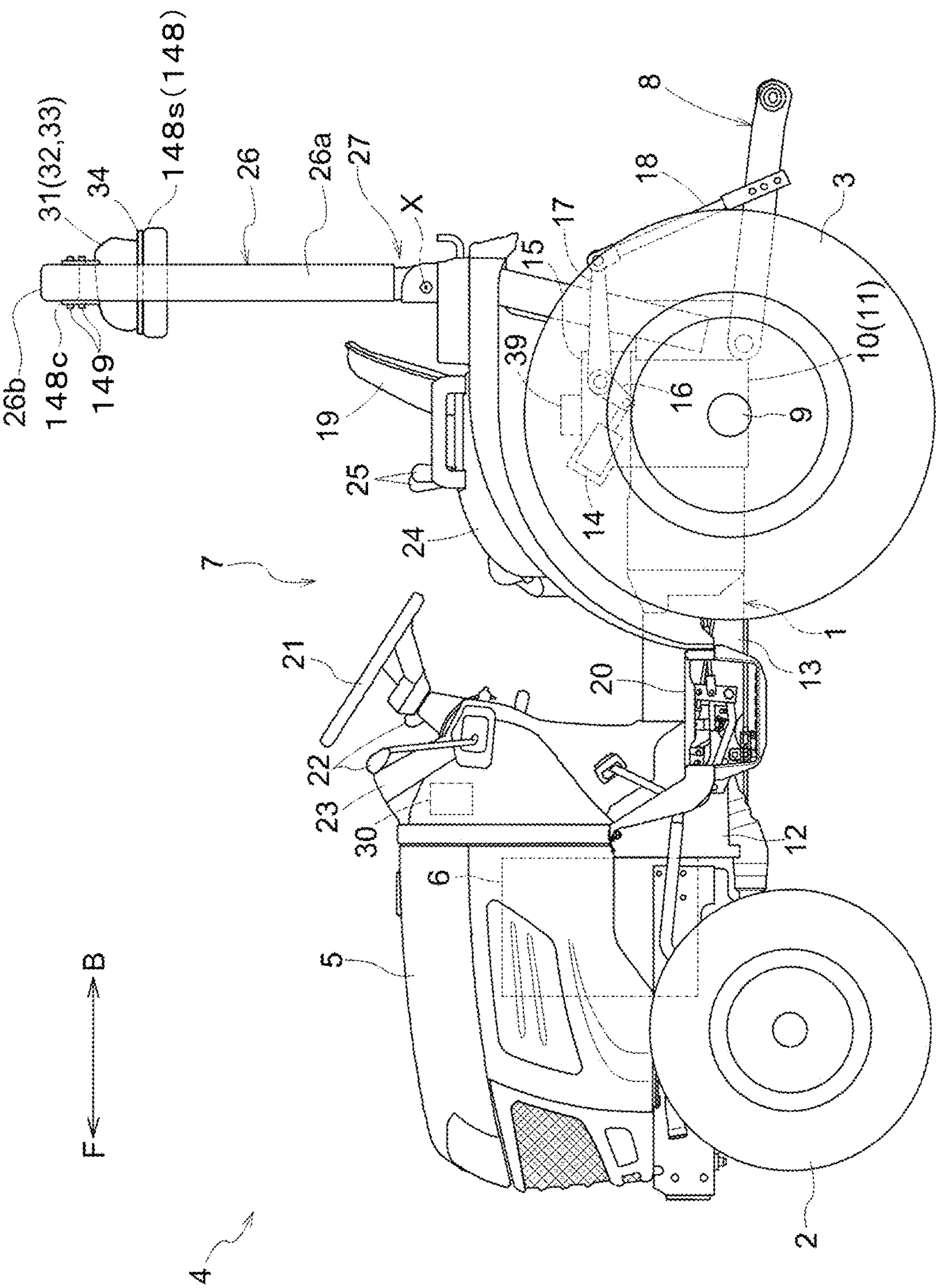
FIG. 70 is a side view of a tractor according to another preferred embodiment i of the present invention.
Figure 71:
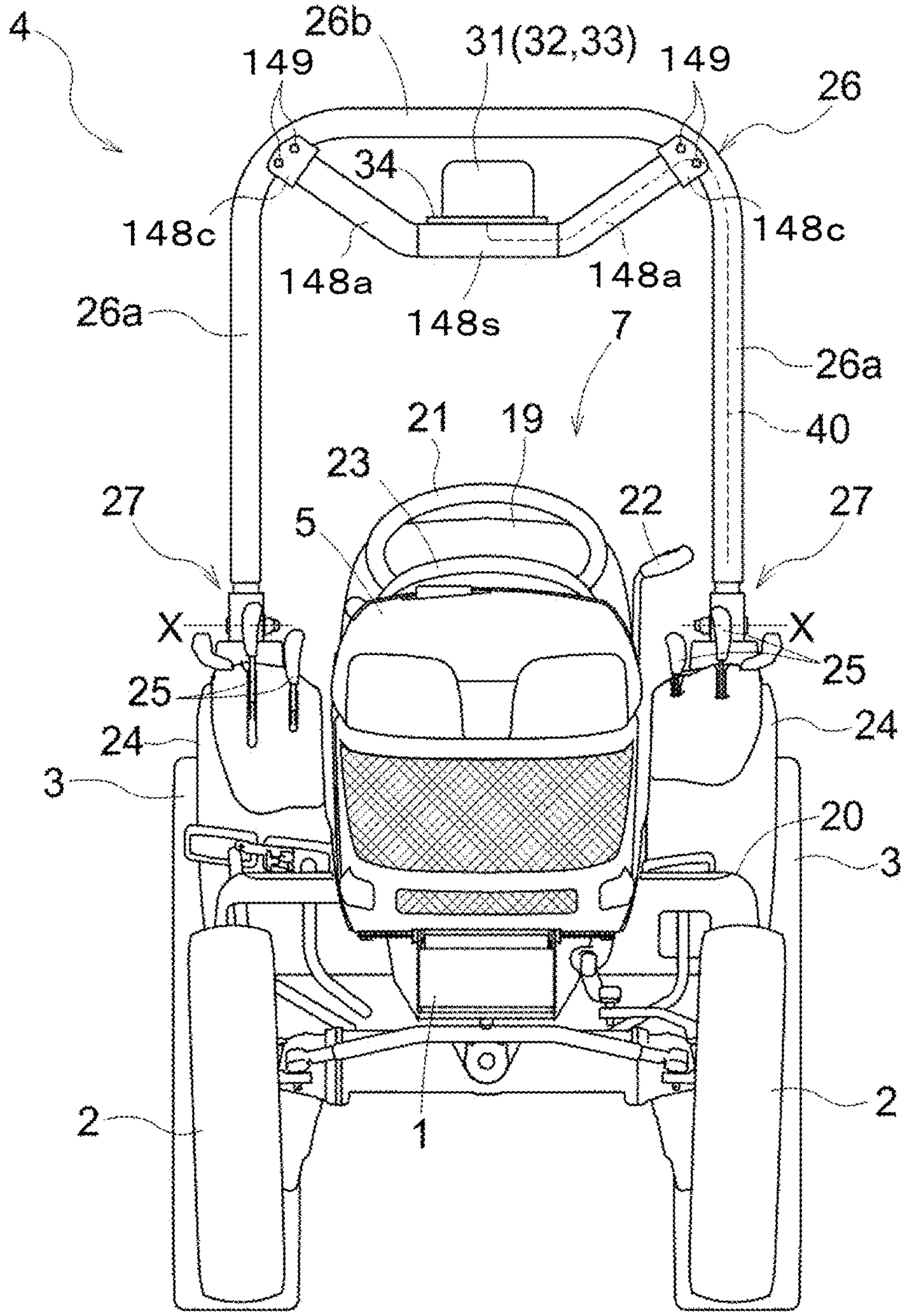
FIG. 71 is a font view of the tractor according to the other preferred embodiment i of the present invention.

Another Preferred Embodiment i (i-1) As shown in FIG. 70 and FIG. 71, the ROPS 26 for roll protection extending obliquely upward so as to surround the upper rear side of the driver seat 19 is provided, and the positioning unit 31 is supported on the attachment base 148*s* of the jig 148 having the ROPS 26 with the attachment bracket 34. The ROPS 26 has left and right vertical frame portions 26*a* extending in the vertical direction by bending a hollow square pipe material, and a lateral frame portion 26*b* connecting the upper ends of the left and right vertical frame portions 26*a* and extending in the horizontal direction.

The positioning unit 31 has the antenna unit 32 for satellite navigation and the satellite navigation device 33 that measures the position and azimuth of the traveling vehicle body 4.

The jig 148 includes left and right support members 148*a* taking a posture in which the outer end side is directed obliquely upward, an attachment base 148*s* located at the central position, and fastening brackets 148*c* formed at both ends of the left and right support members 148*a*. In the jig 148, the outer ends of the left and right support members 148*a* is connected to the ROPS 26 by the holding bolt 149 inserted into the fixed bracket 148*c*, so that the support member 148*a* is held in the horizontal posture. The positioning unit 31 is supported with the attachment bracket 34 with respect to the support member 148*a*. Under the configuration, the position where the fixed bracket 148*c* is connected to the vertical frame portion 26*a* is set to a position higher than the folding portion 27.

In the configuration of the preferred embodiment (i-1), the treatment portion 28 includes a support member 148*a* formed so as to extend toward the internal space of the ROPS 26. Thus, the positioning unit 31 is arranged in a space surrounded by the left and right vertical frame portions 26*a* and the upper lateral frame portion 26*b* in a front view, and partially overlaps with the vertical frame portion 26*a* in a side view. In particular, in that arrangement, the positioning unit 31 is arranged at a position higher than the upper end of the backrest of the driver seat 19.

In addition, as shown in FIG. 71, the supporting member 148*a* and the attachment base 148*s* are formed to have a hollow shape, and the wiring 40 connected to the positioning unit 31 transmits the positioning information under the state where the wiring 40 passes through an internal space of the attachment base 148*s*, an internal space of the supporting member 148*a*, and through the internal space of the vertical frame portion 26*a* of the ROPS 26.

With such a configuration, for example, it is possible to prevent the inconvenience that a branch of a tree or the like comes into contact with the positioning unit 31 during the traveling. In addition, since the ROPS 26 has high rigidity, vibration of the antenna unit can be suppressed, and measurement error can be reduced, and since the positioning unit 31 is arranged above the upper end of the backrest of the driver seat 19, thereby suppressing the inconvenience that the driver seat 19 and the operator sitting on the seat obstruct the receiving of positioning information.

Figure 72:
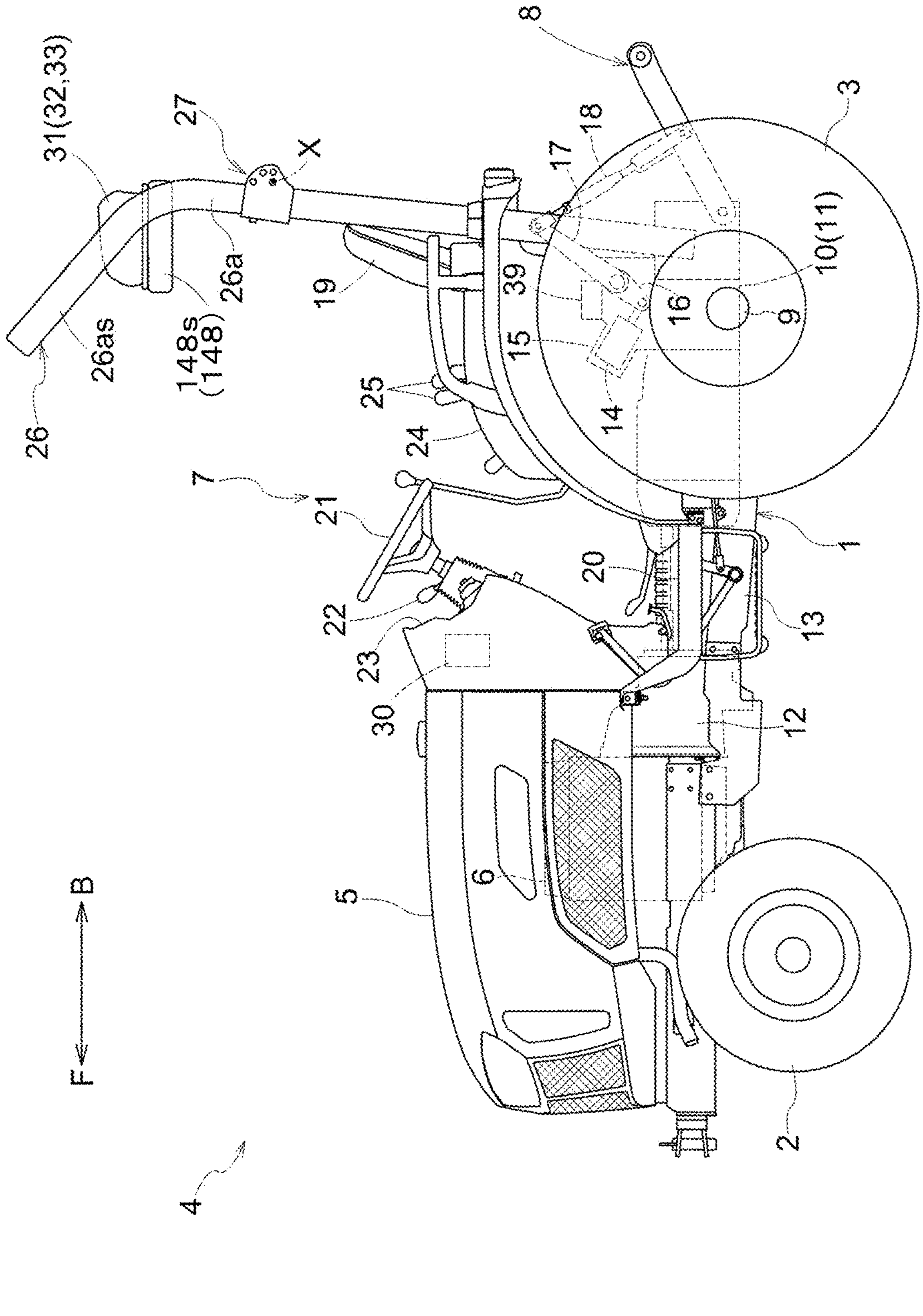
FIG. 72 is a side view of the tractor according to the other preferred embodiment i of the present invention.

(i-2) As shown in FIG. 72, the vertical frame portion 26*a* is provided with an inclined portion 26*as* that is inclined upward toward the upper end of the vertical frame portion 26*a* toward the upper end side. The jig 148 is provided above the folding portion 27.

In the preferred embodiment (i-2), it is assumed that the jigs 148 are supported by the left and right vertical frame portions 26*a* as in the above-described preferred embodiment (h-1). Since the inclined portion 26*as* is inclined forward as it extends upward, the positioning unit 31 mounted on the attachment base 148*s* is separated from the upper end of the inclined portion 26*as*, and As a result, it is possible to suppress the inconvenience that the receiving of the positioning information is interfered by the ROPS 26.

In any of the preferred embodiments (i-1) and (i-2), for example, the positioning unit 31 may be directly supported by the attachment base 148*s*. In addition, the jig 148 may be fixed to the ROPS 26 with the holding bolt 149, and an arbitrary configuration may be used.

Another Preferred Embodiment j

Figure 73:
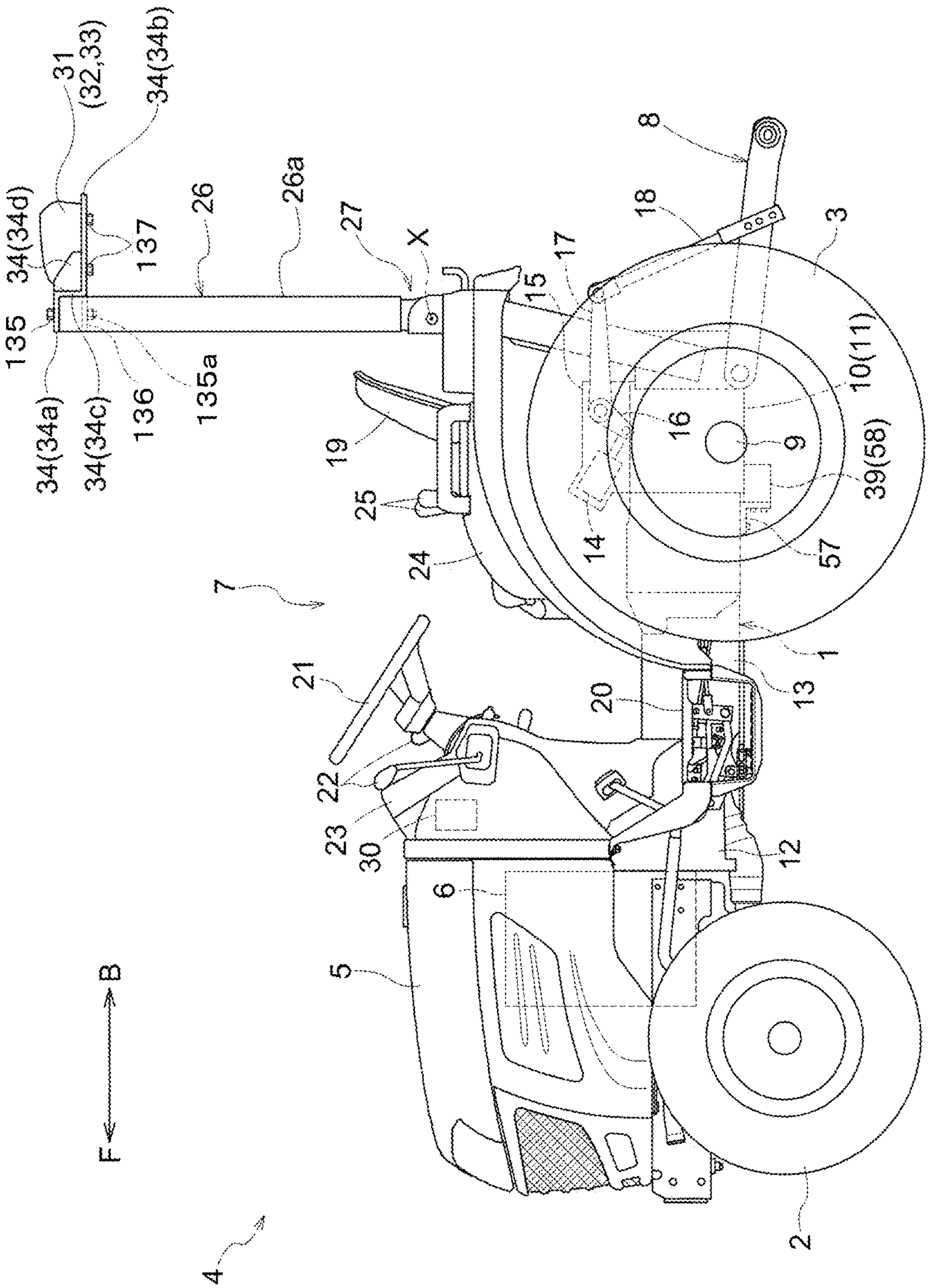
FIG. 73 is a side view of a tractor according to another preferred embodiment j of the present invention.

[j-1] As shown in FIG. 73, the inertia measurement unit is fixed to the lower surface of the vehicle body frame 1 defining and functioning as a rigid member with the fastening bracket 57. In this configuration, the inertia measurement unit 39 is arranged at a position overlapping with the lower side of the vehicle body frame 1 in plan view. In addition, the inertia measurement unit 39 is housed in the mud guard case 58, and by housing the inertia measurement unit 39 in the mud guard case 58 in this manner, thereby not only eliminating the problem of mud and water adhering but also contacting with a protrusion on the ground.

Also in the preferred embodiment (j-1), the inertia measurement unit 39 is arranged at a position adjacent to the rigid portion of the vehicle body frame 1, and the inertia measurement unit 39 is arranged at a middle position between the left and right rear wheel fenders 24 in a front view and at a position overlapping with the rear wheel 3 in a side view. In addition, since arranged in the lower region of the vehicle body frame 1, the attachment becomes easy, and it is not necessary to change the design of the traveling vehicle body 4 for including the inertia measurement unit 39.

Figure 74:
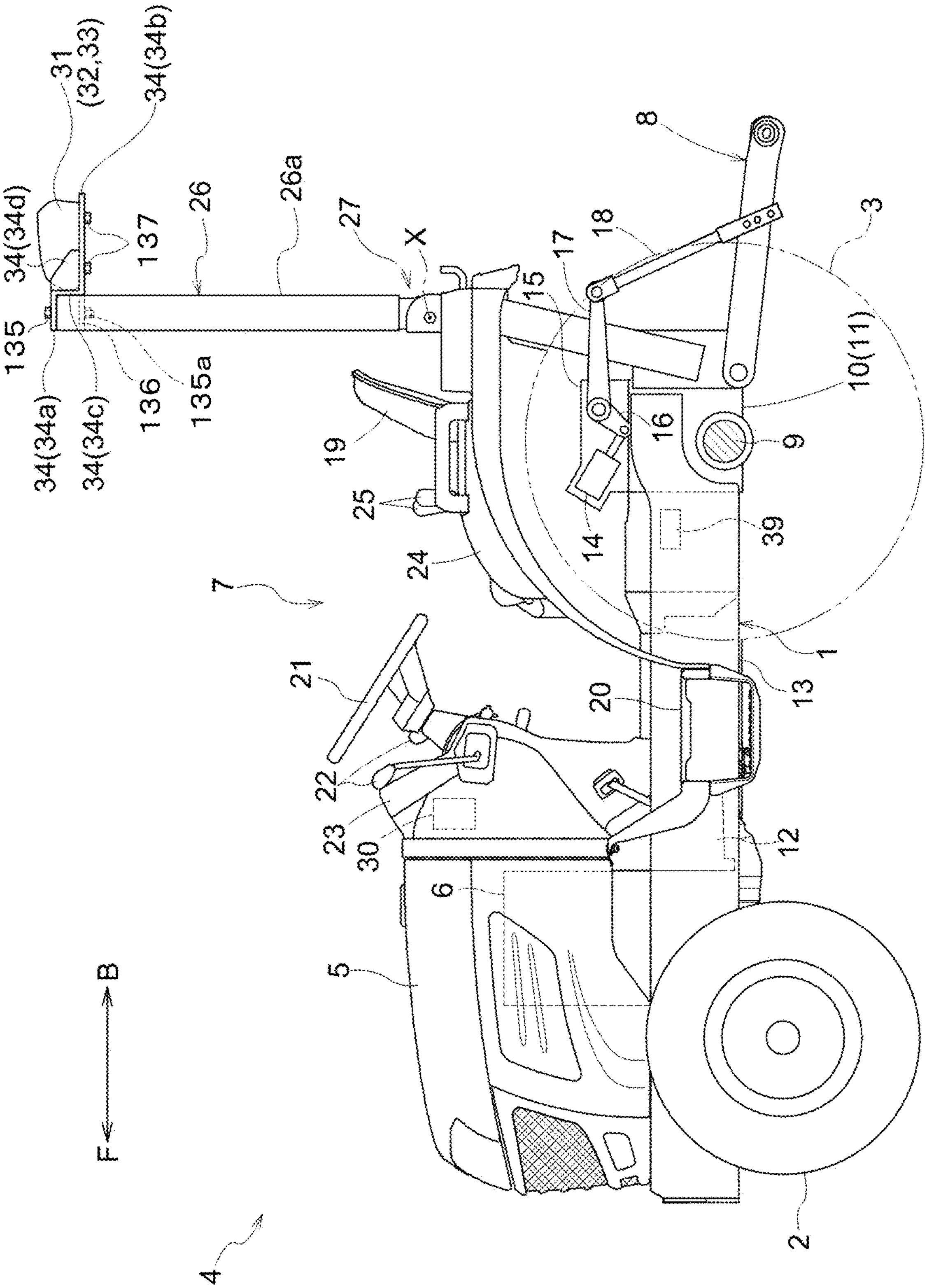
FIG. 74 is a side view of the tractor according to the other preferred embodiment j of the present invention.
Figure 75:
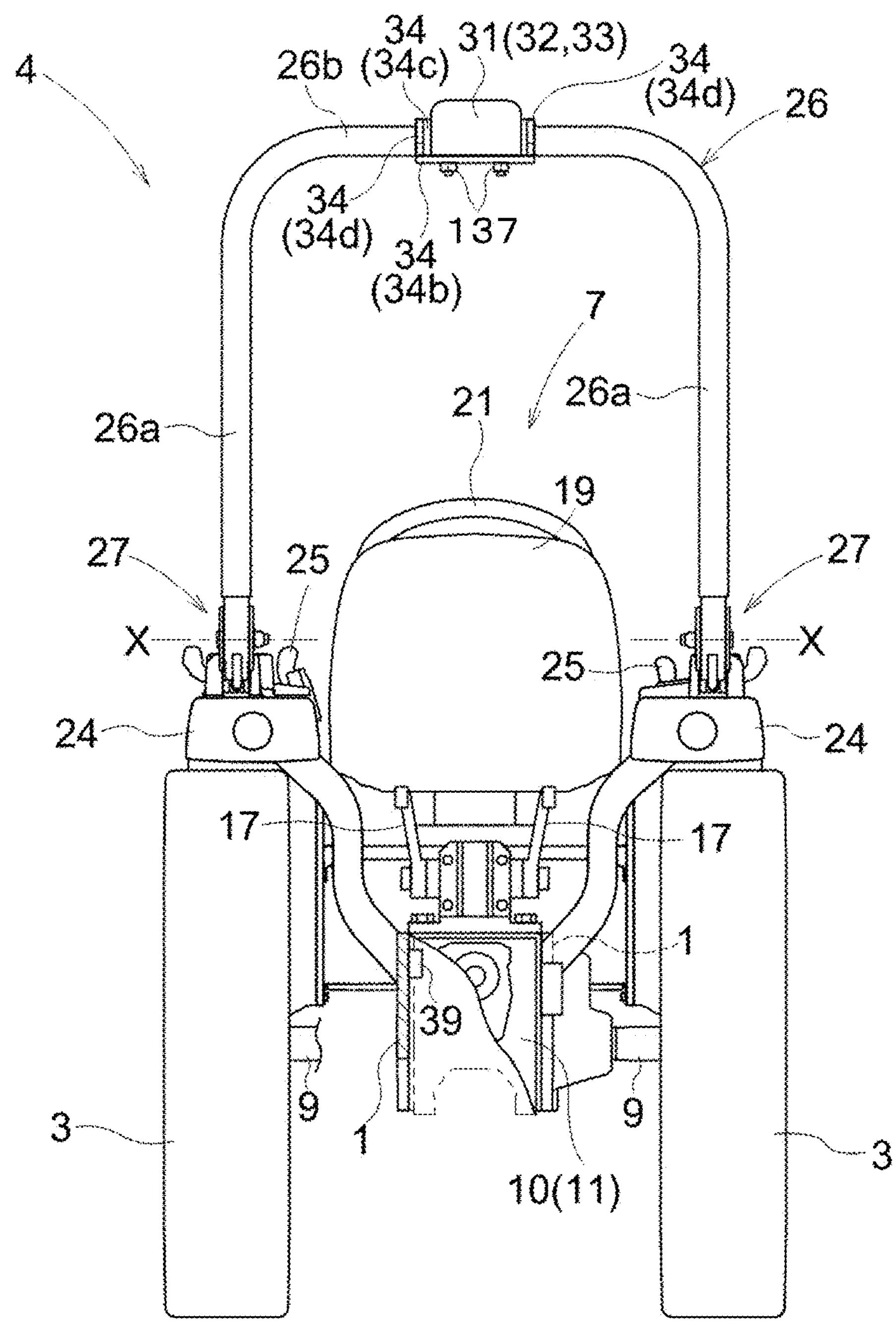
FIG. 75 is a back view of the tractor according to the other preferred embodiment j of the present invention.

(j-2) As shown in FIG. 74 and FIG. 75, by providing the left and right vehicle body frames 1 in a space stretching from the front position of the traveling vehicle body 4 to the transmission case 10 at the rear portion of the vehicle body, the left and right vehicle body frames 1 define rigid member. In the tractor thus configured, the engine 6, the clutch housing 12 and the like are supported by the left and right body frames 1, and the transmission case 10 is connected to the rear ends of the left and right body frames 1.

The left and right vehicle body frames 1 are assumed to be formed of a plate-shaped steel material, and the inertia measurement unit 39 is arranged in an intermediate space between the left and right vehicle body frames 1. In the configuration, the inertia measurement unit 39 is arranged at a position adjacent to the rigid structure defined by the vehicle body frame 1, and the inertia measurement unit 39 is located at a middle position between the left and right rear wheel fenders 24 in a front view, and at a position overlapping with the rear wheel 3 in a side view.

(j-3) The transmission case 10 arranged in the space extending from the rear end of the clutch housing 12 to the rear end of the traveling vehicle body 4 can also be regarded as a rigid member. Then, the inertia measurement unit 39 may be provided at a position adjacent to the transmission case 10. When the vehicle body frame 1 includes a pair of left and right members, the inertia measurement unit 39 may be provided on either the left or right vehicle body frame 1 at a middle position between the left and right vehicle body frames 1.

Figure 76:
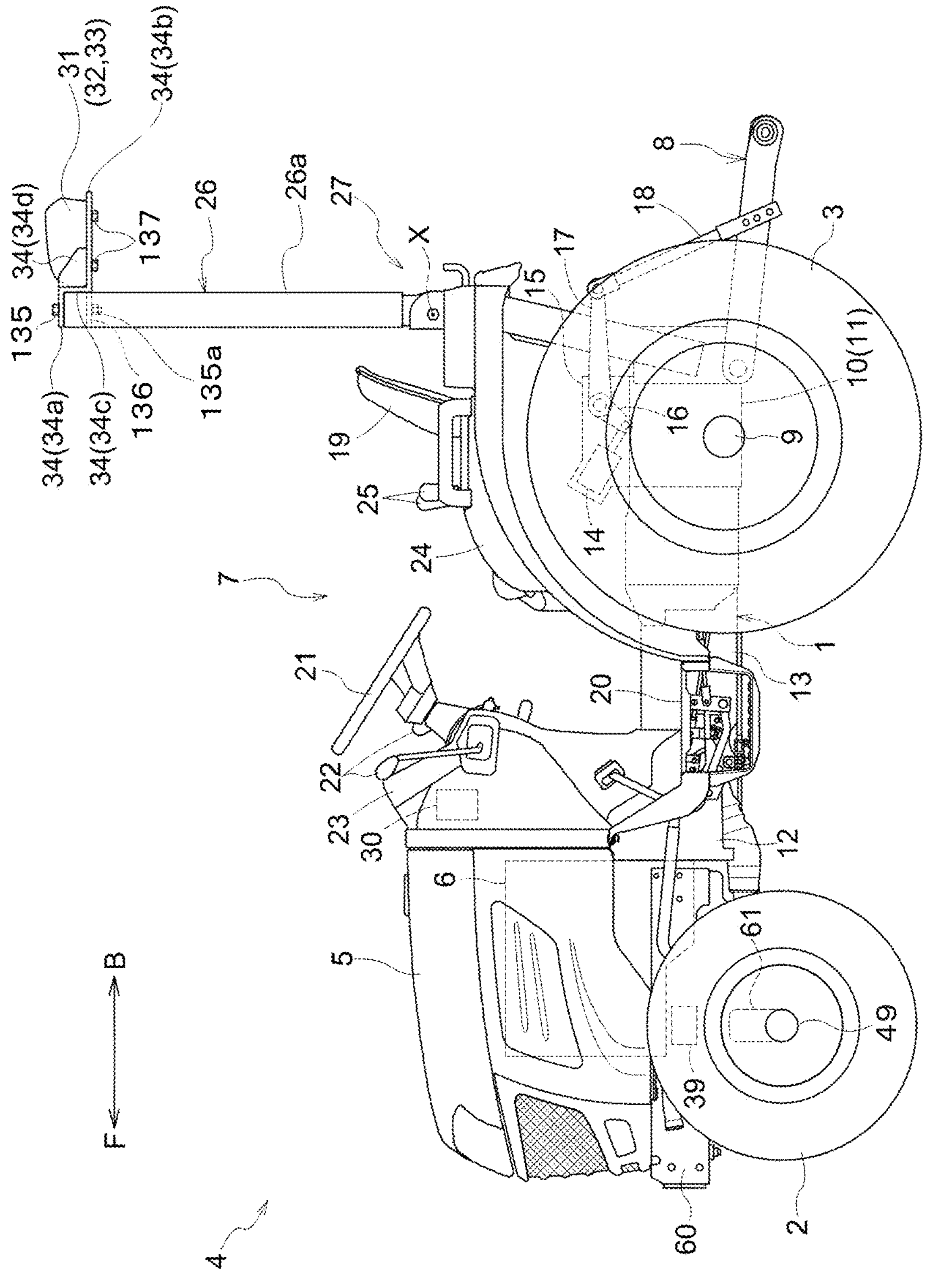
FIG. 76 is a side view of a tractor according to another preferred embodiment k of the present invention.
Figure 77:
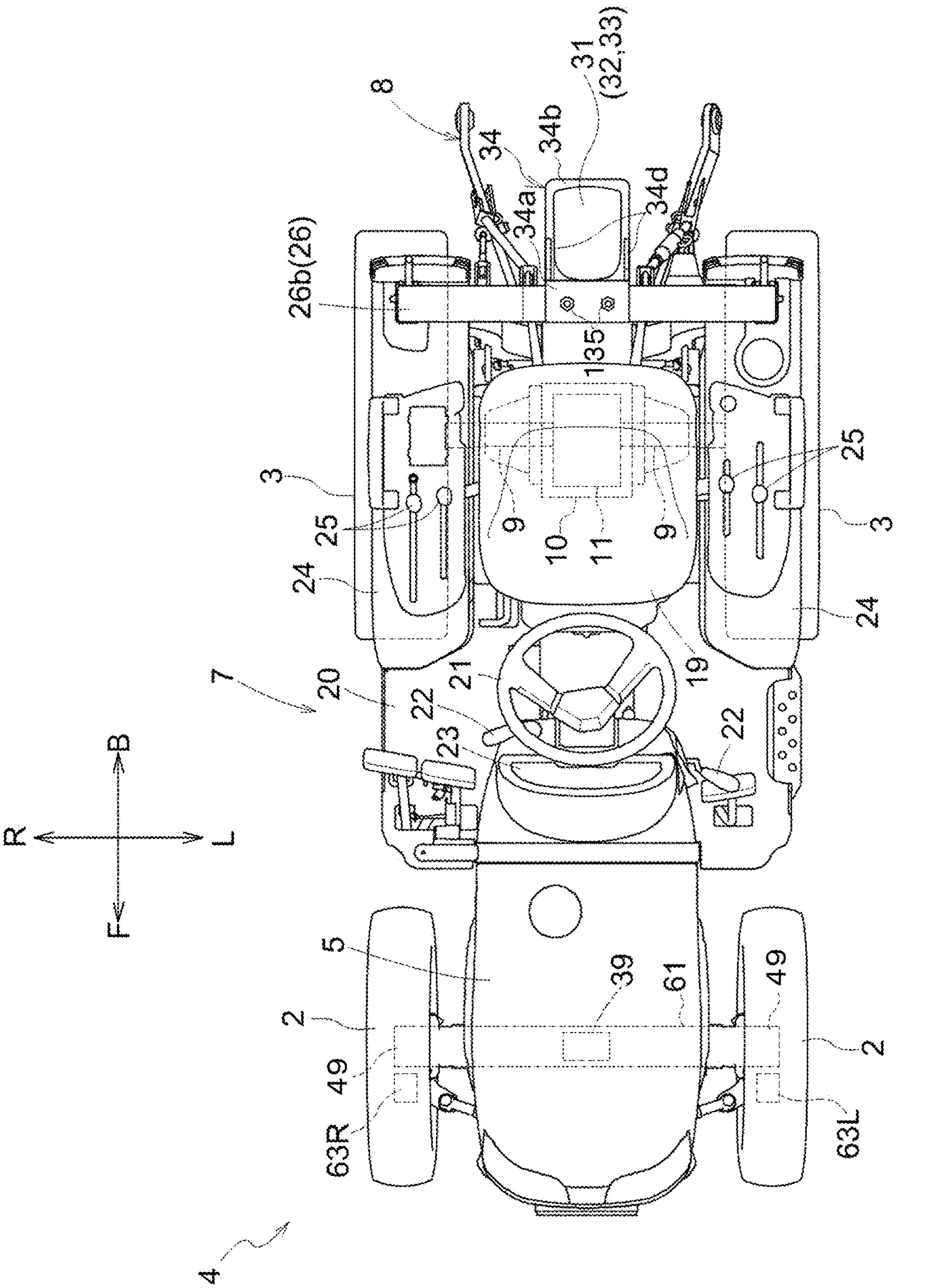
FIG. 77 is a plan view of the tractor according to the other preferred embodiment k of the present invention.
Figure 78:
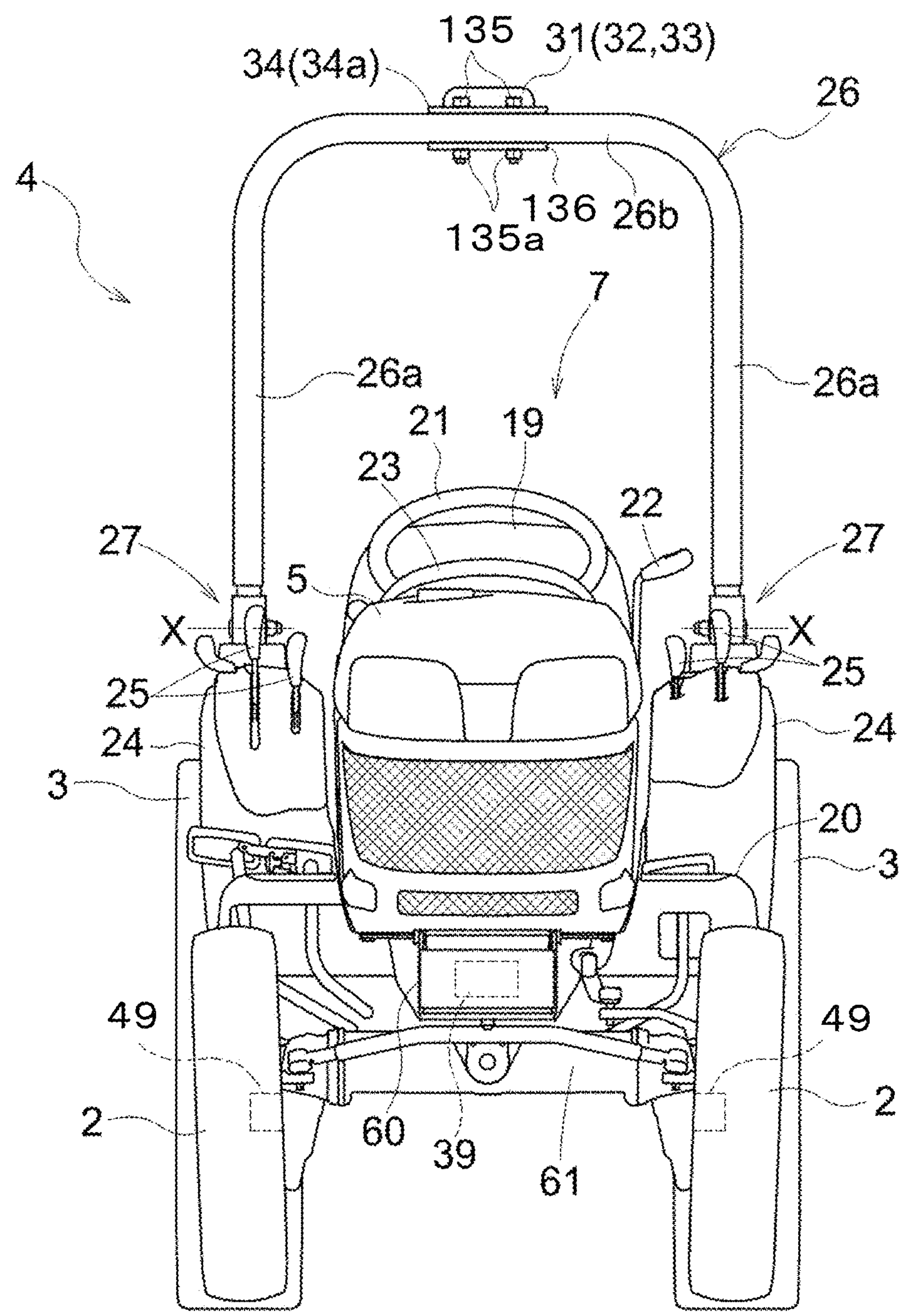
FIG. 78 is a front view of the tractor according to the other preferred embodiment k of the present invention.

Another Preferred Embodiment k (k-1) As shown in FIG. 76 to FIG. 78, a pair of left and right front frames 60 extending forward from the vehicle body frame 1 are provided at the front position of the vehicle body frame 1. The engine 6 is supported by the front frame 60, and the bonnet 5 is arranged at a position to cover the engine 6. In addition, a front axle case 61 is supported by the front frame 60, front axles 49 are provided at both left and right ends of the front axle case 61, and the front wheels 2 are driven by the front axle 49.

In the tractor, the ROPS 26 are provided at the rear position of the driver seat 19. The ROPS 26 include a pair of left and right vertical frame portions 26*a* and a lateral frame portion 26*b* connecting the upper ends thereof and extending in the horizontal direction. The positioning unit 31 including the antenna unit 32 is provided in the lateral frame portion 26*b*.

In such a configuration, the inertia measurement unit 39 configured to measure the inertia information of the traveling vehicle body 4 is arranged at a position overlapping with the bonnet 5 in a plan view. More particularly, it overlaps with the engine 6 in a plan view and overlaps with the front axle case 61 in a plan view. Then, the inertia measurement unit 39 is arranged in the middle space between the left and right front frames 60.

In addition, the inertia measurement unit 39 is arranged above the center of the axle of the front wheel 2, and is arranged at a position overlapping with the front wheel 2 in a side view.

As described above, by arranging the inertia measurement unit 39 at a position close to the center of the front axle 49 in this manner, the displacement extent of the inertia measurement unit 39 is small even when the traveling vehicle body 4 is pitched around the front axle 49 of the front wheel 2, and thus accurate measurement result is provided. In addition, since the inertia measurement unit 39 is arranged at the central delay angle in the left-right direction of the traveling vehicle body 4, even when the traveling vehicle body 4 rolls, the displacement extent of the inertia measurement unit 39 is reduced to obtain a more accurate measurement value.

(k-2) As shown in FIG. 77, this tractor includes a right braking mechanism 63R that applies a braking force to the right front wheel 2, and includes a left braking mechanism 63L that applies a braking force to the left front wheel 2. A accelerator device is provided to drive the peripheral speed of the front wheels 2 on the outside of the turning at a speed which is approximately twice the peripheral speed of the left and right rear wheels 3 when the traveling vehicle body 4 turns.

With this configuration, in the case where the traveling vehicle body 4 is turned with a small radius, the braking force is applied to the front wheel 2 on the inside of the turn of the right braking mechanism 63R and the left braking mechanism 63L, or the front wheels 2 of the outside of the turn is accelerated by the accelerator device, thereby enabling the turning with a small radius.

Figure 79:
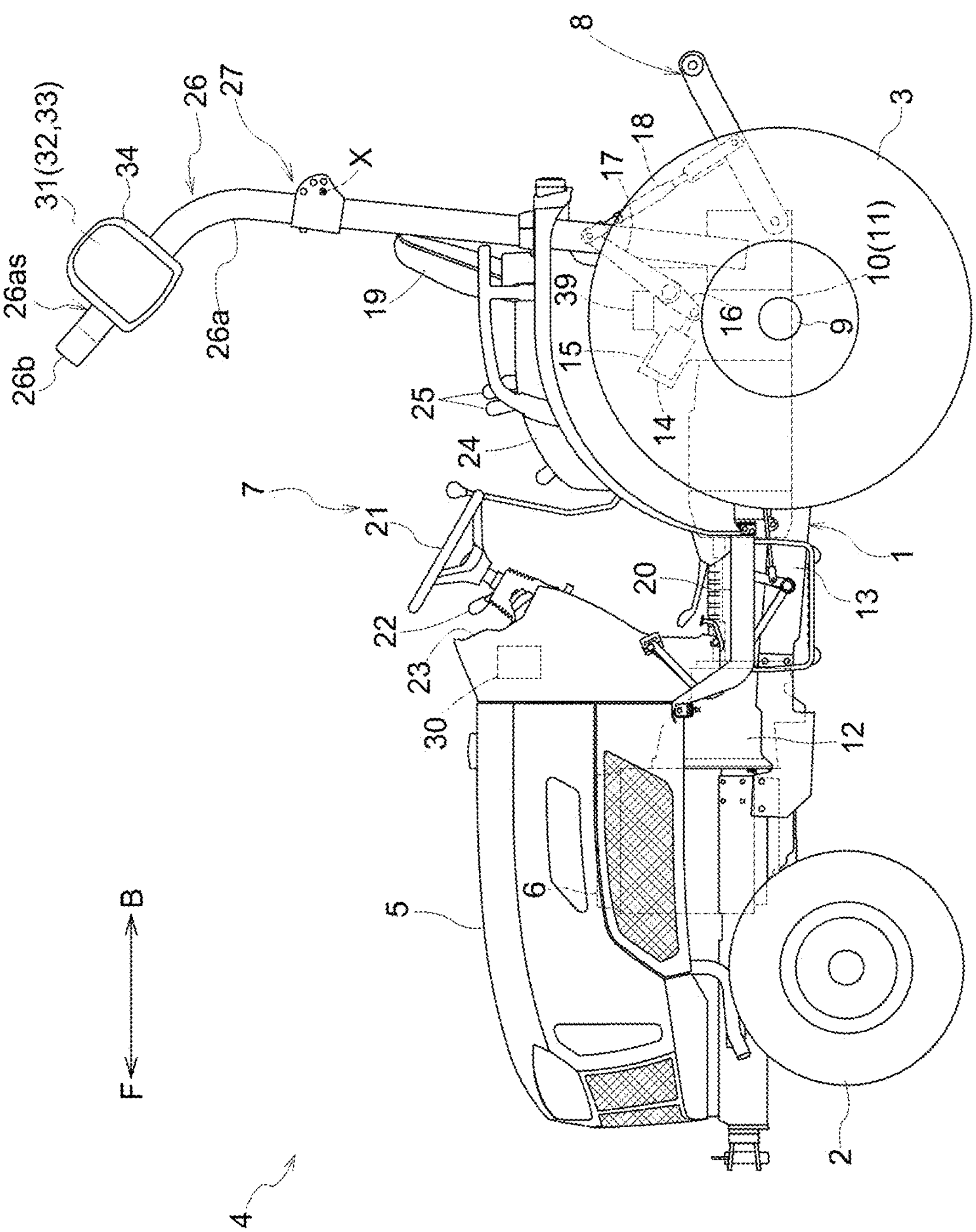
FIG. 79 is a side view of a tractor according to another preferred embodiment L of the present invention.

Another Preferred Embodiment L (L-1) As shown in FIG. 79 to FIG. 1, the folding portion 27 is provided at a middle portion in the vertical direction of the left and right vertical frame portions 26*a* so that the upper side of the folding portion 27 is oscillated laterally. The ROPS 26 are configured to be foldable around the fulcrum X. In addition, the left and right vertical frame portions 26*a* are provided with the inclined portion 26*as* on the upper side of the folding portion 27 and inclined toward the front side as it extends toward the upper end side.

In the preferred embodiment (L-1), in either one of the left and right vertical frame portions 26*a* of the ROPS 26, the attachment bracket 34 defining and functioning as a support member is attached to the outer side surface of the inclined portion 26*as* at a position higher than the top of the backrest portion of the driver seat 19 and above the folding portion 27, and the positioning unit 31 is provided to the attachment bracket 34.

With this configuration, the satellite position information transmitted from GPS satellites and the like can be well received without being obstructed by a part of the bonnet 5 or the traveling vehicle body 4 or being affected by obstacles. In addition, since the ROPS 26 has high rigidity, the positioning unit 31 does not vibrate widely.

Figure 80:
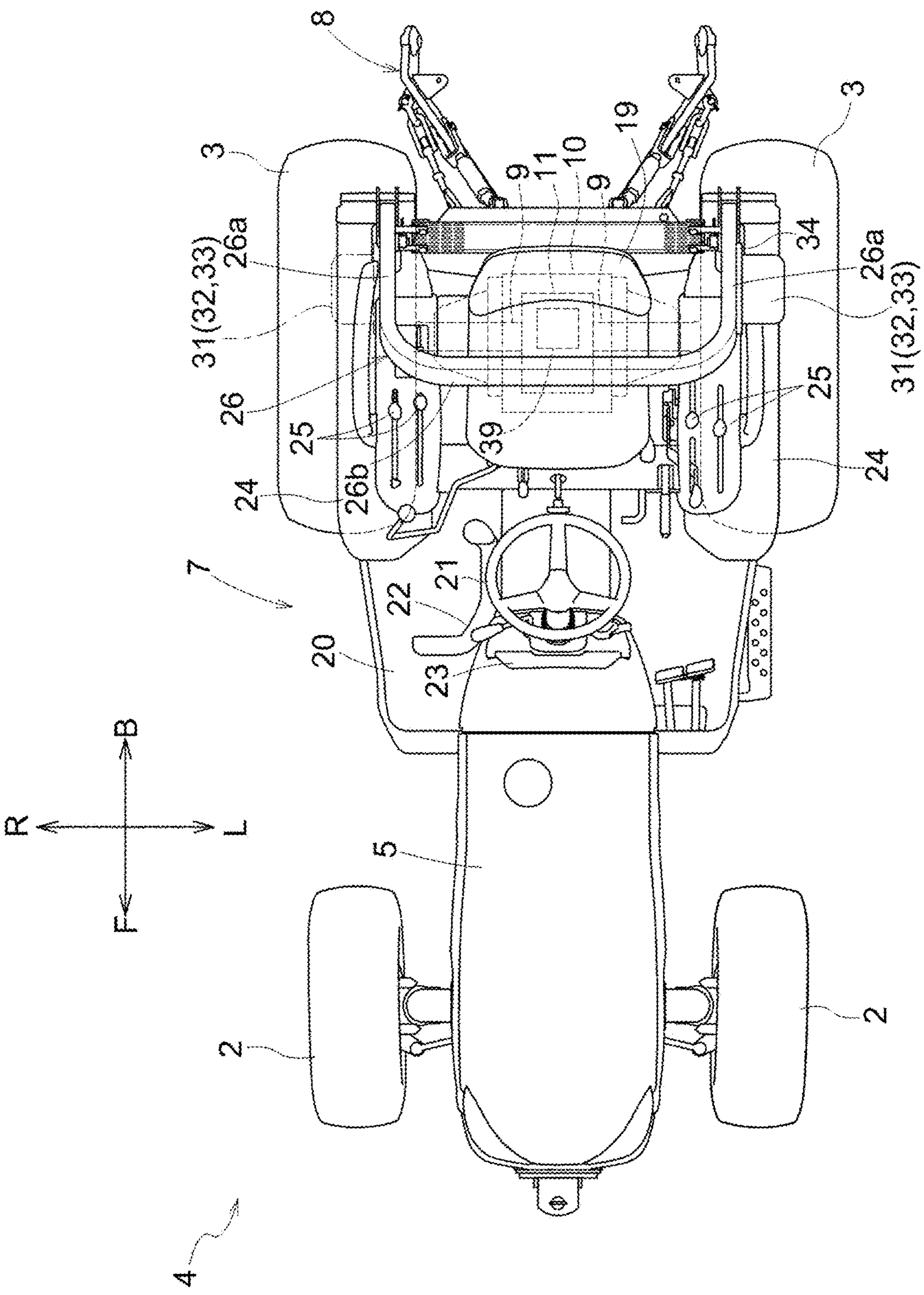
FIG. 80 is a plan view of the tractor according to the other preferred embodiment L of the present invention.
Figure 81:
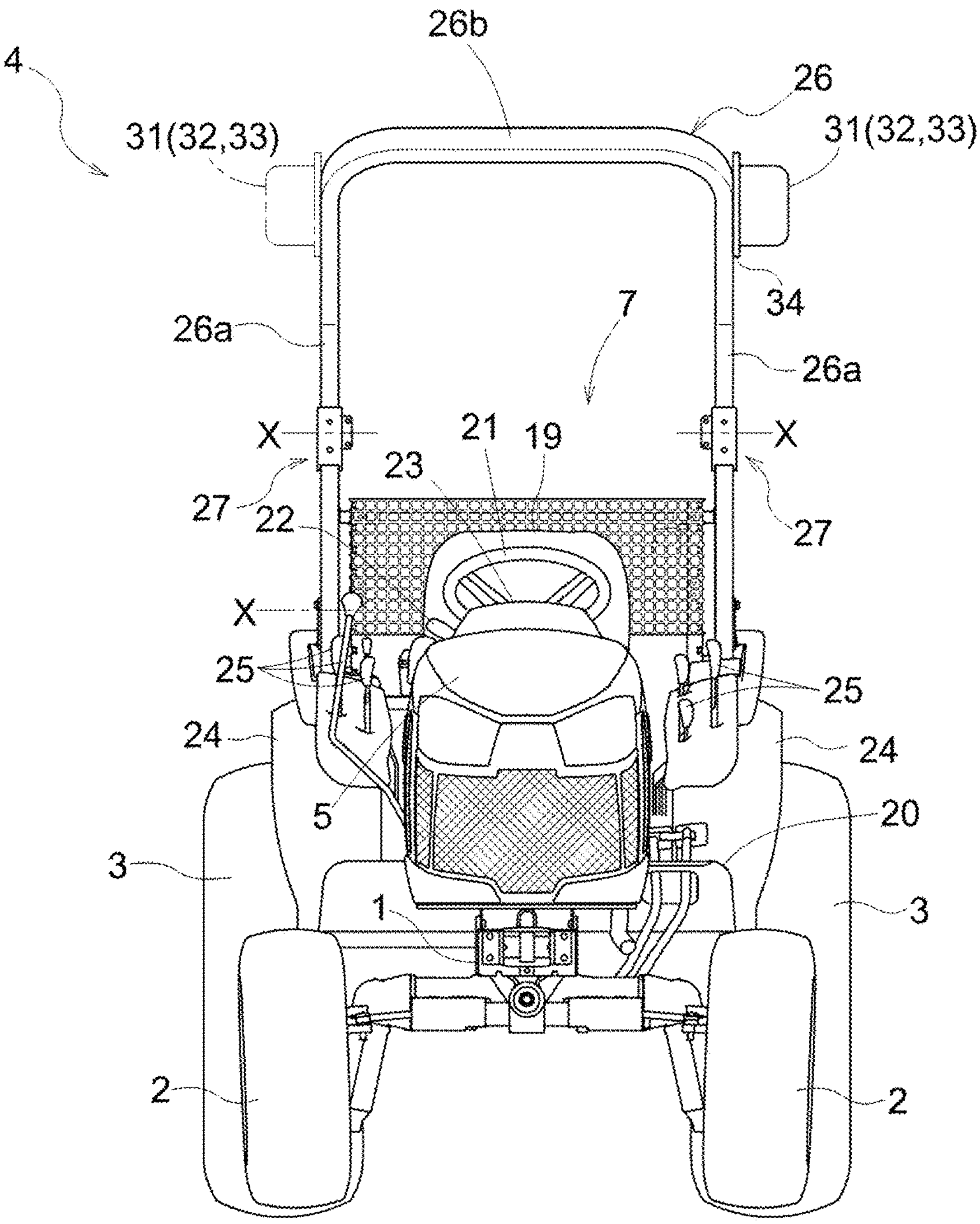
FIG. 81 is a front view of the tractor according to the other preferred embodiment L of the present invention.

(L-2) In FIG. 79 to FIG. 81, the configuration in which the positioning unit 31 is provided on one of the left and right vertical frame portions 26*a* has been described, but instead of this, the attachment brackets are attached to both of the left and right vertical frame portions 26*a*. The positioning unit 31 may be provided with the attachment bracket 34, and the positioning data may be acquired by the two positioning units 31.

3. Third Preferred Embodiment

Next, a third preferred embodiment of the present invention will be described with reference to the drawings.

Figure 109:
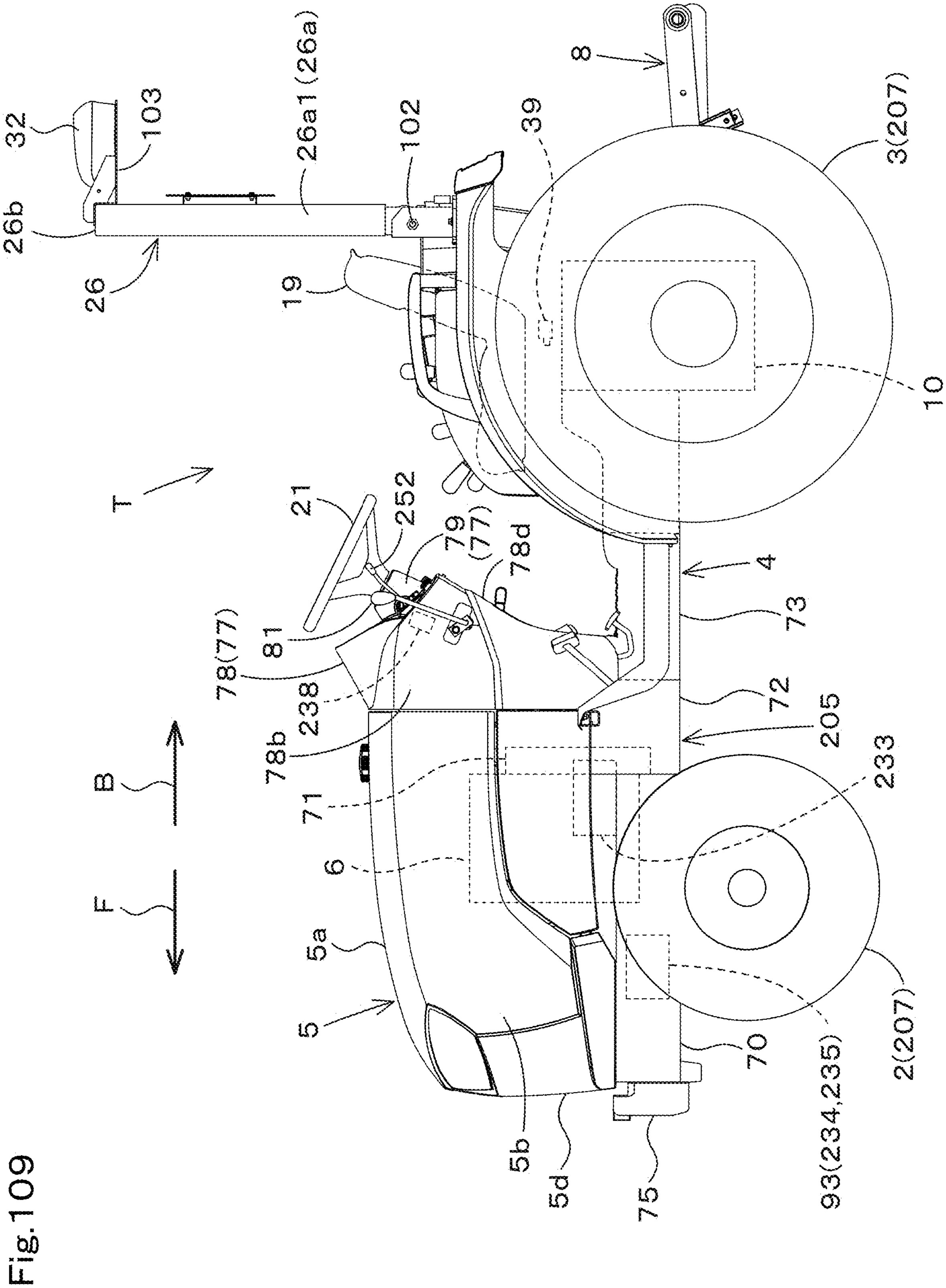
FIG. 109 is a left side view of a working vehicle (a tractor) according to a preferred embodiment of the present invention.
Figure 110:
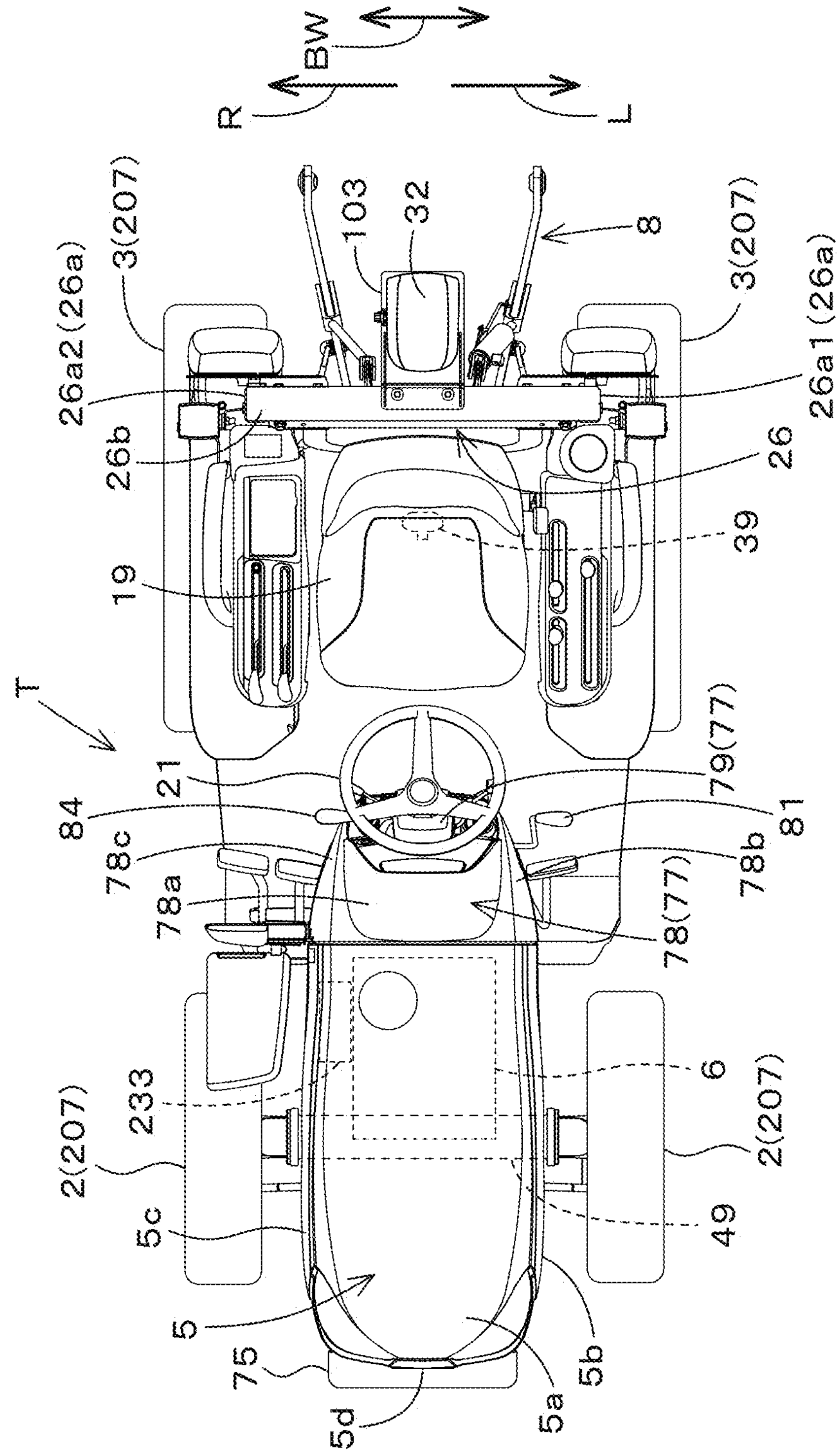
FIG. 110 is a plan view of a working vehicle (a tractor) according to a preferred embodiment of the present invention.

FIG. 109 is a side view showing a preferred embodiment of the working vehicle T according to the third preferred embodiment of the present invention, and FIG. 110 is a plan view showing the preferred embodiment of the working vehicle T. In this preferred embodiment, the working vehicle T is a tractor. However, the working vehicle T is not limited to a tractor, and may be an agricultural machine (an agricultural vehicle) such as a combine or a transplanter, or a construction machine (a construction vehicle) such as a loader working machine.

Hereinafter, the front side of the driver (the operator) sitting on the driver seat 19 of the tractor (working vehicle) 1 (a direction indicated by an arrowed line F in FIG. 109) is referred to as the front, and the rear side of the driver (a direction indicated by an arrowed line B in FIG. 109) is referred to as the rear, the left side of the driver (a direction indicated by an arrowed line L in FIG. 110) is referred to as the left, and the right side of the driver (a direction indicated by an arrowed line R in FIG. 110) is referred to as the right. In addition, a horizontal direction (a direction indicated by an arrowed line BW in FIG. 110), which is a direction orthogonal to the front-rear direction of the tractor T, will be described as a vehicle width direction.

As shown in FIG. 109, the tractor T includes a traveling vehicle body 4, a prime mover 6, and a transmission device 205. The traveling vehicle body 4 includes a traveling device 207 and is configured to travel. The traveling device 207 includes front wheels 2 and rear wheels 3. The front wheel 2 may be a tire type or a crawler type. The rear wheel 3 may also be a tire type or a crawler type.

The prime mover 6 is an engine such as a diesel engine, an electric motor, or the like, and includes a diesel engine in this preferred embodiment. The speed change device 205 is configured to switch the propulsive force of the traveling device 207 by shifting, and is configured to switch the traveling device 207 between forward and reverse. The driver seat 19 is provided on the traveling vehicle body 4.

In addition, at the rear portion of the traveling vehicle body 4, there is provided a connecting part 8 defined by a three-point link mechanism or the like. A working device can be attached to and detached from the connecting portion (link mechanism) 8. By connecting the working device to the connecting portion 8, the working device can be pulled by the traveling vehicle body 4. A working device is a tilling device for cultivating, a fertilizer sprayer for spraying fertilizer, a agrichemicals spraying device for spraying agrichemicals, a harvesting device for the harvesting, a mower for cutting grass or the like, a spreader for spreading the grass or the like, and a bailer for molding the grass or the like.

Figure 82:
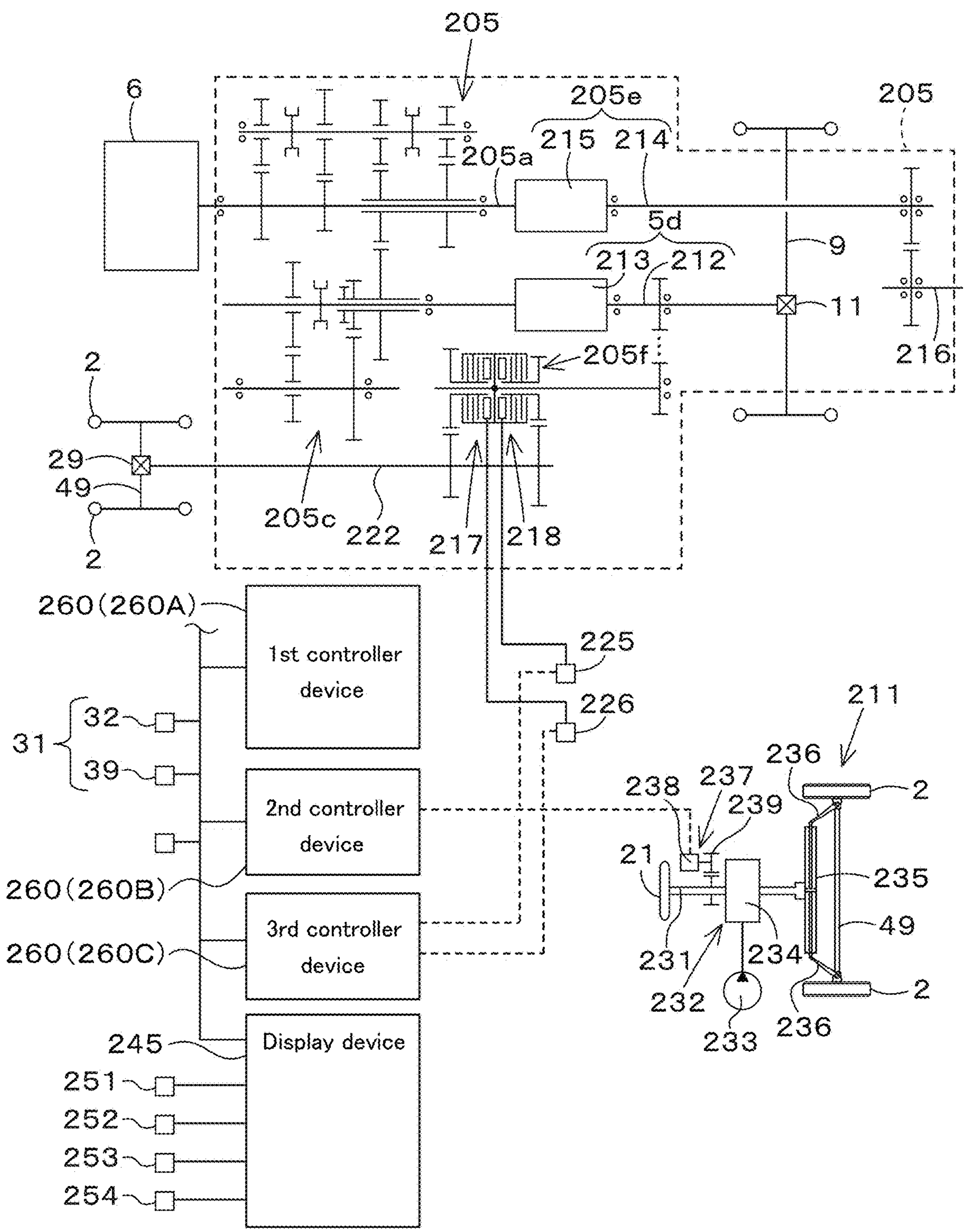
FIG. 82 is a view illustrating a configuration and a control block of a working vehicle (a tractor) according to a preferred embodiment of the present invention.

As shown in FIG. 82, the transmission device 205 includes a main shaft (a propulsion shaft) 205*a*, a main transmission portion 205_b_, an auxiliary transmission portion 205_c_, a shuttle portion 205_d_, a PTO power transmission portion 205_e_, and a front transmission portion 205_f_. The propulsion shaft 205_a_ is rotatably supported by the housing case (mission case) of the transmission device 205, and the power from the crankshaft of the engine (motor) is transmitted to the propulsion shaft 205_a_. The main transmission portion 205_b_ includes a plurality of gears and a shifter that changes the connection of the gears. The main transmission portion 205_b_ changes the rotation inputted from the propulsion shaft 205_a_ and outputs (shifts) by appropriately changing the connection (engagement) between the plurality of gears with a shifter.

The sub-transmission portion 205_c_ includes a plurality of gears and a shifter that changes the connection of the gears, like the main transmission portion 205_b_. The sub-transmission portion 205_c_ changes and outputs (shifts) the rotation inputted from the main transmission portion 205_b_ by appropriately changing the connection (engagement) between a plurality of gears with a shifter.

The shuttle portion 205_d_ includes a shuttle shaft 212 and a forward/reverse switching portion 213. The power output from the auxiliary transmission portion 205_c_ is transmitted to the shuttle shaft 212 with gears and the like. The forward/reverse switching portion 213 includes, for example, a hydraulic clutch or the like, and is configured to switch the rotation direction of the shuttle shaft 212, that is, the forward and backward movements of the tractor T by opening and closing the hydraulic clutch. The shuttle shaft 212 is connected to the rear wheel differential device 11. The rear wheel differential device 11 rotatably supports the rear axle 9 to which the rear wheel 3 is attached.

The PTO power transmission portion 205_e_ includes a PTO propulsion shaft 214 and a PTO clutch 215. The PTO propulsion shaft 214 is rotatably supported and is configured to transmit power from the propulsion shaft 205_a_. The PTO propulsion shaft 214 is connected to the PTO shaft 216 with a gear or the like. The PTO clutch 215 includes, for example, a hydraulic clutch or the like, and when the hydraulic clutch is turned on or off, thereby switching between the power of the propulsion shaft 205_a_ is transmitted to the PTO propulsion shaft 214 and the power of the propulsion shaft 205_a_ is not transmitted to the PTO propulsion shaft 214.

The front transmission portion 205_f_ includes a first clutch 217 and a second clutch 218. The power from the propulsion shaft 205_a_ can be transmitted to the first clutch 217 and the second clutch 218, and for example, the power of the shuttle shaft 212 is transmitted through the gear and the transmission shaft. The power from the first clutch 217 and the second clutch 218 can be transmitted to the front axle 49 through the front transmission shaft 222. In particular, the front transmission shaft 222 is connected to the front wheel differential device 29, and the front wheel differential device 29 rotatably supports the front axle 49 to which the front wheels 2 are attached.

The first clutch 217 and the second clutch 218 are hydraulic clutches and the like. A fluid tube is connected to the first clutch 217, and the fluid tube is connected to a first operation valve 225 to which operation fluid discharged from a hydraulic pump is supplied. The first clutch 217 switches between an engaging state and a disengaging state depending on the opening aperture of the first operation valve 225. A fluid tube is connected to the second clutch 218, and the fluid tube is connected to the second operation valve 226. The second clutch 218 switches between an engaging state and a disengaging state depending on the opening aperture of the second operation valve 226. The first operation valve 225 and the second operation valve 226 are, for example, two-position switching valves with an electromagnetic valve, and are switched to an engaging state or a disengaging state by magnetizing or demagnetizing the solenoid of the electromagnetic valve.

When the first clutch 217 is in the disengaging state and the second clutch 218 is in the engaging state, the power of the shuttle shaft 212 is transmitted to the front wheels 2 through the second clutch 218. As a result, the front wheels and the rear wheels to are driven by power, four-wheel drive (4WD), is established, and the front wheels and the rear wheels to have substantially the same rotation speed (4WD constant speed state) is established. On the other hand, when the first clutch 217 is in the engaging state and the second clutch 218 is in the disengaging state, four-wheel drive is performed and the rotation speed of the front wheels becomes faster than the rotation speed of the rear wheels (4WD acceleration state). In addition, when the first clutch 217 and the second clutch 218 are in the engaging state, the power of the shuttle shaft 212 is not transmitted to the front wheels 2, so that the rear wheels are driven by the two-wheel drive (2WD).

The tractor T includes a position detector device (positioning unit) 31. The position detector device 31 is a device that detects the own position (positioning information including latitude and longitude) by a satellite positioning system (positioning satellite) such as D-GPS, GPS, GLONASS, Hokuto, Galileo, and Michibiki. The position detector device 31 includes a satellite navigation device. The position detector device 31 receives a receiving signal (position of the positioning satellite, transmission time, correction information, and the like) transmitted from the positioning satellite, and detects a position (for example, latitude and longitude) based on the receiving signal. The position detector device 31 includes a receiver device (antenna unit) 32 and an inertia measurement unit (IMU) 39.

The receiver device 32 is a device that has an antenna or the like and receives a receiving signal transmitted from a positioning satellite, and is attached to the traveling vehicle body 4 separately from the inertia measurement unit 39. In this preferred embodiment, the receiver device 32 is attached to the ROPS 26 provided on the traveling vehicle body 4. Note that the attachment location of the receiver device 32 is not limited to that of the preferred embodiment.

The inertia measurement unit 39 includes an acceleration sensor that detects the acceleration, a gyro sensor that detects an angular velocity, and the like. The traveling vehicle body 4 is provided, for example, below the driver seat 19, and the roll angle, pitch angle, yaw angle, and the like of the traveling vehicle body 4 can be detected by the inertia measurement unit 39.

As shown in FIG. 82, the tractor T includes a steering device 211. The steering device 211 is a device configured to perform the manual steering for steering the traveling vehicle body 4 in accordance with a driver's operation and to perform the auto steering for automatically steering the traveling vehicle body 4 without the driver's operation.

The steering device 211 includes a steering handle (steering wheel) 21 and a steering shaft (rotating shaft) 231 that rotatably supports the steering wheel 21. In addition, the steering device 211 includes an auxiliary mechanism (power steering device) 232. The auxiliary mechanism 232 assists the manual steering of the steering wheel 21. More particularly, the auxiliary mechanism 232 assists the rotation of the steering shaft 231 (steering wheel 21) by hydraulic pressure or the like. The auxiliary mechanism 232 includes a hydraulic pump 233, a control valve 234 to which operation fluid discharged from the hydraulic pump 233 is supplied, and a steering cylinder 235 to be operated by the control valve 234. The control valve 234 is, for example, a three-position switching valve configured to be switched by moving a spool or the like, and to switch according to the steering direction (rotational direction) of the steering shaft 231. The steering cylinder 235 is connected to an arm (knuckle arm) 236 that changes the direction of the front wheels 2.

Thus, when the driver grips the steering wheel 21 and operates the steering wheel 21 in one direction or the other direction, the switching position and the opening aperture of the control valve 234 are switched according to the rotation direction of the steering wheel 21, and the steering direction of the front wheels 2 can be changed by stretching and shortening the steering cylinder 235 to the left or right in accordance with the switching position and the opening aperture of the control valve 234. That is, the traveling vehicle body 4 can change the traveling direction to the left or right by manually steering the steering wheel 21.

Next, the auto steering will be described below.

Figure 83:
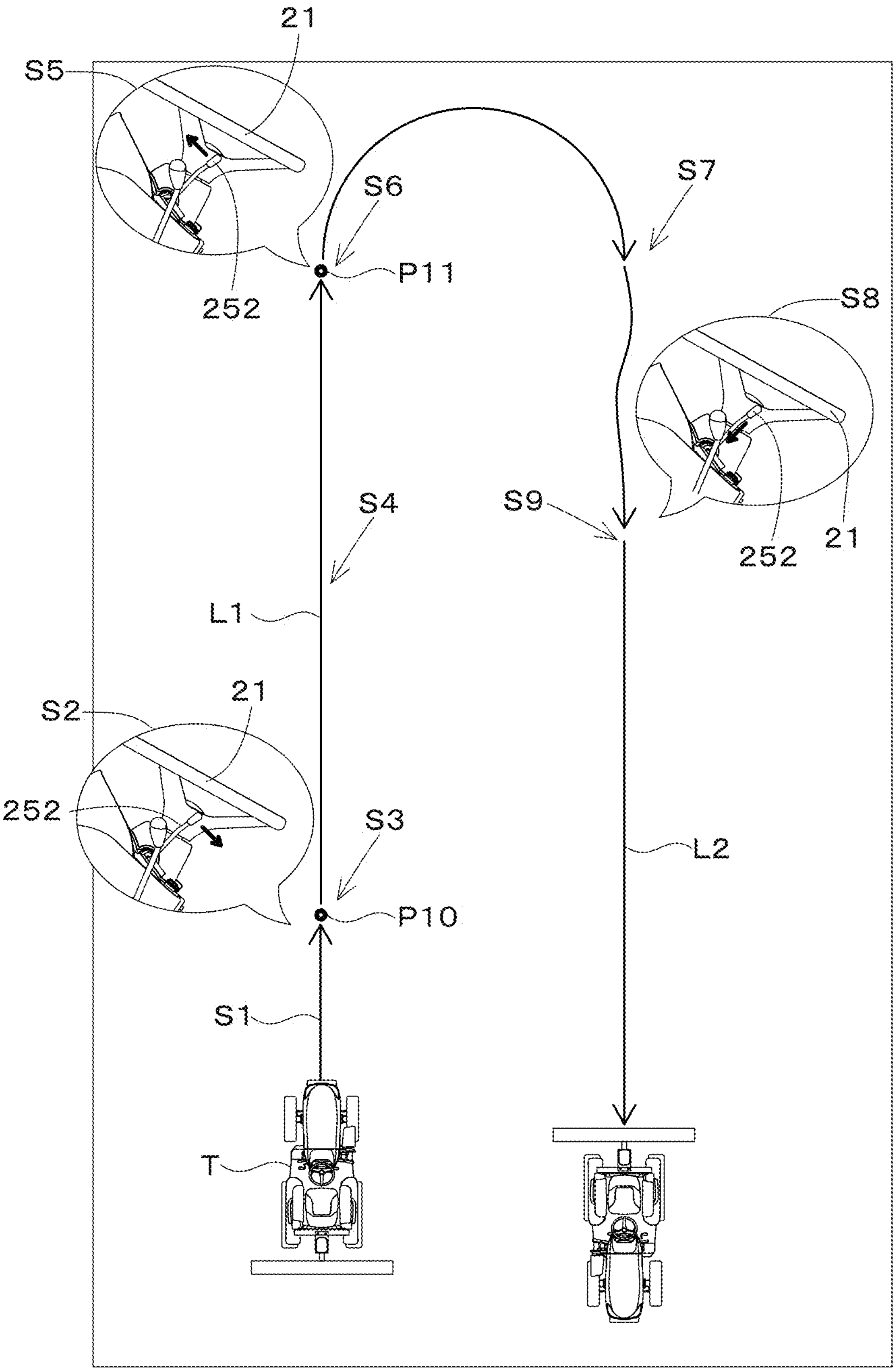
FIG. 83 is an explanation view explaining auto steering according to a preferred embodiment of the present invention.

As shown in FIG. 83, when performing the auto steering, first, the reference traveling line L1 is set before performing the auto steering. After setting the reference traveling line L1, the auto steering can be performed by setting the traveling scheduled line L2 parallel to the reference traveling line L1. In the auto steering, steering in the traveling direction of the tractor T (traveling vehicle 4) is automatically performed so that the vehicle body position (position of the traveling vehicle body 4) measured by the position detector device 31 and the scheduled traveling line L2 match each other.

In particular, before performing the auto steering, the tractor T (the traveling vehicle body 4) is moved to a predetermined position in the field (step S1), and the driver operates the steering switch 252 provided on the tractor T at the predetermined position (step S2), the vehicle body position measured by the position detector device 31 is set as the starting point P10 of the reference traveling line L1 (step S3). In addition, when the tractor T (traveling vehicle body 4) is moved from the starting point P10 of the reference traveling line L1 (step S4) and the driver operates the steering switch 252 at a predetermined position (step S5), the position measured by the position detector device 31 is set as the end point P11 of the reference traveling line L1 (step S6). Thus, the straight line connecting the start point P10 and the end point P11 is set as the reference traveling line L1.

After setting the reference traveling line L1 (after step S6), for example, the tractor T (traveling vehicle body 4) is moved to a place different from the place where the reference traveling line L1 is set (step S7), and when the driver operates the steering switch 252 (step S8), the scheduled traveling line L2 which is a straight line parallel to the reference traveling line L1 is set (step S9). After setting the scheduled traveling line L2, the auto steering is started, and the traveling direction of the tractor T (traveling vehicle body 4) is changed so as to follow the scheduled traveling line L2. For example, when the current vehicle body position is on the left side of the scheduled traveling line L2, the front wheels 2 are steered to the right, and when the current vehicle body position is on the right side of the scheduled traveling line L2, the front wheels 2 are steered to the left. During the auto steering, the traveling speed (vehicle speed) of the tractor T (traveling vehicle body 4) can be changed by the driver by manually changing the operation extent of the accelerator member (accelerator pedal, accelerator lever) provided on the tractor T, and can be changed by changing the shift speed of the transmission device 205.

In addition, after the auto steering is started, when the driver operates the steering switch 252 at an arbitrary position, the auto steering can be ended. That is, the end point of the scheduled traveling line L2 can be set by ending the auto steering by operating the steering switch 252. That is, the length from the start point to the end point of the scheduled traveling line L2 can be set longer or shorter than the reference traveling line L1. In other words, the scheduled traveling line L2 is not associated with the length of the reference traveling line L1, and the scheduled traveling line L2 allows the vehicle to travel while automatically steering along a distance longer than the length of the reference traveling line L1.

As shown in FIG. 82, the steering device 211 includes an auto steering mechanism 237. The auto steering mechanism 237 automatically steers the traveling vehicle body 4, and automatically steers the traveling vehicle body 4 based on the position (vehicle body position) of the traveling vehicle body 4 detected by the position detector device 31. More particularly, the auto steering mechanism 237 automatically steers the steering wheel 21 based on the signal received by the receiver device 32 and the inertia measured by the inertia measurement unit 39. The auto steering mechanism 237 includes the steering motor 238 and the gear mechanism 239. The steering motor 238 is a motor whose rotation direction, rotation speed, rotation angle, and the like can be controlled based on the vehicle body position. The gear mechanism 239 includes a gear that is provided on the steering shaft 231 and rotates together with the steering shaft 231, and includes a gear that is provided on the rotation shaft of the steering motor 238 and rotates together with the rotation shaft. When the rotation shaft of the steering motor 238 rotates, the steering shaft 231 automatically rotates (turns) with the gear mechanism 239, and the steering direction of the front wheels 2 can be changed so that the vehicle body position coincides with the scheduled traveling line L2.

Figure 93:
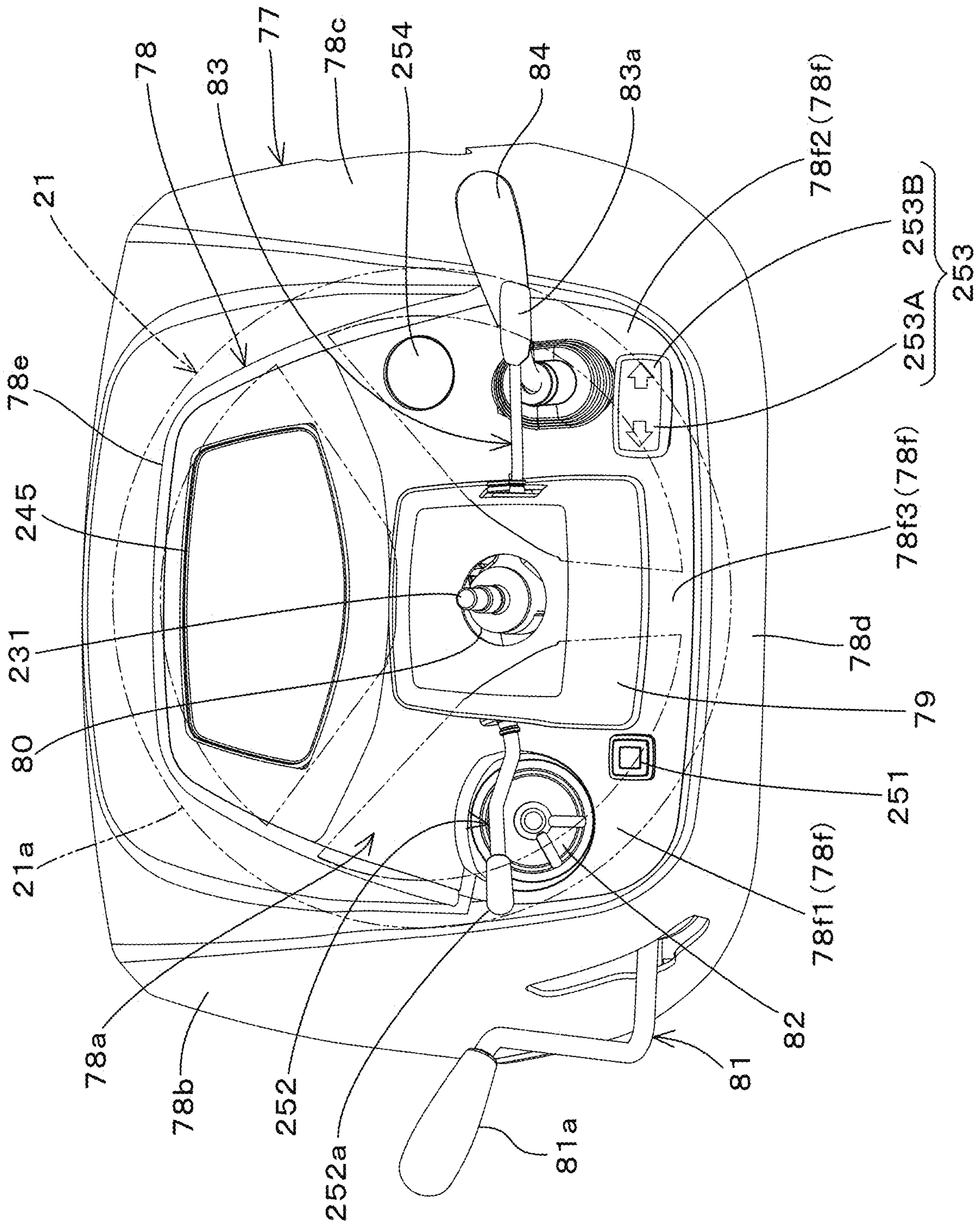
FIG. 93 is a view illustrating a panel cover and the like seen in a vertical direction with respect to a display surface of a display device according to a preferred embodiment of the present invention.

As shown in FIG. 82 and FIG. 93, the tractor T includes a display device 245. The display device 245 is configured to display various information regarding the tractor T, and is configured to display at least the operation information of the tractor T. The display device 245 is provided in front of the driver seat 19.

As shown in FIG. 82, the tractor T includes a setting switch 251. The setting switch 251 is a switch that switches to a setting mode in which the setting is performed at least before the start of auto steering. The setting mode is a mode in which various settings relating to the auto steering are performed before the auto steering is started, and for example, a starting point and an ending point of the reference traveling line L1 are set.

The setting switch 251 can be switched to ON or OFF, and outputs a signal indicating that the setting mode is valid when it is ON and outputs a signal indicating that the setting mode is invalid when it is OFF. The setting switch 251 outputs, to the display device 245, a signal indicating that the setting mode is valid when it is ON, and outputs, to the display device 245, a signal indicating that the setting mode is invalid when it is OFF.

The tractor T includes the steering switch 252. The steering switch 252 is a switch used to change over the start of or the end of auto steering in the setting mode. In particular, the steering switch 252 is capable of switching upward, downward, forward, and rearward from the neutral position, and when the setting mode is valid and the neutral position is switched downward, the auto steering is started. When the setting mode is valid and the neutral position is switched to the upward position, the end of auto steering is outputted. In addition, the steering switch 252 outputs that the current vehicle body position is set at the starting point P10 of the reference traveling line L1 when the setting mode is valid and is changed over from the neutral position to the rearward position, the steering switch 252 outputs that the current vehicle body position is set to the end point P11 of the reference traveling line L1 when the neutral position is switched to the forward position while the setting mode is valid.

The tractor T includes the correction switch 253. The correction switch 253 is a switch that corrects the vehicle body position (latitude, longitude) measured by the position detector device 31. That is, the correction switch 253 is a switch used to correct the vehicle body position (referred to as the calculated vehicle body position) based on the receiving signal (positioning satellite position, transmission time, correction information, and the like) and the measurement information (acceleration, angular velocity) measured by the inertia measurement unit 39.

The correction switch 253 includes a push switch configured to be pressed or a slide switch configured to slide. The case where the correction switch 253 is a push switch or a slide switch will be described below.

When the correction switch 253 is a push switch, the correction extent is set based on the number of times of operating the push switch. The correction extent is determined by the correction extent=the number of times of operations×the correction extent per one operation. For example, as shown in FIG. 84A, the correction extent increases by several centimeters or tens of centimeters every time the push switch is operated. The number of times of operating the push switch is inputted to the first controller device 260A, and the first controller device 260A sets (calculates) the correction extent based on the number of times of operations.

When the correction switch 253 is a slide switch, the correction extent is set based on the operation extent (displacement extent) of the slide switch. For example, the correction extent is determined by the correction extent=the displacement extent from the predetermined position. For example, as shown in FIG. 84B, the correction extent increases by several centimeters or tens of centimeters every time the displacement extent of the slide switch increases by 5 mm, for example. The operation extent (displacement extent) of the slide switch is inputted to the first controller device 260A, and the first controller device 260A sets (calculates) the correction extent based on the displacement extent. The above-described correction extent increasing method and increase ratio are not limited to the above-described numerical values.

Figure 85A:
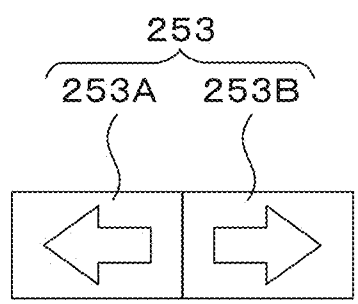
FIG. 85A is a view illustrating a first correction potion and a second correction portion in a push switch according to a preferred embodiment of the present invention.
Figure 85B:
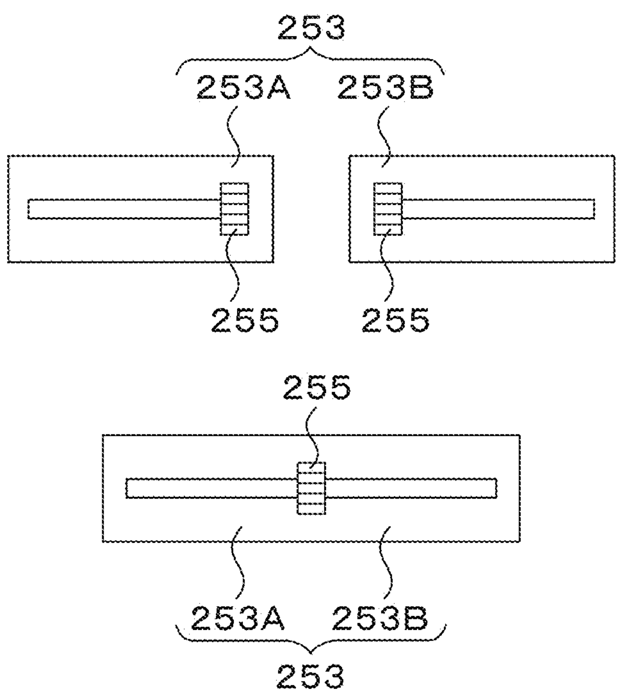
FIG. 85B is a view illustrating a first correction potion and a second correction portion in a slide switch according to a preferred embodiment of the present invention.

More particularly, as shown in FIGS. 85A and 85B, the correction switch 253 includes a first correction portion 253A and a second correction portion 253B. The first correction portion 253A is a portion configured to command the correction of the vehicle body position corresponding to one side, that is, the left side of the traveling vehicle body 4 in the width direction (the vehicle width direction). The second correction portion 253B is a portion configured to command the correction of the vehicle body position corresponding to the other side in the width direction of the traveling vehicle body 4, that is, the right side.

As shown in FIG. 85A, when the correction switch 253 is a push switch, the first correction portion 253A and the second correction portion 253B are ON/OFF switches that automatically return every time the operation is performed. The switch of the first correction portion 253A and the switch of the second correction portion 253B are integrated. Note that the switch of the first correction portion 253A and the switch of the second correction portion 253B may be arranged separately from each other. As shown in FIG. 84A, every time the first correction portion 253A is pressed, the correction extent (left correction extent) corresponding to the left side of the traveling vehicle body 4 increases. In addition, every time the second correction portion 253B is pressed, the correction extent (right correction extent) corresponding to the right side of the traveling vehicle body 4 increases.

As shown in FIG. 85B, when the correction switch 253 is a slide switch, the first correction portion 253A and the second correction portion 253B include a knob 255 that moves to the left or to the right along the longitudinal direction of the long hole. When the correction switch 253 is a slide switch, the first correction portion 253A and the second correction portion 253B are spaced apart from each other in the width direction. As shown in FIG. 84B, when the knob 255 is gradually displaced leftward from the predetermined reference position, the left correction extent increases according to the displacement extent. In addition, when the knob 255 is gradually displaced to the right from the predetermined reference position, the right correction extent increases in accordance with the displacement extent. As shown in FIG. 85B, in the case of a slide switch, the first correction portion 253A and the second correction portion 253B are integrally formed, and the reference position of the knob portion 255 is set to the center portion. The left correction extent may be set when moving the knob 255 to the left side, and the right correction extent may be set when moving the knob 255 from the middle position to the right side.

Next, the relation between the correction extent (left correction extent, right correction extent) by the correction switch 253, the scheduled traveling route L2, and the behavior of the tractor T (traveling vehicle body 4) (travel locus) will be described.

Figure 86A:
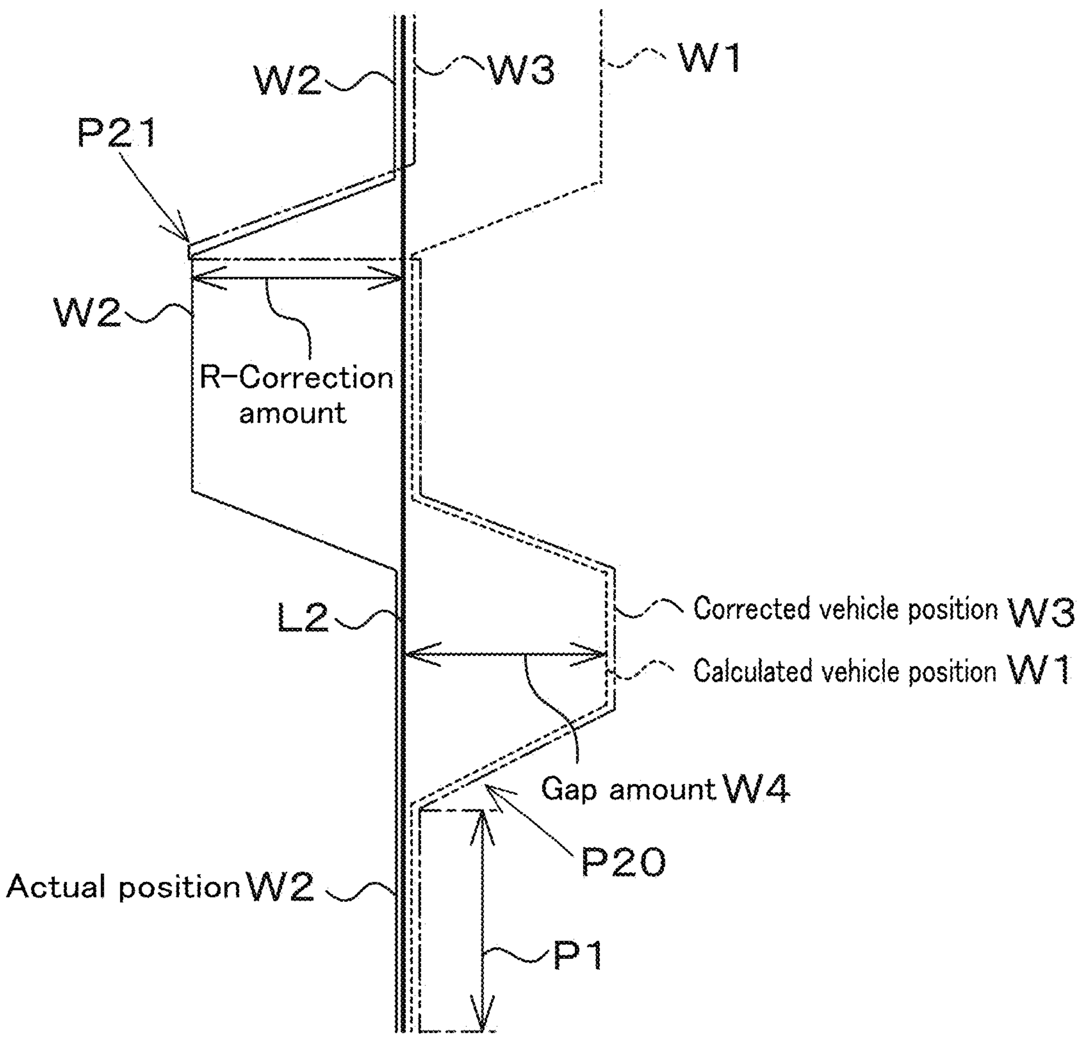
FIG. 86A is a view illustrating a state where a calculated body position deviates to the right in traveling straight during the auto steering according to a preferred embodiment of the present invention.

FIG. 86A shows a state in which the calculated vehicle body position W1 deviates to the right while the vehicle is traveling straight ahead during the auto steering. As shown in FIG. 86A, in the state where the auto steering is started, the actual position (actual position W2) of the tractor T (traveling vehicle body 4) and the calculated vehicle body position W1 match each other, and when the actual position W2 and the scheduled traveling route L2 matches each other, the tractor T travels along the scheduled traveling route L2. That is, in the portion P1 where there is no error in the positioning of the position detector device 31 and the vehicle body position (calculated vehicle body position W1) detected by the position detector device 31 is the same as the actual position W2, the tractor T moves along the scheduled traveling route L2. When there is no error in the positioning of the position detector device 31 and no correction is performed, the calculated vehicle body position W1 and the corrected vehicle body position corrected by the correction extent (corrected vehicle body position) W3 have the same value. The corrected vehicle body position W3 is obtained in "the corrected vehicle body position W3=calculated vehicle body position W1-correction extent".

Here, in the vicinity of the position P20, although the actual position W2 is not displaced with respect to the scheduled traveling route L2, an error occurs in the positioning of the position detector device 31 due to various influences, and the vehicle body position W1 detected by the position detector device 31 deviates to the right with respect to the scheduled traveling route L2 (actual position W2), and when the displacement extent W4 is maintained, the tractor T determined that a deviation has occurred and steers the tractor T to the left so as to eliminate the deviation W4 between the calculated vehicle body position W1 and the scheduled traveling route L2. Then, the actual position W2 of the tractor T is shifted to the scheduled traveling route L2 by steering to the left. After that, it is assumed that the driver notices that the tractor T is displaced from the scheduled traveling route L2 and steers the second correction portion 253B at the position P21 to increase the right correction extent from zero. The right correction extent is added to the calculated vehicle body position W1, and the vehicle body position after correction (corrected vehicle body position) W3 can be made substantially the same as the actual position W2. That is, by setting the right correction extent by the second correction portion 253B, it is possible to correct the vehicle body position detected by the position detector device 31 in a direction to eliminate the displacement extent W4 that has occurred in the vicinity of the position P20. As shown at position P21 in FIG. 86A, when the actual position W2 of the tractor T is leftward from the scheduled traveling route L2 after the vehicle body position is corrected, the tractor T is steered to the right and the tractor T is moved to the right. The actual position W2 can be matched with the scheduled traveling route L2.

Figure 86B:
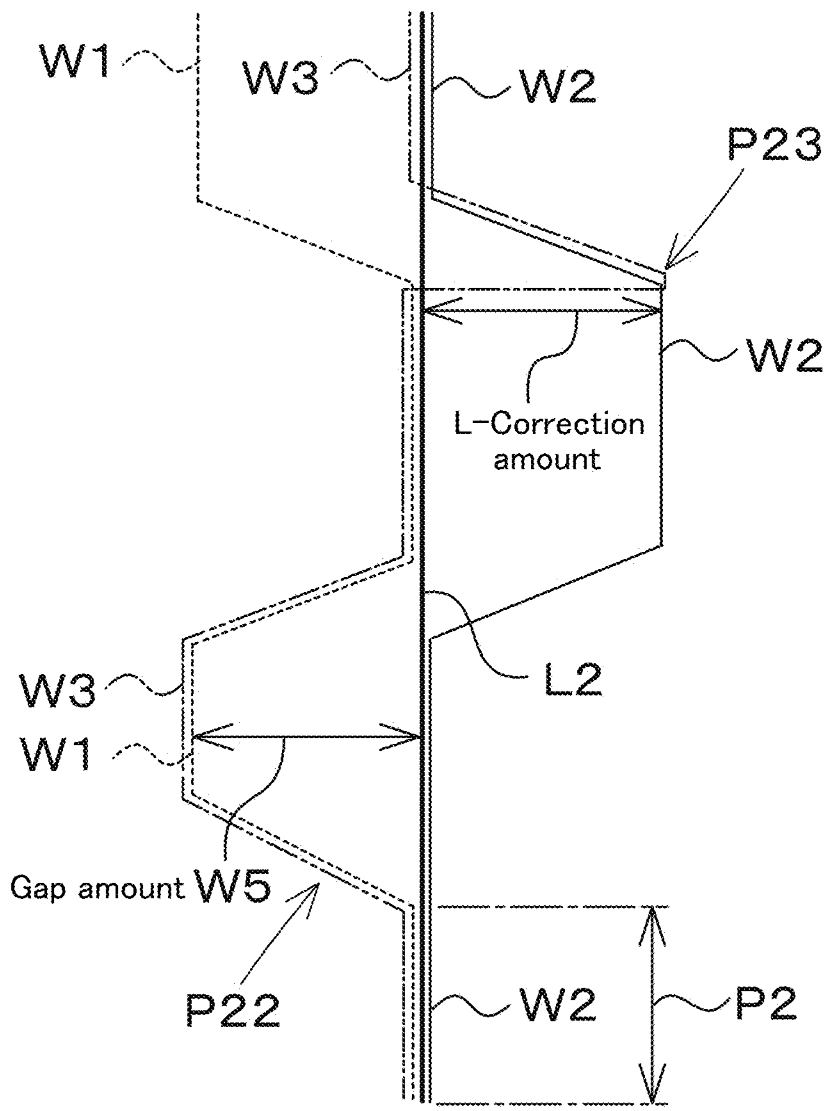
FIG. 86B is a view illustrating a state where a calculated body position deviates to the left in traveling straight during the auto steering according to a preferred embodiment of the present invention.

FIG. 86B shows a state in which the calculated vehicle body position W1 deviates to the left while the vehicle is traveling straight ahead during the auto steering. As shown in FIG. 86B, when the actual position W2 and the calculated vehicle body position W1 match each other and the actual position W2 and the scheduled traveling route L2 match each other in the state where the auto steering is started. Similarly, the tractor T travels along the scheduled traveling route L2. That is, as in the case of FIG. 86A, in the portion P2 in which the positioning of the position detector device 31 has no error, the tractor T travels along the scheduled traveling route L2. In addition, as in FIG. 86A, the calculated vehicle body position W1 and the corrected vehicle body position W3 have the same value.

Here, at the position P22, an error occurs in the positioning of the position detector device 31 due to various influences, the vehicle body position W1 detected by the position detector device 31 is deviated leftward with respect to the actual position W2, and when the displacement extent W5 is maintained, the tractor T steers the tractor T to the right so as to eliminate the displacement extent W5 between the calculated vehicle body position W1 and the scheduled traveling route L2. Then, it is assumed that the driver notices that the tractor T is displaced from the scheduled traveling route L2, and the driver steers the first correction portion 253A at the position P23 to increase the left correction extent from zero. Then, the left correction extent is added to the calculated vehicle body position W1, and the corrected vehicle body position (corrected vehicle body position) W3 can be made substantially the same as the actual position W2. That is, by setting the left correction extent with the first correction portion 253A, it is possible to correct the vehicle body position of the position detector device 31 in a direction to eliminate the displacement extent W5 that has occurred in the vicinity of the position P22. As shown at position P23 in FIG. 86B, when the actual position W2 of the tractor T is separated away from the scheduled traveling route L2 on the right side after the vehicle body position is corrected, the tractor T is steered to the left and the tractor T is moved to the left. The actual position W2 can be matched with the scheduled traveling route L2.

As shown in FIG. 82, the tractor T includes a plurality of controller devices 260. The plurality of controller devices 260 are devices configured or programmed to control the traveling system, the working system, the vehicle body position, and the like in the tractor T. The plurality of controller devices 260 includes a first controller device 260A, a second controller device 260B, and a third controller device 260C.

The first controller device 260A receives the receiving signal (received information) received by the receiver device 32 and the measurement information (acceleration, angular velocity, and the like) measured by the inertia measurement unit 39. And, the vehicle body position is obtained based on the received information and the measurement information. For example, when the correction extent by the correction switch 253 is zero, that is, when the correction of the vehicle body position by the correction switch 253 is not instructed, the first controller device 260A calculates the calculated vehicle body based on the received information and the measurement information. The calculated vehicle body position W1 is determined as the vehicle body position to be used during the auto steering without correcting the position W1. On the other hand, when the correction switch 253 is instructed to correct the vehicle body position, the first controller device 260A sets the correction extent of the vehicle body position based on either the number of times of operating the correction switch 253 or the operation extent (displacement extent) of the correction switch 253, and the corrected vehicle body position W3 obtained by correcting the calculated vehicle body position W1 with the correction extent is determined as a traveling position used during the auto steering.

The first controller device 260A sets a control signal based on the vehicle body position (calculated vehicle body position W1, corrected vehicle body position W3) and the scheduled traveling line L2, and outputs the control signal to the second controller 260B. The second controller device 260B controls the steering motor 238 of the auto steering mechanism 237 so that the traveling vehicle body 4 travels along the scheduled traveling line L2 based on the control signal outputted from the first controller device 260A.

Figure 87:
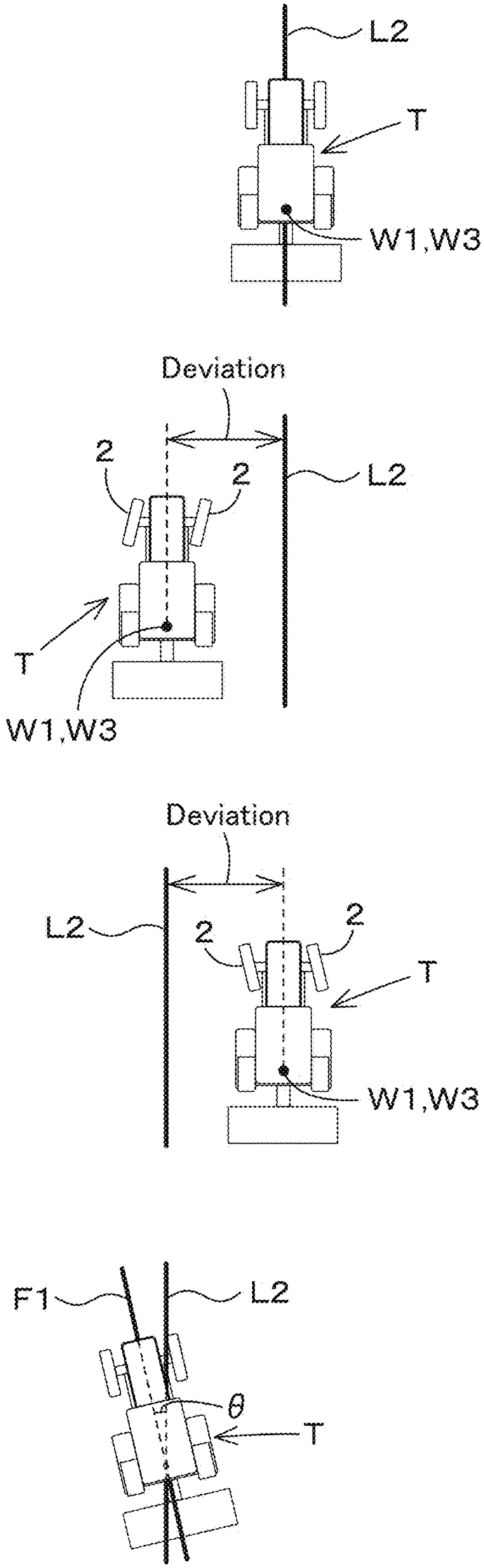
FIG. 87 is an explanation view explaining the auto steering according to a preferred embodiment of the present invention.

As shown in FIG. 87, when the deviation between the vehicle body position and the scheduled traveling line L2 is less than a threshold value, the second controller device 260B maintains the rotation angle of the rotation shaft of the steering motor 238. When the deviation between the vehicle body position and the scheduled traveling line L2 is equal to or more than the threshold value and the tractor T is arranged on the left side with respect to the scheduled traveling line L2, the second controller device 260B rotates the rotation shaft of the steering motor 238 such that the steering direction of the tractor T is oriented to the right. When the deviation between the vehicle body position and the scheduled traveling line L2 is equal to or greater than the threshold value and the tractor T is arranged on the right side with respect to the scheduled traveling line L2, the second controller device 260B rotates the rotation shaft of the steering motor 238 such that the steering direction of the tractor T is oriented to the left. In the preferred embodiment mentioned above, the steering angle of the steering device 211 is changed based on the deviation between the vehicle body position and the scheduled traveling line L2. However, when the azimuth of the scheduled traveling line L2 is different from the azimuth (vehicle body direction) F1 of the running direction (traveling direction) of the tractor T (the traveling vehicle body 4), that is, when the angle θ of the vehicle body direction F1 with respect to the scheduled traveling line L2 is equal to or greater than the threshold value, the second controller device 260B may set the steering angle such that the angle θ becomes zero (such that the vehicle body azimuth F1 matches with the azimuth of the scheduled traveling line L2. In addition, the second controller device 260B may set the final steering angle during the auto steering based on the steering angle obtained based on the deviation (positional deviation) and the steering angle obtained based on the azimuth (azimuth deviation θ). The setting of the steering angle in the auto steering in the above-described preferred embodiment is an example, and is not limited thereto.

The third controller device 260C lifts and lowers the connector portion 8 in accordance with the operation of the operation member provided around the driver seat 19.

Note that the control of the traveling system, the control of the working system, and the calculation of the vehicle body position described above are not limited thereto.

As shown in FIG. 109, the traveling vehicle body 4 includes a front axle frame 70, a flywheel housing 71, a clutch housing 72, an intermediate frame 73, and a mission case 10.

The front axle frame 70 is arranged in the front portion of the traveling vehicle body 4 and rotatably supports the axle (front axle) 49 of the front wheels 2. In addition, the front axle frame 70 supports the prime mover 6 and extends forward from the prime mover 6. The front axle frame 70, the flywheel housing 71, the clutch housing 72, the intermediate frame 73, and the transmission case 10 are integrally connected each other to form a highly rigid body frame.

The flywheel housing 71 is connected to the rear portion of the prime mover 6 and houses the flywheel connected to the output shaft of the prime mover 6. The clutch housing 72 is connected to the flywheel housing 71 and accommodates a clutch that intermittently transmits the power of the prime mover 6 transmitted through the flywheel. The intermediate frame 73 is connected to the rear portion of the clutch housing 72 and extends rearward from the clutch housing 72. The transmission case 10 is connected to the rear portion of the intermediate frame 73 and accommodates the transmission device 205 and the rear wheel differential device 11.

Figure 88:
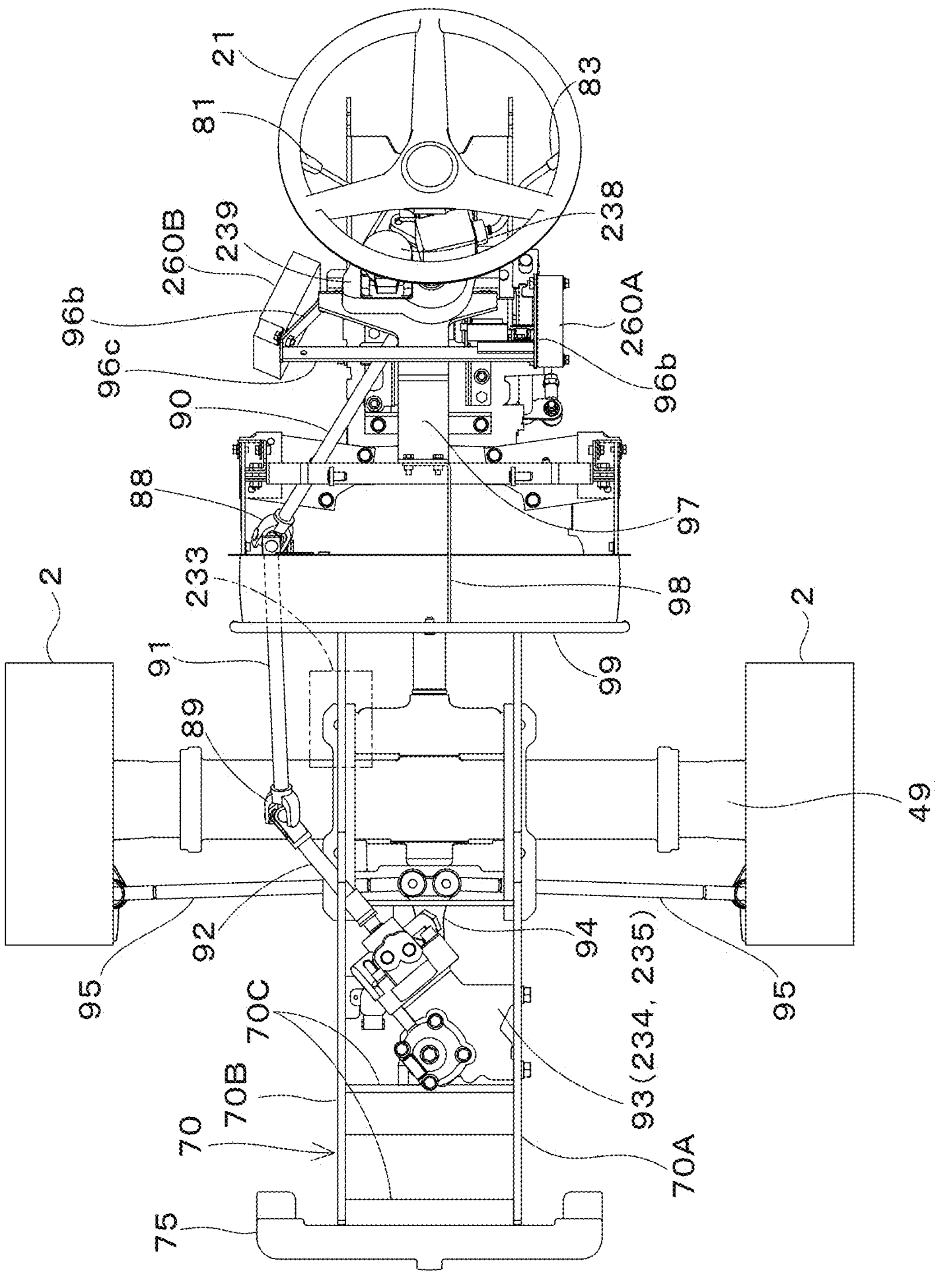
FIG. 88 is a plan view illustrating a main portion of an inner structure of a front portion of a traveling vehicle body according to a preferred embodiment of the present invention.

As shown in FIG. 88, the front axle frame 70 includes a first frame 70A arranged on one side (left side) in the vehicle width direction and a second frame 70B arranged on the other side (right side) in the vehicle width direction, and a third frame 70C that connects the first frame 70A and the second frame 70B. As shown in FIG. 88, FIG. 109, and FIG. 110, a weight 75 is attached to the front end of the front axle frame 70. In addition, the bonnet 5 is attached to the upper portion of the front axle frame 70.

The bonnet 5 covers the prime mover 6. In particular, the bonnet 5 includes an upper plate portion 5*a* that covers the upper portion of the prime mover 6, a left plate portion 5*b* that covers the left portion of the prime mover 6, a right plate portion 5*c* that covers the right portion of the prime mover 6, and a front plate portion 5*d* that covers the front portion of the prime mover 6. A cover 77 for housing the steering shaft 231 and the like is provided at the rear of the bonnet 5. A steering wheel 21 is provided above the cover 77 and in front of the driver seat 19.

Figure 89:
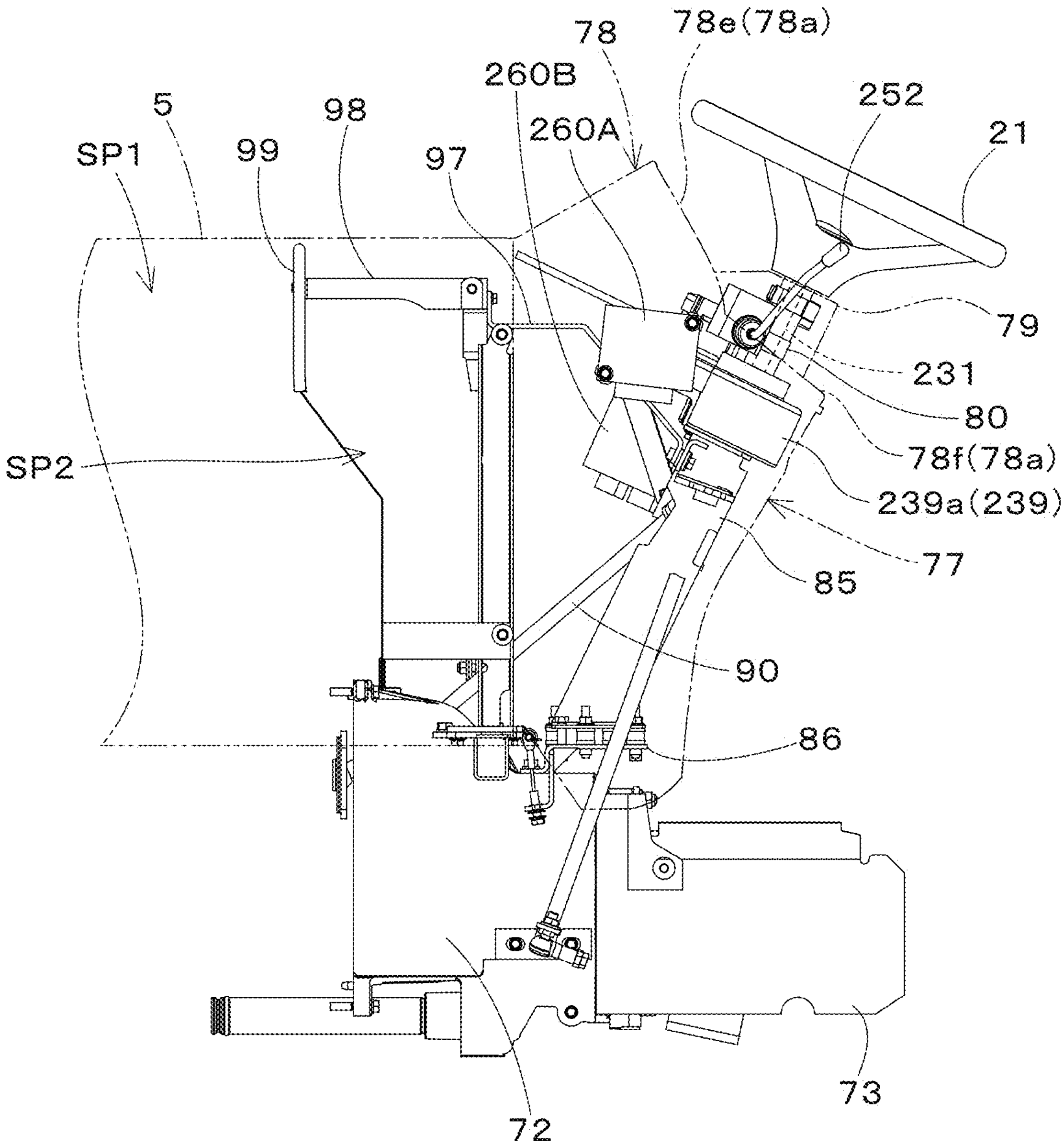
FIG. 89 is a left side view illustrating the main portion of the inner structure of the front portion of the traveling vehicle body according to a preferred embodiment of the present invention.
Figure 90:
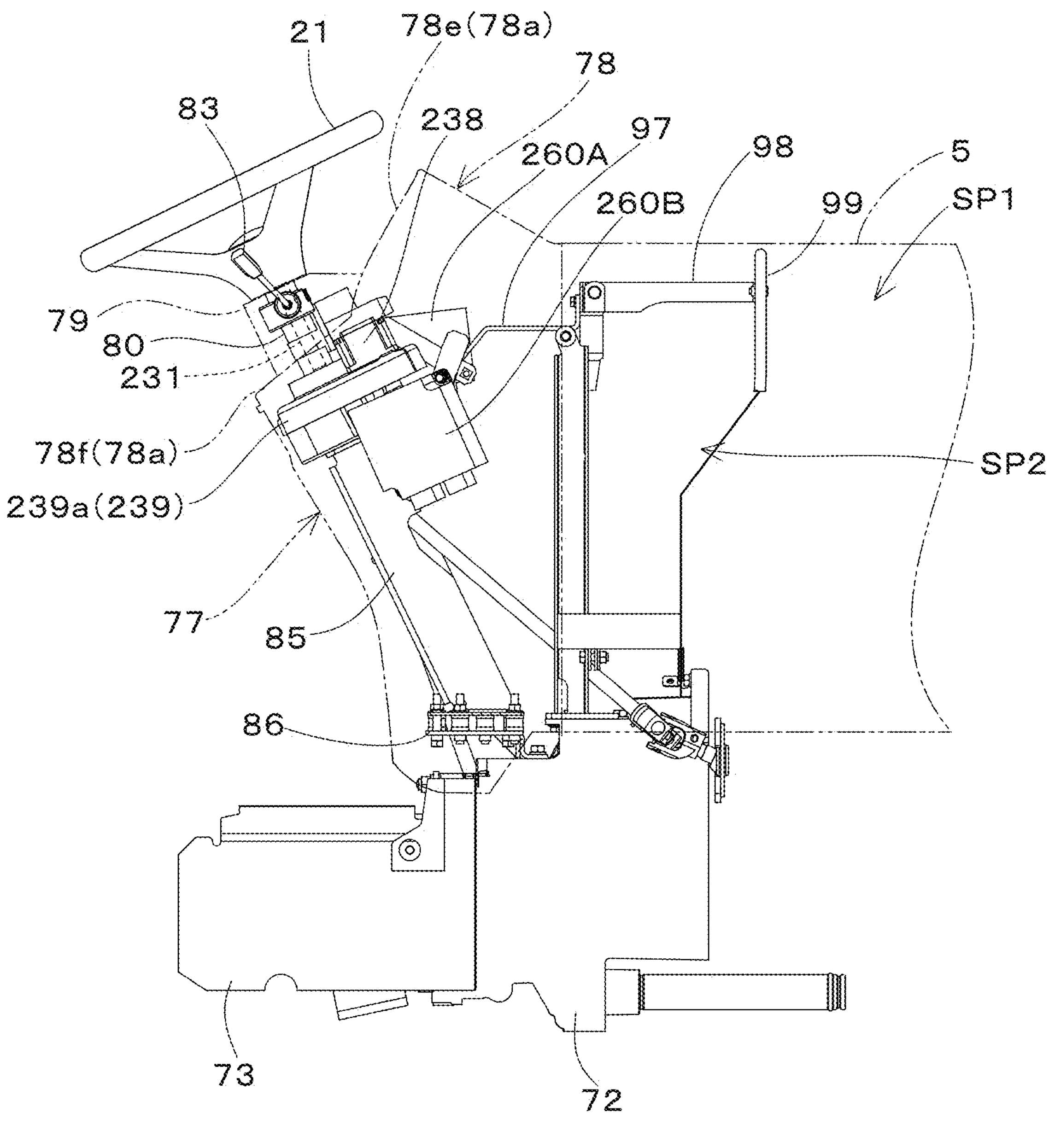
FIG. 90 is a right side view illustrating the main portion of the inner structure of the front portion of the traveling vehicle body according to a preferred embodiment of the present invention.
Figure 91:
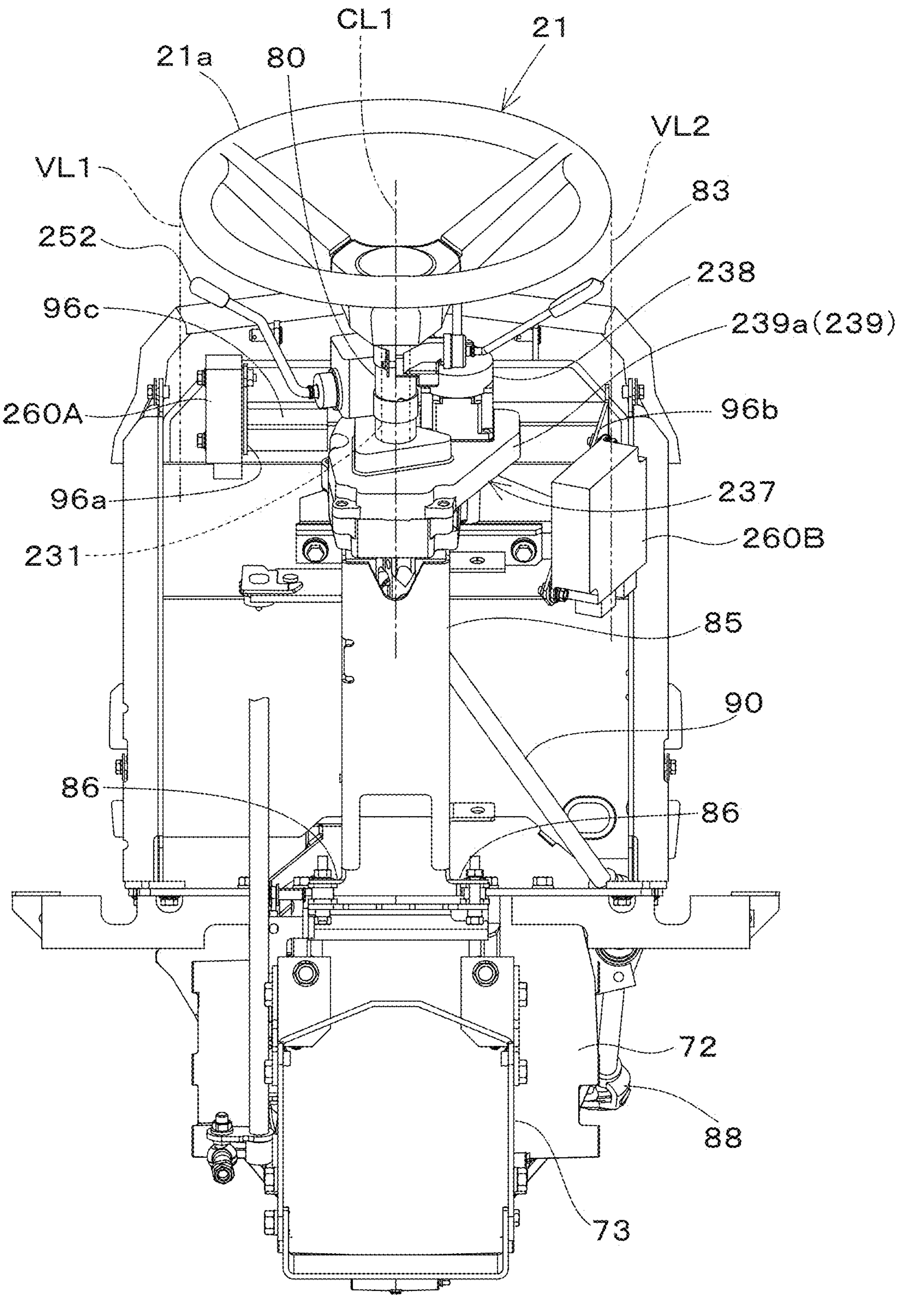
FIG. 91 is a back view illustrating the main portion of the inner structure of the front portion of the traveling vehicle body according to a preferred embodiment of the present invention.
Figure 95:
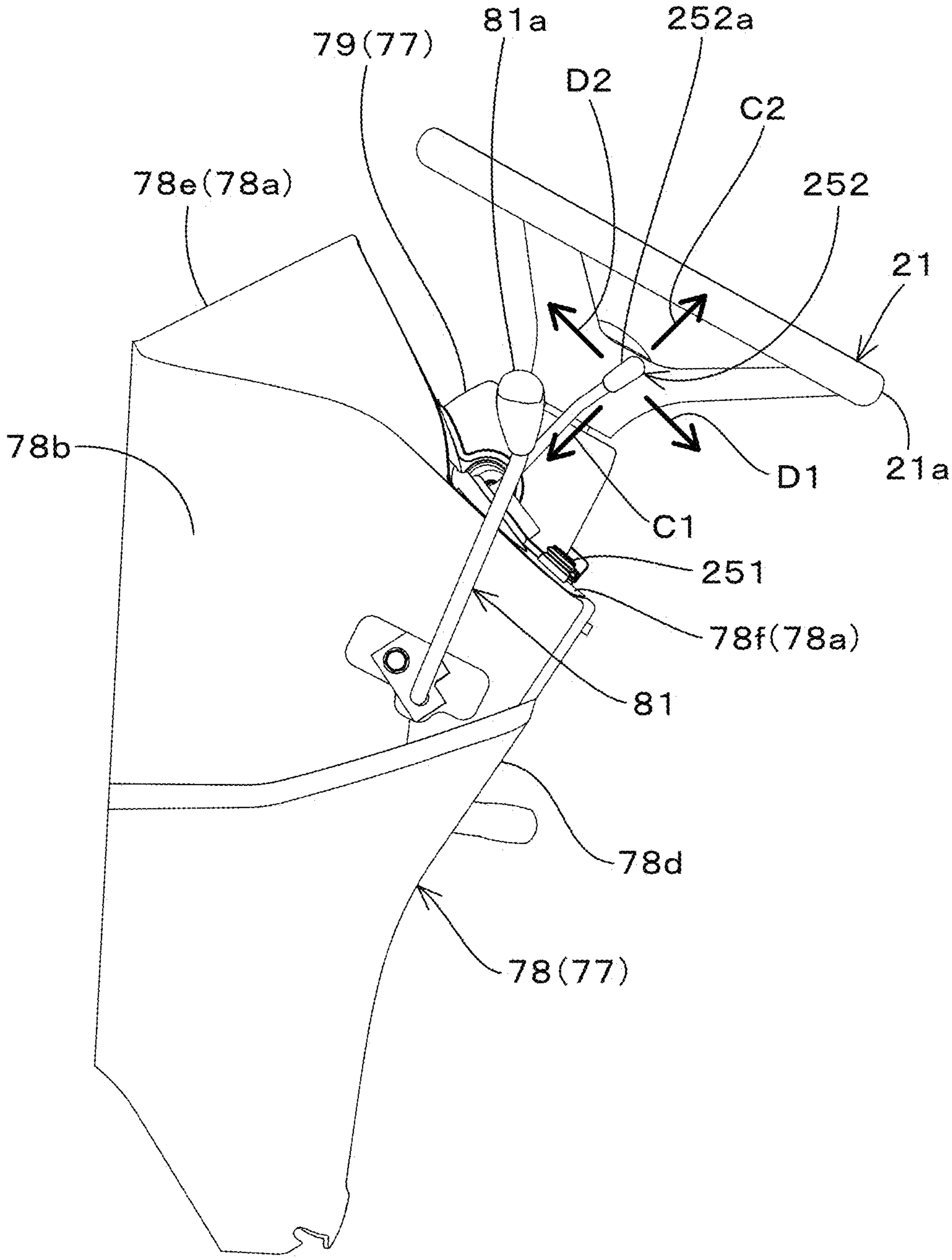
FIG. 95 is a left side view explaining movement of a steering switch according to a preferred embodiment of the present invention.

As shown in FIG. 89 to FIG. 91, the outer periphery of the steering shaft 231 is covered with a steering post 80. The steering post 80 has a cylindrical shape and extends along the axial direction of the steering shaft 231. As shown in FIG. 89 and FIG. 90, the outer periphery of the steering post 80 is covered with a cover 77. The cover 77 is provided in front of the driver seat 19. As shown in FIG. 95, FIG. 109, and FIG. 110, the cover 77 includes a panel cover 78 and a column cover 79.

As shown in FIG. 92 to FIG. 95, FIG. 109, and FIG. 110, the panel cover 78 includes an upper plate portion 78*a*, a left plate portion 78*b*, a right plate portion 78*c*, and a rear plate portion 78*d*. The front end of the left plate portion 78*a* of the panel cover 78 is connected to the left plate portion 5*b* of the bonnet 5. The front end of the right plate portion 78*c* of the panel cover 78 is connected to the right plate portion 5*c* of the bonnet 5. The rear plate portion 78*d* of the panel cover 78 connects the rear end of the left plate portion 78*b* and the rear end of the right plate portion 78*c*. The upper plate portion 78*a* of the panel cover 78 connects the upper end of the left plate portion 78*b*, the upper end of the right plate portion 78*c*, and the upper end of the rear plate portion 78*d*, and is also connected to the upper plate portion 5*a* of the bonnet 5.

As shown in FIG. 92 to FIG. 95, a support portion 78*e* that supports the display device 245 is provided on the upper plate portion 78*a* of the panel cover 78. The support portion 78*e* supports the display device 245 in front of the steering shaft 231 and below the steering wheel 21.

Figure 94:
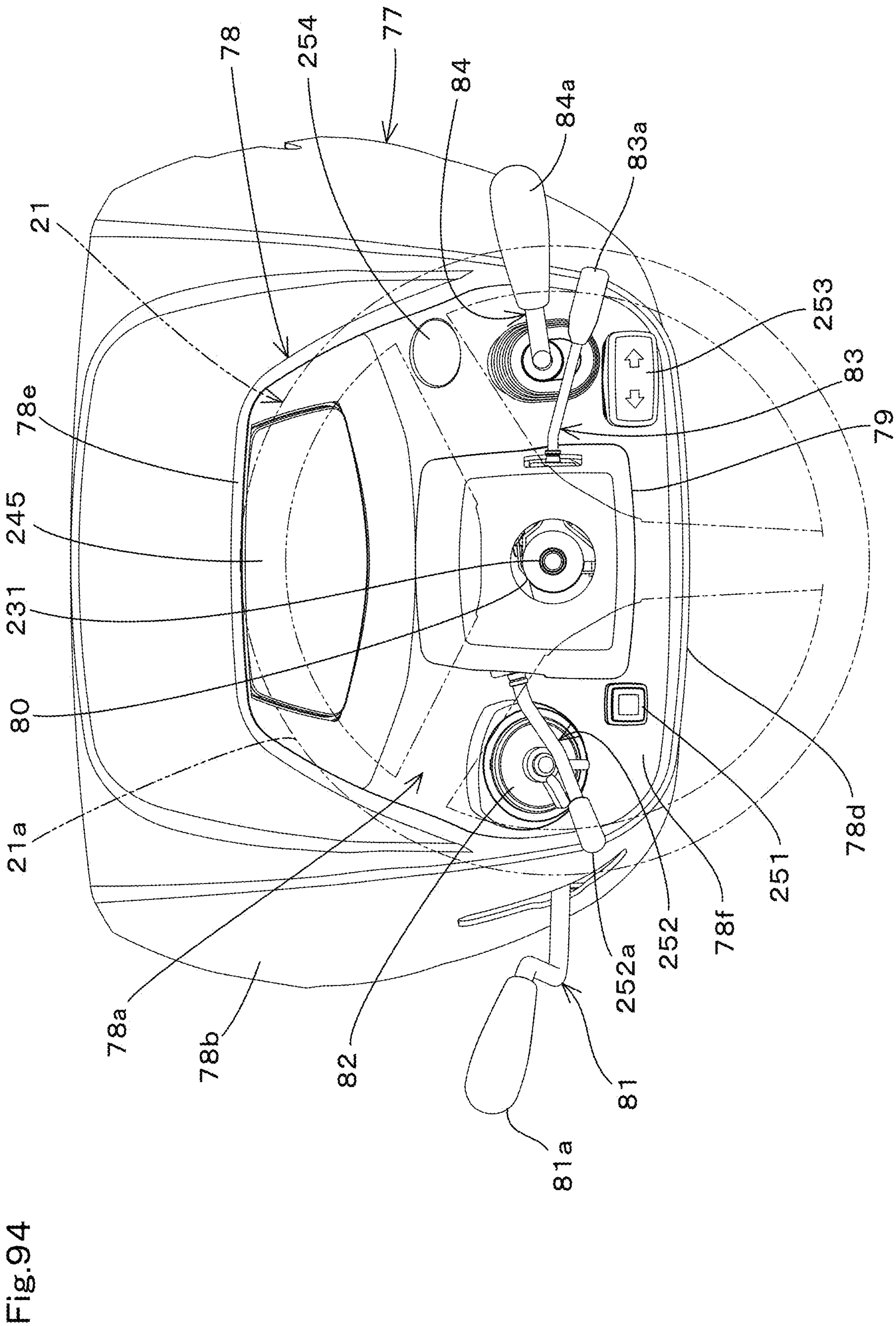
FIG. 94 is a view illustrating the panel cover and the like seen from above in an axial direction of a steering shaft according to a preferred embodiment of the present invention.

In this preferred embodiment, the display device 245 includes a liquid crystal panel. As shown in FIG. 94, the display device 245 is arranged around the steering shaft 231. In particular, the display device 245 is arranged in front of the steering shaft 231. As shown in FIG. 93, the display device 245 does not overlap the grip 21*a* of the steering wheel 21 when viewed from the direction perpendicular to the display surface of the display device 245 (hereinafter, referred to as a "display surface vertical direction") (arranged inside the grip 21*a*). The grip 21*a* is a grip portion of the steering wheel 21 and is formed in an annular shape. Since the vertical direction of the display screen substantially coincides with the line-of-sight direction of the driver sitting on the driver seat 19, the visibility of the display device 245 is improved.

As shown in FIG. 92 to FIG. 95, the upper plate portion 78*a* of the panel cover 78 includes an attachment surface 78*f* to which the setting switch 251, the correction switch 253, and the screen switch 254 are attached. That is, the panel cover 78 is provided with the setting switch 251, the correction switch 253, and the screen switch 254. The attachment surface 78*f* is provided behind the support portion 78*e* and below the steering wheel 21. The support portion 78*e* and the attachment surface 78*f* are continuously and integrally configured, the support portion 78*e* is arranged in the front portion of the upper plate portion 78*a*, and the attachment surface 78*f* is arranged in the rear portion of the upper plate portion 78*a*.

As shown in FIG. 89, FIG. 90, FIG. 92, and FIG. 95, the attachment surface 78*f* is inclined so as to shift downward as it extends rearward. As shown in FIG. 93, the attachment surface 78*f* includes a first area 78*f*1, a second area 78*f*2, and a third area 78*f*3 provided around the steering shaft 231. The first area 78*f*1 is a region arranged on one side (the left side) of the steering shaft 231. The second area 78*f*2 is a region arranged on the other side (the right side) of the steering shaft 231. The third area 78*f*3 is a region arranged behind the steering shaft 231. The setting switch 251, the correction switch 253, and the screen switch 254 are attached to any one of the three regions (the first area 78*f*1, the second area 78*f*2, and the third area 78*f*3) of the attachment surface 78*f*, so that the steering shaft 231 is arranged around the steering shaft 231. Specific arrangements of the setting switch 251, the correction switch 253, and the screen switch 254 will be described below.

As shown in FIG. 92 to FIG. 95, FIG. 109, and FIG. 110, a shuttle lever 81 protrudes from the left portion (left plate portion 78*b*) of the panel cover 78. The shuttle lever 81 protrudes leftward from the left portion of the panel cover 78 and then extends upward. The shuttle lever 81 is a member that performs an operation of switching the traveling direction of the traveling vehicle body 4. More particularly, by operating (by swinging) the shuttle lever 81 forward, the forward/reverse switching portion 213 outputs a forwarding power to the traveling device 207, and the traveling direction of the traveling vehicle body 4 is switched to the forward direction. In addition, by operating (by swinging) the shuttle lever 81 rearward, the forward/reverse switching portion 213 outputs a backward power to the traveling device 207, and the traveling direction of the traveling vehicle body 4 is switched to the backward direction. When the shuttle lever 81 is in the neutral position, no power is outputted to the traveling device 207.

Figure 92:
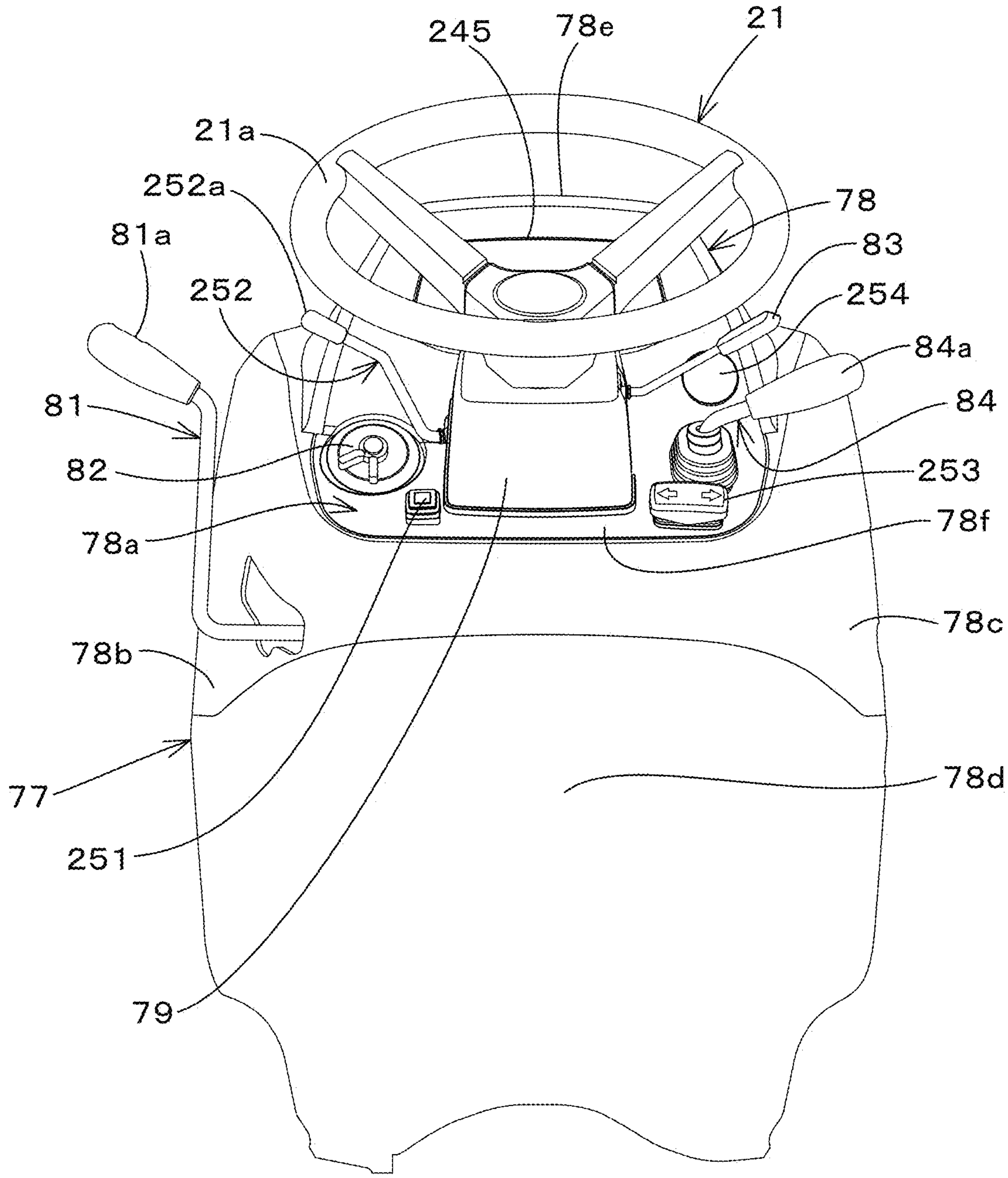
FIG. 92 is a back view illustrating a steering handle, a cover, and the like according to a preferred embodiment of the present invention.

The shuttle lever 81 is provided at the tip end (the upper end) with a grip 81*a* that is gripped by the operator. As shown in FIG. 92, the grip 81*a* is arranged to the left of the grip 21*a* of the steering wheel 21. In addition, the grip portion 81*a* is arranged above the attachment surface 78*f* of the panel cover 78 and at a position leftward from the attachment surface 78*f*. As a result, it is possible to prevent the shuttle lever 81 from coming into contact unintentionally when the shuttle lever 81 is operated, it unintentionally comes into contact with various switches (the setting switch 251 and the like) provided on the attachment surface 78*f*, or when the various switches provided on the attachment surface 78*f* are operated.

As shown in FIG. 92 to FIG. 95, FIG. 109, and FIG. 110, the column cover 79 is arranged below the steering wheel 21. As shown in FIG. 89 and FIG. 90, the column cover 79 covers the periphery of the upper portions of the steering shaft 231 and the steering post 80. The column cover 79 has a substantially rectangular tube shape and protrudes upward from the attachment surface 78*f* of the panel cover 78. As shown in FIG. 93, the first area 78*f*1, the second area 78*f*2, and the third area 78*f*3 of the attachment surface 78*f* are respectively arranged on one side (the left side), on the other side (the right side), and on the rear side of the column cover 79. That is, the attachment surface 78*f* is provided around the column cover 79. The setting switch 251, the correction switch 253, and the screen switch 254 arranged on the attachment surface 78*f* are arranged around the column cover 79.

As shown in FIG. 89, FIG. 90, and FIG. 92 to FIG. 95, the attachment surface 78*f* is connected to the lower end of the column cover 79 and is arranged at the same height as the lower end. Thus, the attachment surface 78*f* is separated from the grip 21*a* of the steering wheel 21 by the height of the column cover 79. As a result, the setting switch 251, the correction switch 253, and the screen switch 254 mounted on the attachment surface 78*f* are arranged at positions spaced from the steering wheel 21.

Since the setting switch 251, the correction switch 253, and the screen switch 254 are arranged separating from the steering wheel 21, the setting switch 251, the correction switch 253, and the screen switch 254 can be prevented from being unintentionally touched when the steering wheel 21 is operated. In addition, it is possible to prevent unintentional contact with the steering wheel 21 when the setting switch 251, the correction switch 253, and the screen switch 254 are operated. Thus, it is possible to prevent unintended switching to the auto steering due to an erroneous operation.

Next, the arrangement of the setting switch 251, the steering switch 252, the correction switch 253, and the screen switch 254 will be described below.

As shown in FIG. 92 to FIG. 94, the setting switch 251, the steering switch 252, the correction switch 253, and the screen switch 254 are arranged around the steering shaft 231. The specific arrangement of the setting switch 251, the steering switch 252, the correction switch 253, and the screen switch 254 will be described below.

As shown in FIG. 92 to FIG. 94, the setting switch 251 is arranged on one side (the left side) of the steering shaft 231 in the vehicle width direction. In addition, the setting switch 251 is arranged behind the steering shaft 231 in the front-rear direction. That is, the setting switch 251 is arranged to the left of the steering shaft 231 and behind the steering shaft 231 (obliquely left rear). In this preferred embodiment, the setting switch 251 includes a push switch.

The setting switch 251 is arranged to the left and rear (obliquely left rear) of the column cover 79 in the positional relation with respect to the column cover 79. The setting switch 251 is arranged in the rear portion of the first area 78*f*1 of the attachment surface 78*f* in the positional relation with respect to the attachment surface 78*f* of the panel cover 78.

In addition, the setting switch 251 is arranged behind the display device 245 (on the side of the driver seat 19) in the positional relation with respect to the display device 245. As a result, the driver can easily and accurately operate the setting switch 251 while checking the display device 245 without changing the posture of the driver sitting on the driver seat 19.

As shown in FIG. 94, the setting switch 251 does not overlap with the grip 21*a* of the steering wheel 21 when viewed from the axial direction of the steering shaft 231. In particular, the setting switch 251 is arranged inside the grip 21*a* of the steering wheel 21 (on the side close to the axis of the steering shaft 231) when viewed from the axial direction of the steering shaft 231.

As shown in FIG. 92 to FIG. 94, the steering switch 252 is arranged on one side (the left side) of the steering shaft 231. In this preferred embodiment, the steering switch 252 includes a swingable lever. The steering switch 252 can swing about a base end portion provided on the steering shaft 231 side as a fulcrum. The base end of the steering switch 252 is provided inside the column cover 79. The steering switch 252 protrudes to one side (the left side) of the column cover 79.

A grip portion 252*a* that is gripped by the operator is provided at the tip (the left end) of the steering switch 252. As shown in FIG. 92, FIG. 95, and the like, the grip portion 252*a* is arranged below the grip 21*a* of the steering wheel 21 and in the vicinity of the grip 21*a*. In addition, as shown in FIG. 94, the grip portion 252*a* overlaps the grip 21*a* of the steering wheel 21 when viewed from the axial direction of the steering shaft 231. As a result, in the state where the grip 21*a* of the steering wheel 21 is gripped, it is possible to extend the finger to the grip portion 252*a* and operate the steering switch 252.

Here, the grip portion 81*a* of the shuttle lever 81 is separated from the grip 21*a* of the steering wheel 21 downward and leftward, and is arranged at a position where the fingers cannot reach when the grip 21*a* is gripped. Thus, it is possible to prevent the shuttle lever 81 from being operated unintentionally when the steering switch 252 is operated with the grip 21*a* held. It is also possible to prevent the steering switch 252 from being operated unintentionally when the shuttle lever 81 is operated.

As shown in FIG. 95, the steering switch 252 has a first direction (a direction indicated by arrowed lines C1 and C2) for switching the start or end of the automatic operation and a second direction (a direction indicated by arrowed lines D1 and D2) for switching a start point and an end point of a reference traveling line defining and functioning as a reference of the scheduled traveling line, and the steering switch 252 is configured to be swung in the first direction and in the second direction.

The swinging in the first direction is the swing from the neutral position upward or downward. The swinging in the second direction is the swing from the neutral position to the front or the rear. When the setting mode is valid, the steering switch 252 commands (outputs) start of the auto steering by swinging downward (in the direction of arrowed line C1) from the neutral position, and commands end of the auto steering by swinging upward (in the direction of arrowed line C2) from the neutral position. In addition, when the setting mode is valid, the steering switch 252 sets the starting point of the reference traveling line by swinging from the neutral position to the rear (in the direction of arrowed line D1), and sets the end point of the reference traveling line by swinging from the neutral position to the front (in the direction of arrowed line D2).

As shown in FIG. 92 to FIG. 94, the correction switch 253 is arranged on the other side (the right side) of the steering shaft 231 in the vehicle width direction. In addition, the correction switch 253 is arranged behind the steering shaft 231 in the front-rear direction. That is, the correction switch 253 is arranged to the right of the steering shaft 231 and behind the steering shaft 231 (obliquely right rear). In this preferred embodiment, the correction switch 253 includes a push switch. The correction switch 253 is arranged rightward and rearward (obliquely right rearward) of the column cover 79 in the positional relation with respect to the column cover 79. The correction switch 253 is arranged in the rear portion of the second area **78*f*2 of the attachment surface 78*f* in the positional relation with respect to the attachment surface 78*f* of the panel cover 78**.

In addition, the correction switch 253 is arranged behind the display device 245 (on the side of the driver seat 19) in the positional relation with respect to the display device 245. As a result, the driver can easily and accurately operate the correction switch 253 while checking the display device 245 without changing the posture of the driver sitting on the driver seat 19.

As shown in FIG. 94, the correction switch 253 does not overlap with the grip **21*a* of the steering wheel 21 when viewed from the axial direction of the steering shaft 231. In particular, the correction switch 253 is arranged inside the grip 21*a* of the steering wheel 21 (on the side close to the axis of the steering shaft 231) when viewed from the axial direction of the steering shaft 231**.

Figure 108:
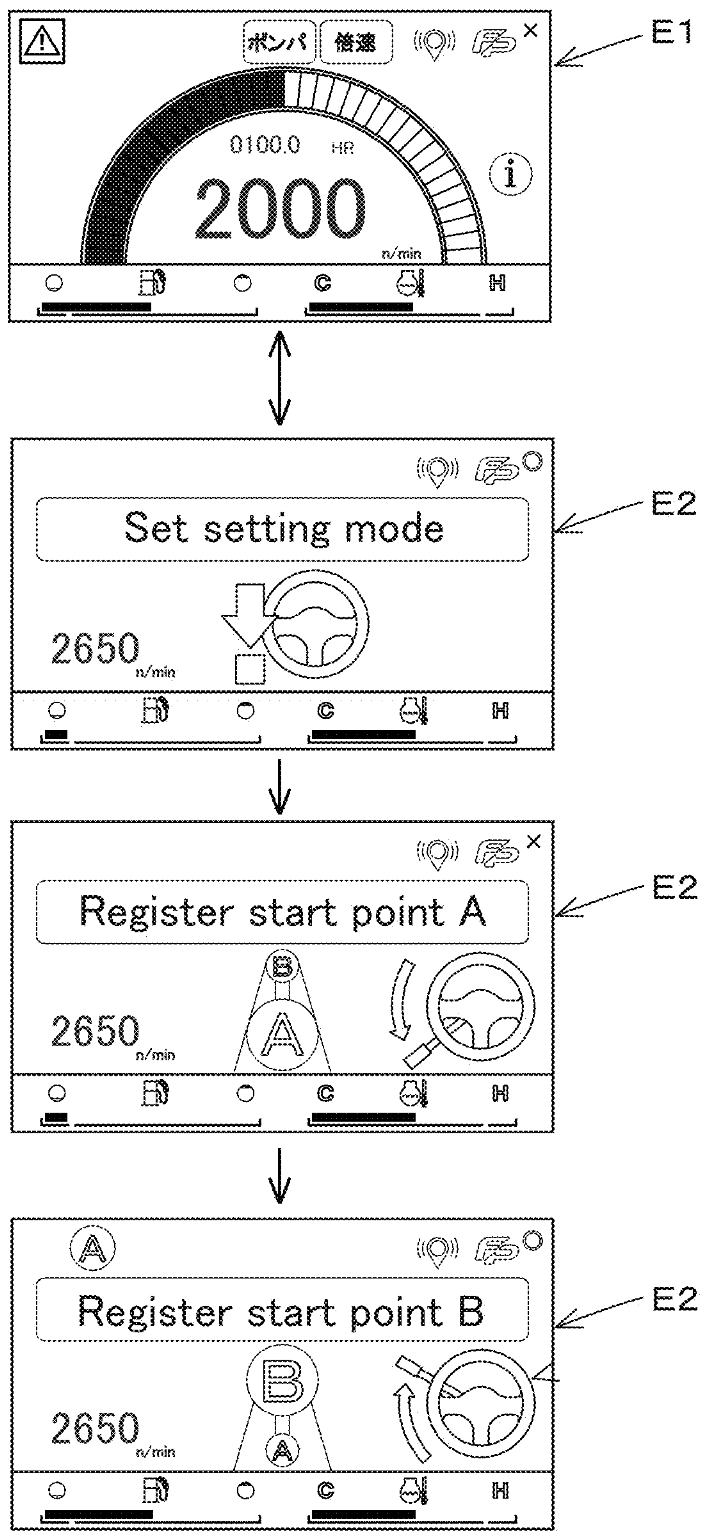
FIG. 108 is a view illustrating an example of a first screen and a second screen both switched by a screen switch according to a preferred embodiment of the present invention.

The screen switch 254 is a switch configured to switch the display of the display device 245 between the first screen E1 that displays the operation state (the driving information) in the setting mode and the second screen E2 that explains the setting operation in the setting mode. FIG. 108 shows an example of the first screen E1 and the second screen E2 displayed on the display device 245.

As shown in FIG. 93 and FIG. 94, the screen switch 254 is arranged on the other side (the right side) of the steering shaft 231 in the vehicle width direction. The screen switch 254 is arranged in front of the steering shaft 231 in the front-rear direction. That is, the screen switch 254 is arranged to the right of and in front of the steering shaft 231 (obliquely right front). In this preferred embodiment, the screen switch 254 includes a push switch. The screen switch 254 is arranged to the right and front (obliquely right front) of the column cover 79 in the positional relation with respect to the column cover 79. The screen switch 254 is arranged in the front portion of the second area 78F of the attachment surface **78*f* in the positional relation with respect to the attachment surface 78*f* of the panel cover 78. The screen switch 254 is arranged in front of the correction switch 253**.

As shown in FIG. 94, the screen switch 254 does not overlap with the grip **21*a* of the steering wheel 21 when viewed from the axial direction of the steering shaft 231. In particular, the screen switch 254 is arranged inside the grip 21*a* of the steering wheel 21 (on the side close to the axis of the steering shaft 231) when viewed in the axial direction of the steering shaft 231**.

As described above, the setting switch 251, the steering switch 252, the correction switch 253, and the screen switch 254 are collectively arranged around the steering shaft 231. Thus, the driver can clearly recognize the position of each switch. In addition, the driver can operate each switch without changing the posture while sitting on the driver seat 19. Thus, the operability is improved and erroneous operation can be prevented. In addition, the harness (the wiring) routed from each switch can be shortened.

In addition, as shown in FIG. 93 and FIG. 94, a combination switch 82 is provided on the attachment surface **78*f* of the panel cover 78. The combination switch 82 is a switch for operating a blinker, a headlight, and the like provided in front of the traveling vehicle body 4. The combination switch 82 is arranged around the steering shaft 231. In particular, the combination switch 82 is arranged on one side (the left side) of the steering shaft 231. The combination switch 82 is arranged on one side (the left side) of the column cover 79 in relation to the column cover 79. The combination switch 82 is arranged below the steering switch 252 and in front of the setting switch 251**.

As shown in FIG. 94, the combination switch 82 does not overlap with the grip **21*a* of the steering wheel 21 when viewed in the axial direction of the steering shaft 231. In particular, the combination switch 82 is arranged inside the grip 21*a* of the steering wheel 21 (on the side close to the axial center of the steering shaft 231) when viewed in the axial direction of the steering shaft 231**.

Regarding the arrangement of the various switches described above, the left and right positional relations may be interchanged. That is, one side may be arranged as the left side and the other side may be arranged as the right side, or one side may be arranged as the right side and the other side may be arranged as the left side. In particular, for example, the setting switch 251 and the steering switch 252 may be arranged on the right side of the steering shaft 231, and the correction switch 253 may be arranged on the left side of the steering shaft 231.

As shown in FIG. 92 to FIG. 94, the tractor T includes a lifting lever 83 and an accelerator lever 84.

The lifting lever 83 is a lever (one-touch lever) that lifts and lowers the connector portion 8. The lifting lever 83 is arranged on the other side (the right side) of the steering shaft 231. The lifting lever 83 can swing around a base end portion provided on the steering shaft 231 side as a fulcrum. The base end of the lifting lever 83 is provided inside the panel cover 78. The lifting lever 83 protrudes to the other side (the right side) of the panel cover 78 and extends upward, and the tip portion thereof is arranged on the other side (the right side) of the column cover 79.

As shown in FIG. 94, when the lifting lever 83 is in the neutral position, lifting lever 83 is arranged between the correction switch 253 and the screen switch 254 when viewed from the axial direction of the steering shaft 231, and the lifting lever 83 does not overlap with the changeover switch 254. As a result, the correction switch 253 and the screen switch 254 can be prevented from being unintentionally operated when the lift lever 83 is operated, and the lift lever 83 can be prevented from being unintentionally moved when the correction switch 253 and the screen switch 254 are operated.

As shown in FIG. 93 and FIG. 94, a grip portion 83*a* that is gripped by the operator is provided at the tip portion (the right end portion) of the lifting lever 83. The grip portion 83*a* is arranged below the grip 21*a* of the steering wheel 21 and in the vicinity of the grip 21*a*. As shown in FIG. 94, the grip portion 83*a* overlaps with the grip 21*a* when viewed in the axial direction of the steering shaft 231. As a result, under the state where the grip 21*a* of the steering wheel 21 is gripped, the fingers can be extended to the grip portion 83*a* to operate the lifting lever 83.

The lifting lever 83 is arranged on the opposite side of the steering switch 252 with the steering shaft 231 interposed therebetween in the vehicle width direction. That configuration can prevent an erroneous operation caused by the operator's hand touching the lifting lever 83 when the steering switch 252 is operated or by the operator's hand touching the steering switch 252 when operating the lifting lever 83.

As shown in FIG. 92 to FIG. 94, the accelerator lever 84 is arranged on the other side (the right side) of the steering shaft 231. The accelerator lever 84 can swing about a base end portion provided on the steering shaft 231 side as a fulcrum. The base end portion of the accelerator lever 84 is provided inside the panel cover 78. The accelerator lever 84 protrudes upward from the attachment surface 78*f* of the panel cover 78 on the other side of the column cover 79. More particularly, the accelerator lever 84 protrudes from the attachment surface 78*f* of the panel cover 78 in front of the correction switch 253 and behind the screen switch 254. The accelerator lever 84 protrudes upward from the attachment surface 78*f* and then extends rightward (separates away from the column cover 79).

A grip portion 84*a* to be gripped by the operator is provided at the tip end (the right end) of the accelerator lever 84. The grip portion 84*a* is arranged below the grip 21*a* of the steering wheel 21. As shown in FIG. 94, the grip portion 84*a* overlaps with the grip 21*a* in the axial direction of the steering shaft 231. The grip portion 84*a* of the accelerator lever 84 is arranged in front of and below the grip portion 83*a* of the lifting lever 83.

Next, the arrangement of the auto steering mechanism 237 will be described below.

As shown in FIG. 91 and FIG. 96 to FIG. 98, the steering motor 238 of the auto steering mechanism 237 is arranged around the steering shaft 231. In particular, the steering motor 238 is arranged, below the steering wheel 21, in front of the steering shaft 231 and to the right (obliquely right front). The output shaft (the rotary shaft) of the steering motor 238 is arranged parallel to the axial direction of the steering shaft 231 and extends downward.

Figure 96:
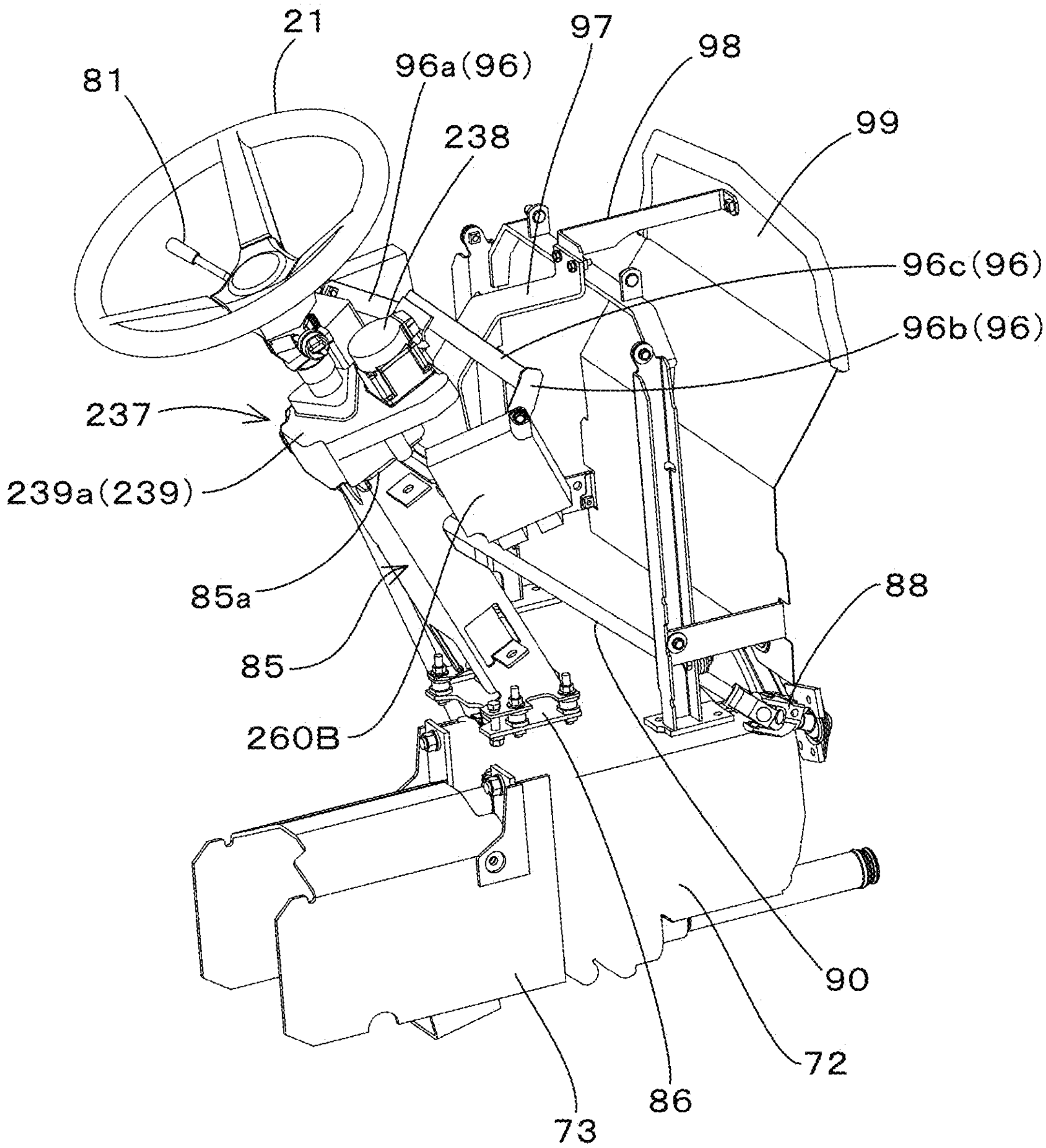
FIG. 96 is a back perspective view illustrating the main portion of the inner structure of the front portion of the traveling vehicle body according to a preferred embodiment of the present invention.
Figure 98:
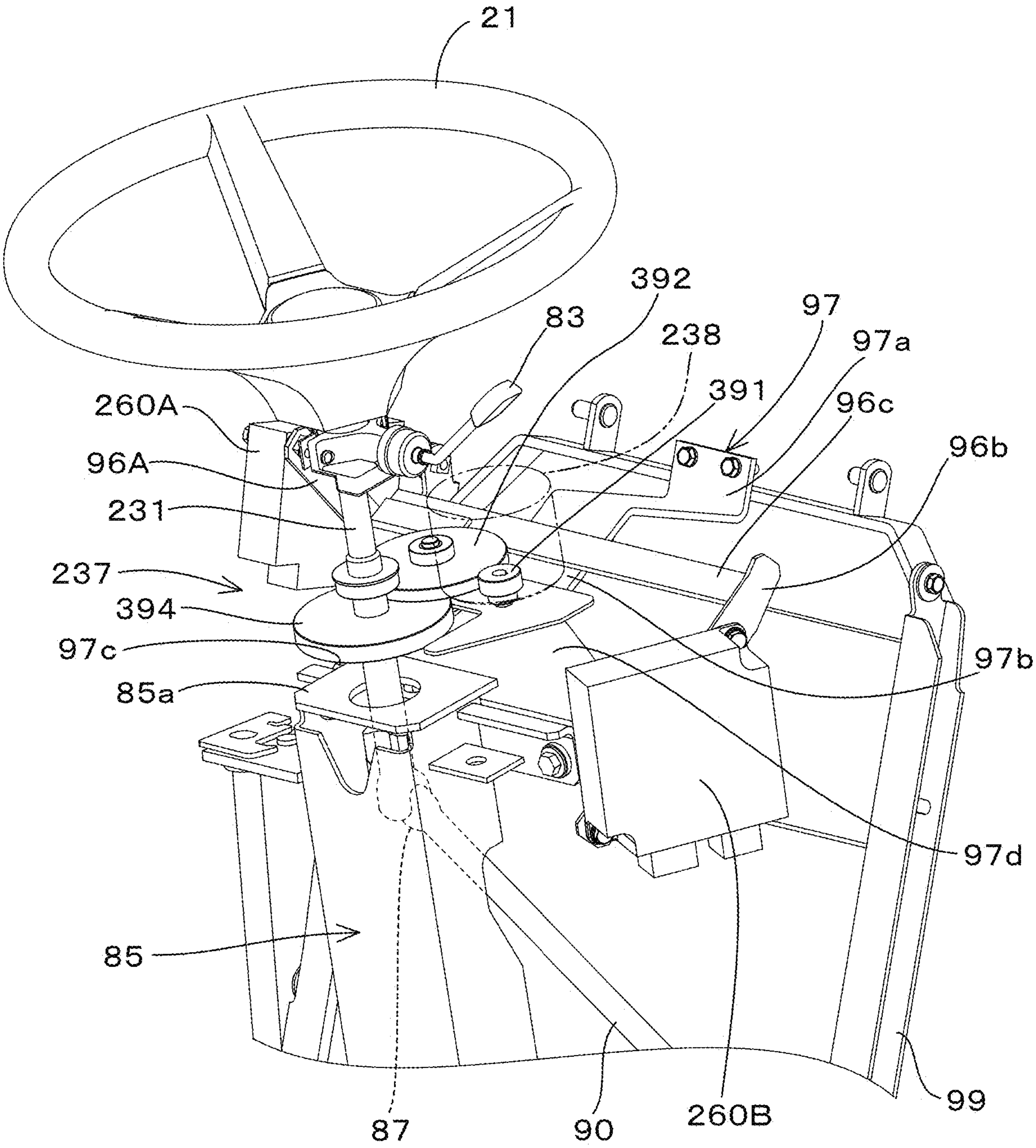
FIG. 98 is a right-back perspective view illustrating the steering handle, a gear mechanism, and the like according to a preferred embodiment of the present invention.

The gear mechanism 239 of the auto steering mechanism 237 includes a gear case 239*a* and a plurality of gears housed inside the gear case 239*a*. As shown in FIG. 91 and FIG. 96, the gear case 239*a* is fixed to the upper end portion of the support post 85. The support post 85 has a rectangular tube shape and extends in the axial direction of the steering shaft 231. As shown in FIG. 96 and FIG. 98, an upper plate 85*a* that supports the gear case 239*a* from below is provided at the upper end portion of the support post 85. In FIG. 98, the gear case 239*a* is omitted and the internal gear is shown. As shown in FIG. 98, the lower portion of the steering shaft 231 that penetrates the upper plate 85*a* and the gear case 239*a* is inserted in the upper portion of the support post 85. As shown in FIG. 89 to FIG. 91 and FIG. 96, the lower end portion of the support post 85 is fixed to the upper portion of the clutch housing 72 with an attachment stay 86 or the like.

The steering motor 238 and the gear mechanism 239 are integrally provided. In particular, the housing of the steering motor 238 is fixed to the upper portion of the gear case 239*a* with bolts or the like.

As shown in FIG. 91, the steering motor 238 and the gear mechanism 239 are arranged in the vicinity of the axis CL1 of the steering shaft 231. In particular, the steering motor 238 and the gear mechanism 239 are arranged closer to the axis CL1 of the steering shaft 231 in the vehicle width direction, compared to the outer edge of the grip 21*a* of the steering wheel 21. In other words, in the vehicle width direction, the steering motor 238 and the gear mechanism 239 arranged between a virtual line VL1 formed by extending the outer end of the grip 21*a* on one side in the vehicle width direction downward and a virtual line VL2 formed by extending the outer end of the grip 21*a* on the other side in the vehicle width direction downward.

Figure 99:
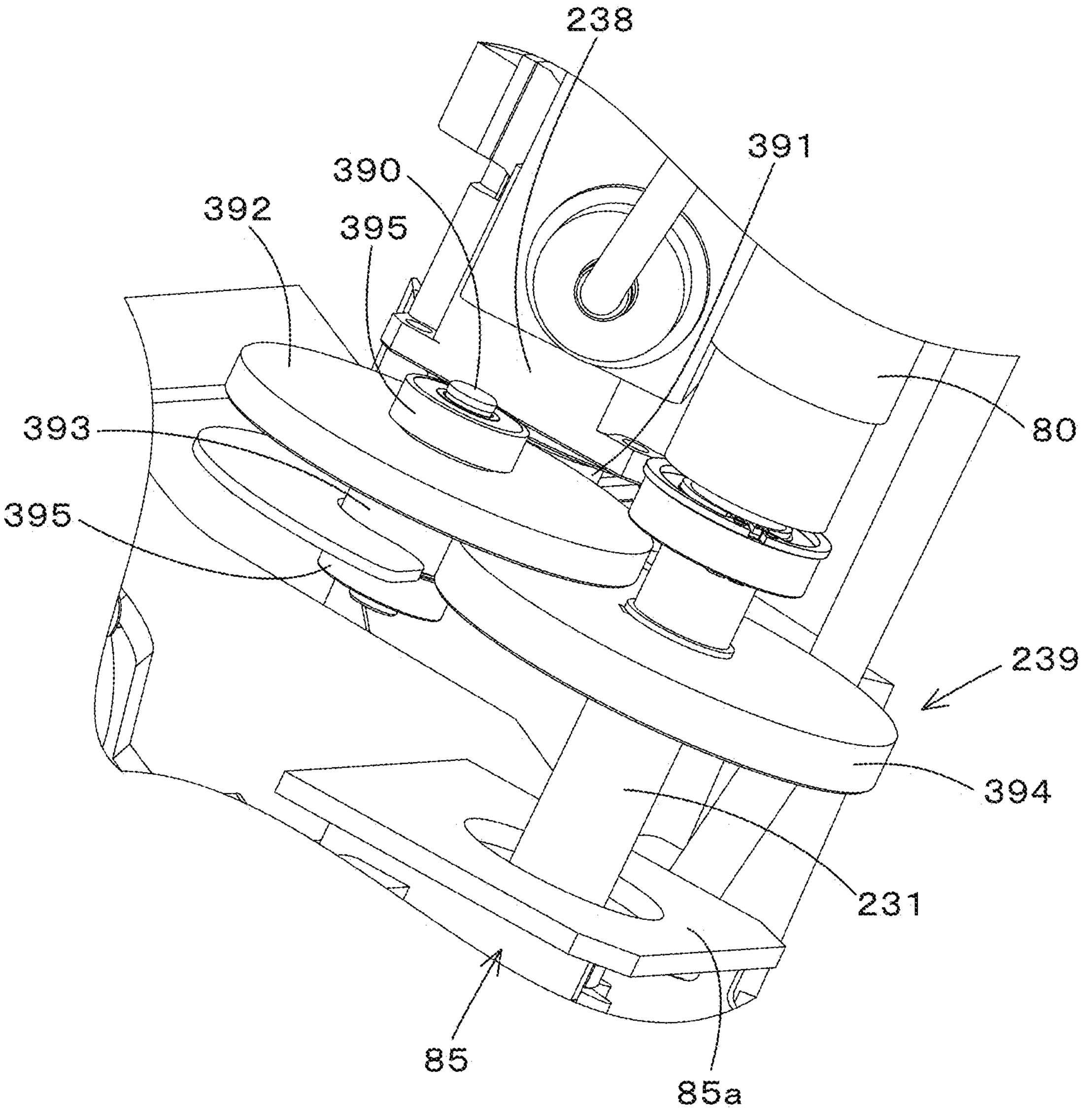
FIG. 99 is a view illustrating the gear mechanism seen from the left according to a preferred embodiment of the present invention.

As shown in FIG. 98 and FIG. 99, the gear mechanism 239 includes a first gear 391, a second gear 392, a third gear 393, and a fourth gear 394. The first gear 391 is attached to the output shaft (the rotating shaft) of the steering motor 238. The second gear 392 is arranged in front of the steering shaft 231 and engages with the first gear 391. The third gear 393 is arranged below the second gear 392, and is connected to the second gear 392 by a connector shaft 390. The connector shaft 390 is rotatably supported by a bearing 395 held in the gear case 239*a*. The second gear 392 and the third gear 393 rotate integrally with the connector shaft 390. The fourth gear 394 engages with the third gear 393. The fourth gear 394 is attached to the steering shaft 231, and rotates together with the steering shaft 231.

When the steering motor 238 drives and the output shaft rotates, the power of the rotation is transmitted from the first gear 391 to the second gear 392, and thereby the connector shaft 390 rotates. When the connector shaft 390 rotates, the third gear 393 rotates, the power of the rotation is transmitted to the steering shaft 231 with the fourth gear 394, and then the steering shaft 231 rotates. In this manner, the steering shaft 231 is rotated by the driving of the steering motor 238.

Next, the arrangement of the power steering device 232 will be described below.

As shown in FIG. 88 and FIG. 98, the steering shaft 231 is connected to the control valve 234 of the power steering device 232 with a linkage mechanism (universal joints 87, 88, 89 and arms 90, 91, 92). In particular, the lower portion of the steering shaft 231 is connected to one end of the first arm 90 with the first universal joint 87. The other end of the first arm 90 is connected to one end of the second arm 91 with the second universal joint 88. The other end of the second arm 91 is connected to one end of the third arm 92 with the third universal joint 89. The other end of the third arm 92 is connected to the power steering device 93 including the control valve 234. The structure of the power steering device 232 shown in FIG. 88 is partially different from the structure shown in FIG. 82, but any structure may be used or other structures may be used.

The power steering device 93 shown in FIG. 88 includes a control valve 234 and a steering cylinder (power cylinder) 235. The power steering device 93 (control valve 234, steering cylinder 235) is supported by the front axle frame 70. The power steering device 93 is arranged between the first frame 70A and the second frame 70B of the front axle frame 70. The power steering device 93 is connected to the hydraulic pump 233 with a hydraulic hose (not shown in the drawings). The hydraulic pump 233 is arranged behind the power steering device 93 and above the second frame 70B of the front axle frame 70. The hydraulic pump 233 is driven by the power of the prime mover 6.

The steering cylinder 235 is connected to one ends (the inner ends) of the left and right tie rods 95 with the pitman arm 94. The other end (the outer end) of the tie rod 95 is connected to the left and right front wheels 2. When the steering wheel 21 is manually rotated (steered), this rotation is transmitted from the steering shaft 231 to the power steering device 93 through the linkage mechanism (the universal joints 87, 88, 89 and arms 90, 91, 92), and then the control valve 234 operates (the spool moves). As a result, the operation fluid outputted from the hydraulic pump 233 is sent to the steering cylinder 235, whereby driving the steering cylinder 235. The driving force of the steering cylinder 235 is transmitted to the tie rod 95 via the pitman arm 94, and the movement of the tie rod 95 changes the azimuth of the left and right front wheels 2.

As shown in FIG. 109, the power steering device 93 (the control valve 234, the steering cylinder 235) and the hydraulic pump 233 that define the power steering device 232 are arranged outside the panel cover 78 (in front of the panel cover 78). On the other hand, as shown in FIG. 89 and FIG. 90, the auto steering mechanism 237 (the steering motor 238, the gear mechanism 239) is arranged inside the panel cover 78. In this manner, the auto steering mechanism 237 (the steering motor 238, the gear mechanism 239) and the power steering device 232 are arranged at a distance, separating from each other.

When the auto steering mechanism 237 and the power steering device 232 (for example, the control valve 234) are arranged in the vicinity of each other, a collectively-large arrangement space is required. However, the auto steering mechanism 237 and the power steering device 232 are arranged separating from each other, and thereby the respective arrangement spaces can be small, and the collectively-large arrangement space is not required.

Figure 97:
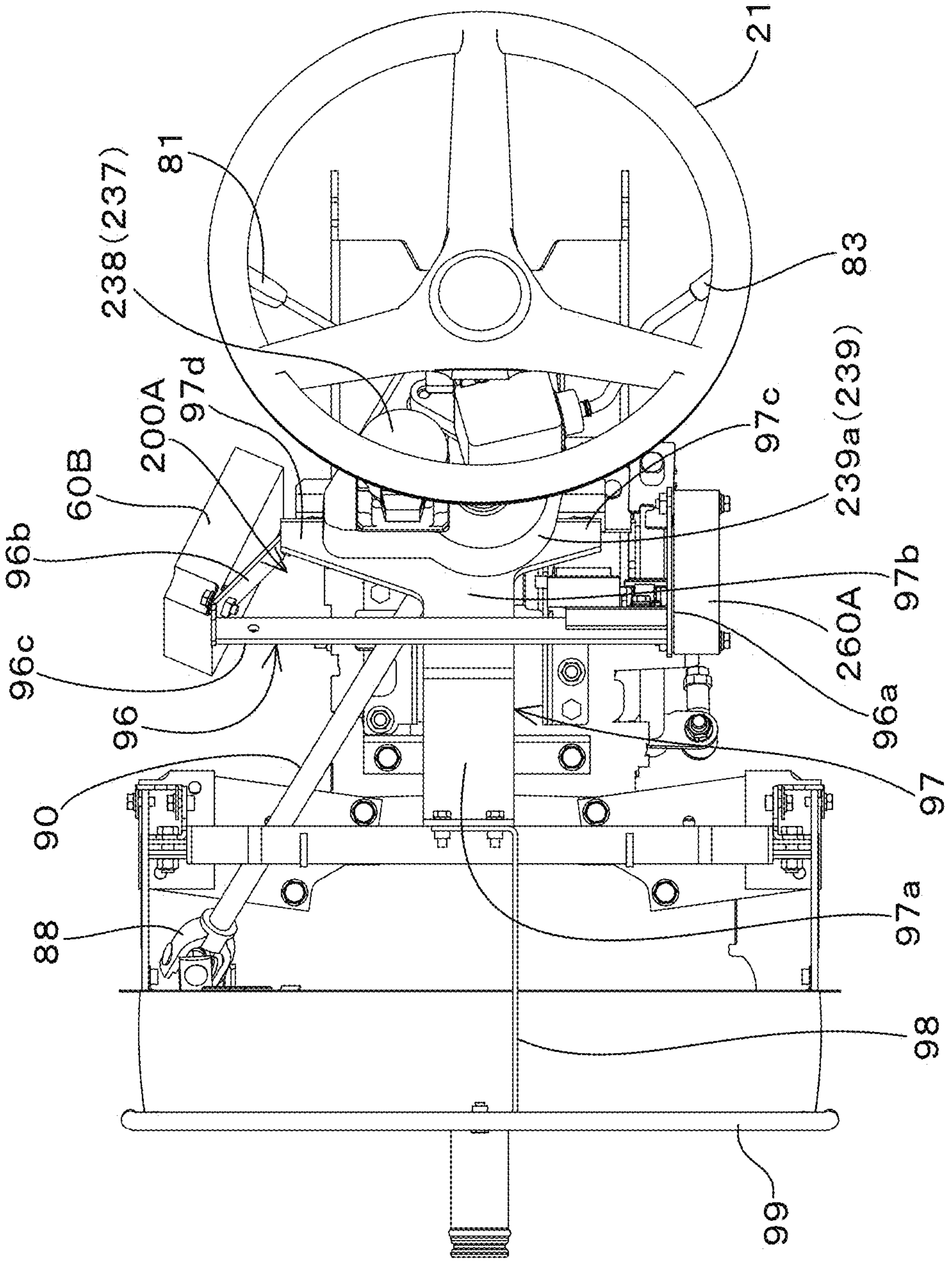
FIG. 97 is a plan view illustrating enlargement of a portion (a front portion) of FIG. 88 according to a preferred embodiments of the present invention.

As shown in FIG. 89 and FIG. 90, the first controller device 260A and the second controller device 260B are arranged inside the panel cover 78. As shown in FIG. 91 and FIG. 97, the first controller device 260A is arranged on one side (the left side) of the steering shaft 231. The second controller device 260B is arranged on the other side (the right side) of the steering shaft 231. The first controller device 260A and the second controller device 260B are connected by a harness (not shown in the drawings) capable of transmitting electric signals.

As described above, the first controller device 260A and the second controller device 260B are separately configured, and are separately arranged on one side (the left side) and the other side (the right side) of the steering shaft 231. As a result, the first controller device 260A and the second controller device 260B can be downsized as compared with the case of an integrated controller device, and can be arranged in the vicinity of the steering shaft 231. Thus, the first controller device 260A and the second controller device 260B can be reliably housed in the panel cover 78. In addition, since the first controller device 260A and the second controller device 260B are arranged separately from each other, it is possible to prevent the heat generated from one controller device from adversely affecting the other controller device.

Each of the first controller device 260A and the second controller device 260B have a housing and a circuit board arranged inside the housing. The circuit board includes various electric/electronic components such as semiconductors, and can perform the above-described control and the like. The housing has a rectangular parallelepiped shape, and is vertically arranged. In particular, in the housing of the first controller device 260A, the shortest side faces the vehicle width direction and the longest side faces the vertical direction among the three sides (vertical, horizontal, and height). In the housing of the second controller device 260B, among the three sides, the shortest side is oriented substantially in the vehicle width direction, and the longest side is oriented substantially in the front-rear direction. As described above, in the first controller device 260A and the second controller device 260B, the shortest side faces the vehicle width direction or faces substantially the vehicle width direction. In this manner, the occupying area of the first controller device 260A and the second controller device 260B in the vehicle width direction becomes smaller, so that the first controller device 260A and the second controller device 260B can be reliably housed in the panel cover 78. In addition, since the panel cover 78 can be made small, it is possible to sufficiently secure the foot space and the forward field of view of the driver sitting on the driver seat 19. In addition, since the first controller device 260A and the second controller device 260B can be arranged close to each other, it is possible to shorten the harness connecting the first controller device 260A and the second controller device 260B, and thus the influence of noise is less likely to be affected.

As shown in FIG. 91, the first controller device 260A is arranged closer to the axis CL1 of the steering shaft 231, compared to the outer edge of the grip 21*a* of the steering wheel 21 in the vehicle width direction. In other words, the first controller device 260A is arranged at a position closer to the axis CL1, compared to the imaginary line VL1 extending downward from the outer end on one side of the grip 21*a* of the steering wheel 21 in the vehicle width direction. The second controller device 260B overlaps with an imaginary line VL2 extending downward from the outer end of the grip 21*a* of the steering wheel 21 on the other side in the vehicle width direction.

The second controller device 260B is arranged below the first controller device 260A. The second controller device 260B is arranged below the steering motor 238. That is, the second controller device 260B is arranged at a position shifting downward with respect to the first controller device 260A and the steering motor 238. Accordingly, it is possible to prevent the second controller device 260B from being adversely affected by the heat generated by the first controller device 260A and the steering motor 238.

As shown in FIG. 91, the second controller device 260B and the steering motor 238 are arranged to the right of the axis CL1 of the steering shaft 231. Since the second controller device 260B and the steering motor 238 are arranged in the same direction (rightward) in the vehicle width direction as described above, the second controller device 260B is arranged in the vicinity of the steering motor 238. As a result, the harness that electrically connects the second controller device 260B and the steering motor 238 can be shortened, and thus the influence of noise is less likely to be affected.

As shown in FIG. 88, FIG. 91, and FIG. 96 to FIG. 98, the first controller device 260A and the second controller device 260B are held by a holding member 96. The holding member 96 includes a first holding portion 96*a*, a second holding portion 96*b*, and a connecting portion 96*c*. The first holding portion 96*a* is arranged on one side (the left side) of the steering shaft 231. The first controller device 260A is fixedly held by the first holding portion 96*a* with a fixture such as a bolt. The second holding portion 96*b* is arranged on the other side (the right side) of the steering shaft 231. The second controller device 260B is fixedly held by the second holding portion 96*c* with a fixture such as a bolt. The connecting portion 96*c* extends in the vehicle width direction from one side (the left side) to the other side (the right side) of the steering shaft 231. The connecting portion 96*c* connects the first holding portion 96*a* and the second holding portion 96*b*.

That is, as shown in FIG. 97, the holding member 96 (the first holding portion 96*a*) supports the first controller device 260A with the steering shaft 231 on one side (the left side) of the gear case 239*a* in a plan view. The holding member 96 (the second holding portion 96*b*) supports the second controller device 260B with the steering shaft 231 on one side (the left side) of the gear case 239*a* in a plan view. The holding member 96 (the second holding portion 96*b*) supports the second controller device 260B so that the second controller device 260B moves to one side (the left side) as it extends from the front end to the rear end. As a result, the space 200A between the connector side (the front side) of the gear case 239*a* and the second controller device 260B can be widened, which facilitates wiring and the like.

In addition, as shown in FIG. 91, the holding member 96 supports the first controller device 260A above the gear case 239*a* when the first controller device 260A and the second controller device 260B are viewed with respect to the gear case 239*a*. The second controller device 260B is supported below the gear case 239*a*.

The middle portion of the connecting portion 96*c* of the holding member 96 in the vehicle width direction is fixed to the connecting member 97 by the welding or the like. The connecting member 97 extends in the front-rear direction. As shown in FIG. 96, the connecting member 97 extends forward and rearward respectively from the connecting portion 96*c*. The rear end of the connecting member 97 is fixed to the upper portion of the support post 85. The front end of the connecting member 97 is connected to the rear end of the stay 98 extending in the front-rear direction.

More particularly, as shown in FIG. 97 and FIG. 98, the connection member 97 includes a plate member, and includes the front plate portion 97*a* to which the connecting portion 96*c* is attached, the front plate portion 97*a* extending forward from the connecting portion 96*c*, the rear plate portion 97*b* to which the connecting portion 96*c* is attached, the rear plate portion 97*b* extending rearward (on the steering shaft 231 side) from the connecting portion 96*c*, the one plate portion 97*c* extending from the rear plate portion 97*b* to the first controller device 260A side, and the other plate part 97*d* extending from the rear plate portion 97B to the second controller device 260B side. The one plate portion 97*c* and the other plate portion 97*d* are integrally formed, and are inclined downward as extending toward the steering shaft 231. The rear ends of the one plate portion 97*c* and the other plate portion 97*d* are attached to the support post 85.

The front end of the stay 98 is fixed to the upper portion of the partition plate 99. As shown in FIG. 89 and FIG. 90, the partition plate 99 is arranged inside the bonnet 5, and divides the space inside the bonnet 5 into a front first space SP1 and a rear second space SP2. The prime mover 6 is arranged in the first space SP1. A fuel tank (not shown in the drawings) is arranged in the second space SP2. The lower portion of the partition plate 99 is fixed to the upper portion of the clutch housing 72.

Next, the arrangement and the like of the receiver device 32 of the position detector device 31 will be described below.

The receiver device 32 receives the signal from the positioning satellite, and detects the position of the traveling vehicle body 4 based on the receiving signal. That is, the receiver device 32 is a device configured to detect the position information of the traveling vehicle body 4 with a satellite positioning system (GNSS: Global Navigation Satellite System). As the satellite positioning system, for example, the GPS (Global Positioning System) is used. For example, the receiver device 32 receives the signal transmitted from the positioning satellite and the signal transmitted from the base station installed on the ground, and calculates the position of the traveling vehicle body 4 based on the receiving signal. In particular, in the base station, the correction information including position information (the reference position) of the base station and information obtained based on a signal transmitted from the positioning satellite (a distance between the satellite receivers, or the like) are transmitted to the receiver device 32 by the wireless communication devices or the like. The receiver device 32 corrects the information received from the positioning satellite based on the correction information obtained from the base station, and obtains the position information with higher accuracy. However, as the method for detecting the vehicle body position by the receiver device 32, another method such as the RTK method may be used.

As shown in FIG. 109 and FIG. 110, the receiver device 32 is attached to the ROPS 26.

Before explaining the attachment position of the receiver device 32, the specific configuration of the ROPS 26 will be described below.

The ROPS 26 is provided behind the driver seat 19. The ROPS 26 includes a vertical frame portion 26*a* and a lateral frame portion 26*b*. The vertical frame portion 26*a* includes a first vertical column portion 26*a*1 and a second vertical column portion 26*a*2. The first vertical column portion 26*a*1, the second vertical column portion 26*a*2, and the lateral frame portion 26*b* are integrally formed by bending a square pipe. The first vertical column portion 26*a*1 extends in the vertical direction on the left side and the rear side of the driver seat 19. The second vertical column portion 26*a*2 extends in the vertical direction on the right side and rear side of the driver seat 19. The lateral frame portion 26*b* extends in the vehicle width direction, and connects the upper end of the first vertical pillar portion 26*a*1 and the upper end of the second vertical pillar portion 26*a*2 above and behind the driver seat 19. As a result, the ROPS 26 are formed to have a generally gate shape in front view as a whole. The ROPS 26 can be swung rearward with a pivot shaft 102 provided at the lower end of the first vertical column portion 26*a*1 and the lower end of the second vertical column portion 26*a*2 as a fulcrum.

The receiver device 32 is attached to the lateral frame portion 26*b* of the ROPS 26. The receiver device 32 is fixed to the bracket 103, and the bracket 103 is attached to the lateral frame portion 26*b*. The bracket 103 is attached to a center portion of the lateral frame portion 26*b* in the vehicle width direction, and extends rearward from the central portion. As a result, the receiver device 32 is arranged behind the center of the lateral frame portion 26*b* in the vehicle width direction. In this manner, the receiver device 32 is arranged at a position offset (shifted) rearward from the ROPS 26. The receiver device 32 is arranged above and behind the driver seat 19.

However, the attachment position of the receiver device 32 is not limited to the positions shown in FIG. 109 and FIG. 110. For example, the receiver device 32 may be arranged at a position offset from the ROPS 26 to the front or the side. The receiver device 32 may be attached to the first vertical column portion 26*a*1 or to the second vertical column portion 26*a*2 of the ROPS 26, or may be attached to a portion of the tractor T other than the ROPS 26. In addition, a canopy may be used instead of the ROPS 26, and the receiver device 32 may be attached to the canopy.

Next, the arrangement and the like of the inertia measurement unit 39 of the position detector device 31 will be described below.

The inertia measurement unit 39 is a device configured to measure the inertia of the traveling vehicle body 4. In particular, the inertia measurement unit 39 can measure the inertia (inertia information) such as the yaw angle, the pitch angle, and the roll angle of the traveling vehicle body 4.

As shown in FIG. 100, FIG. 101, FIG. 109, and FIG. 110, the inertia measurement unit 39 is arranged below the driver seat 19 and on the centerline CL2 in the vehicle width direction. In addition, the inertia measurement unit 39 is arranged at a position overlapping with the rear wheel 3 in a side view.

In addition, the inertia measurement unit 39 is arranged above the transmission case 10. In other words, the inertia measurement unit 39 is arranged at a position overlapping with the transmission case 10 in plan view. Since the inertia measurement unit 39 is arranged at the position where the inertia measurement unit 39 overlaps with the transmission case 10, the position of the inertia measurement unit 39 becomes close to the position of the center of gravity of the traveling vehicle body 4. Thus, the inertia measurement unit 39 can easily measure the representative value of the attitude change of the traveling vehicle body 4 (a value that can represent the posture change of the traveling vehicle body 4), and the inertia measurement unit 39 follows the azimuth change of the traveling vehicle body 4, and thus the position can be obtained quickly and accurately. In other words, since the inertia measurement unit 39 is arranged at a position in the traveling vehicle body 4 in which the weight balance in the vertical direction, in the lateral direction, and in the height direction is good, it is possible to improve the measurement accuracy of the position of the traveling vehicle body 4.

Figure 101:
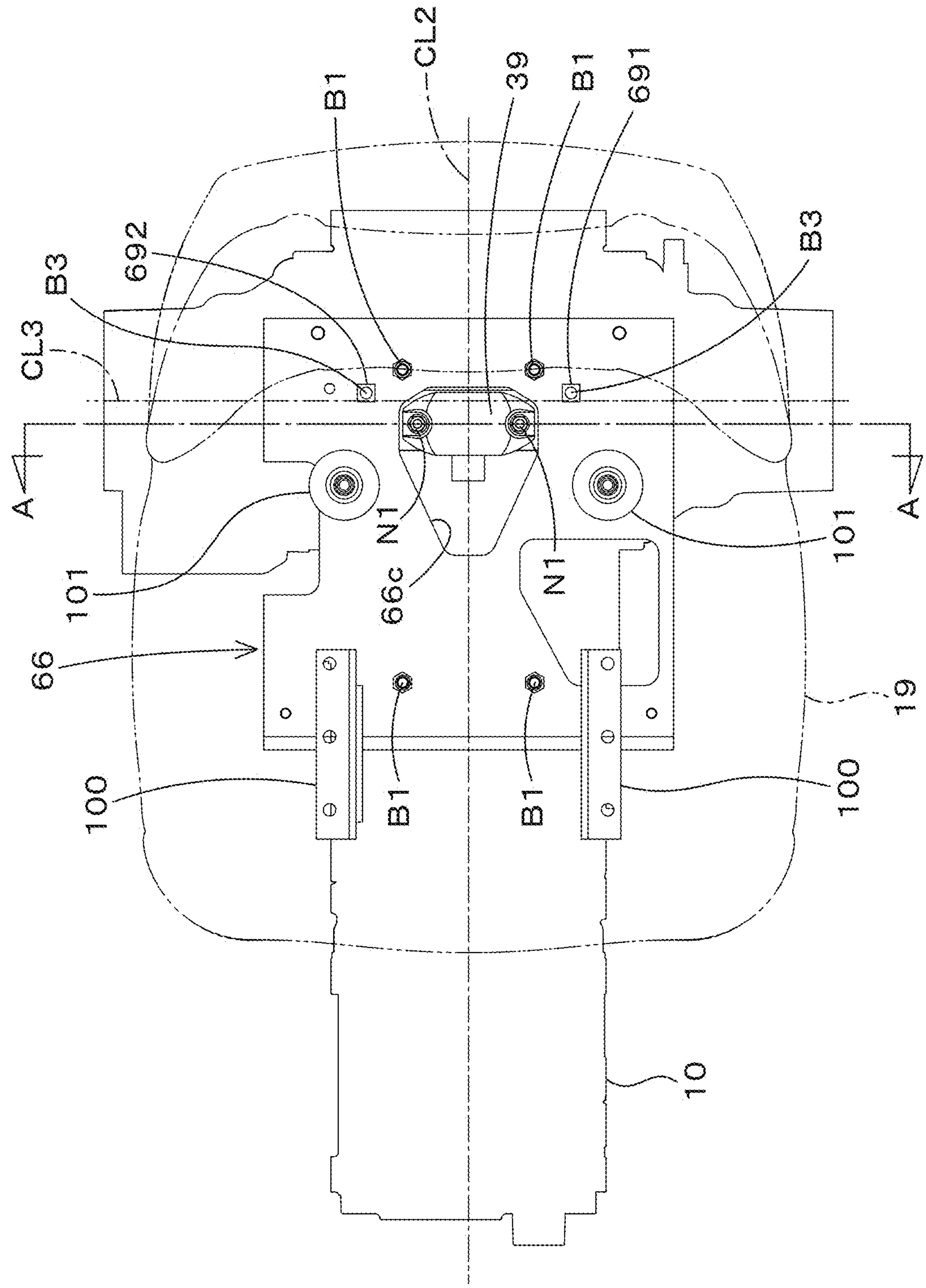
FIG. 101 is a plan view illustrating the attachment structure of the inertia measurement unit according to a preferred embodiment of the present invention.

In addition, as shown in FIG. 101, the inertia measurement unit 39 is arranged on the axial center CL3 of the rear axle in plan view. When the working device (implement) is attached to the connector portion 8, the center of gravity of the traveling vehicle body 4 and the working device is closer to the center axis CL3 of the rear axle, compared to the longitudinal center of the traveling vehicle body 4. Thus, since the inertia measurement unit 39 is arranged on the axis CL3 of the rear axle, the inertia measurement unit 39 is arranged at the center of gravity of the traveling vehicle body 4, the inertia measurement unit 39 is arranged close to the center of gravity of the traveling vehicle body 4 even when the working device (implement) is attached to the connector portion 8, and thus the position of the traveling vehicle body 4 can be obtained quickly and accurately.

Hereinafter, the support structure (attachment structure) of the inertia measurement unit 39 will be described mainly with reference to FIG. 100 to FIG. 106.

The inertia measurement unit 39 is supported on the traveling vehicle body 4 (the transmission case 10) by the support member 65 with the vibration insulator member 64. The vibration-insulator member 64 suppresses the vibration of the inertia measurement unit 39, and includes an elastically deformable member such as a rubber body or a spring.

The support member 65 supports the inertia measurement unit 39 on the traveling vehicle body 4 with the vibration insulator member 64. More particularly, the support member 65 supports the inertia measurement unit 39 with the vibration insulator member 64 in a housing that covers the driving portion configured to drive the traveling vehicle body 4. The driving portion is the prime mover 6 or a device configured to transmit the power of the prime mover 6. In this preferred embodiment, the driving portion is the transmission device 205, and the housing is the transmission case 10. However, the housing on which the support member 65 is supported is not limited to the transmission case 10, and the driving portion covered with the housing is not limited to the transmission device 205. For example, the housing may be the clutch housing 72, and the driving portion may be the clutch. Hereinafter, it is assumed that the driving portion is the transmission device 205, and the housing is the transmission case 10.

The support member 65 is attached to the support plate 66. The support plate 66 is attached to the transmission case (housing) 10. That is, the support member 65 is indirectly attached to the transmission case 10 with the support plate 66. However, the support member 65 may be directly attached to the transmission case (housing) 10 (without the support plate 66).

The support plate 66 is arranged below the driver seat 19 and supports the driver seat 19 from below. The support bracket 100 and the cushion material 101 are attached to the upper surface of the support plate 66. The support bracket 100 is fixed to the left front portion and the right front portion of the support plate 66 by the welding or the like, and extends forward from the support plate 66. In this preferred embodiment, the support bracket 100 includes an angle member having an L-shaped cross portion. The cushion material 101 is formed of an elastic material such as rubber. In this preferred embodiment, the cushion material 101 has a cylindrical shape. The cushion material 101 is fixed to the left rear portion and the right rear portion of the support plate 66 with bolts or the like. The driver seat 19 is supported on the support plate 66 by being mounted on the support bracket 100 and the cushion member 101.

Figure 100:
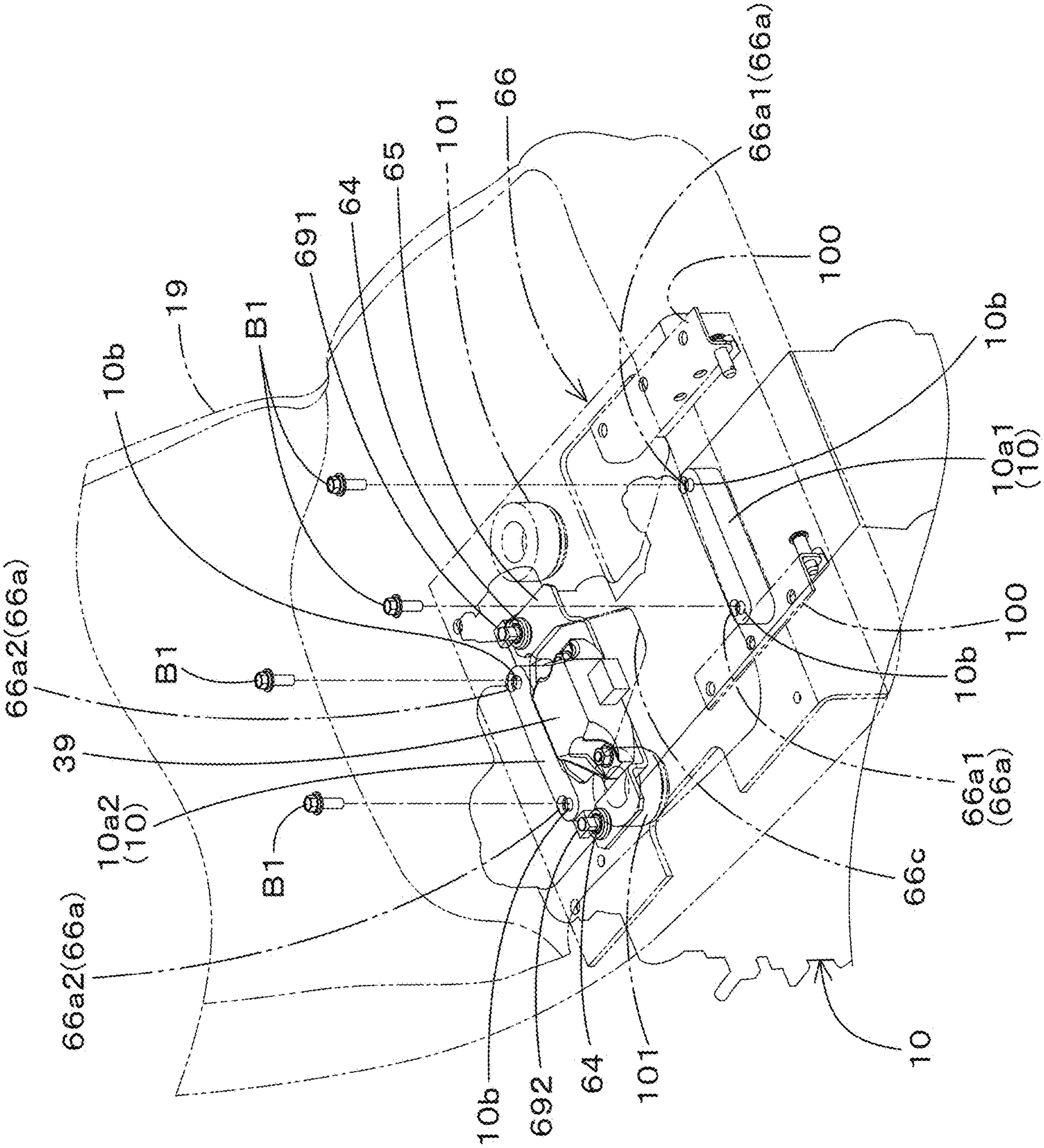
FIG. 100 is a perspective view illustrating an attachment structure of an inertia measurement unit according to a preferred embodiment of the present invention.
Figure 103:
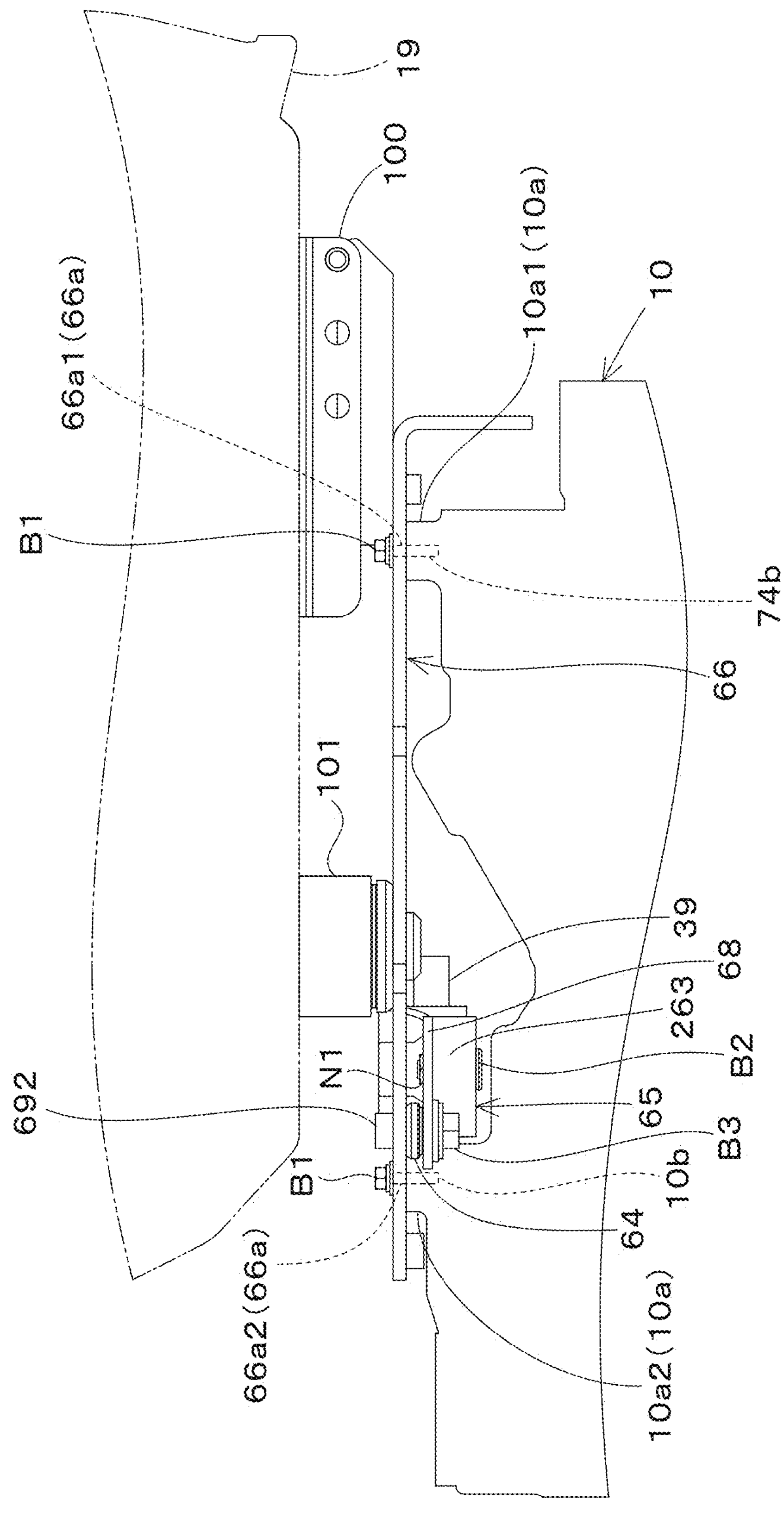
FIG. 103 is aright side view illustrating the attachment structure of the inertia measurement unit according to a preferred embodiment of the present invention.
Figure 104:
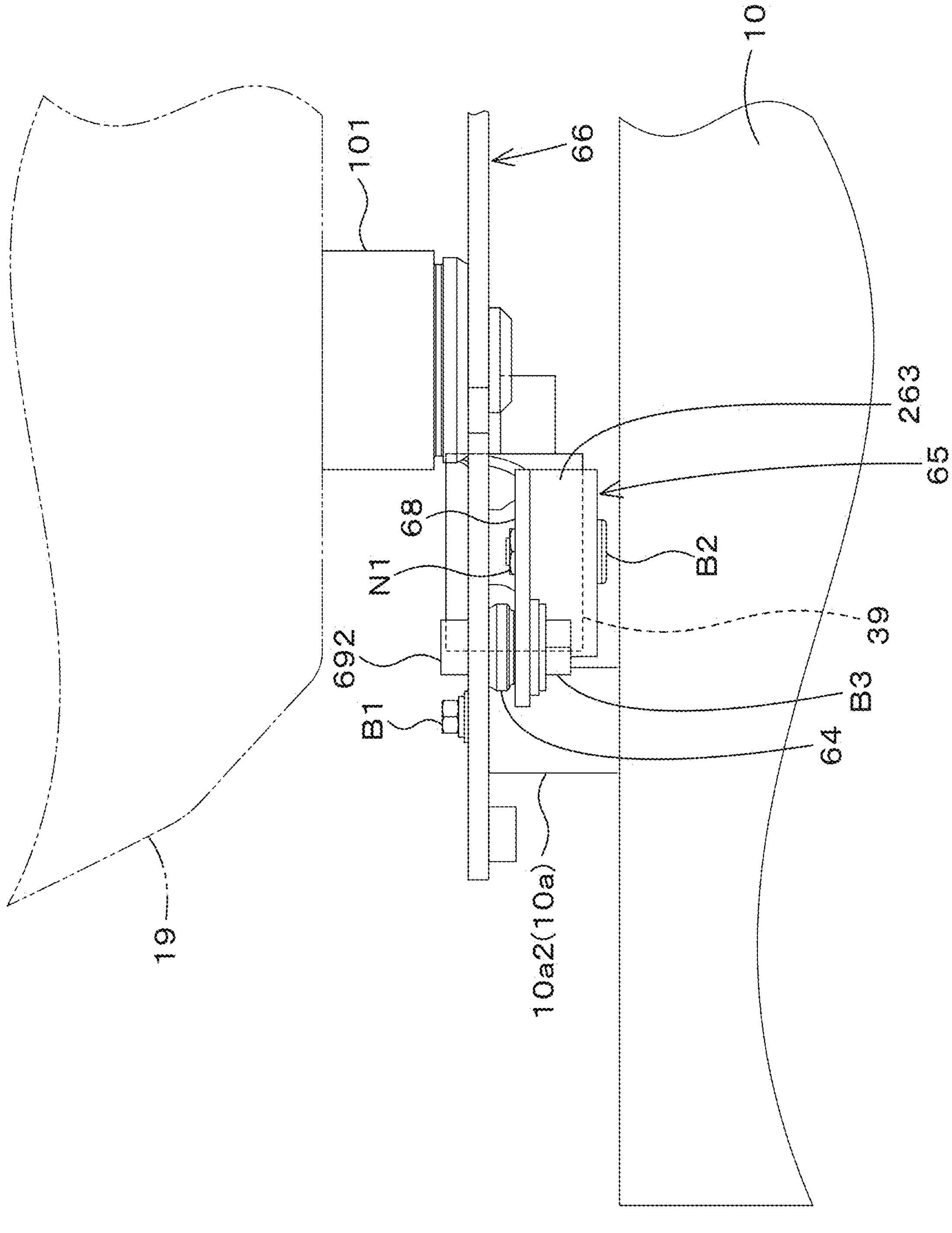
FIG. 104 is a right side view illustrating enlargement of a rear portion of the attachment structure of the inertia measurement unit according to a preferred embodiment of the present invention.

The support plate 66 is attached to the upper portion of the transmission case 10. As shown in FIG. 100, FIG. 103, and the like, the transmission case 10 includes a protruding portion 10*a* that protrudes upward from the upper surface of the transmission case 10. The protruding portion 10*a* includes a front projecting portion 10*a*1 protruding upward from the front portion of the transmission case 10 and includes a rear projecting portion 10*a*2 protruding upward from the rear portion of the transmission case 10. The front protrusion 10*a*1 and the rear protrusion 10*a*2 are arranged at intervals in the front-rear direction, and extend in the vehicle width direction. The front protruding portion 10*a*1 and the rear protruding portion 10*a*2 are each provided with a screw hole 10*b* extending vertically. A plurality of screw holes 10*b* are formed in each of the front protrusion 10*a*1 and the rear protrusion 10*a*2 at intervals in the vehicle width direction. In this preferred embodiment, two screw holes 10*b* are formed in each of the front protrusion 10*a*1 and the rear protrusion 10*a*2 (four in total).

The support plate 66 has a first through hole 66*a* and a second through hole 66*b*.

Figure 102:
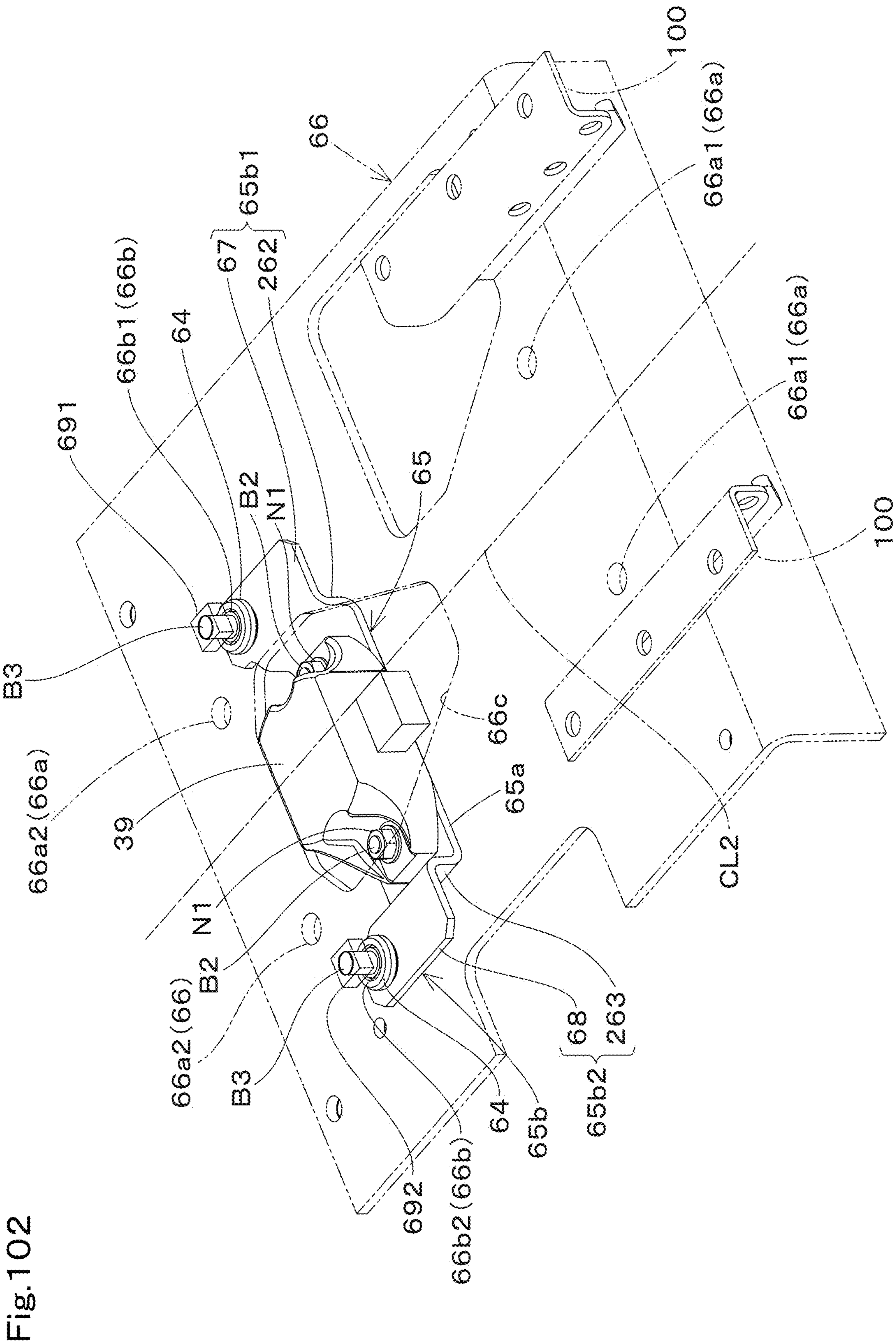
FIG. 102 is a perspective view illustrating the inertia measurement unit, a support member, an anti-vibration member, and a support plate according to a preferred embodiment of the present invention.

The first through hole 66*a* is a hole used to attach the support plate 66 to the transmission case 10. As shown in FIG. 100, FIG. 102, and FIG. 103, the first through holes 66*a* are respectively formed at positions corresponding to the plurality of screw holes 10*b* formed in the transmission case 10. In particular, the first through hole 66*a* includes a front through hole 66*a*1 and a rear through hole 66*a*2. The front through holes 66*a*1 are respectively formed in the left front portion and the right front portion of the support plate 66, respectively. The rear through holes 66*a*2 are respectively formed in the left rear portion and the right rear portion of the support plate 66. The bolt B1 is inserted through the first through hole 66*a*, and the support plate 66 is fixed to the upper portion of the transmission case 10 by screwing the bolt B1 into the screw hole 10*b*.

As described above, the transmission case 10 constitutes a highly rigid vehicle body frame by being integrally connected to the front axle frame 70, the flywheel housing 71, the clutch housing 72, and the intermediate frame 73. Thus, the support plate 66 is fixed to the transmission case 10 so as to be fixed to the highly rigid body frame.

Figure 105:
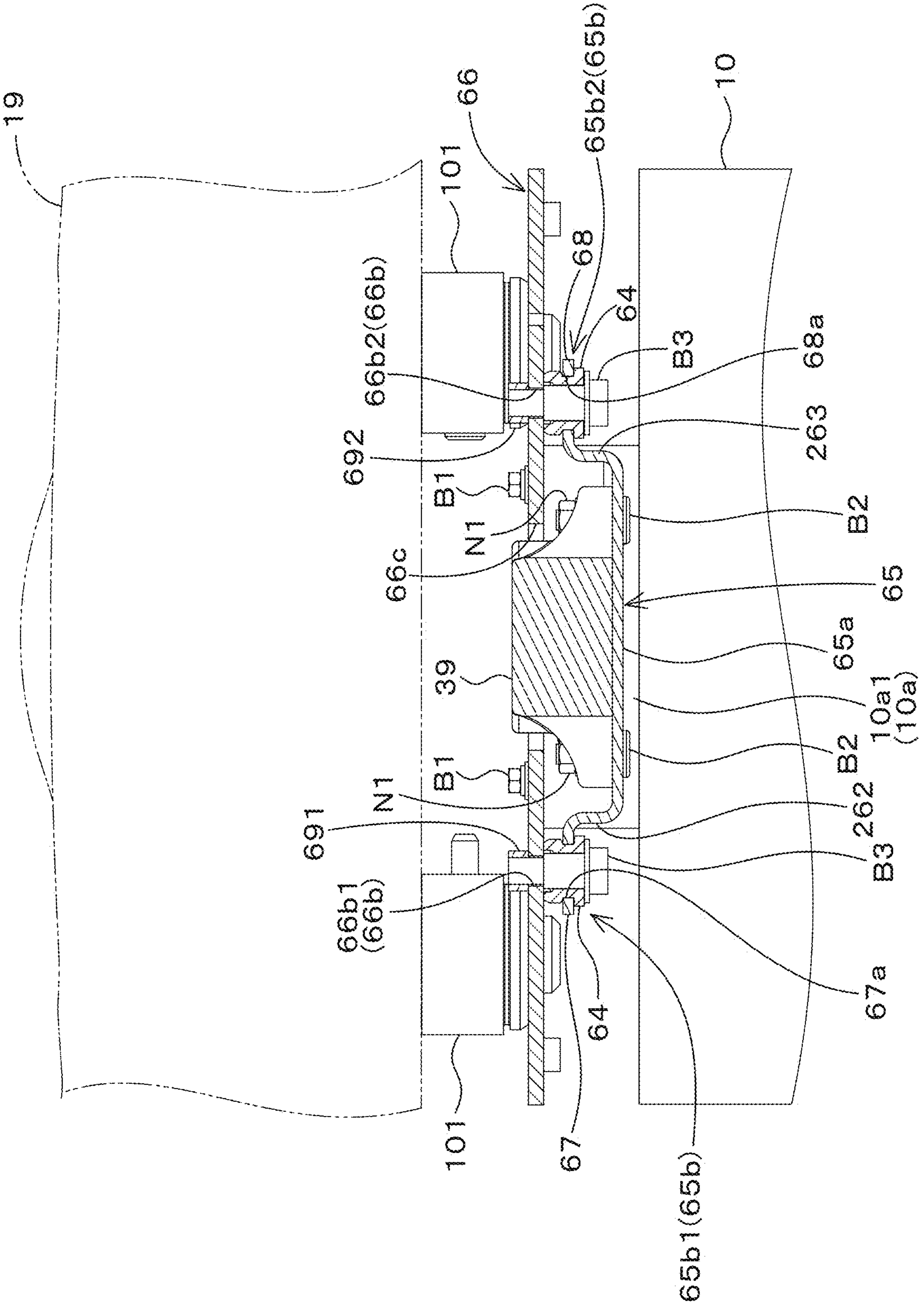
FIG. 105 is a view illustrating an A-A cross portion of FIG. 101 according to a preferred embodiment of the present invention.

The second through hole 66*b* is a hole used to attach the support member 65 to the support plate 66. As shown in FIG. 102 and FIG. 105, the second through hole 66*b* is provided at a position close to the rear side of the support plate 66. More particularly, the second through hole 66*b* is provided behind the front through hole 66*a*1 and in front of the rear through hole 66*a*2. The second through hole 66*b* includes one through hole 66*b*1 provided on one side (left side) in the vehicle width direction and includes another through hole 66*b*2 provided on the other side (right side) in the vehicle width direction. The one through hole 66*b*1 and the other through hole 66*b*2 are respectively provided at symmetrical positions with the center line CL2 in the vehicle width direction interposed therebetween.

A first female screw member 691 and a second female screw member 692 are fixed to the upper surface of the support plate 66. The first female screw member 691 is provided above the first through hole 66*b*1. The second female screw member 692 is provided above the other through hole 66*b*2. The screw hole of the first female screw member 691 communicates with the one through hole 66*b*1. The screw hole of the second female screw member 692 communicates with the other through hole 66*b*2. The first female screw member 691 and the second female screw member 692 can be omitted by directly forming the screw holes in the support plate 66.

As shown in FIG. 102, FIG. 105, and the like, the support member 65 has the attachment portion 65*a* and the fixing portion 65*b*. The attachment portion 65*a* and the fixing portion 65*b* are integrally formed by bending a single plate (a metal plate or the like).

The attachment portion 65*a* is arranged below the support plate 66. The attachment portion 65*a* has a flat plate shape, and is arranged in parallel with the support plate 66. The inertia measurement unit 39 is attached to the attachment portion 65*a*. In particular, the inertia measurement unit 39 is placed on the upper surface of the attachment portion 65*a*, and is fixed to the upper surface by the attachment tools (the bolt B2 and the nut N1).

The fixing portion 65*b* stands up from the mounting portion 65*b*. In particular, the fixing portion 65*b* includes a first fixing portion 65*b*1 provided on the left side of the support member 65 and includes a second fixing portion 65*b*2 provided on the right side of the support member 65. The first fixing portion 65*b*1 includes a first standing portion 262 that stands from the left end of the attachment portion 65*a*, and includes a first upper plate portion 67 that extends leftward from the upper end of the first standing portion 262. The second fixing portion 65*b*2 includes a second standing portion 263 that stands up from the right end of the attachment portion 65*a*, and includes a second upper plate portion 68 that extends rightward from the upper end of the second standing portion 263. The upper surface of the first upper plate portion 67 and the upper surface of the second upper plate portion 68 are arranged at the same height and parallel to the upper surface of the attachment portion 65*a*.

Figure 106:
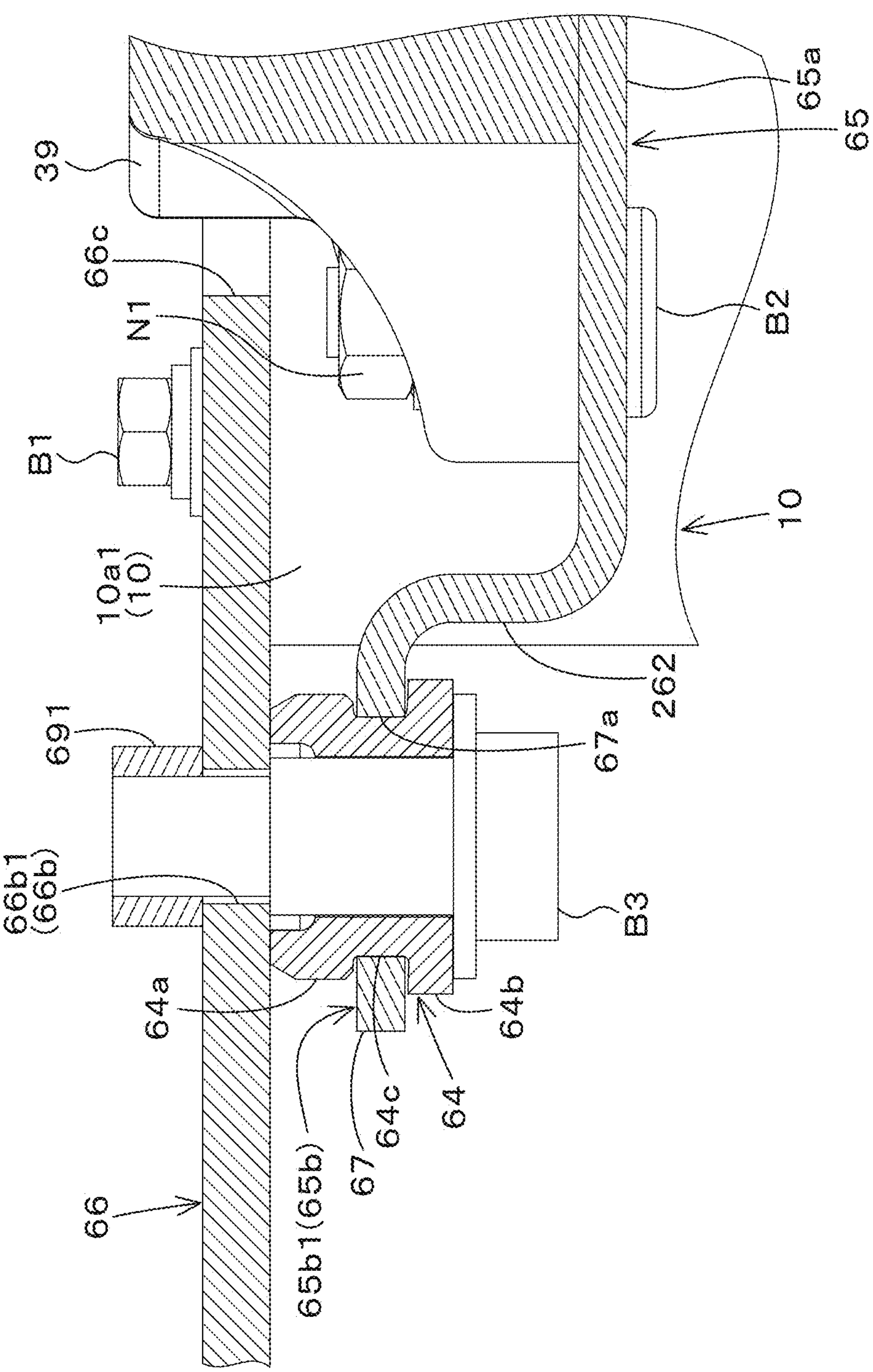
FIG. 106 is a cross-portion view illustrating enlargement of a portion (a left portion) of FIG. 105 according to a preferred embodiment of the present invention.

As shown in FIG. 105 and FIG. 106, the first attachment hole 67*a* is formed in the first upper plate portion 67. The second attachment hole 68*a* is formed in the second upper plate portion 68. The first attachment hole 67*a* and the second attachment hole 68*a* are through holes extending in the vertical direction. The first attachment hole 67*a* is arranged at a position overlapping with the one through hole 66*b*1. The second attachment hole 68*a* is arranged at a position overlapping with the other through hole 66*b*2. The bolts B3 are respectively inserted into the first attachment hole 67*a* and the second attachment hole 68*a*. The bolt B3 inserted into the first attachment hole 67*a* penetrates the one through hole 66*b*1, and is screwed into the screw hole of the first female screw member 691. The bolt B3 inserted into the second attachment hole 68*a* penetrates the other through hole 66*b*2, and is screwed into the screw hole of the second female screw member 692. As a result, the fixing portion 65*b* is fixed to the support plate 66 with the bolt B3.

As shown in FIG. 105, FIG. 106, and the like, the fixing portion 65*b* (first fixing portion 65*b*1, the second fixing portion 65*b*2) is fixed to the support plate 66 with the vibration insulator member 64. The vibration-insulator member 64 includes a substantially cylindrical elastic body (rubber or the like). As shown in FIG. 106, the vibration insulator member 64 has a first large diameter portion 64*a*, a second large diameter portion 64*b*, and a small diameter portion 64*c*. The first large diameter portion 64*a* is provided on the upper portion of the vibration insulator member 64. The second large diameter portion 64*b* is provided below the vibration damping member 64. The small diameter portion 64*c* is provided between the first large diameter portion 64*a* and the second large diameter portion 64*b*. Although FIG. 106 shows the attachment structure of the vibration insulator member 64 in the first fixing portion 65*b*1, the attachment structure of the vibration-insulator member 64 in the second fixing portion 65*b*2 is similar to that in the first fixing portion 65*b*1.

The first large diameter portion 64*a* is interposed between the upper surface of the fixing portion 65*b* (the first fixing portion 65*b*1, the second fixing portion 65*b*2) and the lower surface of the support plate 66. The second large diameter portion 64*b* is interposed between the lower surface of the fixing portion 65*b* (the first fixing portion 65*b*1, the second fixing portion 65*b*2) and the head of the bolt B3. The small diameter portion 64*c* is interposed between the outer circumferential surface of the bolt B3 and the inner peripheral surfaces of the attachment holes (the first attachment hole 67*a*, the second attachment hole 68*a*) of the support member 65. In this manner, the vibration-insulator member 64 is interposed between the bolt B3 and the fixing portion 65*b*

(the first fixing portion 65_b_1, the second fixing portion 65_b_2) and between the fixing portion 65_b_ (the first fixing portion 65_b_1, the second fixing portion 65_b_2) and the support plate 66.

One or both of the first large diameter portion 64_a_ and the second large diameter portion 64_b_ may be formed of elastic deformation of the vibration-insulator member 64 due to tightening of the bolt B3, and may be formed under the state where the vibration-insulator member 64 is not elastically deformed.

As described above, the support member 65 supports the inertia measurement unit 39 below the support plate 66 with the vibration insulator member 64.

As shown in FIG. 101, FIG. 102, and the like, the support plate 66 has an opening 66_c_ provided above the inertia measurement unit 39. The inertia measurement unit 39 is exposed from the opening 66_c_. That is, the inertia measurement unit 39 includes a portion arranged below the support plate 66 and includes a portion protruding above the support plate 66 through the opening 66_c_. The uppermost surface of the inertia measurement unit 39 is arranged above the support plate 66, but is separated from at least the lower surface of the driver seat 19 at least with a distance that can reliably avoid contact with the lower surface. In addition, the opening 66_c_ exposes the attachment tool (nut N1). This allows the attachment tool to be easily removed by inserting a hand, a tool, or the like from the opening 66_c_. In addition, by protruding the upper portion of the inertia measurement unit 39 from the opening 66_c_, the space occupied by the inertia measurement unit 39 can be reduced in the thickness direction (vertical direction).

The attachment position of the inertia measurement unit 39 is not limited to that of the above preferred embodiment. From the viewpoint of accurately detecting the behavior of the tractor (working vehicle) 1 with the inertia measurement unit 39, four positions can be mainly considered as the positions at which the inertia measurement unit 39 is attached.

Figure 107:
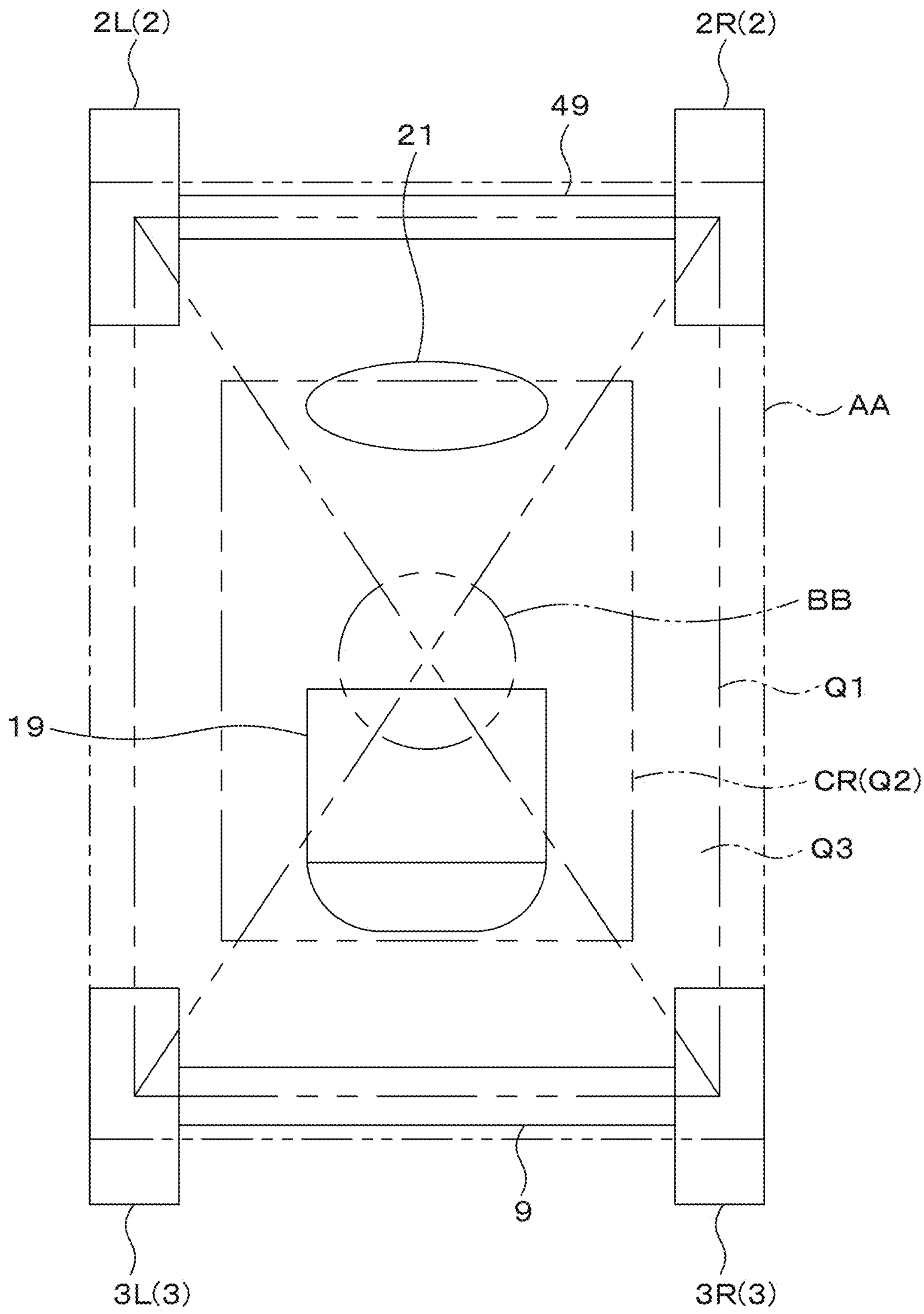
FIG. 107 is a schematic plan view explaining an attachment position of the inertia measurement unit according to a preferred embodiment of the present invention.

The first position is within a region connecting the left front wheel 2L, the right front wheel 2R, the left rear wheel 3L, and the right rear wheel 3R, and is indicated by a reference numeral AA in FIG. 107. The second position is within a region in the vicinity of a portion of a diagonal line connecting the left front wheel 2L and the right rear wheel 3R and a diagonal line connecting the right front wheel 2R and the left rear wheel 3L, and is denoted by reference numeral BB in FIG. 107. The third position is in the vicinity of the center of gravity of the tractor T. The fourth position is a range in which the zero moment point (ZMP) moves when the tractor T is traveling (a range in which the center of gravity moves during the traveling (dynamic center of gravity)), and is indicated by reference numeral CR in FIG. 107. The range in which the ZMP indicated by the reference numeral CR in FIG. 107 moves is a stable region in which the posture of the tractor T is stable during the traveling (for example, a region in which the tractor T travels stably).

The ZMP can be calculated by providing the traveling vehicle body 4 with a plurality of vehicle body state detector portions. The vehicle body state detector device is configured to detect at least a first load (a floor reaction force) and a moment applied to the traveling vehicle body 4, and uses, for example, a 6-component force type load cell configured to detect the first load and the moment in three axis directions (the X axis direction, the Y axis direction, the Z axis direction). The X-axis direction can be set as the traveling direction of the traveling vehicle body 4, the Y-axis direction can be set as the vehicle width direction, and the Z-axis direction can be set as the vertical direction.

The plurality of vehicle body state detector portions include a first state detector portion corresponding to a left front support point (the left front wheel) of the traveling body 4, a second state detector portion corresponding to a right front support point (the right front wheel) of the traveling body 4, a third state detector portion corresponding to a left rear support point (the left rear wheel) of the traveling body 4, and a fourth state detector portion corresponding to a right rear support point (the right rear wheel) of the traveling body 4. The calculation of ZMP can be performed by a controller device (the controller device 260 or another controller device) (computer). The controller device calculates the ZMP shown in two dimensions based on the first load (the floor reaction force) at the support point of the traveling vehicle 4, for example, based on the floor reaction forces and the moments of the first state detector portion, the second state detector portion, the third state detector portion, and in the fourth state detector portion.

In FIG. 107, a region Q1 connecting the support points of the traveling vehicle body 4 (positions at which a plurality of vehicle body state detector portions are installed) is a critical region and is represented by two dimensions of the X axis and the Y axis. The stable region Q2 (CR) is a stable region in which the tractor T takes a stable posture during the traveling, and is a region shifted inward by a predetermined distance from the critical region Q1. A region excluding the critical region Q1 and the stable region Q2, that is, a region between the contour line forming the critical region Q1 and the contour line forming the stable region Q2 is an unstable region Q3 that is likely to become unstable.

When the inertia measurement unit 39 is attached in the stable region Q2 (CR), the measurement accuracy of the inertia measurement device 39 can be improved.

The working vehicle according to the first preferred embodiment of the present invention achieves the following effects.

The working vehicle includes an inertia detector to measure inertia information of a vehicle body, a rear axle supporting a rear wheel, and a transmission case rotatably supporting the rear wheel. The inertia detector overlaps with at least a portion of the transmission case in a plan view.

According to this configuration, the transmission case that rotatably supports the rear axle constitutes a part of the structure (frame) that supports the vehicle body, has high rigidity, and is unlikely to be deformed. With respect to such a transmission case, the inertia measurement unit is arranged at a position overlapping in a plan view. As a result, since the inertia measurement unit is provided under the state where it overlaps with the transmission case, which has high rigidity and is less likely to be deformed, in plan view, the supported portion is not deformed. In addition, in this type of working vehicle, the engine is often installed inside the bonnet arranged in the front portion of the vehicle body, and the inertia measurement unit is less susceptible to the vibration of the engine. As a result, the error caused by the deformation of the supported portion or the influence of vibration is reduced, and thus the measurement accuracy is improved.

Thus, it has become possible to measure the inertia information generated due to the change in the posture of the vehicle body with high accuracy with use of the inertia measurement unit.

In addition, the inertia measurement unit is arranged above a driving axis of the rear axle.

According to this configuration, the upper portion of the rear axle is the position where the load of the vehicle body is applied to the rear wheels through the rear axle, and is the portion having a highly rigid support structure. Since the inertia measurement unit or inertia detector is provided in such a place, the inertia measurement unit or inertia detector can perform the measurement with a small error.

In addition, the working vehicle includes a lifting cylinder to move a working device upward and downward, and a cylinder case housing the lifting cylinder. The inertia measurement unit or inertia detector is arranged above the cylinder case.

According to this configuration, the inertia measurement unit or inertia detector is not directly supported on the upper side of the transmission case but is arranged on the upper side of the cylinder case that houses the lifting cylinder. Vibration is generated in the transmission case by the power transmission mechanism that transmits power, but this vibration is prevented from being directly transmitted to the inertia measurement unit or inertia detector. As a result, by effectively utilizing the case of the lifting cylinder provided to lift and lower the working device connected to the rear portion of the vehicle body, the inertia measurement unit or inertia detector is less susceptible to the influence of vibration, and thus the measurement can be performed with a small error.

In addition, the working vehicle includes a differential device to generate a difference between a driving speed of the right rear axle and a driving speed of the left rear axle. The inertia measurement unit arranged left is arranged above the differential device.

According to this configuration, the differential device is arranged in the middle portion of the vehicle body in the lateral direction, and since the position has high rigidity, the inertia measurement unit is arranged at that position, so the measurement error is reduced.

In addition, the inertia measurement unit arranged left overlaps with at least a portion of the rear axle in the plan view.

According to this configuration, the portion that overlaps with the rear axle in the plan view has high rigidity, and since the inertia measurement unit or inertia detector is arranged at such a portion, the measurement error is reduced.

In addition, the working vehicle includes a driver seat on which an operator can sit. The inertia measurement unit or inertia detector is arranged below the driver seat.

According to this configuration, the driver seat is supported at a position with high rigidity, and the inertia measurement unit or inertia detector is arranged at such a position with high rigidity, so the measurement error is reduced.

In addition, the inertia measurement unit or inertia detector overlaps with at least a portion of the rear wheel in a side view.

According to this configuration, the inertia measurement unit or inertia detector is in the state where the left and right sides are covered by the rear wheels, protected by the rear wheels, and is less likely to be damaged by obstacles.

In addition, the working vehicle includes a ROPS to provide rolling protection, arranged in the vicinity of the transmission case, and an antenna device to receive satellite position information, the antenna device being supported by the ROPS.

The ROPS is installed at a high height so as to bypass the upper portion of the driving portion in order to protect the driver in the case of rolling. Thus, according to the present configuration, by supporting the antenna unit on such a ROPS, it is less likely to be adversely affected by obstacles such as the bonnet and the case of the vehicle body, and thus the satellite position information transmitted from the GPS satellites or the like is well received easily. Moreover, since the ROPS has high rigidity and is unlikely to generate vibration or bending, it is difficult to transmit the vibration generated in the vehicle body, and there is little possibility that an error in the positioning result of position or azimuth of the vehicle body will be caused by the vibration. Thus, it becomes possible to easily and completely receive the satellite position information accurately.

The tractor according to the second preferred embodiment of the present invention achieves the following effects.

The tractor includes an inertia detector to measure inertia information of a vehicle body, a right rear wheel, and a left rear wheel. The inertia detector is provided at a position adjacent to a transmission case of the vehicle body to transmit a driving force to the right and left rear wheels or to a rigid portion of a vehicle frame.

According to this configuration, the position adjacent to the rigid portion of the transmission case or the vehicle body frame is lower than that of the roof of the cabin because the vehicle body is arranged at a lower position, and thus the amount of the vehicle body shaking during traveling is small. Moreover, since the rigid body portion is hardly elastically deformed, the inertia detector does not measure a value larger than the actual value by providing the inertia detector this portion even when the vehicle body sways.

Thereby, the tractor prevents erroneous detection by the inertia detector.

In addition, the rigid body portion includes a pair of the vehicle frames, one of the vehicle frames being arranged to a right side of the transmission case, the other one of the vehicle frames being arranged to a left side of the transmission case. The inertia detector is arranged in a space between the pair of the vehicle frames in a plan view.

According to this configuration, since the inertia detector is arranged in an intermediate space between the left and right frame members, for example, as compared with the case where the inertia detector is provided at the lateral end position of the vehicle body, the fluctuation of the inertia detector in the vertical direction is reduced when the vehicle body rolls, and thereby it is possible to suppress the inconvenience that the measured value of the inertia detector is larger than the actual value.

In addition, the inertia detector is fixed by a fastening bracket in a space below the rigid body portion.

In the tractor, devices are arranged above a rigid structure including an engine, a clutch housing, and a transmission case, but no devices are arranged below this rigid structure, and an open space is provided herein. In addition, since the inertia detector is fixed with the fastening bracket, the inertia detector can be provided at a position where the influence of the shaking of the vehicle body is small without changing the design of the tractor.

In addition, the tractor includes a fender provided at a position covering an upper portion of the right rear wheel, and another fender provided at a position covering an upper portion of the left rear wheel. The inertia detector is arranged at a middle position between the fenders in a front view.

For example, in consideration of the situation where the vehicle body pitches around the left and right rear wheel axles, the amount of displacement toward the upper limit increases as the position is farther from the rear wheel axle during the pitching. On the other hand, by arranging the inertia detector at a middle position between the left and right fenders in a view from the front, it is possible to prevent the disadvantage that the measurement value of the inertia detector becomes larger than the actual value when the vehicle body is pinched.

In addition, the inertia detector is provided at a position overlapping with the rear wheels in a side view.

According to this configuration, since the inertia detector is provided at a position that is not largely separated from the axle of the rear wheel in a side view, the measurement value by the inertia focusing device is reduced to prevent erroneous measurement when the vehicle body is pitched.

In addition, the inertia detector is fixed and housed in a mud-guard case.

According to this configuration, it is possible to suppress the inconvenience such as the damage and the phenomenon where mud and water adhere to the inertia detector.

The working vehicle (tractor) T according to the third preferred embodiment of the present invention achieves the following effects.

The working vehicle T includes a steering wheel 21, a steering shaft 231 rotatably supporting the steering wheel 21, a traveling vehicle body 4 capable of traveling in either the manual steering with the steering wheel 21 or the auto steering of the steering wheel 21 based on the scheduled traveling line, a setting switch 251 arranged around the steering shaft 231 and configured to switch to at least the setting mode to perform the setting before the start of auto steering, and a steering switch 252 arranged around the steering shaft 231 and configured to switch between the start of and the end of the auto steering in the setting mode.

According to this configuration, since the setting switch 251 and the steering switch 252 are arranged around the steering shaft 231, the driver can surely recognize the setting switch 251 and the steering switch 252 at a glance. At the same time, it can be easily operated without changing the posture. Thus, it is possible to prevent unintended auto steering or the like due to an erroneous operation of the switching.

In addition, the working vehicle T includes a position detector device 31 provided on the traveling vehicle body 4 and configured to detect a position of the traveling vehicle body 4 based on a signal of the satellite, and a correction switch 253 arranged around the steering shaft 231 and configured to correct the position of the traveling vehicle body detected by a position detector device 31.

According to this configuration, since the correction switch 253 is arranged around the steering shaft 231 in addition to the setting switch 251 and the steering switch 252, the driver can easily recognize the setting switch 251, the steering switch 252, and the correction switch 253, and can be easily operated without changing the posture. Thus, it is possible to prevent unintended auto steering or the like due to an erroneous operation of the switching.

In addition, the working vehicle T includes a display device 245 arranged around the steering shaft 231 and configured to display the driving information, and a screen switch 254 arranged around the steering shaft 231 and configured to selectively switch between a first screen E1 to display the driving information under a state where the display device 245 is in the setting mode and to a second screen E2 to explain the setting operation in the setting mode.

According to this configuration, in addition to the setting switch 251, the steering switch 252 and the correction switch 253, the screen switch 254 is also arranged around the steering shaft 231, so that the driver can surely recognize at glance the setting switch 251, the steering switch 252, the correction switch 253 and the screen switch 254, and can easily operate the setting switch 251, the steering switch 252, the correction switch 253 and the screen switch 254 without changing the posture. Thus, it is possible to prevent unintended auto steering or the like due to an erroneous operation of the switching.

In addition, the setting switch 251 is arranged on one side of the steering shaft 231, and the correction switch 253 is arranged on the other side of the steering shaft 231.

According to this configuration, the setting switch 251 and the correction switch 253 are arranged in opposite directions with the steering shaft 231 interposed therebetween, so that the space around the steering shaft 231 can be effectively utilized, and it is possible to prevent erroneous operation of the setting switch 251 and the correction switch 253.

The steering switch 252 is arranged on one side of the steering shaft 231.

According to this configuration, since the steering switch 252 and the setting switch 251 are arranged on the same side with respect to the steering shaft 231, the operability of the switch operation for the auto steering of the working vehicle T is improved.

The setting switch 251 is arranged on one side of the steering shaft 231, and the screen switch 254 is arranged on the other side of the steering shaft 231.

According to this configuration, since the setting switch 251 and the screen switch 254 are arranged in opposite directions with the steering shaft 231 sandwiched therebetween, the space around the steering shaft 231 can be effectively utilized and the setting switch 251 can be effectively operated. It is possible to prevent erroneous operation of the screen switch 254 and the setting switch 251.

A panel cover 78 that supports the display device 245 is provided below the steering wheel 21, and the setting switch 251, the correction switch 253, and the screen switch 254 are provided on the panel cover.

According to this configuration, the setting switch 251, the correction switch 253, and the screen switch 254 are collectively arranged on the panel cover 78 that supports the display device 245. Thus, the driver can visually recognize the setting switch 251, the correction switch 253, and the screen switch 254 together with the display device 245, and thus the operability is improved. In addition, since the setting switch 251, the correction switch 253, and the screen switch 254 are arranged at positions separated from the steering wheel 21, it can be prevented from unintentionally touching the setting switch 251, the correction switch 253, and the screen switch 254 during the operation of steering wheel 21, and prevented from unintentionally touching the steering wheel 21 during the operation of the setting switch 251, the correction switch 253, and the screen switch 254. Thus, it is possible to prevent unintended switching to the auto steering due to an erroneous operation.

In addition, the working vehicle T includes a connector portion 8 provided at a rear portion of the traveling vehicle body and configured to be connected to the working device, and a lifting lever 83 for lifting and lowering the connector portion 8. The lifting lever is arranged on the other side of the steering shaft 231.

According to this configuration, since the lifting lever and the steering switch 252 are arranged in the opposite directions with the steering shaft 231 interposed therebetween, the space around the steering shaft 231 can be effectively utilized. In addition, by touching the steering switch 252 when operating the lifting lever 83, or by touching the lifting lever 83 when operating the steering switch 252, it is possible to prevent an unintended operation by the driver.

The setting switch 251 and the correction switch 253 are arranged behind the steering shaft 231.

According to this configuration, since the setting switch 251 and the correction switch 253 are arranged on the side of the driver who operates the steering wheel 21, the operability of the setting switch 251 and the correction switch 253 is improved, and erroneous operation is unlikely to occur.

In addition, the working vehicle T includes a steering wheel 21, a steering shaft 231 rotatably supporting the steering wheel 21, a traveling vehicle body 4 capable of traveling in either the manual steering with the steering wheel 21 or the auto steering of the steering wheel 21 based on the scheduled traveling line, a position detector device 31 provided on the traveling vehicle body and configured to detect the position of the traveling vehicle body based on the signal of the positioning satellite, an auto steering mechanism 237 that automatically steers the steering wheel 21 based on the position of the traveling vehicle body detected by the position detector device 31, a first controller device 260A arranged on one side of the steering shaft 231 and configured to output a control signal calculated based on the position of the traveling vehicle body detected by the position detector device 31, and a second controller device 260B arranged on the other side of the steering shaft 231 and configured to control the auto steering mechanism such that the traveling vehicle body travels along the scheduled traveling line based on a control signal outputted by the first controller device.

According to this configuration, the controller device is downsized as compared with the case where the first controller device 260A and the second controller device 260B are integrated into the controller device. Thus, the controller devices (the first controller device 260A and the second controller device 260B) can be arranged in the vicinity of the steering shaft 231 in a small space. In addition, since the first controller device 260A and the second controller device 260B are arranged in the opposite directions with the steering shaft 231 interposed therebetween, it is possible to prevent the heat generated from one controller device from adversely affecting the other controller device.

In addition, the working vehicle T includes a display device 245 arranged around the steering shaft 231 and configured to display the driving information, and a panel cover 78 supporting the display device 245 below the steering wheel 21. The first controller device 260A and the second controller device 260B are arranged inside the panel cover 78.

According to this configuration, since the first controller device 260A and the second controller device 260B are arranged inside the panel cover 78 in a position close to the steering shaft 231, the panel cover 78 can be downsized. Thus, it is possible to sufficiently secure the driver's foot space and the front field of view.

In addition, the working vehicle T includes a steering wheel 21, a steering shaft 231 rotatably supporting the steering wheel 21, a traveling vehicle body 4 capable of traveling in either the manual steering with the steering wheel 21 or the auto steering of the steering wheel 21 based on the scheduled traveling line, a position detector device 31 provided on the traveling vehicle body and configured to detect the position of the traveling vehicle body based on the signal of the positioning satellite, a position detector device 31 provided on the traveling vehicle body and configured to detect the position of the traveling vehicle body 4 based on a signal from the positioning satellite, a power steering device 232 configured to assist the manual operation of the steering wheel 21, and an auto steering mechanism 237 arranged at a position separating from the power steering device 232 and configured to automatically steer the steering wheel 21 based on the position of the traveling vehicle body detected by the position detector device 31.

According to this configuration, since the power steering device 232 and the auto steering mechanism 237 are arranged at positions spaced from each other, the operation of the power steering device 232 and the operation of the auto steering mechanism 237 are performed independently. In this manner, the power steering device 232 can be operated regardless of whether the auto steering mechanism 237 is operated or not.

In addition, the working vehicle T includes the display device 245 arranged around the steering shaft 231 and configured to display the driving information, the panel cover 78 supporting the display device 245 below the steering wheel 21, and the front wheels 2 and rear wheels 3 supporting the traveling vehicle body 4 such that the traveling vehicle body 4 can travel. The traveling vehicle body has a front axle frame 72 supporting the front wheel. The auto steering mechanism is arranged inside the panel cover. The power steering device 232 includes the hydraulic pump 233, the control valve 234 to which the operation fluid outputted from the hydraulic pump 233 is supplied, and the steering cylinder 235 to be operated by the control valve 234. The control valve 234 is supported by the front axle frame 72.

With this configuration, the auto steering mechanism 237 can be arranged inside the panel cover 78 provided in the vicinity of the steering shaft 231 without increasing the size of the panel cover 78. Thus, it is possible to sufficiently secure the driver's foot space and the front field of view.

In addition, the working vehicle T includes a steering wheel 21, a steering shaft 231 rotatably supporting the steering wheel 21, a traveling vehicle body 4 capable of traveling in either the manual steering with the steering wheel 21 or the auto steering of the steering wheel 21 based on the scheduled traveling line, a position detector device 31 provided on the traveling vehicle body and configured to detect the position of the traveling vehicle body based on the signal of the positioning satellite, the steering switch 252 arranged around the steering shaft 231 and configured to swing between a first direction that switches the start or end of the auto steering and a second direction that sets a start point and an end point of a reference traveling line defining and functioning as a reference of the scheduled traveling line with the base end portion provided on the steering shaft 231 side as a fulcrum.

According to this configuration, only by changing the swing direction of the steering switch 252, the start or end of auto steering can be switched, and the start point and the end point of the reference traveling line defining and functioning as the reference of the scheduled traveling line can be set. Thus, the configuration provides excellent operability. In addition, the installation space for the steering switch 252 can be made smaller than in the case where a plurality of switches are provided as the steering switch 252.

In the steering switch 252, the swinging in the first direction is swinging upward or downward, and the swinging in the second direction is swinging forward or backward.

According to this configuration, the steering switch 252 is swung upward, downward, forward, or backward to switch the start or end of the auto steering and to switch the start point and the end point of the reference traveling line defining and functioning as the reference of the scheduled travel line. Thus, the configuration provides excellent operability.

In addition, the steering switch 252 commands start of the auto steering by swinging downward, commands end of the auto steering by swinging upward, sets the starting point of the reference traveling line by swinging backward, and sets the ending point of the reference traveling line by swinging forward.

According to this configuration, each operation of starting the auto steering, ending the auto steering, setting the starting point of the reference traveling line, and setting the ending point of the reference traveling line can be performed easily and reliably.

In addition, the working vehicle includes the setting switch 251 arranged around the steering shaft 231 and configured to switch to a setting mode for performing the setting at least before start of the auto steering.

According to this configuration, the setting switch 251 is arranged around the steering shaft 231 in addition to the steering switch 252, so that it is possible to provide various switches and thereby to reduce the space for arranging the switches.

In addition, the working vehicle includes the position detector device 31 configured to detect the position of the traveling vehicle body 4 based on a signal from a positioning satellite, and the correction switch 253 arranged around the steering shaft 231 and configured to correct the position detected by the position detector device 31.

According to this configuration, the steering switch 252, the setting switch 251, and the correction switch 253 are collectively arranged around the steering shaft 231, thereby providing a wide variety of switches and reducing the switch arrangement space.

In addition, the working vehicle includes the screen switch 254 arranged around the steering shaft 231 and configured to selectively switch between a first screen E1 to display the driving state under a state where the display device 245 is in the setting mode and to a second screen E2 to explain the setting operation in the setting mode.

According to this configuration, in addition to the steering switch 252, the setting switch 251, the correction switch 253, the screen switch 254 is also arranged around the steering shaft 231. Thus, it is possible to reduce the space for arranging the switches while providing various kinds of switches.

In addition, the working vehicle T includes the traveling vehicle body 4 configured to travel in accordance with either manual steering with the steering wheel 21 or auto steering to the steering wheel 21 based on the scheduled traveling line, the receiver device 32 provided to the traveling vehicle body 4 and configured to receive a signal of a positioning satellite, the inertia measurement unit 39 configured to measure inertia of the traveling vehicle body 4, the auto steering mechanism 237 configured to automatically steer the steering wheel 21 based on the signal received by the receiver device and the inertia measured by the inertia measurement unit 39, the vibration-insulator member configured to suppress vibration of the inertia measurement unit 39, and the support member 65 supporting the inertia measurement unit 39 on the traveling vehicle body 4 with the vibration-insulator member 64.

According to this configuration, the vibration insulator member 64 prevents the vibration of the traveling vehicle body 4 and the like from being transmitted to the inertia measurement unit 39. Thus, the measurement error of the inertia measurement unit 39 can be reduced, and the auto steering can be performed accurately.

In addition, the working vehicle includes the driving portion (for example, the transmission device 205) configured to drive the traveling vehicle body, and the housing (for example, the transmission case 10) configured to cover the driving portion. The support member 65 supports the inertia measurement unit 39 on the housing with the vibration-insulator member 64.

According to this configuration, the vibration insulator member 64 suppresses the transmission of the vibration caused by the drive of the driving portion to the inertia measurement unit 39. Thus, the measurement error of the inertia measurement unit 39 can be reduced.

In addition, the working vehicle includes the support plate 66 attached to the housing 10. The support member 65 includes the attachment portion **65*a* to which the inertia measurement unit 39 is attached, the attachment portion 65*a* being arranged below the support plate 66, and the fixing portion 65*b* standing on the attachment portion 65*a* and being fixed to the support plate 66 by the vibration-insulator member 64**.

According to this configuration, the inertia measurement unit 39 can be attached in the form of being suspended below the support plate 66 attached to the housing 10 with the vibration insulator member 64 interposed between the vibration measurement member 64 and the support plate 65. Thus, it is possible to effectively prevent the vibration from being transmitted to the inertia measurement unit 39 with the vibration insulator member 64. In addition, an installation space such as a driver seat can be secured above the support plate 66.

The working vehicle includes the driver seat 19 provided on the traveling vehicle body 4. The support plate 66 supports the driver seat from below.

According to this configuration, the inertia measurement unit 39 can be arranged below the driver seat 19 with the support plate 66. Thus, the inertia measurement unit 39 can be arranged in the vicinity of the center of gravity of the traveling vehicle body 4, and the measurement accuracy of the inertia measurement unit 39 can be improved.

In addition, the fixing portion **65*b* is fixed to the support plate 66 by the bolt B3. The vibration-insulator member 64** is arranged between the bolt and the fixing portion and between the fixing portion and the support plate.

With this configuration, the vibration insulator member 64 reliably prevents the vibration of the support plate 66 from being transmitted to the inertia measurement unit 39 with the support member 65.

In addition, the housing defines and functions as the transmission case 10. The support plate 66 is attached to the upper portion of the transmission case 10.

According to this configuration, since the support plate 66 is attached to the transmission case 10 having high rigidity, the vibration of the support plate 66 to which the support member 65 is fixed is suppressed, and thereby the measurement accuracy of the inertia measurement unit 39 can be improved.

In addition, the support plate 66 has the opening portion **66*c* provided above the inertia measurement unit 39. The inertia measurement unit 39 is exposed in the opening portion 66*c***.

According to this configuration, the inertia measurement unit 39 can be easily attached and detached using the opening **66*c*. In addition, by projecting the upper portion of the inertia measurement unit 39 from the opening 66*c*, the space occupied by the inertia measurement unit 39** can be reduced in the thickness direction (in the vertical direction).

In the above description, preferred embodiments of the present invention have been explained. However, all the features of the preferred embodiments disclosed in this application should be considered just as examples, and the preferred embodiments do not restrict the present invention accordingly. A scope of the present invention is shown not in the above-described preferred embodiments but in the claims, and is intended to include all modifications within and equivalent to a scope of the claims.

Preferred embodiments of the present invention can be applied to a working vehicle provided with an inertia measurement unit that is configured to measure inertia information associated with changes in the posture of the vehicle body. In addition, preferred embodiments of the present invention can be applied to a tractor capable of automatically traveling by receiving satellite position information, and of measuring the behavior of a vehicle body during the traveling with the inertia measurement unit to improve accuracy of the auto traveling.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A tractor comprising:

an inertia detector to measure inertia information of a vehicle body;

a right rear wheel;

a left rear wheel;

a transmission case of the vehicle body to transmit a driving force to the right rear wheel and the left rear wheel; and a rigid portion including a pair of vehicle frames; wherein one of the pair of vehicle frames is located at a right side of the transmission case, and the other one of the pair of vehicle frames is located at a left side of the transmission case; and the inertia detector is provided at a position adjacent to the rigid portion including the pair of vehicle frames and located in a space between the pair of vehicle frames.

2. The tractor according to claim 1, further comprising:

a first fender covering an upper portion of the right rear wheel; and a second fender covering an upper portion of the left rear wheel; wherein the inertia detector is at a middle position between the first and second fenders in a front view.

3. The tractor according to claim 1, wherein the inertia detector overlaps with at least a portion of the right and left rear wheels in a side view.

4. The tractor according to claim 1, wherein the inertia detector is fixed and housed in a mud-guard case.

* * * * *